US012313987B2

(12) United States Patent
Hosokawa et al.

(10) Patent No.: US 12,313,987 B2
(45) **Date of Patent: *May 27, 2025**

(54) POWDER CONTAINER WITH A NOZZLE RECEIVER

(71) Applicant: Ricoh Company, Ltd., Tokyo (JP)

(72) Inventors: Hiroshi Hosokawa, Kanagawa (JP); Shunji Kato, Kanagawa (JP); Shinji Tamaki, Tokyo (JP); Hiroshi Ikeguchi, Kanagawa (JP); Seiji Terazawa, Shizuoka (JP); Junji Yamabe, Shizuoka (JP); Kaori Mitsuishi, Shizuoka (JP); Toshihide Tomotaka, Shizuoka (JP); Tsunehiro Watanabe, Shizuoka (JP); Kenji Kikuchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/226,270

(22) Filed: Jul. 26, 2023

(65) Prior Publication Data

US 2023/0375959 A1 Nov. 23, 2023

Related U.S. Application Data

(63) Continuation of application No. 17/720,300, filed on Apr. 14, 2022, now Pat. No. 11,874,613, which is a (Continued)

(30) Foreign Application Priority Data

Nov. 25, 2011 (JP) ................................ 2011-258355
Nov. 25, 2011 (JP) ................................ 2011-258356

(Continued)

(51) Int. Cl.
*G03G 15/08* (2006.01)

(52) U.S. Cl.
CPC ..... *G03G 15/0877* (2013.01); *G03G 15/0865* (2013.01); *G03G 15/0872* (2013.01); *G03G 15/0886* (2013.01)

(58) Field of Classification Search
None
See application file for complete search history.

(56) References Cited

U.S. PATENT DOCUMENTS 4,949,123 A 8/1990 Takashima
5,345,297 A 9/1994 Katakabe et al.

(Continued)

FOREIGN PATENT DOCUMENTS

CN 1164682 A 11/1997
CN 1311461 A 9/2001

(Continued)

OTHER PUBLICATIONS

Decision to Grant issued Oct. 11, 2023 in Russian Patent Application No. 2022101674/28(003472), 20 pages.

(Continued)

*Primary Examiner* — Jas A Sanghera
(74) *Attorney, Agent, or Firm* — XSENSUS LLP

(57) ABSTRACT

A powder container including a nozzle receiving opening at one side of the powder container in a longitudinal direction of the powder container, a scoop, at the one side, to scoop up the powder, when the scoop is rotated about a rotational axis, and a holder, at the one side, which is rotatable around the rotational axis relative to the scoop. The holder includes an electrical terminal, facing the longitudinal direction, and the holder and the electrical terminal not intersecting the rotational axis. The electrical terminal is oblique to the rotational axis relative to a vertical direction when the powder container is in a mounted orientation.

20 Claims, 66 Drawing Sheets

Related U.S. Application Data continuation of application No. 17/474,060, filed on Sep. 14, 2021, now Pat. No. 11,662,672, which is a continuation of application No. 17/111,511, filed on Dec. 4, 2020, now Pat. No. 11,347,163, which is a continuation of application No. 16/724,300, filed on Dec. 22, 2019, now Pat. No. 10,915,039, which is a continuation of application No. 16/186,842, filed on Nov. 12, 2018, now Pat. No. 10,564,573, which is a continuation of application No. 15/394,574, filed on Dec. 29, 2016, now Pat. No. 10,156,810, which is a continuation of application No. 15/041,232, filed on Feb. 11, 2016, now Pat. No. 9,581,937, which is a continuation of application No. 14/286,604, filed on May 23, 2014, now Pat. No. 9,482,988, which is a continuation of application No. PCT/JP2012/081219, filed on Nov. 26, 2012.

(30) Foreign Application Priority Data

Nov. 25, 2011 (JP) ................................ 2011-258358
Jun. 18, 2012 (JP) ................................ 2012-137077
Nov. 12, 2012 (JP) ................................ 2012-248855
Nov. 22, 2012 (JP) ................................ 2012-256921

(56) References Cited

U.S. PATENT DOCUMENTS 5,455,662 A 10/1995 Ichikawa et al.
5,495,323 A 2/1996 Meetze, Jr.
5,528,349 A 6/1996 Satake
5,576,816 A 11/1996 Staudt et al.
5,638,160 A 6/1997 Vollenbroek
5,648,840 A 7/1997 Ikunami et al.
5,774,773 A 6/1998 Otsuka et al.
5,890,040 A 3/1999 Matsuoka et al.
5,995,782 A 11/1999 Isobe et al.
6,000,567 A 12/1999 Carlsson et al.
6,104,902 A 8/2000 Meyer
6,118,951 A 9/2000 Kato et al.
6,118,958 A 9/2000 Nagashima
6,169,864 B1 1/2001 Baxendell et al.
6,505,006 B1 1/2003 Solanki et al.
6,519,436 B2 2/2003 Katsuyama
6,608,983 B2 8/2003 Terazawa
6,665,505 B2 12/2003 Meetze, Jr.
6,898,405 B2 5/2005 Matsumoto et al.
7,065,313 B2 6/2006 Matsumoto et al.
7,072,594 B2 7/2006 Hoshi et al.
7,079,788 B2 7/2006 Ban et al.
7,088,942 B2 8/2006 Minagawa
7,130,567 B2 10/2006 Sudo et al.
7,248,825 B2 7/2007 Nishitani et al.
7,277,664 B2 10/2007 Katsuyama et al.
7,302,213 B2 11/2007 Kimura et al.
7,321,744 B2 1/2008 Hosokawa et al.
7,480,476 B2 1/2009 Hosokawa et al.
7,519,317 B2 4/2009 Hosokawa et al.
7,583,917 B2 9/2009 Kimura et al.
7,697,870 B2 4/2010 Hosokawa et al.
7,702,262 B2 4/2010 Taguchi et al.
7,706,699 B2 4/2010 Taguchi et al.
7,720,417 B2 5/2010 Taguchi et al.
7,751,737 B2 7/2010 Ishida et al.
7,822,371 B2 10/2010 Taguchi et al.
7,826,777 B2 11/2010 Taguchi et al.
7,835,673 B2 11/2010 Hosokawa et al.
7,835,675 B2 11/2010 Taguchi et al.
7,853,183 B2 12/2010 Taguchi et al.
7,853,184 B2 12/2010 Taguchi et al.
7,853,185 B2 12/2010 Kimura et al.
7,970,297 B2 6/2011 Inoue et al.
7,991,334 B2 8/2011 Taguchi et al.
8,000,627 B2 8/2011 Mizuishi et al.
8,005,406 B2 8/2011 Hosokawa et al.
8,036,578 B2 10/2011 Nishikawa
8,095,048 B2 1/2012 Awano et al.
8,095,049 B2 1/2012 Ishiguro et al.
8,103,198 B2 1/2012 Kimura et al.
8,126,375 B2 2/2012 Taguchi et al.
8,160,461 B2 4/2012 Taguchi et al.
8,195,070 B2 6/2012 Hosokawa et al.
8,285,179 B2 10/2012 Kimura et al.
8,306,461 B2 11/2012 Yomoda et al.
8,428,488 B2 4/2013 Mizuishi et al.
8,755,722 B2 6/2014 Kimura et al.
8,983,344 B2 3/2015 Kimura et al.
9,280,090 B2 3/2016 Kimura et al.
9,465,319 B2 10/2016 Kimura et al.
9,581,937 B2 2/2017 Hosokawa et al.
9,684,264 B2 6/2017 Kimura et al.
9,910,385 B2 3/2018 Kimura et al.
RE47,086 E 10/2018 Taguchi et al.
11,209,748 B2 * 12/2021 Hosokawa ......... G03G 15/0865
2001/0021326 A1 9/2001 Yanagisawa et al.
2001/0033758 A1 10/2001 Katsuyama
2001/0041083 A1 11/2001 Terazawa et al.
2002/0008735 A1 * 1/2002 Lee ...................... G03G 15/104 347/85
2002/0088138 A1 7/2002 Murakami et al.
2002/0106215 A1 8/2002 Ban et al.
2002/0114646 A1 8/2002 Sudo et al.
2002/0122676 A1 9/2002 Yamada et al.
2002/0127029 A1 9/2002 Yamada et al.
2003/0081968 A1 5/2003 Minagawa
2003/0116923 A1 6/2003 Meetze, Jr. et al.
2003/0170049 A1 9/2003 Itoh et al.
2004/0013445 A1 1/2004 Yamada et al.
2004/0067077 A1 4/2004 Sudo et al.
2004/0091289 A1 5/2004 Terazawa et al.
2004/0223790 A1 11/2004 Hosokawa et al.
2004/0223791 A1 11/2004 Yamada et al.
2004/0247343 A1 12/2004 Matsumoto et al.
2004/0253023 A1 12/2004 Terazawa et al.
2005/0008398 A1 1/2005 Hattori
2005/0041999 A1 2/2005 Sudo
2005/0047818 A1 3/2005 Yamada et al.
2005/0089338 A1 4/2005 Hoshi et al.
2005/0180782 A1 8/2005 Matsumoto et al.
2005/0196180 A1 9/2005 Harumoto
2005/0226655 A1 10/2005 Katsuyama et al.
2005/0271426 A1 12/2005 Okino et al.
2006/0013621 A1 1/2006 Kimura et al.
2006/0034641 A1 2/2006 Yamada et al.
2006/0034842 A1 2/2006 Taguchi et al.
2006/0228127 A1 10/2006 Miyabe et al.
2007/0077100 A1 4/2007 Suzuki et al.
2007/0092303 A1 4/2007 Katsuyama et al.
2007/0122205 A1 5/2007 Taguchi et al.
2007/0147902 A1 6/2007 Taguchi et al.
2007/0154243 A1 7/2007 Taguchi et al.
2007/0154244 A1 7/2007 Taguchi et al.
2007/0160393 A1 7/2007 Taguchi et al.
2007/0160394 A1 7/2007 Taguchi et al.
2007/0147900 A1 8/2007 Taguchi et al.
2007/0177886 A1 8/2007 Taguchi et al.
2007/0177905 A1 8/2007 Hosokawa et al.
2007/0196123 A1 8/2007 Mizuishi et al.
2007/0212119 A1 9/2007 Kurenuma et al.
2007/0242982 A1 10/2007 Sudo et al.
2007/0297828 A1 * 12/2007 Causey ................ G03G 21/181 399/109
2008/0003021 A1 1/2008 Hosokawa et al.
2008/0069596 A1 3/2008 Katsuyama et al.
2008/0124133 A1 5/2008 Yoshizawa et al.
2008/0286013 A1 11/2008 Hosokawa et al.
2009/0047037 A1 2/2009 Shigeo et al.
2009/0129811 A1 5/2009 Katsuyama et al.
2009/0129813 A1 5/2009 Nagashima et al.
2009/0175660 A1 7/2009 Hosokawa et al.
2009/0324298 A1 12/2009 Katsuyama et al.

(56) References Cited

U.S. PATENT DOCUMENTS

| | | | | |
|---|---|---|---|---|
| 2010/0008693 | A1* | 1/2010 | Hayashi ............ | G03G 15/0855 399/262 |
| 2010/0119264 | A1 | 5/2010 | Yamaguchi et al. | |
| 2010/0150606 | A1 | 6/2010 | Yomoda et al. | |
| 2010/0158556 | A1 | 6/2010 | Miyabe et al. | |
| 2010/0189470 | A1 | 7/2010 | Yoshizawa et al. | |
| 2010/0247156 | A1 | 9/2010 | Awano et al. | |
| 2010/0272477 | A1 | 10/2010 | Nishika | |
| 2010/0278564 | A1 | 11/2010 | Nagashima et al. | |
| 2010/0296847 | A1 | 11/2010 | Kurenuma et al. | |
| 2010/0316414 | A1 | 12/2010 | Saito et al. | |
| 2011/0002713 | A1 | 1/2011 | Taguchi et al. | |
| 2011/0008075 | A1 | 1/2011 | Taguchi et al. | |
| 2011/0026973 | A1 | 2/2011 | Hosokawa et al. | |
| 2011/0044717 | A1 | 2/2011 | Miyabe et al. | |
| 2011/0091222 | A1* | 4/2011 | Kim .................. | G03G 21/1652 399/9 |
| 2011/0123232 | A1 | 5/2011 | Takashima et al. | |
| 2011/0243579 | A1 | 10/2011 | Oshikawa et al. | |
| 2011/0249991 | A1 | 10/2011 | Hosokawa et al. | |
| 2011/0262179 | A1 | 10/2011 | Mizuishi et al. | |
| 2011/0286771 | A1 | 11/2011 | Taguchi et al. | |
| 2012/0033998 | A1 | 2/2012 | Hori et al. | |
| 2012/0042504 | A1 | 2/2012 | Fowler | |
| 2012/0045244 | A1 | 2/2012 | Komatsu et al. | |
| 2012/0099887 | A1 | 4/2012 | Shokaku | |
| 2012/0134717 | A1 | 5/2012 | Nagashima et al. | |
| 2012/0134718 | A1 | 5/2012 | Nagashima et al. | |
| 2012/0134719 | A1 | 5/2012 | Nagashima et al. | |
| 2012/0134720 | A1 | 5/2012 | Nagashima et al. | |
| 2012/0141169 | A1 | 6/2012 | Yamane et al. | |
| 2012/0163877 | A1 | 6/2012 | Kikuchi et al. | |
| 2012/0177395 | A1 | 7/2012 | Miyabe et al. | |
| 2012/0213555 | A1 | 8/2012 | Komatsu et al. | |
| 2012/0301188 | A1 | 11/2012 | Yamabe et al. | |
| 2013/0011166 | A1 | 1/2013 | Yamaguchi et al. | |
| 2013/0136505 | A1 | 5/2013 | Nagashima et al. | |
| 2013/0272750 | A1 | 10/2013 | Matsumoto et al. | |
| 2013/0336680 | A1 | 12/2013 | Nagashima et al. | |
| 2014/0050509 | A1 | 2/2014 | Kadota et al. | |
| 2014/0169838 | A1 | 6/2014 | Nagashima et al. | |
| 2014/0270859 | A1 | 9/2014 | Hosokawa et al. | |
| 2015/0104218 | A1 | 4/2015 | Komatsu et al. | |
| 2015/0338775 | A1 | 11/2015 | Hosokawa et al. | |

FOREIGN PATENT DOCUMENTS

| | | | |
|---|---|---|---|
| CN | 1427313 | A | 7/2003 |
| CN | 1609727 | A | 4/2005 |
| CN | 1668986 | A | 9/2005 |
| CN | 1722021 | A | 1/2006 |
| CN | 1930528 | A | 3/2007 |
| CN | 101103315 | A | 1/2008 |
| CN | 101612442 | A | 8/2009 |
| CN | 101750940 | A | 6/2010 |
| CN | 101846927 | A | 9/2010 |
| CN | 102073247 | A | 5/2011 |
| EP | 1 006 415 | A1 | 6/2000 |
| EP | 1 229 402 | A2 | 8/2002 |
| EP | 1 921 512 | A2 | 5/2008 |
| EP | 1 927 898 | A2 | 6/2008 |
| EP | 2261751 | A2 | 12/2010 |
| EP | 2378374 | A3 | 10/2011 |
| JP | 61-162071 | | 7/1986 |
| JP | 63-178271 | | 7/1988 |
| JP | 01-130159 | | 9/1989 |
| JP | 04-009061 | | 1/1992 |
| JP | 04-168459 | | 6/1992 |
| JP | 04-368965 | | 12/1992 |
| JP | 05-249825 | | 9/1993 |
| JP | 05-075767 | | 10/1993 |
| JP | 06-059572 | | 3/1994 |
| JP | 6-214496 | A | 8/1994 |
| JP | 07-020705 | | 1/1995 |
| JP | 07-181788 | | 7/1995 |
| JP | 07-199632 | | 8/1995 |
| JP | 07-261492 | | 10/1995 |
| JP | 08-220857 | | 8/1996 |
| JP | 09-197819 | | 7/1997 |
| JP | 09-211977 | | 8/1997 |
| JP | 10-020642 | | 1/1998 |
| JP | 10-153911 | | 6/1998 |
| JP | 10-171230 | | 6/1998 |
| JP | 10-198147 | | 7/1998 |
| JP | 10-254229 | | 9/1998 |
| JP | 10-260574 | | 9/1998 |
| JP | 10-260575 | | 9/1998 |
| JP | 2000-187382 | | 7/2000 |
| JP | 2000-267420 | | 9/2000 |
| JP | 2001-034053 | | 2/2001 |
| JP | 2001-42626 | A | 2/2001 |
| JP | 2001-083785 | | 3/2001 |
| JP | 2001-271912 | | 10/2001 |
| JP | 2001-312130 | | 11/2001 |
| JP | 2002-031943 | | 1/2002 |
| JP | 2002-196629 | | 7/2002 |
| JP | 2002-202656 | | 7/2002 |
| JP | 2002-244417 | | 8/2002 |
| JP | 3353194 | | 9/2002 |
| JP | 2002-302169 | | 10/2002 |
| JP | 2002-357946 | | 12/2002 |
| JP | 2003-057931 | | 2/2003 |
| JP | 2003-066703 | | 3/2003 |
| JP | 2003-66704 | | 3/2003 |
| JP | 2003-66705 | A | 3/2003 |
| JP | 2003-191497 | | 7/2003 |
| JP | 2003-195616 | | 7/2003 |
| JP | 2003-233247 | | 8/2003 |
| JP | 2003-241496 | | 8/2003 |
| JP | 2004-012687 | | 1/2004 |
| JP | 2004-205797 | A | 7/2004 |
| JP | 2004-280064 | | 10/2004 |
| JP | 2005-099434 | | 4/2005 |
| JP | 3655375 | | 4/2005 |
| JP | 2005-193575 | | 7/2005 |
| JP | 2005-221825 | | 8/2005 |
| JP | 2005-242185 | | 9/2005 |
| JP | 2005-331622 | | 12/2005 |
| JP | 2006-058698 | | 3/2006 |
| JP | 2006-072166 | | 3/2006 |
| JP | 2006-209060 | | 8/2006 |
| JP | 2006-235641 | | 9/2006 |
| JP | 2006-293003 | | 10/2006 |
| JP | 2006-309016 | | 11/2006 |
| JP | 3881429 82 | | 12/2006 |
| JP | 2007-65271 | | 3/2007 |
| JP | 2007-065613 | | 3/2007 |
| JP | 2007-140433 | | 6/2007 |
| JP | 2007148320 | A | 6/2007 |
| JP | 2007-178969 | | 7/2007 |
| JP | 2008-225505 | A | 9/2008 |
| JP | 2008-298907 | | 12/2008 |
| JP | 2009-008698 | | 1/2009 |
| JP | 2009-069417 | | 4/2009 |
| JP | 2009-116120 | | 5/2009 |
| JP | 4342958 | | 7/2009 |
| JP | 2009-210615 | | 9/2009 |
| JP | 2009-223351 | | 10/2009 |
| JP | 2009-276659 | | 11/2009 |
| JP | 2010-14763 | | 1/2010 |
| JP | 2010-020343 | | 1/2010 |
| JP | 4441581 | | 3/2010 |
| JP | 2010-262108 | A | 11/2010 |
| JP | 2011-027936 | A | 2/2011 |
| JP | 2011-107606 | | 6/2011 |
| JP | 2011-150121 | | 8/2011 |
| JP | 4794892 | | 8/2011 |
| JP | 2011-197159 | | 10/2011 |
| JP | 2011-215473 | | 10/2011 |
| JP | 2012-018377 | | 1/2012 |
| JP | 4958325 | | 3/2012 |
| JP | 2012-093460 | | 5/2012 |
| JP | 2012-133349 | | 7/2012 |

(56) References Cited

FOREIGN PATENT DOCUMENTS

| | | | |
|---|---|---|---|
| JP | 2012-137740 | | 7/2012 |
| JP | 2013-113945 | | 6/2013 |
| KR | 95-3928 | A | 2/1995 |
| KR | 10-2006-0052785 | A | 5/2006 |
| KR | 10-2006-0054262 | A | 5/2006 |
| KR | 10-2007-0021202 | A | 2/2007 |
| NL | 9302145 | A | 7/1995 |
| RU | 2 372 635 | C2 | 11/2009 |
| RU | 2 398 257 | C2 | 8/2010 |
| TW | 201011480 | | 3/2010 |
| WO | 2004/027522 | A1 | 4/2004 |
| WO | 2006/019150 | A1 | 2/2006 |
| WO | 2006/132259 | | 12/2006 |
| WO | 2011/114798 | A1 | 9/2011 |
| WO | 2011136129 | A1 | 11/2011 |
| WO | 2012/074139 | | 6/2012 |
| WO | 2013/077474 | | 5/2013 |
| WO | 2856265 | | 12/2013 |
| WO | 2014/142362 | | 9/2014 |

OTHER PUBLICATIONS

Extended European Search Report dated Oct. 27, 2022, issued in corresponding European Patent Application No. 22178929.0, 11 pages.
Notice of Allowance issued Jun. 28, 2022 in Korean Patent Application No. 10-2022-7019078, 8 pages.
Notice of Allowance issued Aug. 9, 2021 in Chinese Patent Application No. 201810007087.3, 7 pages.
U.S. Office Action Issued Jan. 14, 2022 in U.S. Appl. No. 17/111,513, 63 pages.
Notice of Allowance issued Mar. 11, 2022 in Korean Patent Application No. 10-2022-7005295, 12 pages. (with Allowed Claims).
Office Action issued May 17, 2021 in Chinese Patent Application No. 201810007087.3, 13 pages.
Office Action dated Nov. 26, 2019 for corresponding Korean Application No. 10-2019-7006510, with English Translation, 12 pages.
Taiwanese Notice of Allowance issued Feb. 27, 2019 in corresponding Taiwanese Application No. 107132686, with English Translation, 4 pages.
Decision of Refusal issued in corresponding Japanese Application No. 2017-236894, dated Jan. 11, 2019, 6 pages (with English Translation).
Office Action issued Oct. 19, 2018 in corresponding Japanese Patent Application No. 2017-236894 (with English Translation), 8 pages.
International Search Report issued Jan. 8, 2013 in PCT/JP2012/081219 filed Nov. 26, 2012 in English.
International Written Opinion mailed on Jan. 8, 2013 for PCT/JP2012/081219 filed Nov. 26, 2012.
Combined Taiwanese Office Action and Search Report issued Apr. 26, 2016 in Patent Application No. 103131631 (with English translation of categories of cited documents).
Korean Office Action dated Jan. 6, 2016 for Korean Application No. 10-2014-7032139 and English translation thereof.
Office Action issued Jul. 7, 2015 in Japanese Patent Application No. 2013-116876.
Office Action issued Apr. 27, 2015 in Russian Patent Application No. 2014106826/28 (with English translation).
Office Action issued Sep. 3, 2013 in Japanese Patent Application No. 2013-034830.
Office Action issued Apr. 21, 2015 in Japanese Patent Application No. 2011 197303.
Office Action issued Jan. 20, 2015 in Australian Patent Application No. 2011337578.
Office Action issued Jun. 26, 2014 in Russian Patent Application No. 2013130231/28 (with English translation).
Extended European Search Report issued Jun. 18, 2014 in Patent Application No. 11845366.1.
Office Action issued Jul. 23, 2013 in Japanese Patent Application No. 2011-262861.
Office Action issued Nov. 5, 2013 in Japanese Patent Application No. 2011-262861.
Office Action issued Apr. 25, 2014 in Taiwanese Patent Application No. 100144415.
Office Action issued Jan. 15, 2014 in Canadian Patent Application No. 2,795,123.
International Search Report issued Jan. 17, 2012 in PCT/JP2011/078626.
Extended European Search Report issued Apr. 1, 2015 in Patent Application No. 12851714.1.
Office issued Sep. 2, 2016 in Chinese Patent Application No. 201280067448.4 (with English language translation).
Office Action issued Sep. 10, 2013 in Japanese Patent Application No. 2013-110330.
Office Action issued Nov. 26, 2013 in Japanese Patent Application No. 2013-153815.
Office Action issued Apr. 22, 2014 in Japanese Patent Application No. 2013-153815.
Russia Decision on Grant dated Mar. 10, 2016 with English translation thereof for Russian Application No. 2014125562.
International Search Report issued Jun. 17, 2014 in PCT/JP2014/057949 filed Mar. 14, 2014.
European Search Report issued Apr. 1, 2015 in Patent Application No. 13800861.0.
International Search Report issued Aug. 13, 2013 in PCT/JP2013/065901 filed Jun. 3, 2013.
Extended European Search Report dated Feb. 8, 2016 for European Patent Application No. 14762332.5.
Combined Taiwanese Office Action and Search Report issued on Mar. 20, 2017 in Patent Application No. 105131395 (with partial English translation and English translation of categories of cited documents).
Office Action issued Oct. 19, 2018 in Japanese Patent Application No. 2017-236894, 3 pages.
Office Action issued Aug. 25. 2020, in corresponding Taiwanese Patent Application No. 108111569, 6 pages.
Korean Office Action dated May 21, 2020 issued in Korean Patent Application No. 10-2019-7006510.
Chinese Office Action dated Mar. 19, 2020, issued in corresponding Chinese Patent Application No. 20180007087.3, 27 pages.
Chinese Office Action dated Mar. 23, 2020, issued in corresponding Chinese Patent Application No. 20180007115.1, 25 Pages.

* cited by examiner

POWDER CONTAINER WITH A NOZZLE RECEIVER

CROSS-REFERENCE TO RELATED APPLICATIONS

This application is a continuation of U.S. application Ser. No. 17/720,300, filed Apr. 14, 2022, which is a continuation of U.S. application Ser. No. 17/474,060, filed Sep. 14, 2021 (now U.S. Pat. No. 11,662,672), which is a continuation of U.S. application Ser. No. 17/111,511, filed Dec. 4, 2020 (now U.S. Pat. No. 11,347,163), which is a continuation of U.S. application Ser. No. 16/724,300, filed Dec. 22, 2019 (now U.S. Pat. No. 10,915,039), which is a continuation of U.S. application Ser. No. 16/186,842, filed Nov. 12, 2018 (now U.S. Pat. No. 10,564,573), which is a continuation of U.S. application Ser. No. 15/394,574, filed Dec. 29, 2016 (now U.S. Pat. No. 10,156,810), which is a continuation of U.S. application Ser. No. 15/041,232, filed Feb. 11, 2016, (now U.S. Pat. No. 9,581,937) which is a continuation of U.S. application Ser. No. 14/286,604, filed May 23, 2014 (now U.S. Pat. No. 9,482,988), which is a continuation of PCT Filing PCT/JP2012/081219, filed on Nov. 26, 2012, which designates the United States, incorporated herein by reference, and which claims the benefit of priority from Japanese Patent Applications No. 2011-258355, filed on Nov. 25, 2011, No. 2011-258356, filed on Nov. 25, 2011, No. 2011-258358, filed on Nov. 25, 2011, No. 2012-137077, filed on Jun. 18, 2012, No. 2012-248855, filed on Nov. 12, 2012, and No. 2012-256921, filed on Nov. 22, 2012, the entire contents of each of which are incorporated herein by reference.

BACKGROUND OF THE INVENTION

1. Field of the Invention

The present disclosure relates to a powder container for containing powder, such as toner, and an image forming apparatus that conveys the powder from the powder container to a conveying destination.

2. Description of the Related Art

In image forming apparatuses, such as copiers, printers, or facsimile machines, using an electrophotographic process, a latent image formed on a photoreceptor is developed with toner provided by a developing device. Because the toner is consumed through development of latent images, it is necessary to replenish the developing device with toner. Therefore, a toner replenishing device as a powder supply device provided in an apparatus body conveys toner from a toner container as a powder container to the developing device so that the developing device can be replenished with toner. The developing device that can be replenished with toner as described above enables continuous development. Furthermore, the toner container is detachably attached to the toner replenishing device. If the toner contained in the toner container is used up, the toner container is replaced with one containing new toner.

Regarding the toner container detachably attached to the toner replenishing device, a toner container is known that has a spiral rib formed on a cylindrical inner surface of a toner storage member for containing toner (see Patent Document 1: Japanese Patent Application Laid-open No. 2003-241496, Patent Document 2: Japanese Patent Application Laid-open No. 2005-221825, Patent Document 3: Japanese Patent No. 4342958, Patent Document 4: Japanese Patent Application Laid-open No. 2002-202656, and Patent Document 5: Japanese Patent Application Laid-open No. 2003-233247). In such a toner container, the toner storage member is rotated while the toner container is attached to the toner replenishing device, so that the stored toner is conveyed from one end to the other end in the rotation axis direction. Thereafter, the toner is discharged via an opening arranged on the other end of the toner storage member to the main body of the toner replenishing device.

Regarding the toner container that conveys toner stored therein from one end to the other end by rotating the toner storage member, Patent Document 6 (Japanese Patent Application Laid-open No. 2009-276659) describes a toner container in which a conveying nozzle fixed to the toner replenishing device is inserted via the opening on the other end of the toner storage member. Specifically, a toner receiving opening is formed in the vicinity of a front end of the conveying nozzle inserted in the toner container in the insertion direction.

However, in the configuration described in Patent Document 6, when the toner container is attached to the toner replenishing device, the outer surface of the conveying nozzle inserted in the toner storage member comes in contact with toner in the toner storage member. Therefore, when the conveying nozzle is removed from the toner container, some of the toner in contact with the conveying nozzle may remain attached to the conveying nozzle and may pass through the nozzle receiving opening along with the conveying nozzle, so that the toner may be leaked from the nozzle receiving opening resulting in toner scattering.

In the above explanation, a problem that occurs with a toner container that contains toner as powder is explained. However, in any powder that contains powder other than toner, if the container is configured to convey and discharge the powder from the inside to the outside by inserting a conveying nozzle fixed to a powder conveying device, powder leaked along with removal of the conveying nozzle may be scattered.

SUMMARY OF THE INVENTION

According to one aspect of the disclosure, there is a powder container comprising a nozzle receiving opening at one side of the powder container in a longitudinal direction of the powder container, a scoop, at the one side, to scoop up the powder, when the scoop is rotated about a rotational axis, and a holder, at the one side, which is rotatable around the rotational axis relative to the scoop. The holder includes an electrical terminal, facing the longitudinal direction, and the holder and the electrical terminal not intersecting the rotational axis. The electrical terminal is oblique to the rotational axis relative to a vertical direction when the powder container is in a mounted orientation.

DETAILED DESCRIPTION OF THE PREFERRED EMBODIMENTS

First Embodiment

Exemplary embodiments of a copier (hereinafter, described as a copier 500) as an image forming apparatus according to the present disclosure will be explained below.

Figure 2:
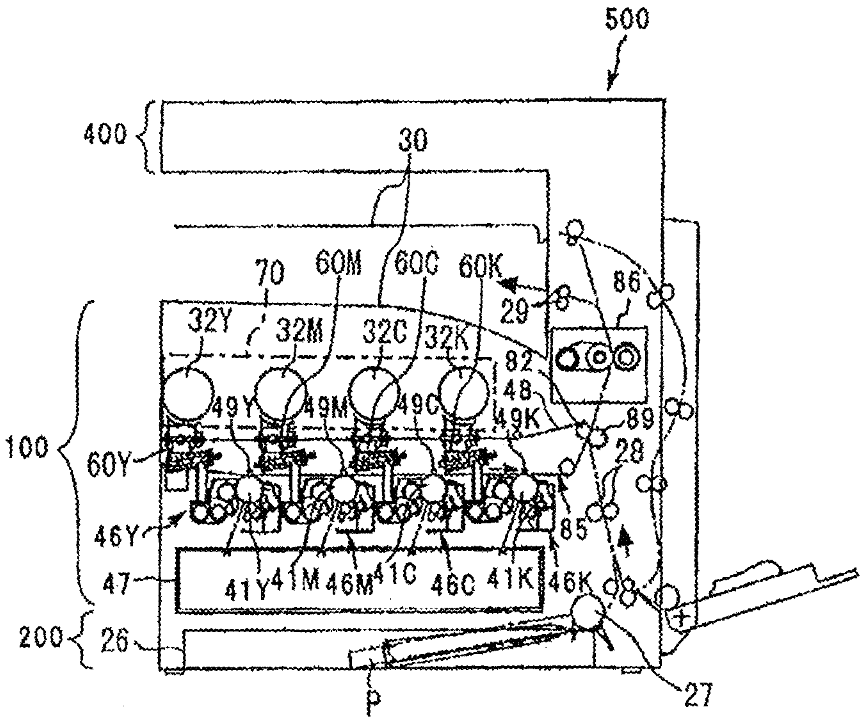
FIG. 2 is an overall configuration diagram of a copier according to an embodiment.

FIG. 2 is an overall configuration diagram of the copier 500 common to first to twentieth embodiments. The copier 500 includes a copier body (hereinafter, described as a printer 100), a sheet feed table (hereinafter, described as a sheet feeder 200), and a scanner (hereinafter, described as a scanner 400) mounted on the printer 100.

Toner containers 32 (Y, M, C, K) serving as four powder containers corresponding to respective colors (yellow, magenta, cyan, black) are detachably (replaceably) attached to a container holding section 70 provided in the upper part of the printer 100. An intermediate transfer unit 85 is arranged below the container holding section 70.

The intermediate transfer unit 85 includes an intermediate transfer belt 48, four primary-transfer bias rollers 49 (Y, M, C, K), a secondary-transfer backup roller 82, a plurality of tension rollers, an intermediate-transfer cleaner, and the like. The intermediate transfer belt 48 is stretched and supported by a plurality of rollers and is endlessly moved in the arrow direction in FIG. 2 along with rotation of the secondary-transfer backup roller 82 that is one of the rollers.

In the printer 100, four image forming units 46 (Y, M, C, K) corresponding to the respective colors are arranged in a tandem manner so as to face the intermediate transfer belt 48. Four toner replenishing devices 60 (Y, M, C, K) are arranged below the four toner containers 32 (Y, M, C, K), respectively. The toner replenishing devices 60 (Y, M, C, K) supply (replenish) toner contained in the toner containers 32 (Y, M, C, K) to developing devices (powder using units) of the image forming units 46 (Y, M, C, K) corresponding to the respective colors.

As illustrated in FIG. 2, the printer 100 includes an exposing device 47 serving as a latent image forming means below the four image forming units 46. The exposing device 47 exposes the surfaces of photoreceptors 41 (to be descried later) to light based on image information of an original image read by the scanner 400 or based on image information input from an external apparatus, such as a personal computer, so that electrostatic latent images are formed on the surfaces of the photoreceptors 41. The exposing device 47 of the printer 100 employs a laser scanning system using a laser diode. However, exposing means having other configurations, for example, having an LED array, may be used.

Figure 3:
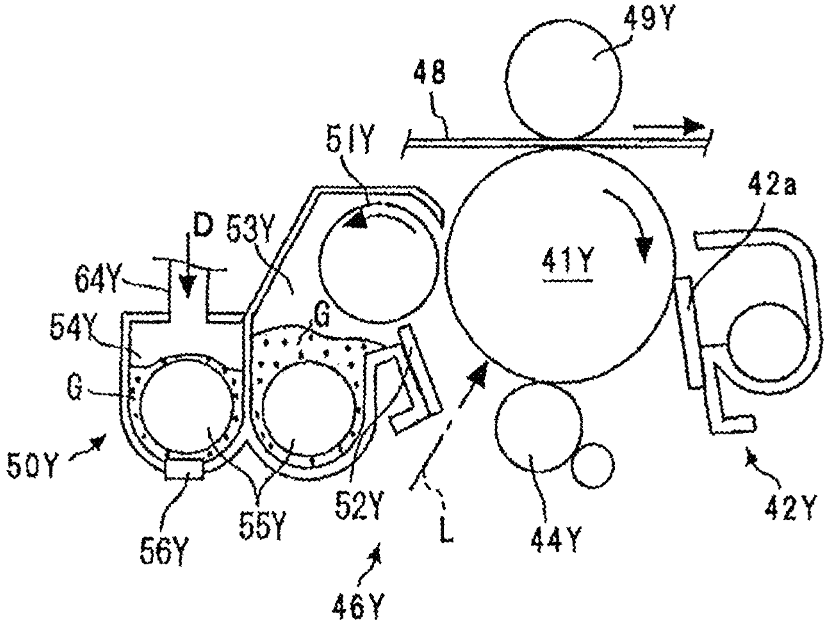
FIG. 3 is a schematic diagram of an image forming unit of the copier.

FIG. 3 is a schematic diagram of an overall configuration of the image forming unit 46Y for yellow.

The image forming unit 46Y includes a drum-shaped photoreceptor 41Y as a latent image carrier. The image forming unit 46Y also includes a charging roller 44Y as a charging means, a developing device 50Y as a developing means, a photoreceptor cleaning device 42Y, and a neutralizing device, which are arranged around the photoreceptor 41Y. Image forming processes (a charging process, an exposing process, a developing process, a transfer process, and a cleaning process) are performed on the photoreceptor 41Y, so that a yellow image is formed on the photoreceptor 41Y.

The other three image forming units 46 (M, C, K) have almost the same configurations as the image forming unit 46Y for yellow except that colors of toner to be used are different, and images corresponding to the respective toner colors are formed on the image forming units 46 (M, C, K). Hereinafter, explanation of the other three image forming units 46 (M, C, K) will be omitted appropriately, and explanation of only the image forming unit 46Y for yellow will be given.

The photoreceptor 41Y is rotated clockwise in FIG. 3 by a driving motor. The surface of the photoreceptor 41Y is uniformly charged at a position facing the charging roller 44Y (charging process). The surface of the photoreceptor 41Y then reaches an irradiation position of laser light L emitted by the exposing device 47, where an electrostatic latent image for yellow is formed through exposure scanning (exposing process). The surface of the photoreceptor 41Y then reaches a position facing the developing device 50Y, where the electrostatic latent image is developed and a yellow toner image is formed (developing process).

The four primary-transfer bias rollers 49 (Y, M, C, K) of the intermediate transfer unit 85 and the photoreceptors 41 (Y, M, C, K) sandwich the intermediate transfer belt 48, so that primary transfer nips are formed. A transfer bias with polarity opposite to the polarity of toner is applied to the primary-transfer bias rollers 49 (Y, M, C, K).

The surface of the photoreceptor 41Y, on which the toner image is formed through the developing process, reaches the primary transfer nip facing the primary-transfer bias roller 49Y across the intermediate transfer belt 48, and the toner image on the photoreceptor 41Y is transferred onto the intermediate transfer belt 48 at the primary transfer nip (primary transfer process). At this time, a slight amount of non-transferred toner remains on the photoreceptor 41Y. The surface of the photoreceptor 41Y, from which the toner image is transferred onto the intermediate transfer belt 48 at the primary transfer nip, reaches a position facing the photoreceptor cleaning device 42Y. At this position, the non-transferred toner remaining on the photoreceptor 41Y is mechanically collected by a cleaning blade 42*a* (cleaning process). The surface of the photoreceptor 41Y finally reaches a position facing the neutralizing device, where the residual potential on the photoreceptor 41Y is removed. In this way, a series of image forming processes performed on the photoreceptor 41Y is completed.

The above image forming processes are also performed on the other image forming units 46 (M, C, K) in the same manner as on the image forming unit 46Y for yellow. Specifically, the exposing device 47 arranged below the image forming units 46 (M, C, K) emits laser light L based on image information toward the photoreceptors 41 (M, C, K) of the image forming units 46 (M, C, K). More specifically, the exposing device 47 emits the laser light L from a light source and irradiates the photoreceptors 41 (M, C, K) with the laser light L via a plurality of optical elements while scanning the laser light L by a polygon mirror being rotated. Subsequently, toner images of the respective colors formed on the photoreceptors 41 (M, C, K) through the developing process are transferred onto the intermediate transfer belt 48.

At this time, the intermediate transfer belt 48 moves in the arrow direction in FIG. 2 and sequentially passes through the primary transfer nips of the primary-transfer bias rollers 49 (Y, M, C, K). Therefore, the toner images of the respective colors formed on the photoreceptors 41 (Y, M, C, K) are superimposed on the intermediate transfer belt 48 as primary transfer, so that a color toner image is formed on the intermediate transfer belt 48.

The intermediate transfer belt 48, on which the color toner image is formed by superimposing the toner images of the respective colors, reaches a position facing a secondary transfer roller 89. At this position, the secondary-transfer backup roller 82 and the secondary transfer roller 89 sandwich the intermediate transfer belt 48, so that a secondary transfer nip is formed. The color toner image formed on the intermediate transfer belt 48 is transferred onto a recording medium P, such as a sheet of paper, conveyed to the position of the secondary transfer nip. At this time, non-transferred toner which has not been transferred onto the recording medium P remains on the intermediate transfer belt 48. The intermediate transfer belt 48 that has passed through the secondary transfer nip reaches the position of the intermediate-transfer cleaner, where the non-transferred toner on the surface is collected. In this way, a series of transfer processes performed on the intermediate transfer belt 48 is completed.

Movement of the recording medium P will be explained below.

The recording medium P is conveyed to the secondary transfer nip from a feed tray 26 of the sheet feeder 200 arranged below the printer 100 via a feed roller 27, a registration roller pair 28, and the like. Specifically, a plurality of recording media P is stacked in the feed tray 26. When the feed roller 27 is rotated counterclockwise in FIG. 2, the topmost recording medium P is fed to a nip between two rollers of the registration roller pair 28.

The recording medium P conveyed to the registration roller pair 28 temporarily stops at the position of the nip between the rollers of the registration roller pair 28, the rotation of which is being stopped. The registration roller pair 28 is rotated to convey the recording medium P toward the secondary transfer nip in accordance with the timing at which the color toner image on the intermediate transfer belt 48 reaches the secondary transfer nip. Accordingly, a desired color image is formed on the recording medium P.

The recording medium P on which the color toner image is transferred at the secondary transfer nip is conveyed to the position of a fixing device 86. In the fixing device 86, the color toner image transferred on the surface of the recording medium P is fixed to the recording medium P by heat and pressure applied by a fixing belt and a pressing roller. The recording medium P that has passed through the fixing device 86 is discharged to the outside of the apparatus via a nip between rollers of a discharge roller pair 29. The recording medium P discharged to the outside of the apparatus by the discharge roller pair 29 is sequentially stacked, as an output image, on a stack section 30. In this way, a series of image forming processes in the copier 500 is completed.

A configuration and operation of the developing device 50 in the image forming unit 46 will be explained in detail below. In the following, the image forming unit 46Y for yellow will be explained by way of example. However, the same applies to the image forming units 46 (M, C, K) for the other colors.

As illustrated in FIG. 3, the developing device 50Y includes a developing roller 51Y, a doctor blade 52Y, two developer conveying screws 55Y, a toner density sensor 56Y, and the like. The developing roller 51Y faces the photoreceptor 41Y. The doctor blade 52Y faces the developing roller 51Y. The two developer conveying screws 55Y are arranged inside two developer accommodating portions (53Y, 54Y). The developing roller 51Y includes a magnet roller fixed inside thereof and a sleeve that rotates around the magnet roller. Two-component developer G formed of carrier and toner is stored in the first developer accommodating portion 53Y and the second developer accommodating portion 54Y. The second developer accommodating portion 54Y communicates with a toner dropping passage 64Y via an opening formed in the upper part thereof. The toner density sensor 56Y detects toner density in the developer G stored in the second developer accommodating portion 54Y.

The developer G in the developing device 50 circulates between the first developer accommodating portion 53Y and the second developer accommodating portion 54Y while being stirred by the two developer conveying screws 55Y. The developer G in the first developer accommodating portion 53Y is supplied to and carried on the surface of the sleeve of the developing roller 51Y due to the magnetic field formed by the magnet roller in the developing roller 51Y while the developer G is being conveyed by one of the developer conveying screws 55Y. The sleeve of the developing roller 51Y rotates counterclockwise as indicated by an arrow in FIG. 3, and the developer G carried on the developing roller 51Y moves on the developing roller 51Y along with the rotation of the sleeve. At this time, the toner in the developer G electrostatically adheres to the carrier by being charged to the potential opposite to the polarity of the carrier due to triboelectric charging with the carrier in the developer G, and is carried on the developing roller 51Y together with the carrier that is attracted by the magnetic field formed on the developing roller 51Y.

The developer G carried on the developing roller 51Y is conveyed in the arrow direction in FIG. 3 and reaches a doctor portion where the doctor blade 52Y and the developing roller 51Y face each other. The developer G on the developing roller 51Y is adjusted to an appropriate amount when passing through the doctor portion, and then conveyed to a development area facing the photoreceptor 41Y. In the development area, the toner in the developer G adheres to the latent image formed on the photoreceptor 41Y by a developing electric field formed between the developing roller 51Y and the photoreceptor 41Y. The developer G remaining on the surface of the developing roller 51Y that has passed through the development area reaches the upper part of the first developer accommodating portion 53Y along with rotation of the sleeve, where the developer G is separated from the developing roller 51Y.

The toner density of the developer G in the developing device 50Y is adjusted to a predetermined range. Specifically, toner contained in the toner container 32Y is supplied to the second developer accommodating portion 54Y via the toner replenishing device 60Y (to be described later) in accordance with the amount of toner consumed from the developer G in the developing device 50Y through the development.

The toner supplied to the second developer accommodating portion 54Y circulates between the first developer accommodating portion 53Y and the second developer accommodating portion 54Y while being mixed and stirred with the developer G by the two developer conveying screws 55Y.

The toner replenishing devices 60 (Y, M, C, K) will be explained below.

Figure 4:
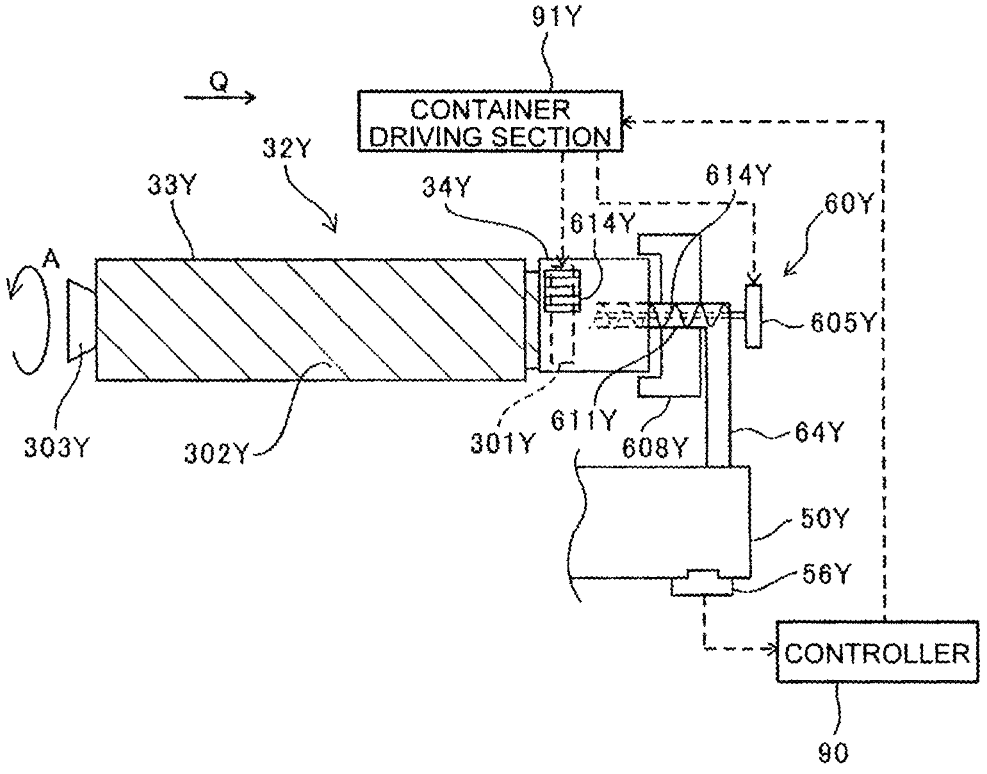
FIG. 4 is a schematic diagram of how the toner container is attached to the toner replenishing device of the copier.
Figure 5:
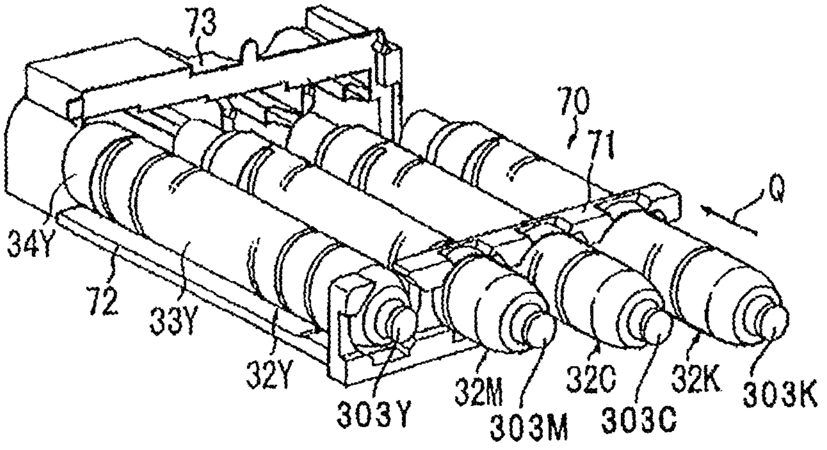
FIG. 5 is a schematic perspective view of how the toner container is attached to a container holding section of the copier.

FIG. 4 is a schematic diagram of how the toner container 32Y is attached to the toner replenishing device 60Y. FIG. 5 is a schematic perspective view of how the four toner containers 32 (Y, M, C, K) are attached to the container holding section 70.

Toner contained in the toner containers 32 (Y, M, C, K) attached to the container holding section 70 of the printer 100 is appropriately supplied to the developing devices 50 (Y, M, C, K) by the toner replenishing devices 60 (Y, M, C, K) for the respective colors, in accordance with the consumption of toner in the developing devices 50 (Y, M, C, K) for the respective colors. At this time, toner in the toner containers 32 (Y, M, C, K) is replenished by the toner replenishing devices 60 (Y, M, C, K) provided for the respective colors. The four toner replenishing devices 60 (Y, M, C, K) have almost the same configurations and the toner containers 32 (Y, M, C, K) have almost the same configurations, except that colors of toner used for the image forming processes are different. Therefore, explanation of only the toner replenishing device 60Y and the toner container 32Y for yellow will be given below, and explanation of the toner replenishing devices 60 (M, C, K) and the toner containers 32 (M, C, K) for the other three colors will be omitted appropriately.

The toner replenishing device 60 (Y, M, C, K) is formed of the container holding section 70, a conveying nozzle 611 (Y, M, C, K), a conveying screw 614 (Y, M, C, K), the toner dropping passage 64 (Y, M, C, K), and a container driving section 91 (Y, M, C, K).

When the toner container 32Y moves in the arrow Q direction in FIG. 4 and attached to the container holding section 70 of the printer 100, the conveying nozzle 611Y of the toner replenishing device 60Y is inserted from the front end of the toner container 32Y along with the attachment operation. Consequently, the toner container 32Y and the conveying nozzle 611Y communicate with each other. A configuration for enabling the communication along with the attachment operation will be described in detail later.

As an embodiment of a toner container common to the first to the twentieth embodiments, the toner container 32Y is an approximately cylindrical toner bottle, and mainly includes a container front end cover 34Y that is non-rotatably held by the container holding section 70 and includes a container body 33Y integrated with a container gear 301Y. The container body 33Y is held so as to rotate relative to the container front end cover 34Y.

The container holding section 70 mainly includes a container cover receiving section 73, a container receiving section 72, and an insert hole section 71. The container cover receiving section 73 is a section for holding the container front end cover 34Y of the toner container 32Y. The container receiving section 72 is a section for holding the container body 33Y of the toner container 32Y. The insert hole section 71 forms an insert hole used in the attachment operation of the toner container 32Y. When a body cover arranged on the front side of the copier 500 (the front side in the direction normal to the sheet of FIG. 2) is opened, the insert hole section 71 of the container holding section 70 is exposed. Attachment/detachment operation of each of the toner containers 32 (Y, M, C, K) (attachment/detachment operation with the longitudinal direction of the toner containers 32 taken as an attachment/detachment direction) is performed from the front side of the copier 500 while each of the toner containers 32 (Y, M, C, K) is oriented with its longitudinal direction made parallel to the horizontal direction. A setting cover 608Y in FIG. 4 is a part of the container cover receiving section 73 of the container holding section 70.

The container receiving section 72 is formed such that its longitudinal length is approximately the same as the longitudinal length of the container body 33Y. The container cover receiving section 73 is arranged on a container front end of the container receiving section 72 in the longitudinal direction (attachment/detachment direction) and the insert hole section 71 is arranged on one end of the container receiving section 72 in the longitudinal direction. Therefore, along with the attachment operation of the toner container 32Y, the container front end cover 34Y first passes through the insert hole section 71, slides on the container receiving section 72 for a while, and is finally attached to the container cover receiving section 73.

When the container driving section 91Y including a driving motor, a driving gear, or the like inputs rotation drive to the container gear 301Y provided in the container body 33Y via a container driving gear 601Y while the container front end cover 34Y is attached to the container cover receiving section 73, the container body 33Y rotates in the arrow A direction in FIG. 4. With the rotation of the container body 33Y, a spiral rib 302Y formed in a spiral shape on the inner surface of the container body 33Y conveys toner in the container body 33Y from the left to the right in FIG. 4 along the longitudinal direction of the container body. Consequently, the toner is supplied from the container front end cover 34Y side to the inside of the conveying nozzle 611Y.

The conveying screw 614Y is arranged in the conveying nozzle 611Y. When the container driving section 91Y inputs rotation drive to a conveying screw gear 605Y, the conveying screw 614Y rotates and the toner supplied in the conveying nozzle 611Y is conveyed. The downstream end of the conveying nozzle 611Y in the conveying direction is connected to the toner dropping passage 64Y, and the toner conveyed by the conveying screw 614Y falls along the toner dropping passage 64Y by gravity and is supplied to the developing device 50Y (the second developer accommodating portion 54Y).

The toner containers 32 (Y, M, C, K) are replaced with new ones at the end of their lifetimes (when the container becomes empty because almost all of contained toner is consumed). A gripper 303 is arranged on an end portion of the toner container 32 opposite the container front end cover 34 in the longitudinal direction. When the toner container 32 is to be replaced, an operator can grip the gripper 303 to pull out and detach the attached toner container 32.

A controller 90 calculates, in some cases, a consumption amount of toner based on image information used by the exposing device 47 described above and determines that it is necessary to supply toner to the developing device 50Y. The controller 90 detects, in some cases, a decrease in the toner density in the developing device 50Y based on a detection result of the toner density sensor 56Y. In these cases, the controller 90 rotates the container driving section 91Y to rotate the container body 33Y of the toner container 32Y and the conveying screw 614Y for a predetermined time to thereby supply toner to the developing device 50Y. Because the toner is supplied by rotating the conveying screw 614Y arranged in the conveying nozzle 611Y, it is possible to accurately calculate the supply amount of toner from the toner container 32Y by detecting the rotation frequency of the conveying screw 614Y. If the supply amount of toner that has cumulatively been calculated since attachment of the toner container 32Y reaches the amount of toner that had been contained in the toner container 32Y at the time of the attachment, it is determined that the toner container 32Y is empty of toner and a notice for urging replacement of the toner container 32Y is displayed on a display of the copier 500.

In some cases, even when the toner density sensor 56Y detects a decrease in the toner density and repeats replenishment and determination of whether the toner density is recovered, the toner density sensor 56Y cannot detect recovery of the toner density. In this case, it is determined that the toner container 32Y is empty of toner and a notice for urging replacement of the toner container 32Y is displayed on the display of the copier 500.

The toner replenishing device 60Y common to the first to the twentieth embodiments controls the amount of toner supplied to the developing device 50Y in accordance with the rotation frequency of the conveying screw 614Y. Therefore, toner that passes through the conveying nozzle 611Y is directly conveyed to the developing device 50Y via the toner dropping passage 64Y without controlling the supply amount of toner to the developing device 50Y. Even in the toner replenishing device 60Y configured to insert the conveying nozzle 611Y into the toner container 32Y as described in the present embodiment, it may be possible to provide a temporary toner storage, such as a toner hopper. In this case, the amount of toner supplied to the developing device 50Y may be controlled by controlling the amount of toner conveyed from the temporary toner storage to the developing device 50Y.

Furthermore, while the toner replenishing device 60Y according to the present embodiment uses the conveying screw 614Y for conveying the toner supplied in the conveying nozzle 611Y, the configuration for conveying the toner supplied in the conveying nozzle 611Y is not limited to the screw. It may be possible to apply a conveying force by using other than the screw, for example, by using a powder pump for generating a negative pressure at the opening of the conveying nozzle 611Y as described in Patent Document 6.

In the configuration including the temporary toner storage, a toner end sensor is provided for detecting that the amount of toner stored in the temporary toner storage becomes a predetermined amount or smaller. Toner is supplied to the temporary toner storage by rotating the container body 33Y and the conveying screw 614Y for a predetermined time based on a toner end detection of the toner end sensor. When the toner end detection of the toner end sensor is not cancelled even after the above control is repeated, it is determined that the toner container 32Y is empty of toner and a notice for urging replacement of the toner container 32Y is displayed on the display of the copier 500. In this way, if whether the toner container 32Y becomes empty of toner is detected based on the toner end detection by the toner end sensor, it is not necessary to cumulatively calculate the supply amount of toner since attachment of the toner container 32Y. However, if the temporary toner storage is not provided as in the toner replenishing device 60Y according to the present embodiment, it is possible to reduce the size of the toner replenishing device 60Y, enabling to reduce the overall size of the copier 500.

The toner containers 32 (Y, M, C, K) and the toner replenishing devices 60 (Y, M, C, K) common to the first to the twentieth embodiments will be explained in detail below. As described above, the toner containers 32 (Y, M, C, K) and the toner replenishing devices 60 (Y, M, C, K) have almost the same configurations except that colors of toner to be used are different. Therefore, in the following explanation, symbols Y, M, C, and K representing the colors of toner will be omitted.

Figure 6:
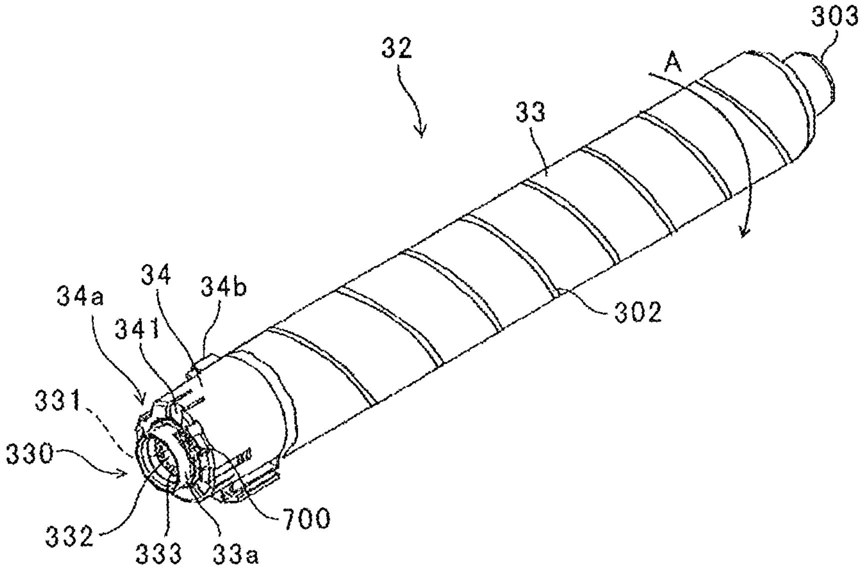
FIG. 6 is an explanatory perspective view of the toner container.
Figure 7:
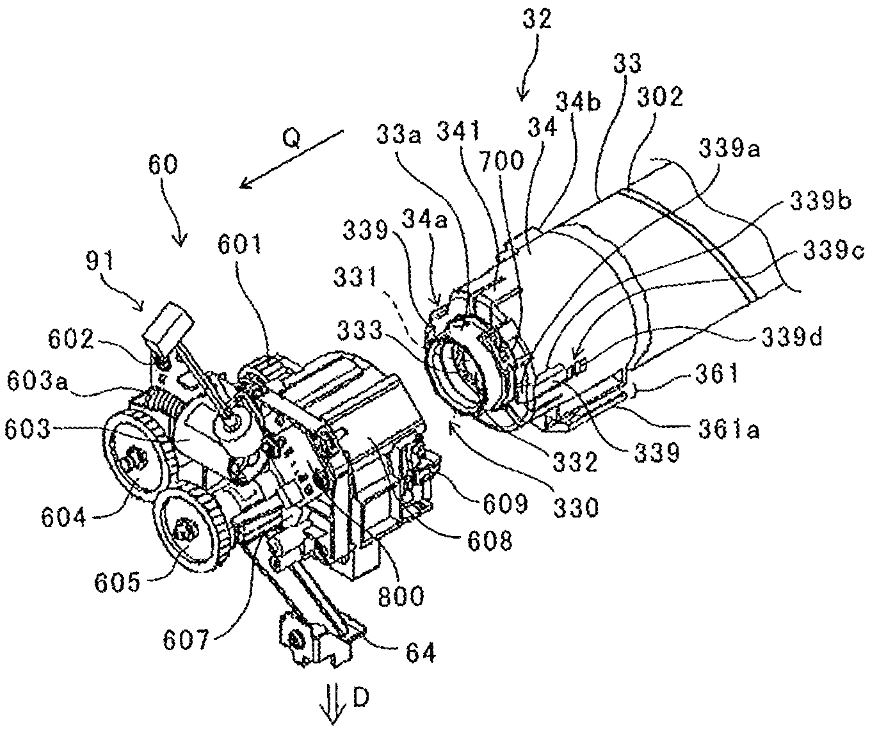
FIG. 7 is an explanatory perspective view of the toner replenishing device before the toner container is attached and the toner container.
Figure 8:
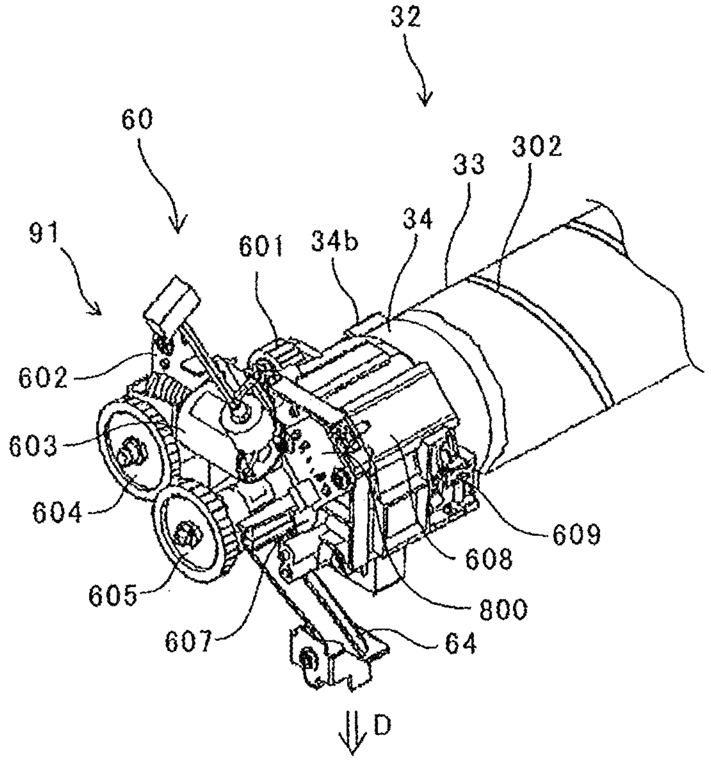
FIG. 8 is an explanatory perspective view of the toner replenishing device to which the toner container is attached and the toner container.

FIG. 6 is an explanatory perspective view of the toner container 32 common to the first to the twentieth embodiments. FIG. 7 is an explanatory perspective view of the toner replenishing device 60 before the toner container 32 is attached and a front end of the toner container 32. FIG. 8 is an explanatory perspective view of the toner replenishing device 60 to which the toner container 32 is attached and the front end of the toner container 32.

Figure 1:
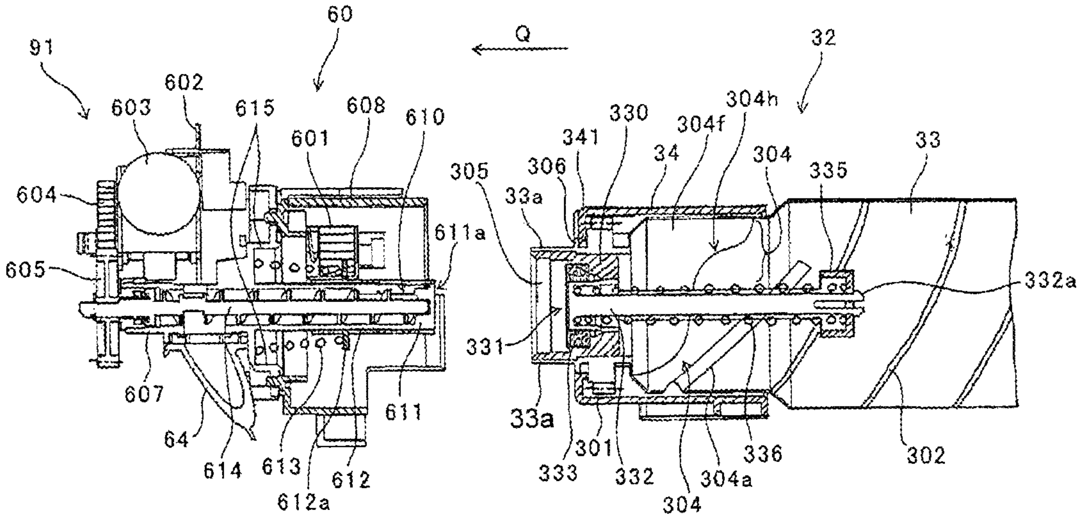
FIG. 1 is an explanatory cross-sectional view of a toner replenishing device before a toner container is attached and the toner container.
Figure 9:
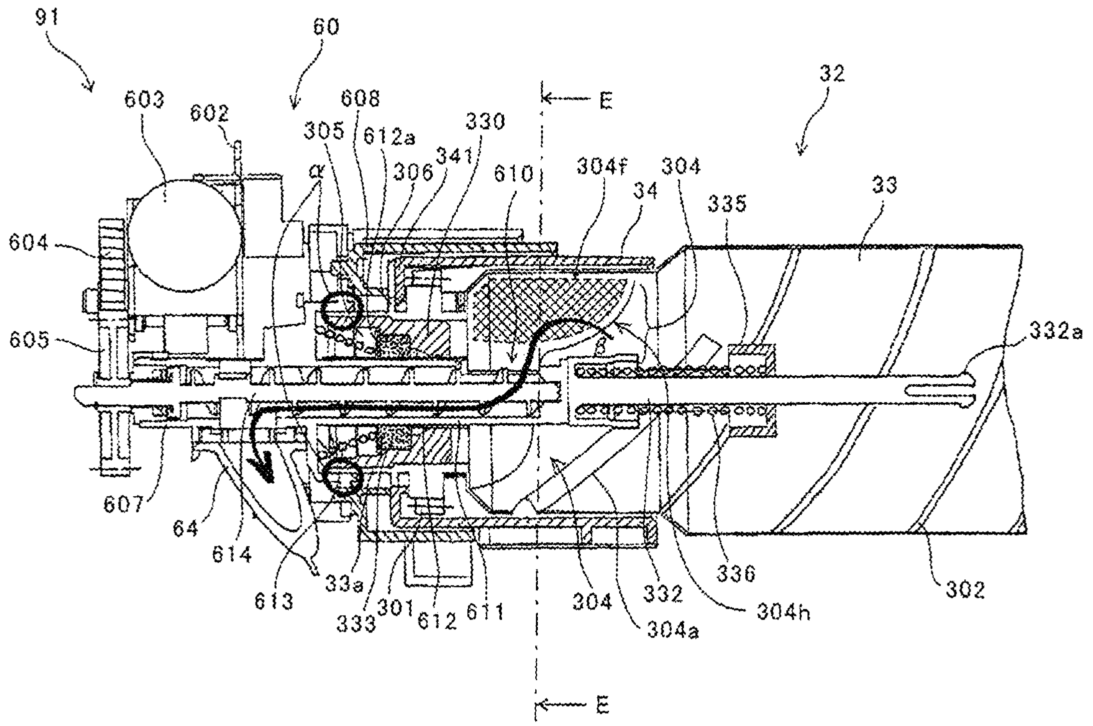
FIG. 9 is an explanatory cross-sectional view of the toner replenishing device to which the toner container is attached and the toner container.

FIG. 1 is an explanatory cross-sectional view of the toner replenishing device 60 before the toner container 32 is attached and the front end of the toner container 32. FIG. 9 is an explanatory cross-sectional view of the toner replenishing device 60 to which the toner container 32 is attached and the front end of the toner container 32.

The toner replenishing device 60 includes the conveying nozzle 611 inside which the conveying screw 614 is arranged. The toner replenishing device 60 further includes a nozzle shutter 612. The nozzle shutter 612 closes a nozzle opening 610 formed on the conveying nozzle 611 at the time of detachment, which is before the toner container 32 is attached (in the states in FIG. 1 and FIG. 7), and opens the nozzle opening 610 at the time of attachment, which is when the toner container 32 is attached (in the states in FIG. 8 and FIG. 9). Meanwhile, a receiving opening 331, into which the conveying nozzle 611 is inserted at the time of attachment, is formed in the center of the end surface of the toner container 32, and a container shutter 332 that closes the receiving opening 331 at the time of detachment is provided.

The toner container 32 will be explained below.

Figure 10:
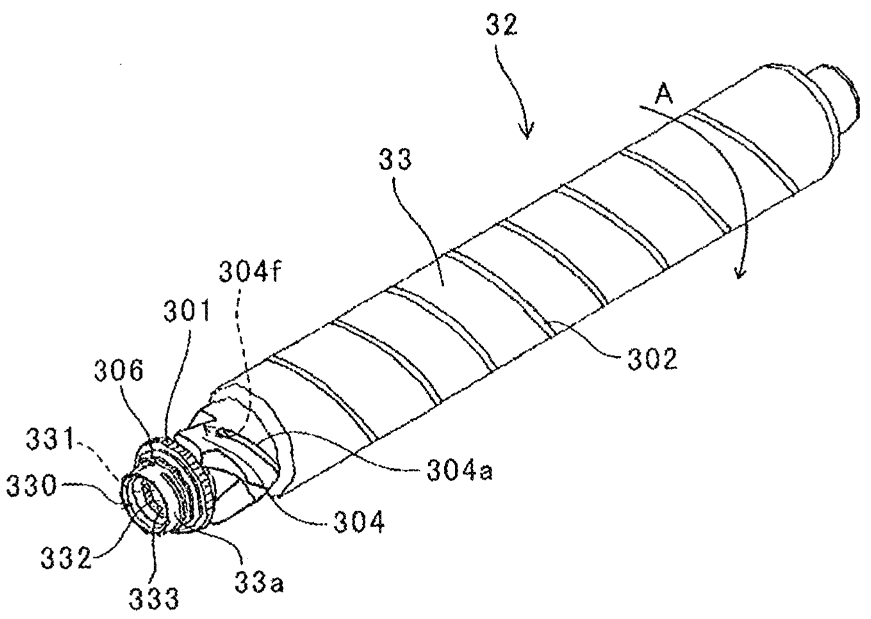
FIG. 10 is an explanatory perspective view of the toner container when a container front end cover is detached.

As described above, the toner container 32 mainly includes the container body 33 and the container front end cover 34. FIG. 10 is an explanatory perspective view of the toner container 32 when the container front end cover 34 is detached. As illustrated in FIG. 10, the toner container 32 from which the container front end cover 34 is detached includes the container body 33 and a nozzle receiver 330 that forms the receiving opening 331.

Figure 11:
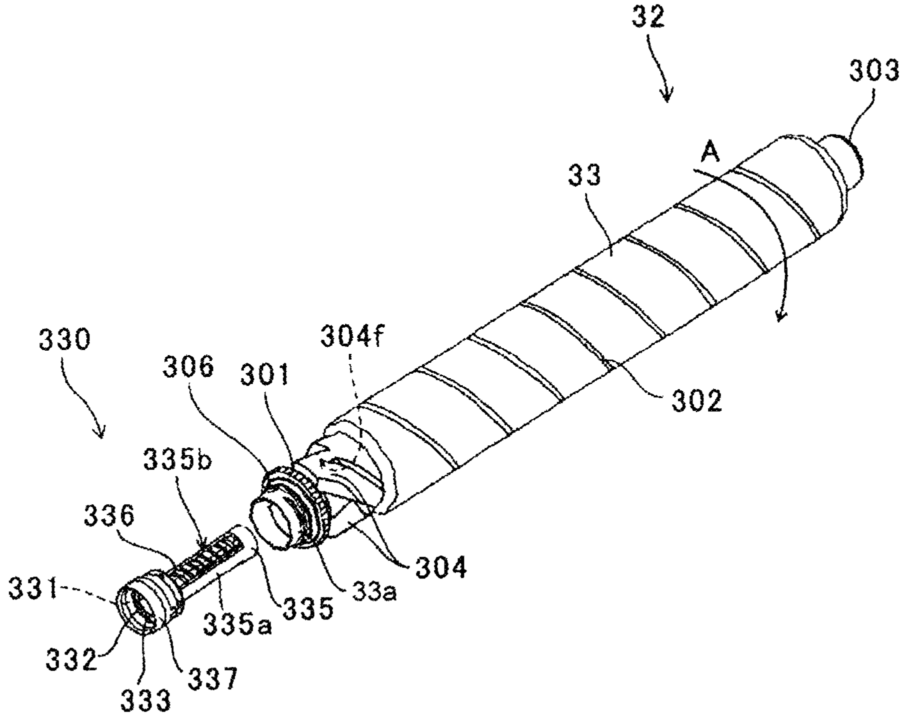
FIG. 11 is an explanatory perspective view of the toner container when a nozzle receiver is detached from a container body.
Figure 12:
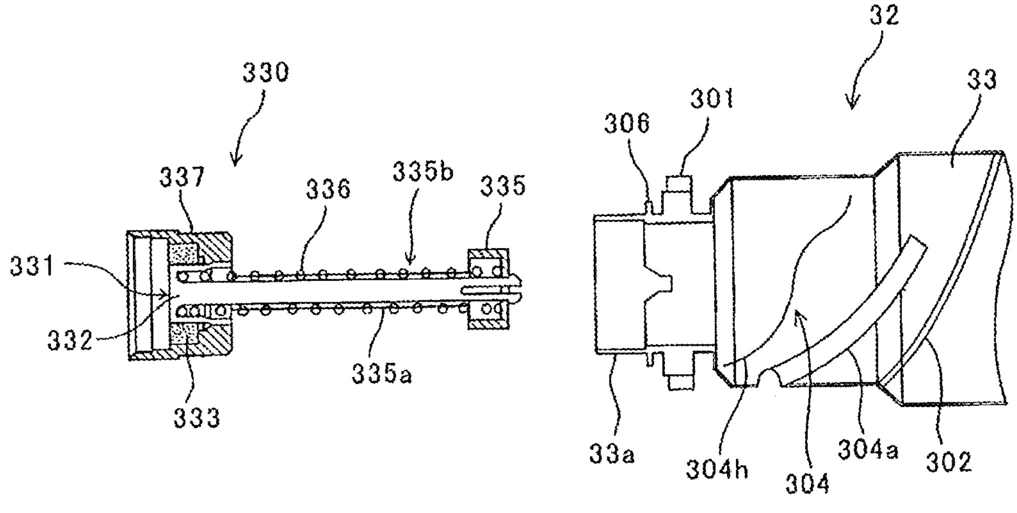
FIG. 12 is an explanatory cross-sectional view of the toner container when the nozzle receiver is detached from the container body.
Figure 13:
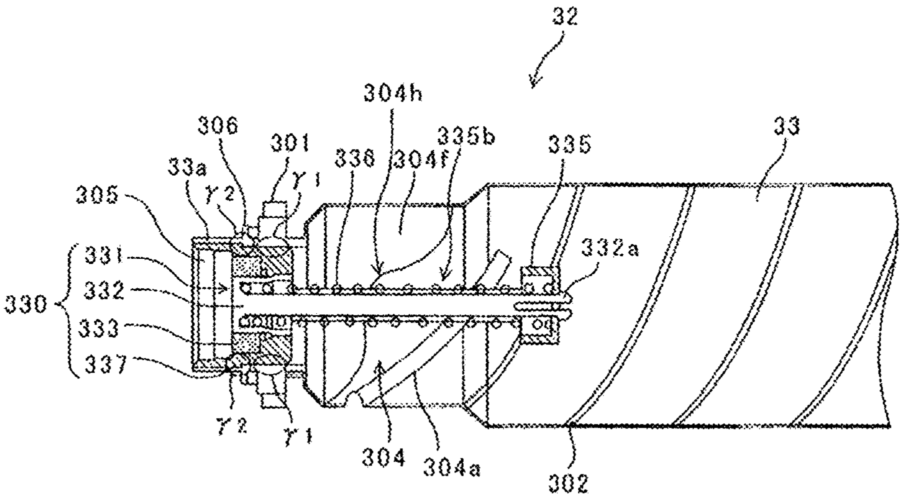
FIG. 13 is an explanatory cross-sectional view of the toner container when the nozzle receiver is attached to the container body from the state illustrated in FIG. 12.

FIG. 11 is an explanatory perspective view of the toner container 32 when the nozzle receiver 330 is detached from the container body 33. FIG. 12 is an explanatory cross-sectional view of the toner container 32 when the nozzle receiver 330 is detached from the container body 33. FIG. 13 is an explanatory cross-sectional view of the toner container 32 when the nozzle receiver 330 is attached to the container body 33 from the state illustrated in FIG. 12 (the container front end cover 34 is detached from the toner container 32 similarly to FIG. 10).

The container body 33 is in the form of an approximate cylinder and rotates about a central axis of the cylinder as a rotation axis. Hereinafter, a direction parallel to the rotation axis is referred to as "a rotation axis direction" and one side of the toner container 32 where the receiving opening 331 is formed (the side where the container front end cover 34 is arranged) in the rotation axis direction may be referred to as "a container front end". The container front end is referred to as a first end too. Furthermore, the other side of the toner container 32 where the gripper 303 is arranged (the side opposite the container front end) may be referred to as "a container rear end". The container rear end is referred to as a second end too. The longitudinal direction of the toner container 32 described above is the rotation axis direction, and the rotation axis direction becomes a horizontal direction when the toner container 32 is attached to the toner replenishing device 60. The container rear end of the container body 33 relative to the container gear 301 has a greater outer diameter than that of the container front end, and the spiral rib 302 is formed on the inner surface of the container rear end. When the container body 33 rotates in the arrow A direction in FIG. 10, a conveying force for moving toner from one end (the container rear end) to the other end (the container front end) in the rotation axis direction is applied to the toner in the container body 33 due to the action of the spiral rib 302.

Scooping portions 304 are formed on the inner wall of the front end of the container body 33. The scooping portions 304 scoop up toner, which has been conveyed to the container front end by the spiral rib 302 along with the rotation of the container body 33 in the arrow A direction in FIG. 10, along with rotation of the container body 33. Each of the scooping portions 304 is formed of a convex 304*h* and a scooping wall surface 304*f*. The convex 304*h* rises inside the container body 33 so as to form a ridge toward the rotation center of the container body 33 in a spiral form. The scooping wall surface 304*f* is an inner wall surface that is a part of the wall surface of a rising portion continued from the convex 304*h* (ridge) to the inner wall of the container body 33 and that is on the downstream side in the rotation direction of the container. When the scooping wall surface 304*f* is located in the lower part, the scooping wall surface 304*f* scoops up toner, which has been entered into the scooping portion 304 by the conveying force of the spiral rib 302, along with rotation of the conveying body 33. Therefore, the toner can be scooped up and located above the inserted conveying nozzle 611.

As illustrated in FIG. 1 and FIG. 10 for example, a scooping portion spiral rib 304*a* in a spiral shape is formed on the inner surface of the scooping portion 304 in order to convey toner inside the scooping portion 304, similarly to the spiral rib 302.

The container gear 301 is formed on the container front end relative to the scooping portion 304 of the container body 33. A gear exposing hole 34*a* is arranged on the container front end cover 34 so that a part of the container gear 301 (a far side in FIG. 6) can be exposed when the container front end cover 34 is attached to the container body 33. When the toner container 32 is attached to the toner replenishing device 60, the container gear 301 exposed from the gear exposing hole 34*a* is engaged with a container driving gear 601 of the toner replenishing device 60.

A cylindrical container opening 33*a* is formed on the container front end relative to the container gear 301 of the container body 33. A nozzle receiver fixing portion 337 of the nozzle receiver 330 is press fitted to the container opening 33*a* so that the nozzle receiver 330 can be fixed to the container body 33. A method for fixing the nozzle receiver 330 is not limited to press fitting. Other methods including fixing with adhesive agent or fixing with screws may be applied.

The toner container 32 is configured such that the nozzle receiver 330 is fixed to the container opening 33*a* of the container body 33 after the container body 33 is filled with toner via the opening of a front end opening 305.

A cover hooked portion 306 is formed on the container opening 33*a* and is arranged beside the container gear 301 of the container body 33. The container front end cover 34 is attached to the toner container 32 (the container body 33) in the state illustrated in FIG. 10 from the container front end (from the bottom left side in FIG. 10). Consequently, the container body 33 penetrates through the container front end cover 34 in the rotation axis direction, and a cover hook 341 arranged in the front end part of the container front end cover 34 is engaged with the cover hooked portion 306. The cover hooked portion 306 is formed so as to surround the outer surface of the container opening 33*a*, and when the cover hook 341 is engaged, the container body 33 and the container front end cover 34 are attached so as to rotate relative to each other.

The container body 33 is molded by a biaxial stretch blow molding method (see Patent Documents 1 to 3). The biaxial stretch blow molding method generally includes two-stage processes including a preform molding process and a stretch blow molding process. In the preform molding process, a test-tube shaped preform is molded with resin by injection molding. By the injection molding, the container opening 33*a*, the cover hooked portion 306, and the container gear 301 are formed at the opening of the test-tube shape. In the stretch blow molding process, the preform that is cooled after the preform molding process and detached from a mold is heated and softened, and then subjected to blow molding and stretching.

As for the container body 33, the container rear end relative to the container gear 301 is molded by the stretch blow molding process. Specifically, a portion where the scooping portion 304 and the spiral rib 302 are formed and the gripper 303 are molded by the stretch blow molding process.

In the container body 33, each of the parts, such as the container gear 301, the container opening 33*a*, and the cover hooked portion 306, on the container front end relative to the container gear 301 remains in the same form as in the preform generated by the injection molding; therefore, they can be molded with high accuracy. By contrast, the portion where the scooping portion 304 and the spiral rib 302 are formed and the gripper 303 are molded by stretching through the stretch blow molding process after the injection molding; therefore, the molding accuracy is lower than that of the preform molded parts.

The nozzle receiver 330 fixed to the container body 33 will be explained below.

Figure 14:
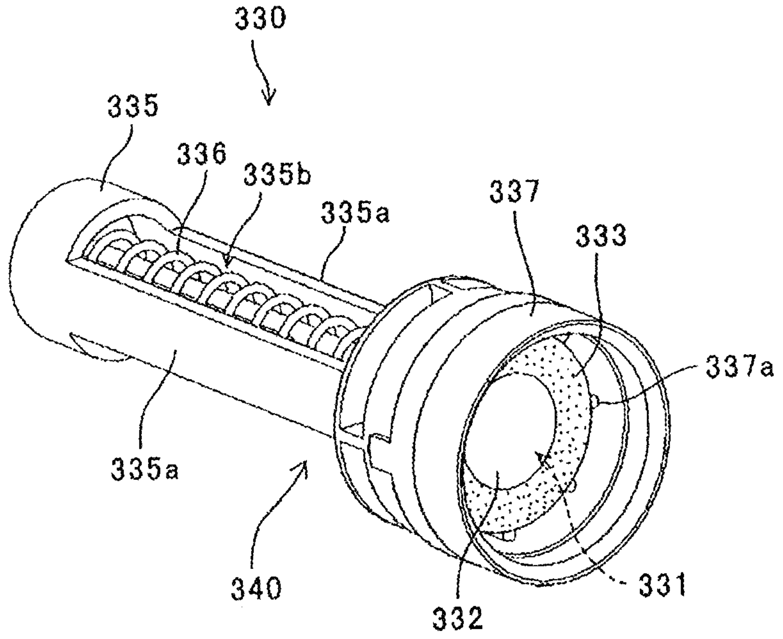
FIG. 14 is an explanatory perspective view of the nozzle receiver viewed from a front end of the container.
Figure 15:
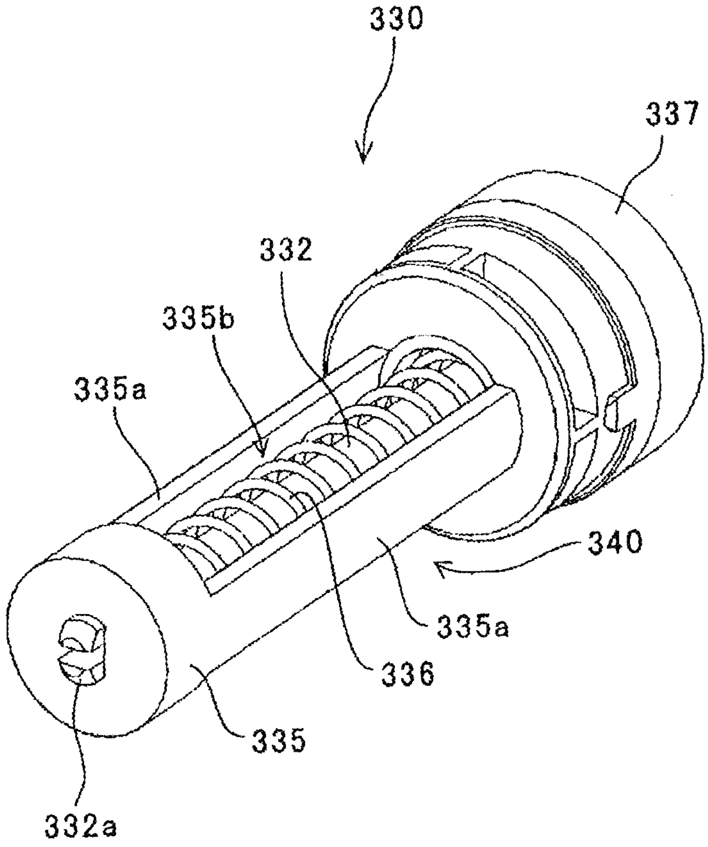
FIG. 15 is an explanatory perspective view of the nozzle receiver viewed from a rear end of the container.
Figure 16:
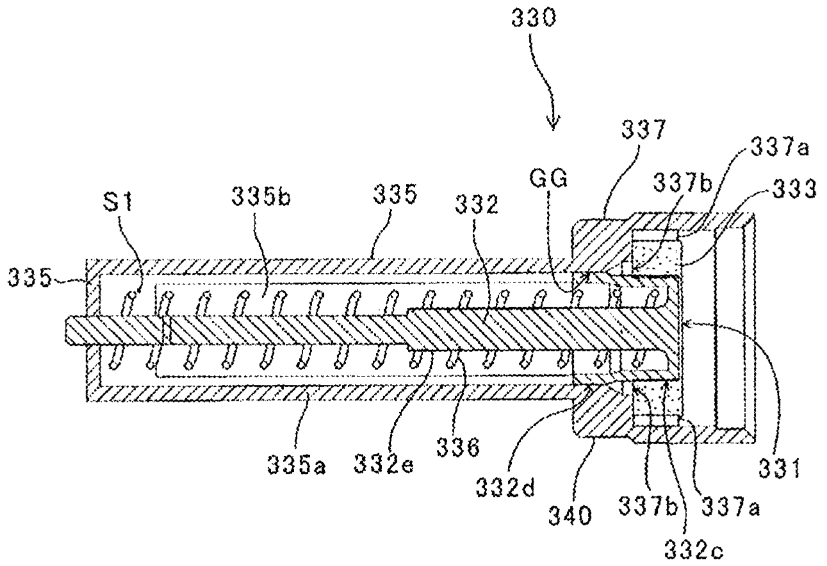
FIG. 16 is a top cross-sectional view of the nozzle receiver in the state illustrated in FIG. 13.
Figure 17:
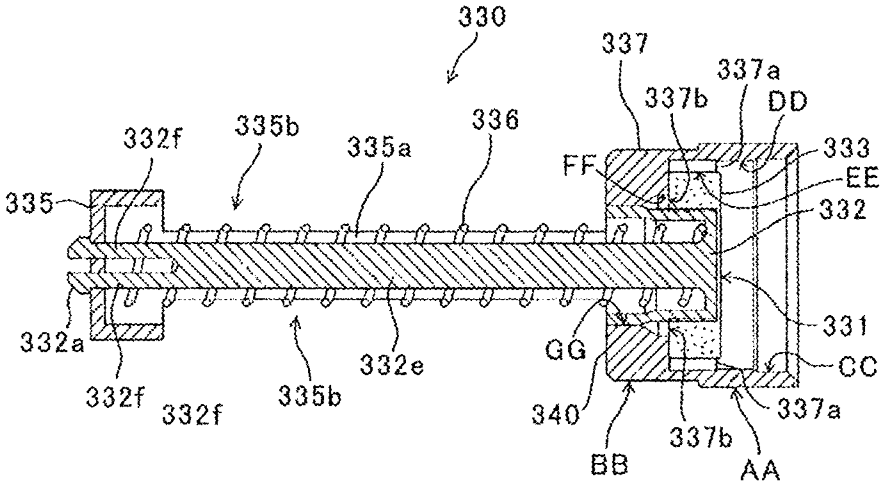
FIG. 17 is a transverse cross-sectional view of the nozzle receiver in the state illustrated in FIG. 13.
Figure 18:
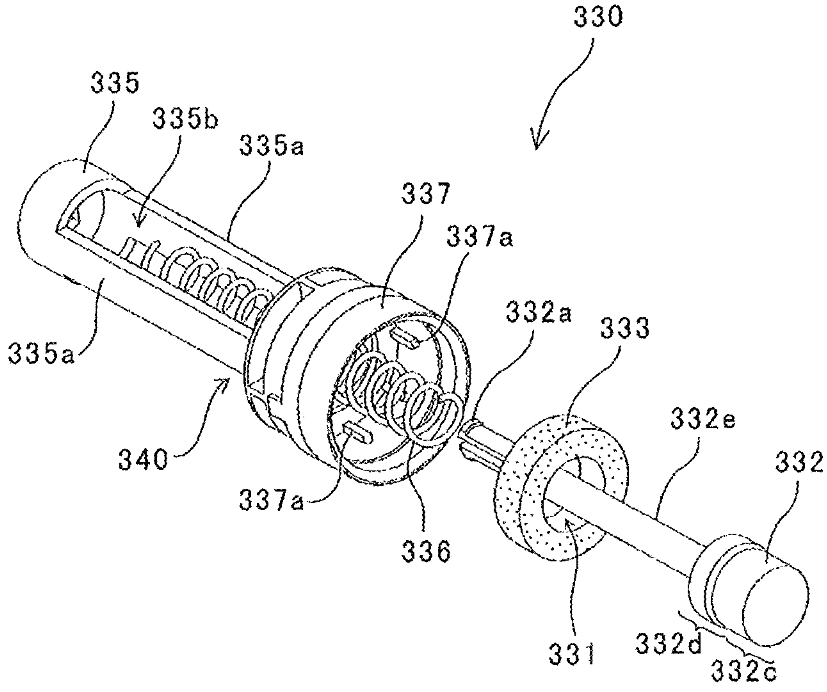
FIG. 18 is an exploded perspective view of the nozzle receiver.

FIG. 14 is an explanatory perspective view of the nozzle receiver 330 viewed from the container front end. FIG. 15 is an explanatory perspective view of the nozzle receiver 330 viewed from the container rear end. FIG. 16 is a top cross-sectional view of the nozzle receiver 330 viewed from above in the state illustrated in FIG. 13. FIG. 17 is a transverse cross-sectional view of the nozzle receiver 330 viewed from side (from the back side of FIG. 13) in the state illustrated in FIG. 13. FIG. 18 is an exploded perspective view of the nozzle receiver 330.

The nozzle receiver 330 includes a container shutter supporter 340, the container shutter 332, a container seal 333, a container shutter spring 336, and the nozzle receiver fixing portion 337. The container shutter supporter 340 includes a shutter rear end supporting portion 335, shutter side supporting portions 335*a*, and the nozzle receiver fixing portion 337. The container shutter spring 336 is formed of a coil spring.

The container shutter 332 includes a front end cylindrical portion 332*c*, a sliding section 332*d*, a guiding rod 332*e*, and first shutter hooks 332*a*. The front end cylindrical portion 332*c* is a container front end portion which can fit a cylindrical opening (the receiving opening 331) of the container seal 333. The sliding section 332*d* is a cylindrical portion, which is formed on the container rear end side relative to the front end cylindrical portion 332*c*. The sliding section 332*d* has an outer diameter slightly greater than the front end cylindrical portion 332*c*, and slides on the inner surfaces of the shutter side supporting portions 335*a* as a pair. The guiding rod 332*e* is a rod portion, which stands from the inside of the front end cylindrical portion 332*c* toward the container rear end and which functions as a guide to prevent the container shutter spring 336 from being buckled by being inserted into the coil of the container shutter spring 336. The first shutter hooks 332*a* are a pair of hooks, which are provided on the end opposite the base where the guiding rod 332*e* stands and which is configured to prevent the container shutter 332 from coming out of the container shutter supporter 340.

As illustrated in FIG. 16 and FIG. 17, a front end of the container shutter spring 336 butts against the inner wall of the front end cylindrical portion 332*c*, and a rear end of the container shutter spring 336 comes in contact with the wall of the shutter rear end supporting portion 335. At this time, the container shutter spring 336 is in a compressed state, so that the container shutter 332 receives a biasing force in a direction away from the shutter rear end supporting portion 335 (to the right or in the container front end direction in FIG. 16 and FIG. 17). However, the first shutter hooks 332*a* formed on the container rear end of the container shutter 332 is engaged with an outer wall of the shutter rear end supporting portion 335. Therefore, the container shutter 332 is prevented from moving farther in the direction away from the shutter rear end supporting portion 335 than in the state illustrated in FIG. 16 and FIG. 17. Due to the engaged state between the first shutter hooks 332*a* and the shutter rear end supporting portion 335 and the biasing force applied by the container shutter spring 336, it is possible to determine the positions of the front end cylindrical portion 332*c* and the container seal 333, which have a toner leakage preventing function, relative to the container shutter supporter 340 in the axial direction. Therefore, it is possible to determine the positions while the front end cylindrical portion 332*c* and the container seal 333 are fitted, enabling to prevent toner leakage.

The nozzle receiver fixing portion 337 is in the form of a tube whose outer diameter and inner diameter are reduced in a stepped manner toward the container rear end. The diameters are gradually reduced from the container front end to the container rear end. Two outer diameter portions (outer surfaces AA and BB from the container front end) are formed on the outer surface, and five inner diameter portions (inner surfaces CC, DD, EE, FF, and GG from the container front end) are formed on the inner surface. The boundary between the outer surfaces AA and BB on the outer surface is connected by a tapered surface. Similarly, the boundary between the fourth inner diameter portion FF and the fifth inner diameter portion GG on the inner surface is connected by a tapered surface. The inner diameter portion FF on the inner surface and the continued tapered surface correspond to a seal jam preventing space 337*b* to be described later, and the ridge lines of these surfaces correspond to sides of the cross-section of a pentagon to be described later.

As illustrated in FIG. 16 to FIG. 18, a pair of the shutter side supporting portions 335*a*, which face each other and which have flake shapes obtained by cutting a cylinder in the axial direction, are provided so as to protrude from the nozzle receiver fixing portion 337 toward the container rear end. The rear ends of the two shutter side supporting portions 335*a* are connected to the shutter rear end supporting portion 335 that has a cup shape with a hole open in the center of the bottom. In the two shutter side supporting portions 335*a*, a cylindrical space S1 is formed, which is recognized due to inner cylindrical surfaces of the shutter side supporting portions 335*a* facing each other and virtual cylindrical surfaces extending from the shutter side supporting portions 335*a*. The nozzle receiver fixing portion 337 includes the inner diameter portion GG, which is a fifth portion from the front end, as a cylindrical inner surface having an inner diameter that is the same as the diameter of the cylindrical space S1. The sliding section 332*d* of the container shutter 332 slides on the cylindrical space S1 and the cylindrical inner surface GG. The third inner surface EE of the nozzle receiver fixing portion 337 is a virtual cylindrical surface that passes through longitudinal apexes of nozzle shutter positioning ribs 337*a* that are equally spaced at 45°. The container seal 333 with a quadrangular cylindrical (cylindrical tube-shaped) cross section (the cross section in the cross-sectional view in FIG. 16 and FIG. 17) is arranged so as to correspond to the inner surface EE. The container seal 333 is fixed to a vertical surface connecting the third inner surface EE and the fourth inner surface FF, with an adhesive agent or double-stick tape. The exposed surface of the container seal 333 opposite the attachment surface (the right side in FIG. 16 and FIG. 17) serves as an inner bottom of the cylindrical opening of the cylindrical nozzle receiver fixing portion 337 (the container opening).

As illustrated in FIG. 16 and FIG. 17, the seal jam preventing space 337*b* (a catch preventing space) is formed so as to correspond to the inner surface FF of the nozzle receiver fixing portion 337 and the continued tapered surface. The seal jam preventing space 337*b* is an annular sealed space enclosed by three different parts. Specifically, the seal jam preventing space 337*b* is an annular space enclosed by the inner surface (the fourth inner surface FF and the continued tapered surface) of the nozzle receiver fixing portion 337, the vertical surface on the attachment side of the container seal 333, and the outer surface continuing from the front end cylindrical portion 332*c* to the sliding section 332*d* of the container shutter 332. A cross section of the annular space (the cross section illustrated in FIG. 16 and FIG. 17) is in the form of a pentagon. The angle between the inner surface of the nozzle receiver fixing portion 337 and the end surface of the container seal 333 and the angle between the outer surface of the container shutter 332 and the end surface of the container seal 333 are 90°.

Functions of the seal jam preventing space 337*b* will be described below. When the container shutter 332 moves to the container rear end while closing the receiving opening 331, the inner surface of the container seal 333 slides against the front end cylindrical portion 332*c*. Therefore, the inner surface of the container seal 333 is pulled by the container shutter 332 and elastically deformed so as to move toward the container rear end.

At this time, if the seal jam preventing space 337*b* is not provided and the vertical surface (the attachment surface of the container seal 333) continued from the third inner surface and the fifth inner surface GG are connected perpendicular to each other, the following situation may occur. Specifically, the elastically-deformed portion of the container seal 333 may be caught between the inner surface of the nozzle receiver fixing portion 337 sliding against the container shutter 332 and the outer surface of the container shutter 332, resulting in causing a jam. If the container seal 333 is jammed in the portion where the nozzle receiver fixing portion 337 and the container shutter 332 slide against each other, that is, between the front end cylindrical portion 332*c* and the inner surface GG, the container shutter 332 is firmly fixed to the nozzle receiver fixing portion 337, so that it becomes impossible to open and close the receiving opening 331.

By contrast, the seal jam preventing space 337*b* is formed on the inner area of the nozzle receiver 330 of the present embodiment. The inner diameter of the seal jam preventing space 337*b* (the inner diameter of each of the inner surface EE and the continued tapered surface) is smaller than the outer diameter of the container seal 333. Therefore, the entire container seal 333 can hardly enter the seal jam preventing space 337*b*. Furthermore, a part (area) of the container seal 333 to be elastically deformed by being pulled by the container shutter 332 is limited, and the container seal 333 can be restored by its own elasticity before the container seal 333 is brought to and jammed at the inner surface GG. With this action, it is possible to prevent a situation where the receiving opening 331 cannot be opened and closed because of fixed state between the container shutter 332 and the nozzle receiver fixing portion 337.

As illustrated in FIG. 16 to FIG. 18, a plurality of the nozzle shutter positioning ribs 337*a* are formed so as to radially extend, on the inner surface of the nozzle receiver fixing portion 337 in contact with the outer circumference of the container seal 333. As illustrated in FIG. 16 and FIG. 17, when the container seal 333 is fixed to the nozzle receiver fixing portion 337, the vertical surface of the container seal 333 on the container front end slightly protrudes relative to the front ends of the nozzle shutter positioning ribs 337*a* in the rotation axis direction. As illustrated in FIG. 9, when the toner container 32 is attached to the toner replenishing device 60, a nozzle shutter flange 612*a* of the nozzle shutter 612 of the toner replenishing device 60 presses down the protruding part of the container seal 333 by being biased by a nozzle shutter spring 613. The nozzle shutter flange 612*a* further moves and covers the front end surface of the container seal 333 from the receiving opening 331 side of the container seal 333 abutting the container front end of the nozzle shutter positioning ribs 337*a*, thereby sealing the container from the outside. Therefore, it is possible to ensure the sealing performance in the vicinity of the conveying nozzle 611 at the receiving opening 331 at the time of attachment, enabling to prevent toner leakage.

The back side of a nozzle shutter spring receiving surface 612*f* of the nozzle shutter flange 612*a* biased by the nozzle shutter spring 613 butts against the nozzle shutter positioning ribs 337*a*, so that the position of the nozzle shutter 612 relative to the toner container 32 in the rotation axis direction is determined.

As illustrated in FIG. 9 for example, when the toner container 32 is attached to the body of the toner replenishing device 60, the nozzle shutter 612 as a contact member and the nozzle shutter spring 613 as a biasing member are accommodated in the front end opening 305 that is a cylindrical inner space. To realize the above configuration, in the followings, explanation is given of a relationship of the diameter of the outer surface of the cylindrical container opening 33*a*, the inner diameter of the nozzle receiver fixing portion 337, and the diameters of parts including a container setting section 615 of the toner replenishing device 60.

Figure 66:
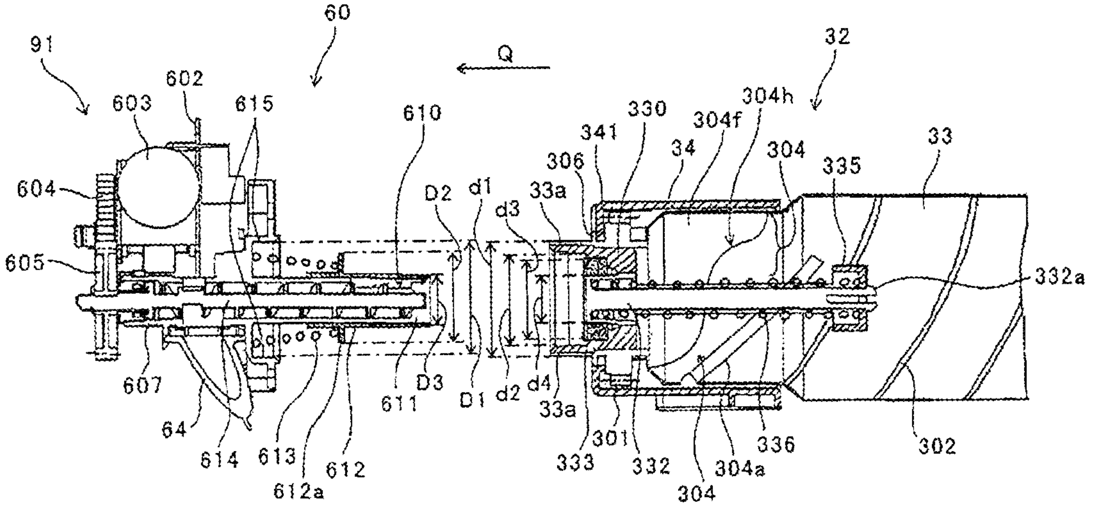
FIG. 66 is an explanatory diagram illustrating a relationship of a diameter of the outer surface of a container opening, an inner diameter of the nozzle receiving fixing portion, and diameters of parts including the container setting section of the toner replenishing device.

FIG. 66 is an explanatory diagram illustrating a relationship of the diameter of the outer surface of the container opening 33*a*, the inner diameter of the nozzle receiver fixing portion 337, and the diameters of parts including the container setting section 615 of the toner replenishing device 60.

As will be described later, the container setting section 615 includes an inner surface 615*a* of the container setting section that is fitted to the outer surface of the cylindrical container opening 33*a* of the toner container 32 when the toner container 32 is set. The inner diameter of the inner surface 615*a* is denoted by D1. The diameter of the outer surface of the cylindrical container opening 33*a* of the toner container 32 is denoted by d1.

The nozzle shutter 612 provided on the conveying nozzle 611 includes the nozzle shutter flange 612*a*, and the outer diameter of the nozzle shutter flange 612*a* is denoted by D2. The inner diameter of the nozzle receiver fixing portion 337 on the outer side relative to the container seal 333 in the axial direction (the inner diameter of the second inner surface from the container front end) among the inner diameters of the nozzle receiver fixing portion 337 is denoted by d2, and the outer diameter of the container seal 333 is denoted by d3. The nozzle shutter positioning ribs 337*a* come in contact with the outer surface of the container seal 333 and are arranged between the outer surface of the container seal 333 and the second inner surface of the nozzle receiver fixing portion 337 from the front end. The outer diameter of the nozzle shutter 612 (the outer diameter of a nozzle shutter tube 612*e* to be described later) is denoted by D3, and the inner diameter of the container seal 333 is denoted by d4.

When the toner container 32 is attached, the conveying nozzle 611 enters the receiving opening 331 while the nozzle opening 610 is closed by the nozzle shutter 612. The nozzle shutter flange 612*a* comes in contact with the container seal 333 and subsequently presses the container seal 333 down. Thereafter, the nozzle shutter flange 612*a* butts against the front ends of the nozzle shutter positioning ribs 337*a*, so that the nozzle opening 610 is opened and the inside of the toner container 32 and the inside of the conveying nozzle 611 communicate with each other. At this time, the outer surface of the cylindrical container opening 33*a* of the toner container 32 and the inner surface 615*a* of the container setting section are fitted to each other, and the container body 33 is rotatably held at the fitted position.

To rotatably fit the outer surface of the cylindrical container opening 33*a* of the toner container 32 and the inner surface 615*a* of the container setting section, the diameter d1 of the outer surface of the cylindrical container opening 33*a* of the toner container 32 and the inner diameter D1 of the inner surface 615*a* of the container setting section are set such that "d1<D1". Furthermore, d1 and D1 are set so that a fit tolerance becomes 0.01 mm to 0.1 mm. By maintaining the relationship of "d1<D1", it is possible to rotate the container body 33 while holding it to the container setting section 615.

The conveying nozzle 611 and the nozzle shutter 612 are configured such that they enter the receiving opening 331 while the nozzle opening 610 of the conveying nozzle 611 is closed by the nozzle shutter 612. To realize the configuration, the outer diameter D2 of the nozzle shutter flange 612*a* and the inner diameter d2 of the nozzle receiver fixing portion 337 on the outer side relative to the container seal 333 in the axial direction (the inner diameter of the second inner surface DD from the container front end) among the inner diameters of the nozzle receiver fixing portion 337 are set such that "D2<d2".

To cause the nozzle shutter flange 612*a* to come in contact with and press down the container seal 333 and subsequently butt against the front ends of the nozzle shutter positioning ribs 337*a*, the outer diameter D2 of the nozzle shutter flange 612*a* is set such that "D2>d3". Specifically, a relationship of "d3<D2<d2" is set among the outer diameter D2 of the nozzle shutter flange 612*a*, the inner diameter d2 of the nozzle receiver fixing portion 337 on the outer side relative to the container seal 333 in the axial direction among its inner diameters, and the outer diameter d3 of the container seal 333.

With the above setting, it becomes possible to accommodate the nozzle shutter 612 in the front end opening 305 of the toner container 32 (inside the nozzle receiver fixing portion 337). While the container seal 333 and the nozzle shutter flange 612*a* slide against each other along with rotation of the container body 33, it is possible to prevent damage on the container seal 333 due to the sliding. This is because the nozzle shutter flange 612*a* is in contact with the nozzle shutter positioning ribs 337*a* so as not to excessively press the container seal 333 down and it is possible to suppress a sliding load. Furthermore, because the nozzle shutter flange 612*a* moderately fits the container seal 333 while pressing the container seal 333 down, it is possible to reduce toner scattering that may occur at the time of attachment of the toner container 32.

Moreover, the outer diameter D3 of the nozzle shutter 612 and the inner diameter d4 of the container seal 333 of the nozzle receiver 330 are set such that "d4<D3". With this setting, the inner diameter of the container seal 333 is stretched along with insertion of the conveying nozzle 611, so that the container seal 333 can appropriately fit the nozzle shutter 612. Therefore, it is possible to prevent toner leakage from the toner container 32 to the outside while the conveying nozzle 611 is inserted.

To put all the above relationships together, each of the parts of the toner container 32 is set such that a relationship of "d4<D3<d3<D2<d2<d1<D1" for the diameters can be obtained. With this setting, it is possible to realize both the sealing capability for preventing scattering or leakage of toner from the toner container 32 and the housing capability for housing the nozzle shutter 612 and the nozzle shutter spring 613.

As will be described later, when the toner container 32 is attached, the nozzle opening 610 is opened after the nozzle shutter flange 612*a* butts against the nozzle shutter positioning ribs 337*a* and the position of the nozzle shutter 612 relative to the toner container 32 is fixed. On the other hand, when the toner container 32 is detached, even after the conveying nozzle 611 starts to be removed from the toner container 32, the position of the nozzle shutter 612 relative to the toner container 32 does not change because of the biasing force of the nozzle shutter spring 613 while the nozzle opening 610 is open.

When the toner container 32 is pulled out, the position of the toner container 32 relative to the conveying nozzle 611 changes, so that the position of the nozzle shutter 612 relative to the conveying nozzle 611 also changes. Consequently, the nozzle shutter 612 starts closing the nozzle opening 610. At this time, a distance between the toner container 32 and the container setting section 615 becomes longer along with the pull-out operation of the toner container 32. Therefore, the nozzle shutter spring 613 extends to the natural length due to its own restoring force, so that the biasing force applied to the nozzle shutter 612 is reduced.

When the toner container 32 is further pulled out and the nozzle shutter 612 completely closes the nozzle opening 610, a part of the nozzle shutter 612 (in particular, "a first inner rib 612*b*" to be described later) butts against a part of the conveying nozzle 611. With this butt contact, the position of the nozzle shutter 612 relative to the conveying nozzle 611 is fixed, and the butt contact of the nozzle shutter 612 with the nozzle shutter positioning ribs 337*a* is released.

Thereafter, the toner container 32 is further pulled out, so that the nozzle shutter 612 is removed from the toner container 32 together with the conveying nozzle 611.

When the nozzle shutter flange 612*a* is in butt-contact with the nozzle shutter positioning ribs 337*a*, a portion where the nozzle opening 610 is formed on the conveying nozzle 611 is fully inside the toner container 32 relative to an inlet of the receiving opening 331. Specifically, the nozzle opening 610 is located at the position opposite the scooping portion 304 where the nozzle opening 610 goes over the container gear 301 in the rotation axis direction. Because the nozzle opening 610 is opened while it is fully inside the toner container 32, it is possible to prevent toner leakage from the nozzle opening 610 to the outside.

The shutter side supporting portions 335*a* and a space 335*b* between the side supporting portions, which is as an opening arranged adjacent to the side supporting portion, are formed such that the two shutter side supporting portions 335*a* facing each other form a part of a cylindrical shape and an another part of the cylindrical shape is cut out at two portions of the space 335*b* between the side supporting portions. With this shape, it is possible to guide the container shutter 332 to move in the rotation axis direction in the cylindrical space S1 formed inside the cylindrical shape.

The nozzle receiver 330 fixed to the container body 33 rotates together with the container body 33 when the container body 33 rotates. At this time, the shutter side supporting portions 335*a* of the nozzle receiver 330 rotate around the conveying nozzle 611 of the toner replenishing device 60. Therefore, the shutter side supporting portions 335*a* being rotated pass a space just above the nozzle opening 610 formed in the upper part of the conveying nozzle 611. Consequently, even when toner is instantaneously accumulated above the nozzle opening 610, because the shutter side supporting portions 335*a* cross the accumulated toner and alleviate the accumulation, it is possible to prevent a situation in which the accumulated toner is aggregated in the rest state and a toner conveying failure occurs when the device is resumed. On the other hand, when the shutter side supporting portions 335*a* are located on the side of the conveying nozzle 611 and the nozzle opening 610 and the space 335*b* between the side supporting portions face each other, toner in the container body 33 is supplied to the conveying nozzle 611 as indicated by an arrow β in FIG. 9.

As illustrated in FIG. 16 and FIG. 17, a step which is between the first outer surface AA and the second outer surface BB is formed such that the outer diameter of the nozzle receiver fixing portion 337 on the container rear end is reduced in the middle of the outer surface of the nozzle receiver fixing portion 337 in the rotation axis direction. As illustrated in FIG. 13, the inner surface of the cylindrical container opening 33*a* of the container body 33 is shaped so as to follow the outer surface of the nozzle receiver fixing portion 337, and a step is formed so that the inner diameter of the cylindrical container opening 33*a* the container rear end is reduced. The step on the outer surface of the nozzle receiver fixing portion 337 butts against the step on the inner surface of the cylindrical container opening 33*a* in the whole area in the circumferential direction. Therefore, it is possible to prevent the axis of the nozzle receiver 330 from being inclined with respect to the container body 33 (a state in which the central axis of the cylindrical nozzle receiver fixing portion 337 is inclined with respect to the central axis of the cylindrical container opening 33*a*).

Second Embodiment

A toner container 32 according to a second embodiment will be explained below, in which the container shutter 332 is modified compared with the toner container 32 of the first embodiment.

The toner container 32 can be detached from the copier 500 in the state illustrated in FIG. 6. However, when the toner container 32 alone is transported or is set to the main body by a user, the toner container 32 may be dropped.

Figure 19:
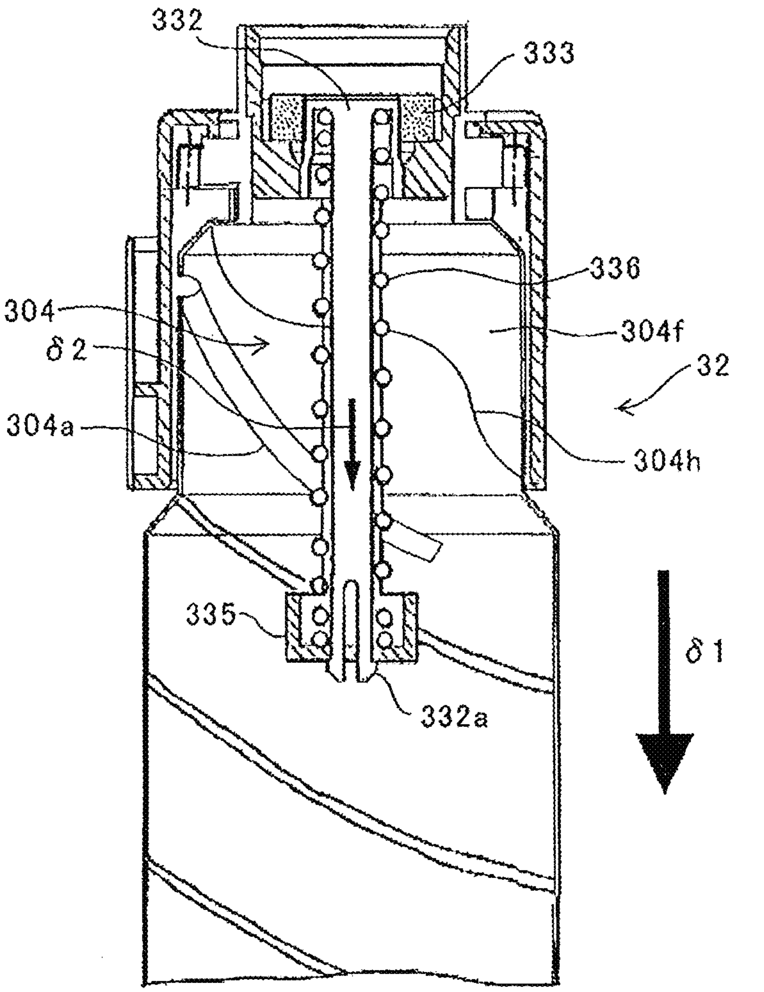
FIG. 19 is an explanatory diagram illustrating a state where the toner container falls with the rear end facing downward.

FIG. 19 is an explanatory diagram illustrating a state where the toner container 32 falls with the rear end facing downward. An arrow δ1 in FIG. 19 indicates the falling direction.

If the toner container 32 falls down and hit the floor as illustrated in FIG. 19, the inertia force of the container shutter 332 acts in the same direction as the falling direction as indicated by an arrow δ2 in FIG. 19. The inertia force increases as the impact due to falling increases, and if the inertial force becomes greater than the pressing force of the container shutter spring 336, the container shutter 332 moves in the direction in which the inertia force acts (in the arrow δ2 direction in FIG. 19). In this case, if the amount of movement of the container shutter 332 becomes greater than the thickness of the container seal 333, a gap is generated between the container shutter 332 and the container seal 333 for a moment and toner may be scattered. Furthermore, if the container body 33 of the toner container 32 is a hollow resin product formed by blow molding, the impact due to the hit may be transformed into momentum and the inertia force may be increased.

To reduce the amount of movement of the container shutter 332 caused by the inertial force due to the falling, it is effective to use the container shutter spring 336 with a greater pressing force. However, if the pressing force of the container shutter spring 336 is increased, an adverse effect as described below occurs.

Specifically, if the pressing force of the container shutter spring 336 is increased, a contact pressure between the container shutter 332 and the conveying nozzle 611 is increased while the toner container 32 is attached to the toner replenishing device 60. If the contact pressure increases, driving torque for rotating the toner container 32 increases. Therefore, a driving motor 603 with greater output is needed and the cost of the driving motor 603 increases. Furthermore, with an increase in the contact pressure, abrasion of the contact surfaces of the container shutter 332 and the conveying nozzle 611 increases resulting in shortened lifetimes.

Moreover, if the pressing force of the container shutter spring 336 increases, a greater force is needed to set the toner container 32 in the toner replenishing device 60 resulting in reduced operability. Furthermore, the pressing force of the container shutter spring 336 acts in the direction in which the toner container 32 is pushed out of the toner replenishing device 60. Therefore, if the pressing force of the container shutter spring 336 increases, there is a risk that the toner container 32 may pop out from the toner replenishing device 60 immediately after an engaged state between structures (replenishing device engaging members 609 and container engaged portions 339) for engaging the toner container 32 with the toner replenishing device 60 is released.

Figure 20:
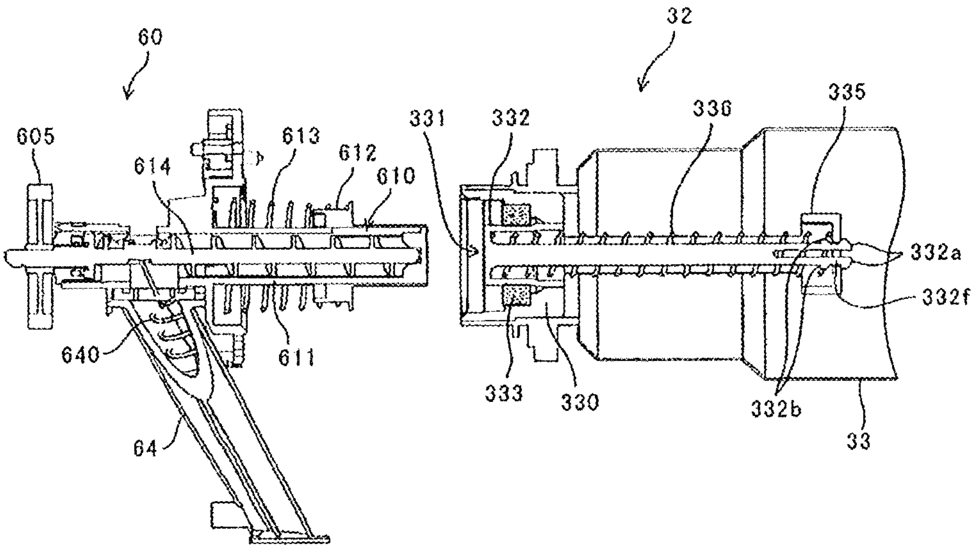
FIG. 20 is an explanatory diagram illustrating a state before the toner container including second shutter hooks is set in a device body.
Figure 21:
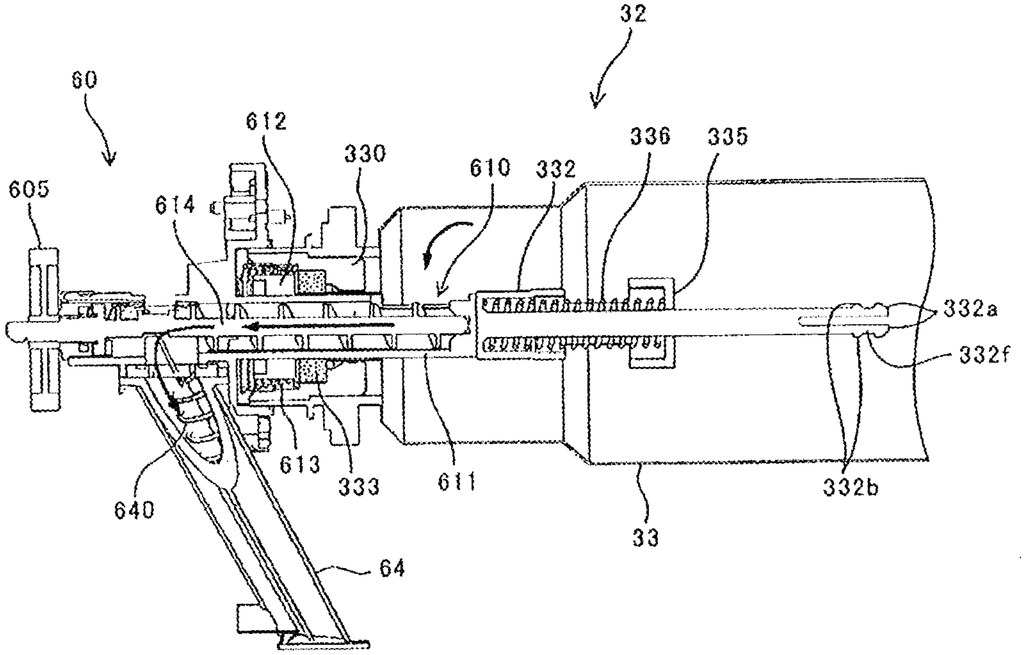
FIG. 21 is an explanatory diagram illustrating a state where the toner container including the second shutter hooks is set in the body.

FIG. 20 and FIG. 21 are explanatory diagrams illustrating a configuration in which second shutter hooks 332*b* are provided at a position slightly closer to the container front end of the container shutter 332 relative to the guiding rod 332*e* of the first shutter hooks 332*a*. FIG. 20 is an explanatory cross-sectional view of the toner replenishing device 60 before the toner container 32 is attached and the front end of the toner container 32. FIG. 21 is an explanatory cross-sectional view of the toner replenishing device 60 to which the toner container 32 is attached and the front end of the toner container 32.

In the configuration illustrated in FIG. 20 and FIG. 21, the container shutter 332 of the toner container 32 is pressed in the direction in which the receiving opening 331 is closed by the container shutter spring 336 (to the left in FIG. 20). The container shutter 332 includes a pair of the first shutter hooks 332*a* and a pair of the second shutter hooks 332*b*, as two pairs of hooks configured to prevent the container shutter 332 from coming off, on the container rear end relative to the guiding rod 332*e*.

The container rear end of the guiding rod 332*e* is bifurcated so as to form a pair of cantilevers 332*f*. The first shutter hooks 332*a* and the second shutter hooks 332*b* are arranged on the respective outer surfaces of the cantilevers. As illustrated in FIG. 20, the vertical surface of the shutter rear end supporting portion 335 is located between the first shutter hooks 332*a* and the second shutter hooks 332*b* when the container shutter 332 closes the receiving opening 331. A hole smaller than the projected area of the first shutter hooks 332*a* in the axial direction is formed on the vertical surface of the shutter rear end supporting portion 335. The guiding rod 332*e* is inserted in the container shutter spring 336 and the pair of the cantilevers 332*f* of the guiding rod 332*e* is bent toward the center of the axis of the guiding rod 332*e* so as to pass the first shutter hooks 332*a* through the hole in the vertical surface of the shutter rear end supporting portion 335. Accordingly, the guiding rod 332*e* is mounted on the container body 33 as illustrated in FIG. 20. The guiding rod 332*e* is molded with resin, such as polystyrene, so as to ensure the elasticity that allows the cantilevers 332*f* to bend.

FIG. 20 illustrates a state before the toner container 32 is set in the main body of the toner replenishing device 60 (not in use) when, for example, the toner container 32 is transported.

When the toner container 32 is set in the main body of the toner replenishing device 60 in the state illustrated in FIG. 20, the toner container 32 is pushed into the main body and the front end of the conveying nozzle 611 pushes the container shutter 332 toward the inside of the toner container 32. At this time, the first shutter hooks 332*a* at the end of the guiding rod 332*e* are pushed out of the container rear end of the shutter rear end supporting portion 335. Accordingly, the second shutter hooks 332*b* that are second hooks are engaged with the hole in the vertical surface of the shutter rear end supporting portion 335.

The hole in the vertical surface is smaller than the projected area of the second shutter hooks 332*b*, and therefore, the second shutter hooks 332*b* do not come off when it is in contact with the vertical surface. However, when the user increase the pushing force applied to the toner container 32, the pushing force acts on the contact section of the second shutter hooks 332*b* and the vertical surface. Due to the action of the pushing force, both of the second shutter hooks 332*b* and the pair of the cantilevers 332*f* provided on the outer surface are bent toward the center of the axis of the guiding rod 332*e*, so that the second shutter hooks 332*b* pass through the hole in the vertical surface. Therefore, as illustrated in FIG. 21, the second shutter hooks 332*b* are located inside the toner container 32 relative to the shutter rear end supporting portion 335.

Once the container shutter 332 is set in the toner container 32, the second shutter hooks 332*b* function to prevent the container shutter 332 from coming off.

As described above, when the toner container 32 alone is transported or is set in the main body by a user, the toner container 32 may be dropped. In this case, as explained above with reference to FIG. 19, a force in a direction of opening the container shutter 332 may be applied to the container shutter 332 due to the inertia force of the container shutter 332. However, if the second shutter hooks 332*b* are provided as in the configuration illustrated in FIG. 20 and FIG. 21, it is possible to prevent toner scattering when the toner container 32 falls because of the reasons described below. Specifically, when the container shutter 332 is caused to move in the open direction, the pressing force of the container shutter spring 336 and a force needed to pass the second shutter hooks 332*b* through the hole (i.e., a force for bending the pair of the cantilevers 332*f*) prevent the container shutter 332 from moving in the open direction. Because the inertia force due to the impact at the time of falling does not increase unlike the pushing force applied by the user, the second shutter hooks 332*b* are engaged with the hole in the vertical surface of the shutter rear end supporting portion 335 and the container shutter 332 can be prevented from being opened. Therefore, it is possible to prevent toner scattering when the toner container 32 falls.

In the toner container 32 configured as illustrated in FIG. 20 and FIG. 21, it is possible to prevent the movement of the shutter when the toner container falls, without increasing the pressing force of the container shutter spring 336. Therefore, it is possible to prevent toner scattering at the time of falling without causing the adverse effect as described above. Furthermore, only the second shutter hooks 332*b* are added to the container shutter 332 compared with the configuration explained above with reference to FIG. 1 and FIG. 9 for example, and additional parts are not needed. Therefore, it is possible to prevent toner scattering at the time of falling at low costs.

The configuration of the container front end cover 34 common to the first to the twentieth embodiments will be explained below with reference to FIG. 5 to FIG. 8.

The container front end cover 34 of the toner container 32 is caused to slide and move on the container receiving section 72 illustrated in FIG. 5 at the time of attachment to the toner replenishing device 60. In FIG. 5, gutters continuing from the insert hole section 71 to the container cover receiving section 73 are formed just below the four toner containers 32, respectively, such that the longitudinal side goes along the axial direction of the container body 33. Sliding guides 361 as a pair are formed on the both lower sides of the container front end cover 34 so as to allow the container front end cover 34 to slide and move while the sliding guides 361 are engaged with the gutter. More specifically, sliding rails as a pair are protruding on both sides of each of the gutters of the container receiving section 72. Sliding gutters 361*a* parallel to the rotation axis of the container body 33 are formed on the sliding guides 361 so as to sandwich the pair of sliding rails from above and below. Furthermore, the container front end cover 34 includes the container engaged portions 339 that are engaged with the replenishing device engaging members 609 provided on the setting cover 608 at the time of attachment to the toner replenishing device 60.

The container front end cover 34 also includes an ID tag (ID chip) 700 for recording data, such as usage of the toner container 32. The container front end cover 34 also includes a color-specific rib **34*b* that prevents the toner container 32 containing toner of a certain color from being attached to the setting cover 608 of a different color. As described above, because the sliding guides 361 are engaged with the sliding rails of the container receiving section 72 at the time of attachment, the posture of the container front end cover 34 on the toner replenishing device 60 is determined. Therefore, the positioning between the container engaged portions 339 and the replenishing device engaging members 609 and the positioning between the ID tag 700 and a connector 800** to be described later can be performed smoothly.

The toner replenishing device 60 common to the first to the twentieth embodiment will be explained below.

As illustrated in FIG. 7 and FIG. 8, the toner replenishing device 60 includes a nozzle holder 607 that fixes the conveying nozzle 611 to a frame 602 of the main body of the copier 500. The setting cover 608 is fixed to the nozzle holder 607. The toner dropping passage 64, which is arranged so as to communicate with the inside of the conveying nozzle 611 from the lower part of the conveying nozzle 611, is fixed to the nozzle holder 607.

The toner dropping passage 64 may include, as in the configuration illustrated in FIG. 20 and FIG. 21, an oscillating spring 640 inside thereof.

One end of the oscillating spring 640 is engaged with the rotation axis of the conveying screw 614, and moves in the vertical direction along with rotation of the conveying screw 614. The oscillating spring 640 scrapes off toner stagnated or attached on the vicinity of the inner surface of the toner dropping passage 64 serving as a tube member, along with the vertical movement. To improve the effect of preventing clogging of the toner dropping passage 64, it is desirable to place the oscillating spring 640 configured to oscillate to a position closer to the inner surface of the toner dropping passage 64. In the configuration of the embodiment, because the toner dropping passage 64 is a cylindrical member, the oscillating spring 640 (a spring with a diameter slightly smaller than the diameter of the inner wall of the toner dropping passage 64) is used as an oscillating scraper. However, it is preferable to adjust the shape of the oscillating scraper in accordance with the cross-sectional shape of the toner dropping passage 64 such that when the shape of the x-section of the toner dropping passage 64 is other than a circle, the shape of the oscillating scraper is adjusted in accordance with the actual shape.

Furthermore, the container driving section 91 is fixed to the frame 602.

The container driving section 91 is fixed to the frame 602. The container driving section 91 includes the driving motor 603, the container driving gear 601, and a worm gear **603*a* for transmitting rotation drive of the driving motor 603 to the rotation axis of the container driving gear 601. A drive transmitting gear 604 is fixed to the rotation axis of the container driving gear 601 so as to be engaged with the conveying screw gear 605 fixed to the rotation axis of the conveying screw 614. With this configuration, it is possible to rotate the toner container 32 via the container driving gear 601 and the container gear 301. Furthermore, it is possible to rotate the conveying screw 614 via the drive transmitting gear 604 and the conveying screw gear 605 together with the rotation of the toner container 32**.

It may be possible to provide a clutch in a drive transmitting passage from the driving motor 603 to the container gear 301 or in a drive transmitting passage from the driving motor 603 to the conveying screw gear 605. With the clutch, it becomes possible to rotate only one of the toner container 32 and the conveying screw 614 along with the rotation of the driving motor 603.

The conveying nozzle 611 of the toner replenishing device 60 will be explained below.

Figure 22:
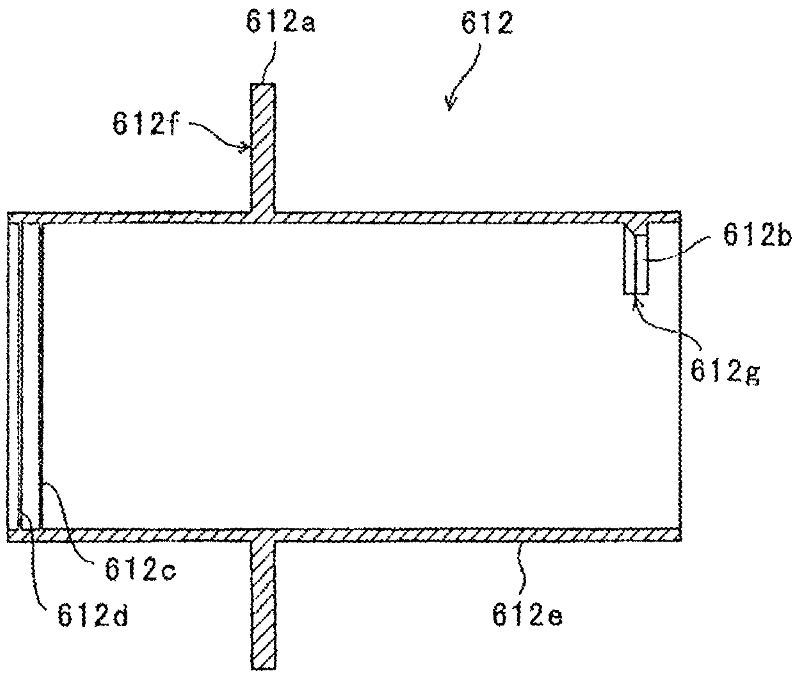
FIG. 22 is an explanatory cross-sectional view of a nozzle shutter.
Figure 23:
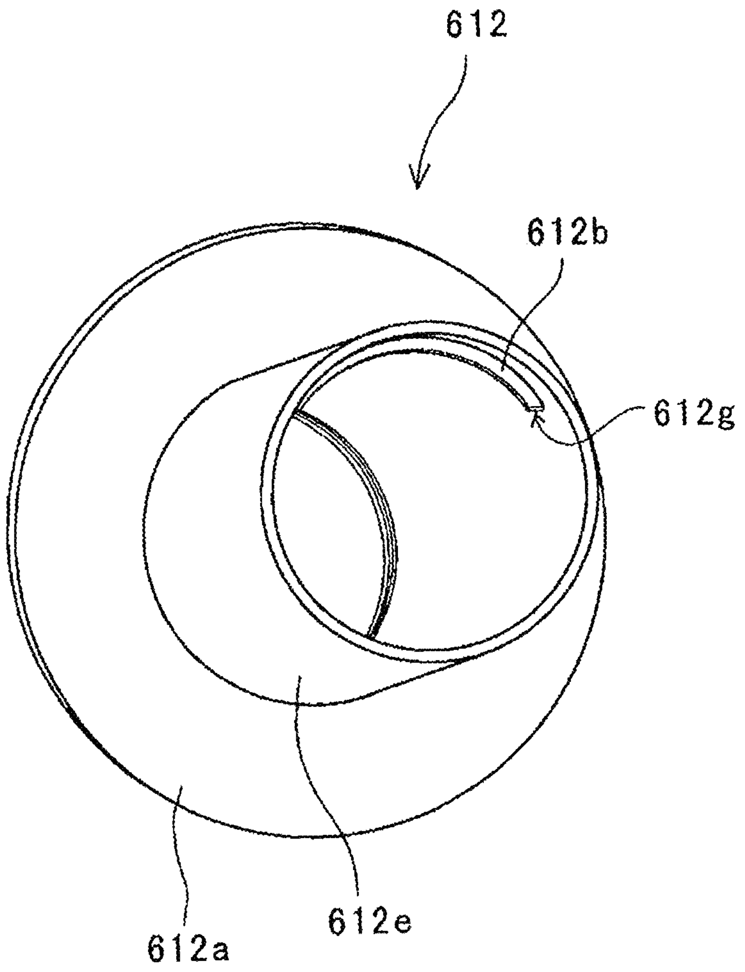
FIG. 23 is an explanatory perspective view of the nozzle shutter viewed from a front end of the nozzle.
Figure 24:
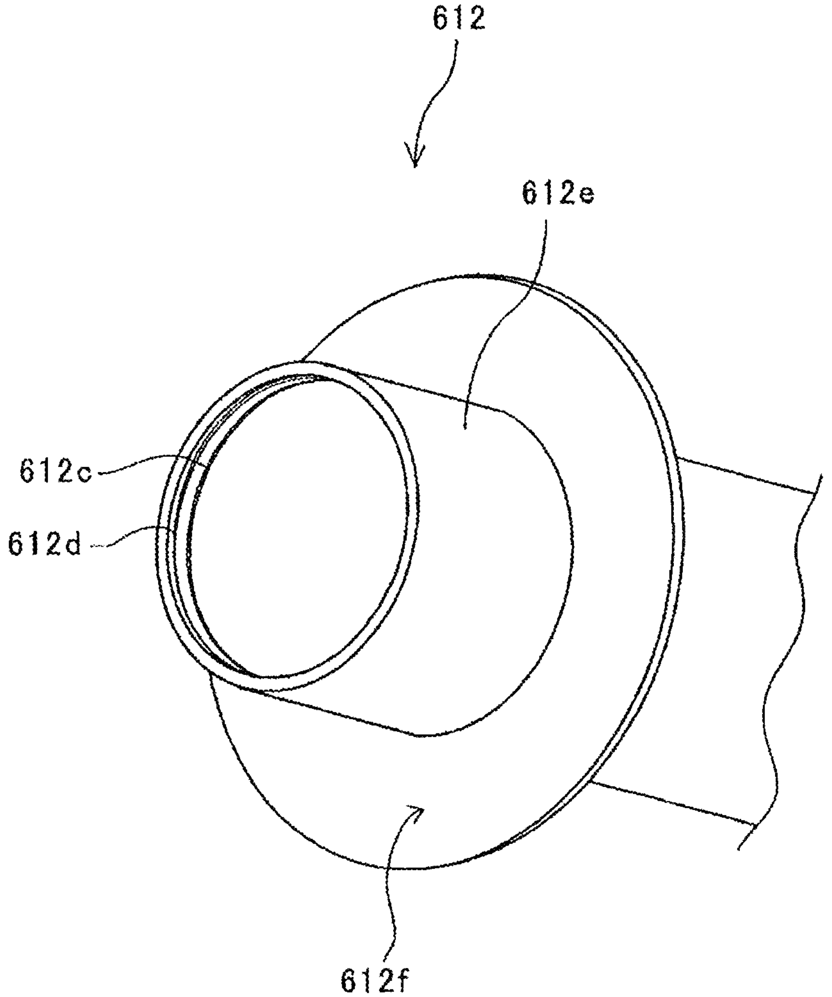
FIG. 24 is an explanatory perspective view of the nozzle shutter viewed from a based end of the nozzle.
Figure 25:
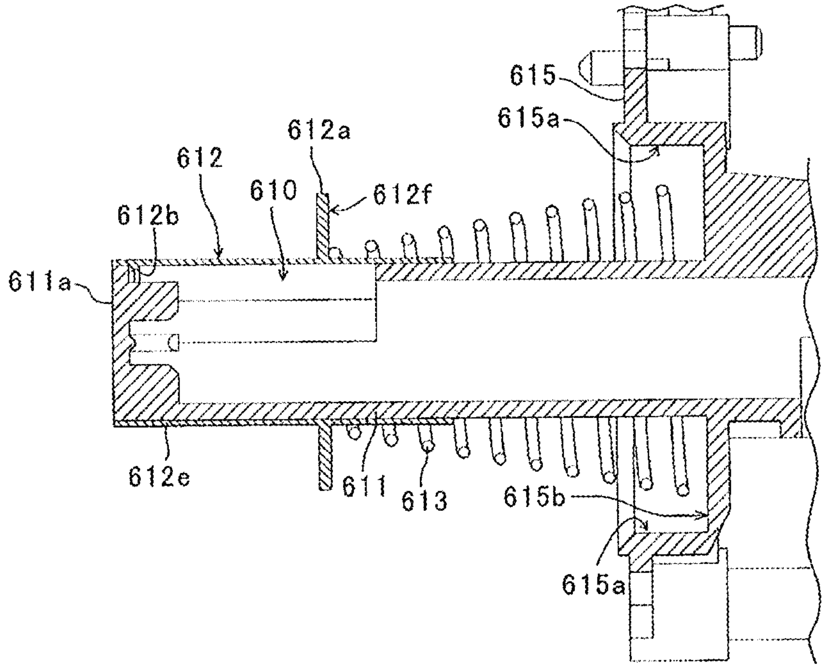
FIG. 25 is an explanatory cross-sectional view of the vicinity of a conveying nozzle of the toner replenishing device.
Figure 26:
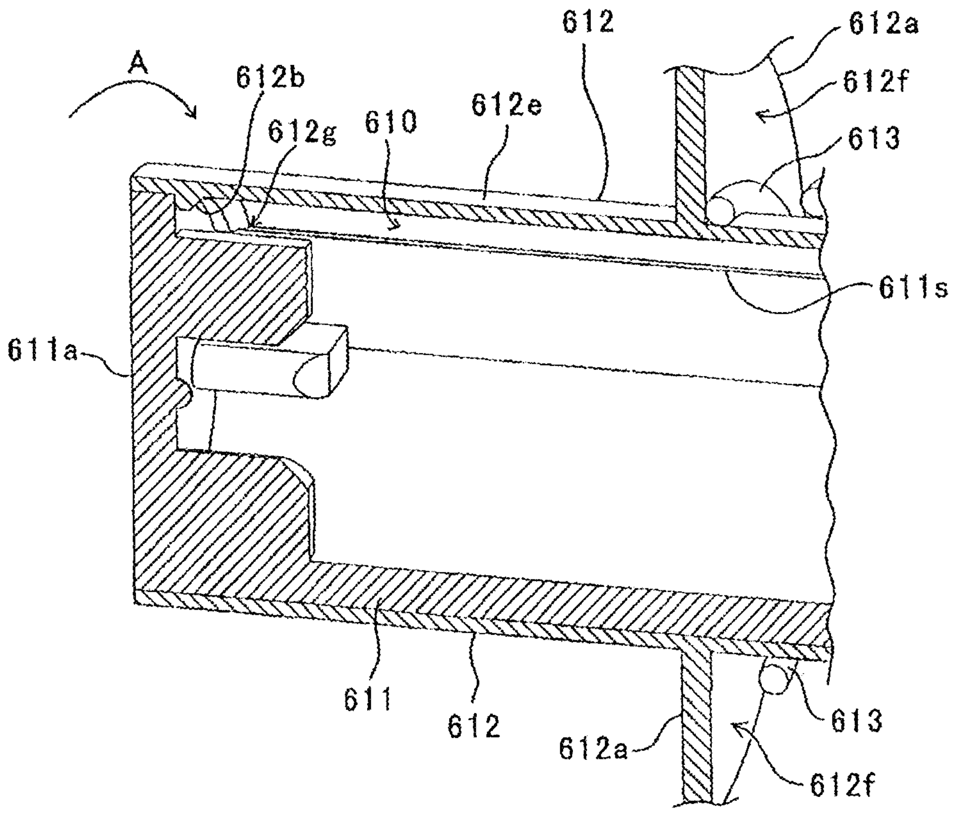
FIG. 26 is an explanatory perspective cross-sectional view of the vicinity of a nozzle opening of the conveying nozzle.
Figure 27:
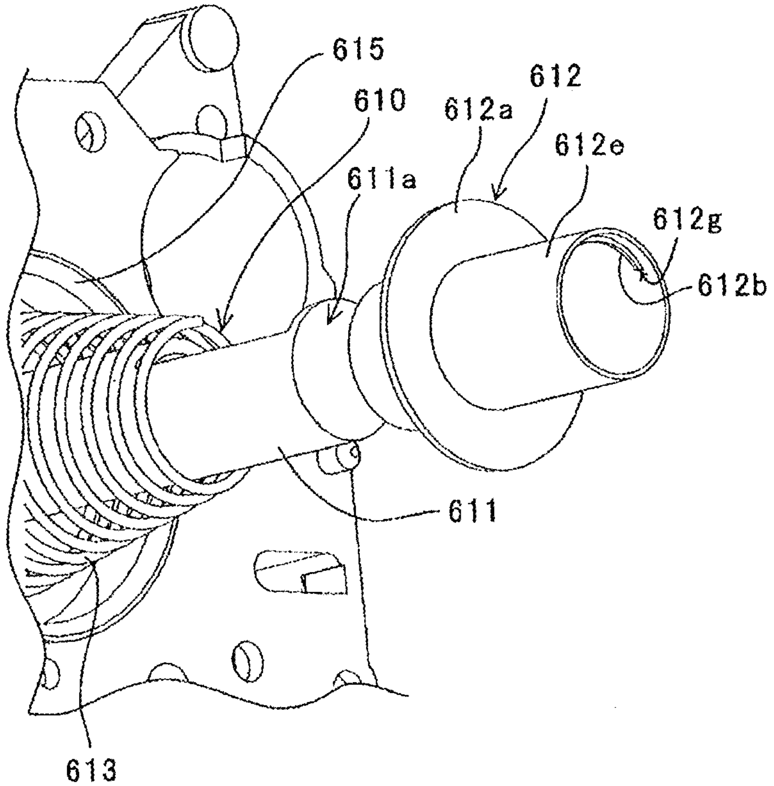
FIG. 27 is an explanatory perspective view of the vicinity of the conveying nozzle when the nozzle shutter is detached, viewed from the front end of the nozzle.
Figure 28:
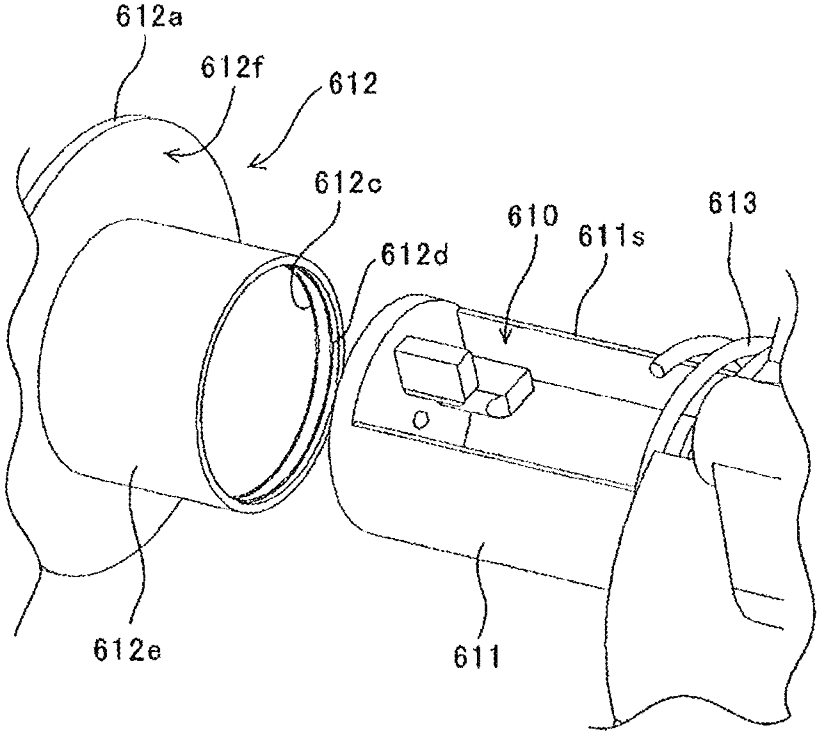
FIG. 28 is an explanatory perspective view of the vicinity of the nozzle opening when the nozzle shutter is detached.

FIG. 22 is an explanatory cross-sectional view of the nozzle shutter 612. FIG. 23 is an explanatory perspective view of the nozzle shutter 612 viewed from a side where the toner container 32 is attached (a front end of the nozzle). FIG. 24 is an explanatory perspective view of the nozzle shutter 612 viewed from the toner replenishing device 60 side (a base end of the nozzle). FIG. 25 is an explanatory cross-sectional view of the vicinity of the conveying nozzle 611 of the toner replenishing device 60. FIG. 26 is an explanatory perspective cross-sectional view of the vicinity of the nozzle opening 610 of the conveying nozzle 611. FIG. 27 is an explanatory perspective view of the vicinity of the conveying nozzle 611 when the nozzle shutter 612 is detached, viewed from the front end of the nozzle. FIG. 28 is an explanatory perspective view of the vicinity of the nozzle opening 610 when the nozzle shutter 612 is detached. In FIG. 25, FIG. 26, and FIG. 28, the conveying screw 614 arranged inside the conveying nozzle 611 is omitted.

At the base end of the conveying nozzle 611, the container setting section 615 is formed, in which the cylindrical container opening **33*a* is fitted when the toner container 32 is attached to the toner replenishing device 60. The container setting section 615 is in the form of a cylinder and is fitted such that the inner surface 615*a* thereof and an outer surface of the cylindrical container opening 33*a* can slide against each other. With this fitting, the position of the toner container 32 relative to the toner replenishing device 60 in the planar direction perpendicular to the rotation axis of the toner container 32 is determined. When the toner container 32 rotates, the outer surface of the cylindrical container opening 33*a* functions as a rotary shaft section and the container setting section 615 functions as a shaft receiving section. The position where the outer surface of the cylindrical container opening 33*a* and the container setting section 615 slidably contact each other and the position of the toner container 32 relative to the toner replenishing device 60 is determined is indicated by a in FIG. 9**.

As illustrated in FIG. 22 for example, the nozzle shutter 612 includes the nozzle shutter flange **612*a* and the nozzle shutter tube 612*e*. The first inner rib 612*b* is formed in a part of the upper inner surface of the nozzle shutter tube 612*e* near the front end of the nozzle. A second inner rib 612*c* and a third inner rib 612*d* are formed on the inner surface of the nozzle shutter tube 612*e*** near the base end of the nozzle so as to surround the inner surface.

The length of the first inner rib **612*b* in the circumferential direction on the inner surface is set so that the first inner rib 612*b* can be fitted in the width of the nozzle opening 610 in the circumferential direction while the nozzle shutter 612 is attached to the conveying nozzle 611**.

As illustrated in FIG. 1 and FIG. 25, the end of the nozzle shutter spring 613 on the base end of the nozzle butts against an end surface **615*b* of the container setting section 615. Furthermore, the end of the nozzle shutter spring 613 on the front end of the nozzle butts against the nozzle shutter spring receiving surface 612*f* of the nozzle shutter flange 612*a*. At this time, the nozzle shutter spring 613 is in a compressed state and a biasing force is applied to the nozzle shutter 612 in a direction in which the nozzle shutter 612 comes out of the front end of the nozzle (to the left in FIG. 25). However, the first inner rib 612***b* butts against the edge of the nozzle opening 610 on the front end of the nozzle, that is, the upper inner surface of a front end 611*a* of the conveying nozzle 611. Therefore, the nozzle shutter 612 is prevented from moving in a direction in which it comes out of the conveying nozzle 611 in the state illustrated in FIG. 25 or FIG. 26. Due to the butt-contact of the first inner rib 612*b* and the biasing force of the nozzle shutter spring 613, the position of the nozzle shutter 612 relative to the conveying nozzle 611 in the rotation axis direction is determined.

A front end 612*g* of the first inner rib, which is an end of the first inner rib 612*b* in the circumferential direction, is shaped such that it can butt against a nozzle opening rim 611 is, which is a rim of the nozzle opening 610 in the lateral direction. Specifically, the front end 612*g* of the first inner rib is shaped so as to butt against the nozzle opening rim 611*s* when the nozzle shutter 612 is caused to rotate in the arrow A direction in FIG. 26.

When the toner container 32 rotates, a force that causes rotation in the arrow A direction in FIG. 26 acts on the nozzle shutter 612, in which the outer surface of the nozzle shutter tube 612*e* comes in contact with the inner surface of the container seal 333 fixed to the toner container 32. At this time, if the nozzle shutter 612 rotates relative to the conveying nozzle 611 and the first inner rib 612*b* is separated from the nozzle opening 610, the following may occur. Specifically, the nozzle shutter 612 may come out of the conveying nozzle 611 due to the biasing force based on the restoring action of the nozzle shutter spring 613 when the toner container 32 is detached from the toner replenishing device 60.

Besides, depending on the elasticity of the nozzle shutter 612, the first inner rib 612*b* detached from the nozzle opening 610 may firmly tighten the outer surface of the conveying nozzle 611 and the nozzle shutter 612 is precluded from moving relative to the conveying nozzle 611. In each case, the nozzle opening 610 remains open when the toner container 32 is detached from the toner replenishing device 60, resulting in toner leakage.

By contrast, in the toner replenishing device 60 according to the present embodiment, when the nozzle shutter 612 is caused to rotate in the arrow A direction in FIG. 26, the front end 612*g* of the first inner rib butts against the nozzle opening rim 611*s*. Therefore, it is possible to prevent the nozzle shutter 612 from rotating relative to the conveying nozzle 611 in the state illustrated in FIG. 26.

The inner diameters of the second inner rib 612*c* and the third inner rib 612*d* are set to be slightly smaller than the outer diameter of the cylindrical conveying nozzle 611. The second inner rib 612*c* and the third inner rib 612*d*, which are molded with resin, are elastically deformed so that the nozzle shutter 612 can be attached to the conveying nozzle 611. Because the two ribs (612*c*, 612*d*) with the inner diameters slightly smaller than the outer diameter of the conveying nozzle 611 are elastically deformed and come into contact with the outer surface of the conveying nozzle 611, the sealing performance between the inner surface of the nozzle shutter 612 and the outer surface of the conveying nozzle 611 can be improved. Therefore, it is possible to prevent toner leakage from a gap between the nozzle shutter 612 and the conveying nozzle 611.

The toner replenishing device 60 according to the present embodiment uses a conical spring as the nozzle shutter spring 613. The conical spring allows at least a part of adjacent coils to overlap each other in the completely-compressed state, so that the length in the winding axis direction in the completely-compressed state can be shortened compared with a cylindrical spring with the same spring length. Therefore, it is possible to reduce a space of the nozzle shutter spring 613 in the winding axis direction in the completely-compressed state.

A process of attaching the toner container 32 to the toner replenishing device 60 will be explained below.

When the toner container 32 is moved toward the toner replenishing device 60 as indicated by an arrow Q in FIG. 7 or FIG. 1, the front end 611*a* of the conveying nozzle 611 comes in contact with the front end surface of the container shutter 332. When the toner container 32 is further moved toward the toner replenishing device 60, the conveying nozzle 611 presses the front end surface of the container shutter 332. Because of the pressing of the container shutter 332, the container shutter spring 336 is compressed. Accordingly, the container shutter 332 is pushed into the inside (to the container rear end) of the toner container 32 along with the compression and the front end of the conveying nozzle 611 is inserted into the receiving opening 331. At this time, apart of the nozzle shutter tube 612*e* on the front end of the nozzle relative to the nozzle shutter flange 612*a* of the nozzle shutter 612 is also inserted into the receiving opening 331 together with the conveying nozzle 611.

When the toner container 32 is further moved toward the toner replenishing device 60, the surface opposite a nozzle shutter spring receiving surface of the nozzle shutter flange 612*a* comes in contact with the front end surface of the container seal 333. Subsequently, the surface comes in contact with the nozzle shutter positioning ribs 337*a* by slightly pressing the container seal 333. Consequently, the position of the nozzle shutter 612 relative to the toner container 32 in the rotation axis direction is fixed.

When the toner container 32 is further moved toward the toner replenishing device 60, the conveying nozzle 611 is further inserted to the inside of the toner container 32. At this time, the nozzle shutter 612 abutting the nozzle shutter positioning ribs 337*a* is pushed back toward the base end of the conveying nozzle 611. Therefore, the nozzle shutter spring 613 is compressed and the relative position of the nozzle shutter 612 and the conveying nozzle 611 is shifted toward the base end of the nozzle. Due to the shift of the relative position, the nozzle opening 610 covered by the nozzle shutter 612 is exposed inside the container body 33 and the inside of the container body 33 and the inside of the conveying nozzle 611 communicate with each other.

When the conveying nozzle 611 is inserted in the receiving opening 331, a force in a direction in which the toner container 32 is pushed back relative to the toner replenishing device 60 (a direction opposite the arrow Q in FIG. 7) acts due to the biasing force of the compressed container shutter spring 336 or the nozzle shutter spring 613. However, when the toner container 32 is attached to the toner replenishing device 60, the toner container 32 is moved to a position at which the container engaged portions 339 are engaged with the replenishing device engaging members 609 in a direction toward the toner replenishing device 60 against the above-mentioned force. Therefore, the biasing force of the container shutter spring 336 and the nozzle shutter spring 613 and the engaged state between the container engaged portions 339 and the replenishing device engaging members 609 become active. Due to the action of the biasing force and the engaged state, the position of the toner container 32 relative to the toner replenishing device 60 in the rotation axis direction is determined in the state illustrated in FIG. 8 and FIG. 9.

As illustrated in FIG. 7, each of the container engaged portions 339 includes a guiding protrusion 339*a*, a guiding gutter 339*b*, a bump 339*c*, and a rectangular engaged hole 339*d*. Two sets of the container engaged portions 339 each including, as one set, the above parts are arranged on both sides of the container front end cover 34 in a symmetric manner with respect to a vertical line passing through the receiving opening 331. The guiding protrusions 339*a* are arranged on a front vertical surface of the container front end cover 34 so as to be on the horizontal line passing through the center of the receiving opening 331. The guiding protrusions 339*a* include inclined surfaces continued to the guiding gutters 339*b*. The inclined surfaces come in contact with the replenishing device engaging members 609 and guide the replenishing device engaging members 609 toward the guiding gutters 339*b* at the time of attachment of the toner container 32. The guiding gutters 339*b* are gutters that are sunken on the side surface of the container front end cover 34.

The widths of the guiding gutters 339*b* are set to be slightly wider than the replenishing device engaging members 609 and to be appropriate to prevent the replenishing device engaging members 609 from coming out of the gutters.

The rear ends of the guiding gutters 339*b* do not directly continue to the engaged holes 339*d* but are ended. The heights of the guiding gutters 339*b* are the same as the height of the side surface of the container front end cover 34. Specifically, outer surfaces with widths of about 1 mm are present between the guiding gutters 339*b* and the engaged holes 339*d*, which correspond to the bumps 339*c*. The replenishing device engaging members 609 go over the bumps 339*c* and fall into the engaged holes 339*d*. As a result, the toner container 32 and the toner replenishing device 60 are engaged with each other.

The toner container 32 is configured such that the container shutter 332 is located in the center of a line segment connecting the two container engaged portions 339 on a virtual plane perpendicular to the rotation axis. If the container shutter 332 is not located on the line segment connecting the two container engaged portions 339, the following may occur. Specifically, a distance from the line segment to the container shutter 332 becomes a lever and moment of force that rotates the toner container 32 about the line segment is generated due to the biasing force between the container shutter spring 336 and the nozzle shutter spring 613 at the position of the container shutter 332. Due to the action of the moment, the toner container 32 may be inclined with respect to the toner replenishing device 60. In this case, an attachment load on the toner container 32 increases, increasing a load on the nozzle receiver 330 that holds and guides the container shutter 332.

In particular, if the toner container 32 is new and adequately filled with toner, and when the toner container 32 is pushed from the rear end such that the protruding conveying nozzle 611 is inserted in the horizontal direction, moment of force acts to rotate the toner container 32 due to weight of the container 32 added with the weight of toner. Therefore, a load is applied to the nozzle receiver 330 in which the conveying nozzle 611 is inserted, and the nozzle receiver 330 may be damaged or broken in the worst case. By contrast, in the toner container 32 according to the present embodiment, because the container shutter 332 is located on the line segment connecting the two container engaged portions 339. Therefore, it is possible to prevent the toner container 32 from being inclined with respect to the toner replenishing device 60 due to the biasing force of the container shutter spring 336 and the nozzle shutter spring 613 that act at the position of the container shutter 332.

Figure 31A:
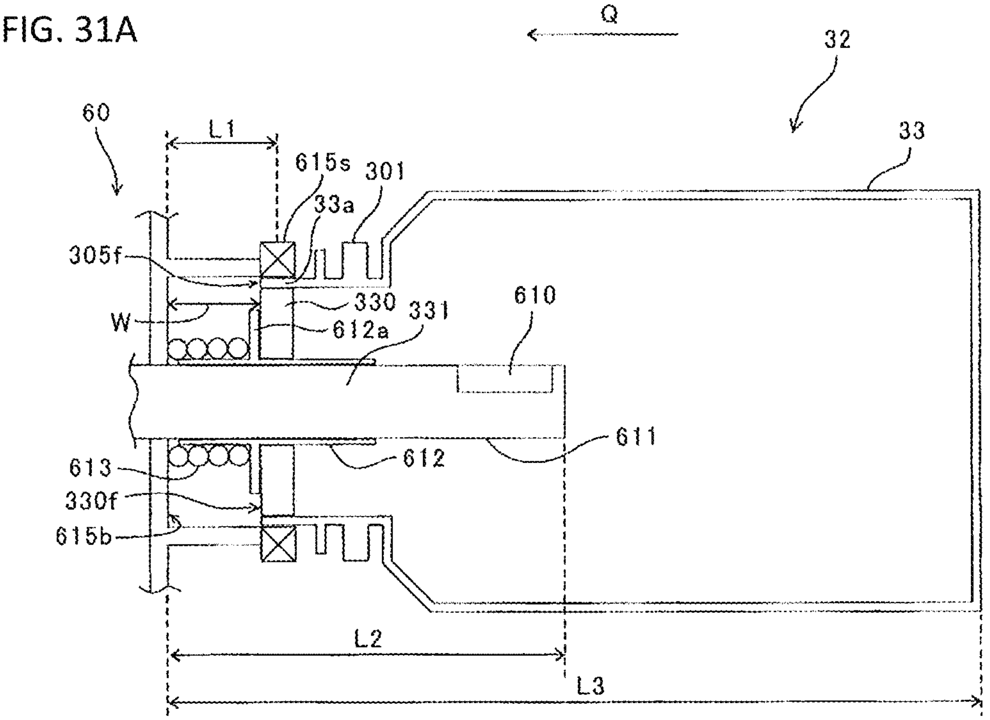
FIG. 31A is a schematic explanatory diagram illustrating a state where the toner container is attached to the toner replenishing device such that an edge (brim) of a front end opening and an edge of the nozzle receiver are at the same position in the rotation axis direction.
Figure 31B:
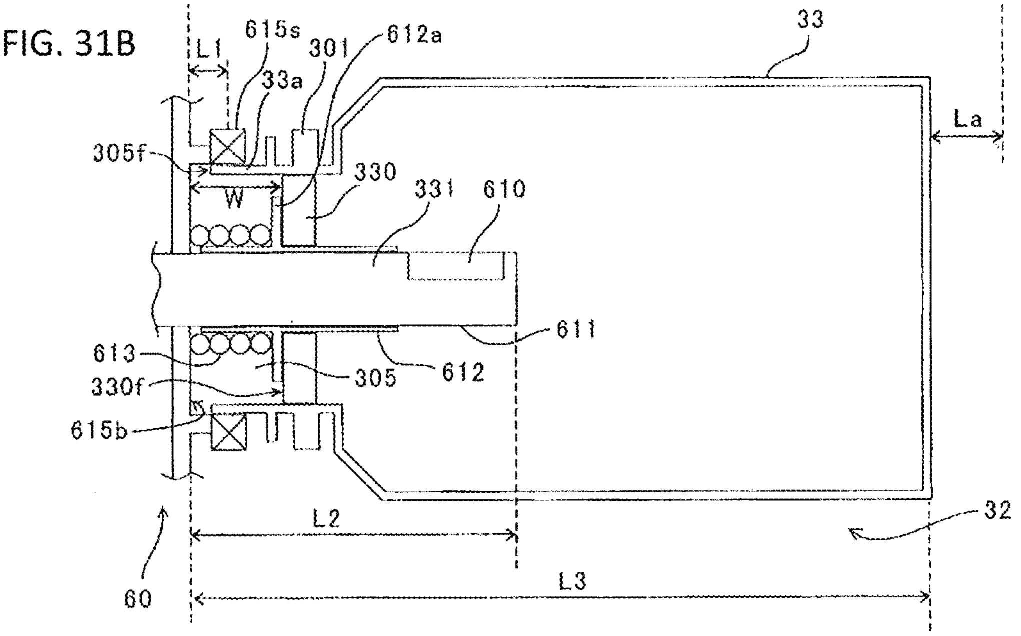
FIG. 31B is a schematic explanatory diagram illustrating a state where the toner container is attached to the toner replenishing device such that the edge of the nozzle receiver is located on the rear end of the container relative to the edge of the front end opening.

As illustrated in FIG. 31B, the circular end surface of the cylindrical container opening 33*a* of the toner container 32 does not come in contact with the end surface 615*b* of the container setting section 615 when the toner container 32 is attached to the toner replenishing device 60. The reason for this is as follows. It is assumed that the circular end surface of the cylindrical container opening 33*a* comes in contact with the end surface 615*b* of the container setting section 615. In this configuration, the circular end surface of the cylindrical container opening 33*a* may butt against the end surface 615*b* of the container setting section 615 before the engaged holes 339*d* of the container engaged portions 339 are engaged with the replenishing device engaging members 609. If the end surfaces butt against each other as described above, it is impossible to move the toner container 32 farther toward the toner replenishing device 60, so that the positioning in the rotation axis becomes impossible. To prevent such a situation, when the toner container 32 is attached to the toner replenishing device 60, a small gap is generated between the circular end surface of the cylindrical container opening 33*a* and the end surface 615*b* of the container setting section 615.

When the position in the rotation axis direction is determined as described above, the outer surface of the cylindrical container opening 33*a* is rotatably fitted to the inner surface 615*a* of the container setting section 615. Therefore, as described above, the position of the toner container 32 relative to the toner replenishing device 60 in the planar direction perpendicular to the rotation axis is determined. Consequently, attachment of the toner container 32 to the toner replenishing device 60 is completed.

When the toner container 32 is completely attached, if the driving motor 603 is rotated, the container body 33 of the toner container 32 and the conveying screw 614 inside the conveying nozzle 611 rotate.

With the rotation of the container body 33, toner in the container body 33 is conveyed to the container front end of the container body 33 by the spiral rib 302. The toner that reaches the scooping portion 304 by the conveyance is scooped up to be located above the nozzle opening 610 by the scooping portion 304 along with the rotation of the container body 33. The toner scooped up to be located above the nozzle opening 610 falls toward the nozzle opening 610, so that the toner is supplied to the conveying nozzle 611. The toner supplied to the conveying nozzle 611 is conveyed by the conveying screw 614 and is replenished in the developing device 50 via the toner dropping passage 64. The flow of the toner from the inside of the container body 33 to the toner dropping passage 64 at this time is indicated by an arrow β in FIG. 9.

Third Embodiment

A modification of rotation timings of the toner container 32 etc. according to a third embodiment will be explained.

In the configurations explained above in the first and the second embodiments, the toner container 32 and the conveying screw 614 are rotated simultaneously. However, regarding the rotation timings, it may be possible to rotate only the toner container 32 at the start of toner replenishment, and subsequently rotate the conveying screw 614 after a lapse of a predetermined time. Furthermore, it may be possible to stop the toner container 32 at the end of the toner replenishment, and subsequently stop the conveying screw 614 after a lapse of a predetermined time. A timing chart of the above rotation timings is illustrated in FIG. 29.

Figure 29:
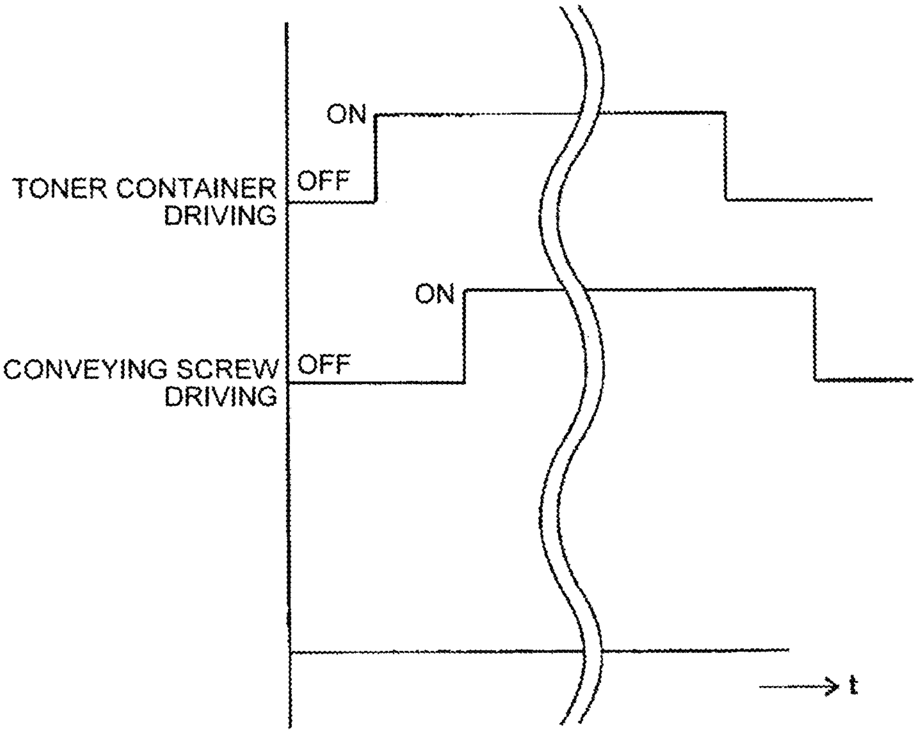
FIG. 29 is a timing chart for a structure that first rotates the toner container and subsequently rotates a conveying screw.

In the configuration with the rotation timings illustrated in FIG. 29, when the toner replenishment is stopped, rotation of the toner container 32 is stopped before rotation of the conveying screw 614 inside the conveying nozzle 611 is stopped. With these rotation timings, conveyance by the conveying screw 614 is continued at the nozzle opening 610 while supply of new toner is stopped, and rotation of the conveying screw 614 is subsequently stopped after a predetermined time elapses. Therefore, toner T that remains in the vicinity of the nozzle opening 610 of the conveying nozzle 611 when the rotation of the toner container 32 is stopped can be conveyed toward the toner dropping passage 64 by the conveying screw 614. Consequently, it becomes possible to reduce the amount of the toner T remaining on the conveying nozzle 611 near the nozzle opening 610. When the toner container 32 is detached from the main body of the toner replenishing device, because the amount of toner on the conveying nozzle 611 has been reduced, the container seal 333 arranged on the nozzle receiver 330 can easily clean the conveying nozzle 611. Therefore, it is possible to prevent scattering and falling of toner due to attachment/detachment of the toner container 32 to/from the main body.

Furthermore, in the configuration with the above rotation timings, rotation of the toner container 32 is started before a start of rotation of the conveying screw 614 when the toner replenishment is started. Therefore, it is possible to start rotation of the conveying screw 614 after the vicinity of the nozzle opening 610 of the conveying nozzle 611 is filled with toner. Consequently, the amount of toner conveyed by one rotation of the conveying screw 614 can become stable from the start of rotation of the conveying screw 614. As a result, the stability of the replenishing amount of toner can be improved.

In this way, it is possible to easily realize a configuration, in which the rotation timings of the toner container 32 and the conveying screw 614 are differentiated, by using independent drive sources that independently rotate the toner container 32 and the conveying screw 614.

Fourth Embodiment

A fourth embodiment, which is a modification that uses the same drive source for differentiating the rotation timings of the toner container 32 etc. of the third embodiment, will be explained below.

A configuration using the same drive source may be realized by using a clutch. With use of the same drive source, the configuration for differentiating the rotation timings can be realized at low costs.

Figures 30A, 30B:
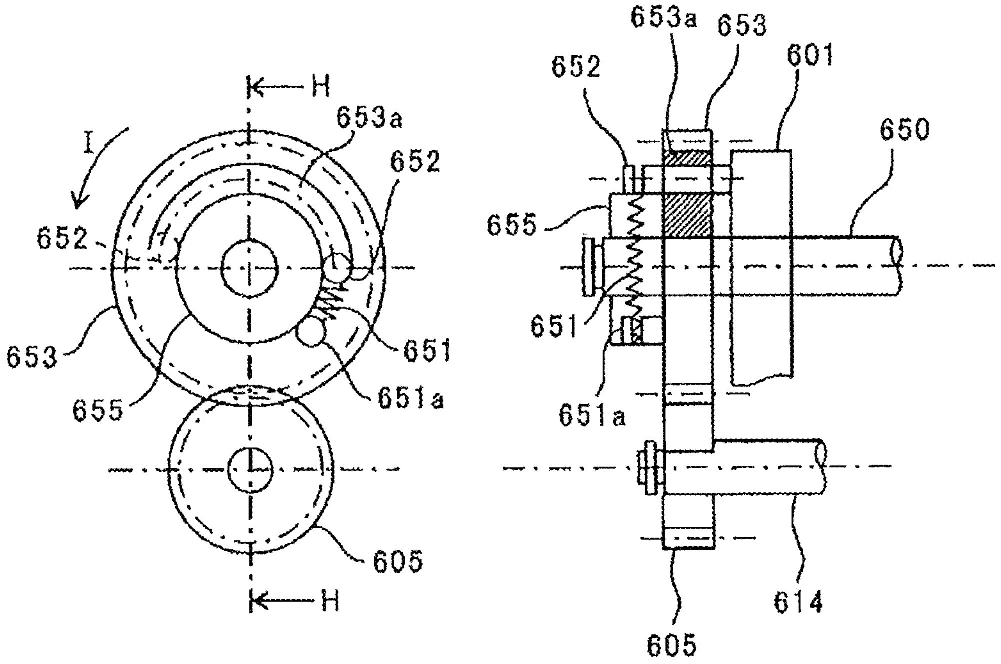
FIG. 30A is an explanatory front view of a drive transmitter that differentiates rotation timings of the toner container and the conveying screw by using the same driving source.
FIG. 30B is an explanatory lateral cross-sectional view of the drive transmitter.

An example of a drive transmitter for differentiating the rotation timings by using the same drive source is illustrated in FIGS. 30A and 30B. FIG. 30A is a front view of the drive transmitter. FIG. 30B is an explanatory lateral cross-sectional view of the drive transmitter taken along H-H in FIG. 30A.

The drive transmitter illustrated in FIGS. 30A and 30B includes the container driving gear 601 fixed to a toner container driving shaft 650 and an idler gear 653 that is arranged so as to rotate relative to the toner container driving shaft 650. A gear surface hole 653*a* is formed so as to follow the semiperimeter of the idler gear 653 along the rotation direction of the idler gear 653. A driving pin 652 is fixed to the container driving gear 601 so as to be engaged with the gear surface hole 653*a*. As illustrated in FIG. 30A, a delay generating spring 651 is provided, one end of which is fixed to the idler gear 653 by a spring fixing pin 651*a* and the other one end of which is fixed to the driving pin 652.

On the front face of the idler gear 653, a spring guiding circular plate 655 is provided, which is concentric with respect to the idler gear 653 and that is arranged on the inner side of the gear surface hole 653*a* such that the delay generating spring 651 extends along the outer surface of the spring guiding circular plate 655.

Furthermore, the conveying screw gear 605 is provided, which is fixed to the rotation axis of the conveying screw 614, which is gear-engaged with the idler gear 653, and which transmits rotation of the idler gear 653 to the conveying screw 614.

In the drive transmitter illustrated in FIGS. 30A and 30B, when a driving motor rotates the toner container driving shaft 650 in the arrow I direction in FIG. 30A, the container driving gear 601 rotates. Furthermore, the driving pin 652 integrated with the container driving gear 601 rotates along the gear surface hole 653*a* arranged on the idler gear 653.

If the container driving gear 601 rotates by about 180° when the driving pin 652 is located at a position indicated by a solid line in FIG. 30A, the driving pin 652 butts against the gear surface hole 653*a* as indicated by a dashed line in FIG. 30A. When the container driving gear 601 in the butt-contact state further rotates, the idler gear 653 is rotated. Consequently, the conveying screw gear 605 rotates via the idler gear 653, and the conveying screw 614 starts rotating.

In this way, a time taken to move the driving pin 652 along the gear surface hole 653*a* after the toner container driving shaft 650 has started to rotate causes a time lag between a start of rotation of the toner container 32 and a start of rotation of the conveying screw 614.

At this time, the delay generating spring 651 is extended by a length corresponding to the semiperimeter along the outer surface of the spring guiding circular plate 655.

On the other hand, when the driving motor stops the rotation of the toner container driving shaft 650, the rotation of the driving pin 652 is stopped. At this time, a force of the delay generating spring 651, one end of which is fixed to the driving pin 652 and which has been extended from a natural length, acts so as to retract to the natural length, so that the idler gear 653 rotates such that the spring fixing pin 651*a* approaches the driving pin 652. Accordingly, the idler gear 653 rotates by the amount corresponding to the gear surface hole 653*a* (the length approximately corresponding to the semiperimeter). Therefore, after the rotation of the toner container 32 is stopped, the conveying screw 614 can be rotated by the amount corresponding to the rotation of the idler gear 653 caused by the delay generating spring 651.

In this case, it is possible to set a desired driving time lag by appropriately setting various parameters. Examples of the parameters include the number of gear teeth of the idler gear 653 or the conveying screw gear 605, the movable range of the driving pin 652 (the range of opening of the gear surface hole 653*a* of the idler gear), a pitch of the conveying screw 614, and the width of the nozzle opening 610.

Furthermore, after the rotation of the toner container 32 is stopped, it is desirable to stop the conveying screw 614 after the conveying screw 614 is rotated by at least the amount of conveyance corresponding to the longitudinal width of the nozzle opening 610 of the conveying nozzle 611. Consequently, it becomes possible to convey the toner T remaining near the nozzle opening 610 of the conveying nozzle 611 to the toner dropping passage 64 side relative to the position facing the nozzle opening 610. With this conveyance, it is possible to more reliably prevent scattering and falling of toner due to attachment/detachment of the toner container 32 to/from the main body.

Moreover, after the rotation of the toner container 32 is started, it is desirable to start rotation of the conveying screw 614 after the toner container 32 is rotated by at least the amount of conveyance by which the nozzle opening 610 of the conveying nozzle 611 is filled with the toner T. Consequently, the stability of the replenishing amount of toner can further be improved.

Explanation will be given of the engaged portion between the toner container 32 common to the first to the twentieth embodiments and the container setting section 615 and related configurations.

As described above, the position at which the cylindrical container opening 33*a* and the container setting section 615 slidably contact each other and the position at which the position of the toner container 32 relative to the toner replenishing device 60 is determined are indicated by a in FIG. 9. The position a in FIG. 9 does not necessarily function both as a sliding section and a positioning section, but may function as only one of the sliding section and the positioning section.

The toner container 32 according to the present embodiment includes the nozzle receiver 330, which is arranged on the opening of the container body 33 and which includes the receiving opening 331 and the space 335*b* between the side supporting portions. The receiving opening 331 is a portion into which the conveying nozzle 611 having the nozzle opening 610 as a powder receiving opening is inserted. The space 335*b* between the side supporting portions are replenishing opening for supplying toner, as powder, from the container body 33 to the nozzle opening 610. The toner container 32 also includes the container shutter 332 that is supported by the nozzle receiver 330 and that functions as an open/close member for opening and closing the receiving opening 331 by sliding in the rotation axis direction along with insertion and removal of the conveying nozzle 611 to and from the nozzle receiver 330. With this configuration, the toner container 32 can maintain the closed state of the receiving opening 331 until the conveying nozzle 611 is inserted, and can prevent leakage or scattering of toner before the toner container 32 is attached to the toner replenishing device 60.

When the conveying nozzle 611 is inserted in the receiving opening 331 and the container shutter 332 being pushed by the conveying nozzle 611 slides to the container rear side, toner accumulated near the space 335*b* between the side supporting portions is pushed away. Therefore, a space for inserting the conveying nozzle 611 can be ensured near the space 335*b* between the side supporting portions in the area where the receiving opening 331 is formed. Consequently, it is possible to reliably supply toner from the space 335*b* between the side supporting portions to the receiving opening 331.

In this way, the toner container 32 can prevent toner contained in the container body 33 from being leaked or scattered before the toner container 32 is attached to the toner replenishing device 60, and can reliably discharge toner to the outside of the container body 33 when the toner container 32 is attached to the toner replenishing device 60.

In the toner container 32, as illustrated in FIG. 1 and FIG. 7, the receiving opening 331 is formed on the container rear end side relative to the container front end of the front end opening 305, that is, at a position on the rear side of the opening formed by the tube-shaped front end opening 305.

Figure 64A:
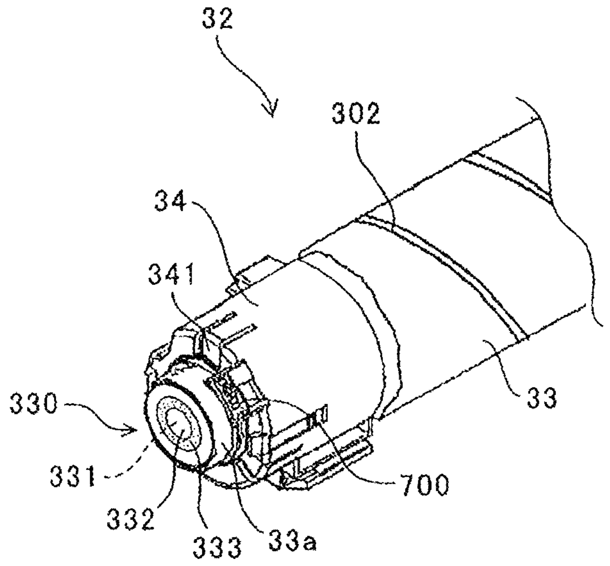
FIG. 64A is an explanatory perspective view of the vicinity of the front end of the toner container when the position of the receiving opening in the rotation axis direction is the same as the position of the front end opening on the front end of the container.
Figure 64B:
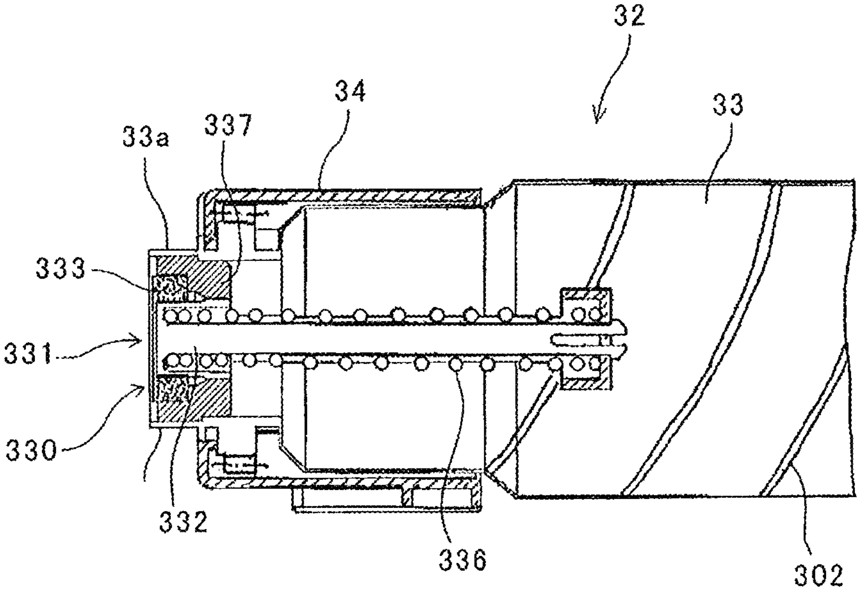
FIG. 64B is an explanatory cross-sectional view of the vicinity of the front end of the toner container.

FIGS. 64A and 64B are explanatory diagrams of the toner container 32 according to a comparative example, in which the opening position of the receiving opening 331 in the rotation axis direction is the same as the container front end of the front end opening 305. FIG. 64A is an explanatory perspective view of the vicinity of the front end of the toner container 32. FIG. 64B is an explanatory cross-sectional view of the front end of the toner container 32.

Similarly to the toner container 32 according to the embodiments described above with reference to FIG. 1 to FIG. 21, the toner container 32 illustrated in FIGS. 64A and 64B can maintain the closed state of the receiving opening 331 until the conveying nozzle 611 is inserted and can prevent leakage or scattering of toner before the toner container 32 is attached to the toner replenishing device 60. When the conveying nozzle 611 is inserted in the receiving opening 331 and the container shutter 332 being pushed by the conveying nozzle 611 slides to the container rear side, toner accumulated near the space 335*b* between the side supporting portions is pushed away. Therefore, it is possible to reliably discharge toner to the outside of the container body 33 when the toner container 32 is attached to the toner replenishing device 60.

The toner container 32 illustrated in FIGS. 64A and 64B is configured such that toner in the container body 33 is supplied to the nozzle opening 610 that is arranged in the portion of the conveying nozzle 611 inserted in the container body 33. In this configuration, a contact section, which is between the container seal 333 as a seal member of the container body 33 and the conveying nozzle 611 and in which toner leakage is likely to occur, is separated from the nozzle opening 610 through which the toner is supplied from the container body 33 to the conveying nozzle 611. Therefore, if the toner replenishing operation is performed while the toner container is completely attached to the toner replenishing device 60, even the toner container 32 of the comparative example illustrated in FIGS. 64A and 64B can prevent toner leakage at the contact section between the container seal 333 and the conveying nozzle 611 separated from the nozzle opening 610.

However, when the conveying nozzle 611 is inserted in the container body 33, the outer surface of the conveying nozzle 611 is in contact with toner in the container body 33. A part of the contacted toner remains attached to the conveying nozzle 611 when the conveying nozzle 611 is removed from the toner container 32 (when removed from the toner replenishing device 60). Most of the toner attached to the conveying nozzle 611 is scraped off by the container seal 333 when the conveying nozzle 611 passes through the contact section with the container seal 333. However, a small amount of toner may pass through the container seal 333 together with the conveying nozzle 611 resulting in toner leakage. The leaked toner may come around to the outer surface of the cylindrical container opening 33*a* of the toner container 32 or may adhere to the inner surface 615*a* of the container setting section 615, so that a setting failure may occur when the toner container 32 is re-attached for replacement etc. or an aggregation of the attached toner may be developed resulting in an image defect.

By contrast, in the toner container 32 according to the first to the twentieth embodiments, as illustrated in FIG. 1 for example, the front edge of the container body 33 protrudes in the rotation axis direction relative to the vertical surface of the nozzle receiver 330 where the receiving opening 331 is open. Specifically, in the toner container 32, the opening position of the receiving opening 331 is located on the rear end side relative to the container front end of the front end opening 305 that is the opening position of the container body 33.

In this way, because the opening position of the receiving opening 331 is located on the rear side relative to the opening position of the container body 33, it is possible to prevent toner from adhering to the outer surface of the cylindrical container opening 33*a*. This is because, even if toner is leaked when the conveying nozzle 611 is removed from the toner container 32, toner leaked and scattered from the receiving opening 331 is not likely to come around to the container front end of the cylindrical container opening 33*a*. Furthermore, toner leaked and dropped from the receiving opening 331 is hung on the lower inner surface of the front end opening 305. Therefore, it is possible to prevent toner from adhering to the inner surface 615*a* of the container setting section 615. In this way, it is possible to retain the toner leaked from the receiving opening 331 within an area enclosed by the inner surface of the cylindrical container opening 33*a*. As a result, it is possible to prevent toner from being scattered to the outside of the toner container.

As illustrated in FIG. 1 and FIG. 9, according to the first to the twentieth embodiments, the container setting section 615, which functions both as a positioning section and a rotary shaft receiving section of the toner container 32, is separated with a space from the nozzle opening 610 at which toner leakage may occur, compared with a case that the toner container 32 according to the comparative example illustrated in FIGS. 64A and 64B is attached. Furthermore, the container front end of the cylindrical container opening 33*a*, which functions both as a positioning section and a rotation axis of the toner container 32 on the toner container 32 side, protrudes from the nozzle opening 610 at which toner leakage may occur. In the space between the container setting section 615 and the receiving opening 331, the nozzle shutter flange 612*a* and the nozzle shutter spring 613 are arranged. Therefore, even during the attachment/detachment operation, it is possible to prevent toner from coming around and adhering to the inner end surface 615*b* of the container setting section 615 or to the container front end of the cylindrical container opening 33*a*.

The container shutter 332 that seals the receiving opening 331 being a toner discharge opening of the toner container 32 is arranged on the rear side relative to the container front end of the front end opening 305 of the container body 33. With this arrangement, it is possible to ensure a certain distance from the container shutter 332 to the container front end of the front end opening 305. Consequently, it is possible to prevent toner from arriving at the outer surface of the front end opening 305 via the opening position of the container body 33 from the receiving opening 331 that is located on the rear side relative to the opening position of the container body 33. As a result, it is possible to prevent toner scattering.

As described above, the position of the toner container 32 relative to the toner replenishing device 60 in the direction perpendicular to the rotation axis is determined based on the fitting between the outer surface of the front end opening 305 and the cylindrical inner surface 615*a* of the container setting section 615. Specifically, the outer surface of the cylindrical container opening 33*a* of the container body 33 being a powder storage serves as a positioning section with respect to the toner replenishing device 60 being a powder conveying device. Therefore, if the outer surface of the cylindrical container opening 33*a* becomes dirty with toner, the fitted state to the inner surface of the container setting section 615 may be changed and the positioning accuracy may be reduced. By contrast, the toner container 32 according to the present embodiment can prevent toner from arriving at the outer surface of the cylindrical container opening 33*a*, the positioning accuracy of the toner container 32 relative to the toner replenishing device 60 can be stabilized.

Furthermore, at the contact section between the outer surface of the cylindrical container opening 33*a* and the inner surface of the container setting section 615, they also slide against each other when the toner container 32 rotates. Specifically, the outer surface of the cylindrical container opening 33*a* of the container body 33 being the powder storage serves as a sliding section with respect to the toner replenishing device 60 being the powder conveying device. If toner enters the sliding section, a sliding load increases and the rotational torque of the toner container 32 may be increased. By contrast, the toner container 32 according to the present embodiment can prevent toner from arriving at the outer surface of the cylindrical container opening 33*a* and prevent toner from entering the contact section of the inner surface of the container setting section 615. Therefore, it is possible to prevent an increase in the sliding load and stabilize the sliding performance, enabling to prevent an increase in the rotational torque of the toner container 32. Furthermore, it is possible to prevent toner from entering the sliding section, so that it is possible to prevent the toner from being aggregated by being pressed in the sliding section.

Furthermore, as described above, when the toner container 32 is attached to the toner replenishing device 60, the container seal 333 is pressed down by the nozzle shutter flange 612*a*. Therefore, the nozzle shutter flange 612*a* is firmly pressed against the container seal 333, so that toner leakage can be prevented more reliably. By arranging the container shutter 332 on the inner side (the container rear end side) relative to the opening position in the longitudinal direction, a cylindrical space is formed between the front end of the toner container 32 and the front end surface of the container seal 333.

The toner container common to the first to the twentieth embodiments illustrated in FIG. 1 will be explained below with reference to schematic diagrams in FIGS. 31A and 31B.

FIGS. 31A and 31B are explanatory diagrams for comparing a case that the position of a front surface 330*f* of the container front end of the nozzle receiver 330 is the same as the position of an edge (brim) 305*f* of the container front end of the cylindrical container opening 33*a* in the rotation axis direction and a case that the front surface 330*f* is located on the container rear end side relative to the edge 305*f*. At the front surface 330*f* of the container front end of the nozzle receiver 330, the receiving opening 331 is open. FIG. 31A is an explanatory diagram of the case that the position of the front surface 330*f* of the nozzle receiver 330 is the same as the position of the edge 305*f* of the cylindrical container opening 33*a* in the rotation axis direction. FIG. 31B is an explanatory diagram illustrating the case that the position of the front surface 330*f* of the nozzle receiver 330 is located on the container rear end side relative to the position of the edge 305*f* of the cylindrical container opening 33*a* in the rotation axis direction.

In the toner replenishing device 60 illustrated in FIGS. 31A and 31B, before the conveying nozzle 611 is inserted into the nozzle receiving opening 331 of the nozzle receiver 330, the nozzle shutter 612 is biased by the nozzle shutter spring 613 in the nozzle insertion direction (to the right in FIG. 31B). Therefore, the nozzle shutter 612 is located near the front end of the conveying nozzle 611 and closes the nozzle opening 610. At this time, one end of the nozzle shutter spring 613 butts against the back side of the nozzle shutter flange 612*a* as a positioning portion of the nozzle shutter 612, and the other end of the nozzle shutter spring 613 butts against the end surface 615*b* of the toner replenishing device 60.

The toner container 32 being a powder container is slid in the arrow Q direction (the attachment direction) in FIGS. 31A and 31B so as to be attached to the toner replenishing device 60 illustrated in FIGS. 31A and 31B. Along with the attachment, the nozzle shutter 612 biased by the nozzle shutter spring 613 toward a direction opposite the Q direction butts against the front surface 330*f* of the front end of the nozzle receiver 330 where the receiving opening 331 of the nozzle receiver 330 is open. Thereafter, when the toner container 32 further slides in the Q direction, the nozzle shutter 612 moves in the Q direction relative to the conveying nozzle 611 being inserted in the toner container 32. Therefore, the nozzle shutter 612 moves to the base end of the conveying nozzle 611 and the conveying nozzle 611 is opened. Then, as illustrated in FIGS. 31A and 31B, the nozzle opening 610 is completely opened after the toner container 32 is attached to the toner replenishing device 60.

With the movement of the nozzle shutter 612 toward the base end of the conveying nozzle 611, the nozzle shutter spring 613 is compressed. As illustrated in FIGS. 31A and 31B, the length of the nozzle shutter spring 613 in the rotation axis direction becomes the shortest when the toner container 32 is attached to the toner replenishing device 60. Even in this state, however, the nozzle shutter spring 613 has a certain length in the rotation axis direction. Therefore, a housing space (with the length W in the rotation axis direction) is needed between the front surface 330*f* of the nozzle receiver 330 and the end surface 615*b* of the toner replenishing device 60. The housing space is a space for housing the part of the container front end side of the nozzle shutter 612 relative to the nozzle shutter flange 612*a* and for housing the nozzle shutter spring 613.

Furthermore, the nozzle opening 610 needs to arrive at a position at which toner can be received. The optimal position of the nozzle opening 610 is determined based on the shape of the container body 33. Therefore, if the shape of the container body 33 is identical in the case of FIGS. 31A and 31B, a distance from the edge 305*f* of the cylindrical container opening 33*a* of the container body 33 to the optimal position of the nozzle opening 610 in the rotation axis direction is constant.

In the above configuration, if the toner container 32 is configured as illustrated in FIG. 31A, the following problem may occur. In the configuration illustrated in FIG. 31A, the position of the edge 305*f* of the container front end of the cylindrical container opening 33*a* in the rotation axis direction and the position of the front surface 330*f* of the nozzle receiver 330 where the receiving opening 331 is open in the rotation axis direction are the same.

Therefore, a distance (L1) from the end surface 615*b* of the toner replenishing device 60 to the fitted portion 615*s* becomes longer than the length (W) of the housing space in the rotation axis direction. Therefore, the size of the toner replenishing device 60 increases.

If the shape of the container body 33 is identical, a distance from the edge 305*f* of the cylindrical container opening 33*a* to the optimal position of the nozzle opening 610 in the rotation axis direction is constant. Furthermore, the position of the edge 305*f* of the cylindrical container opening 33*a* as a starting point for determining the position of the nozzle opening 610 in the rotation axis direction is separated from the end surface 615*b* of the toner replenishing device 60 by the length (W) of the housing space or longer in the rotation axis direction. Therefore, a distance (L2) from the end surface 615*b* of the toner replenishing device 60 to the front end of the conveying nozzle 611 increases, so that the size of the toner replenishing device 60 is increased.

Furthermore, the position of the edge 305*f* of the cylindrical container opening 33*a*, which is the front end of the toner container 32, is separated from the end surface 615*b* of the toner replenishing device 60 by the length W of the housing space in the rotation axis direction. Therefore, a distance (L3) from the end surface 615*b* of the toner replenishing device 60 to one end of the toner container 32 increases, so that the size of the toner replenishing device 60 that holds the toner container 32 is increased.

In the configuration illustrated in FIG. 31B, the front surface (330*f* in FIGS. 31A and 31B) of the nozzle receiver 330 where the receiving opening 331 is open is located on the container rear end side relative to the container front end of the cylindrical container opening 33*a*. The front surface of the nozzle receiver 330 where the receiving opening 331 open is denoted by 330*f* in FIGS. 31A and 31B, and correspond to the front surface of the container seal 333 or the front end of the nozzle shutter positioning ribs 337*a*. Therefore, when the toner container 32 is attached to the toner replenishing device 60, the nozzle shutter flange 612*a* of the nozzle shutter 612 butts against the front surface 330*f* on the container rear end side relative to the container front end of the cylindrical container opening 33*a* in the rotation axis direction. Consequently, at least a part of the housing space is located in the circular space formed between the opening position of the front end opening 305 (the container front end) and the front surface of the container seal 333. Therefore, the distances L1, L2, and L3 in FIGS. 31A and 31B can be made shorter than those illustrated in FIG. 31A (by La in FIG. 31A).

If the size of the toner replenishing device 60 need not be reduced, the container body 33 can be made longer by La in the rotation axis direction. Therefore, the amount of toner contained in the toner container 32 can be increased.

The nozzle shutter 612 closes the nozzle opening 610 of the conveying nozzle 611 when the toner container 32 is not attached to the toner replenishing device 60. When the toner container 32 is attached to the toner replenishing device 60, the nozzle shutter 612 needs to be opened so as to receive toner.

In the toner replenishing device 60, the cylindrical space (the front end opening 305) is formed between the container front end of the cylindrical container opening 33*a* and the end surfaces of the container shutter 332 and the container seal 333 on the container front side. The housing space is configured so that the whole or a part of the nozzle shutter 612 can be housed when the nozzle shutter 612 is opened. In the housing space, the whole or a part of the nozzle shutter spring 613 for closing the nozzle shutter 612 is also housed. With this configuration, it is possible to reduce the size of a space for arranging the nozzle shutter 612 and the nozzle shutter spring 613.

As illustrated in FIG. 9, according to the present embodiment, when the toner container 32 is attached to the toner replenishing device 60, the housing position of the nozzle shutter 612 on the front end of the nozzle relative to the nozzle shutter flange 612*a* is located inside the container seal 333. The base end of the nozzle relative to the nozzle shutter flange 612*a* is substantially housed in the cylindrical space formed between the opening position of the front end opening 305 (the container front end) and the front surface

330*f* of the container seal 333. Furthermore, the nozzle shutter spring 613 in the compressed state is substantially housed in the cylindrical space.

With this configuration, it is possible to reduce a distance from the opening position of the front end opening 305 being the endmost portion of the toner container 32 to a toner dropped area of the toner replenishing device 60 (the position where the toner dropping passage 64 is connected to the conveying nozzle 611). Therefore, the size of the main body can be reduced.

As explained above with reference to FIG. 22 to FIG. 28, the first inner rib 612*b* butts against a front rim of the nozzle opening 610, that is, the upper inner surface of the front end 611*a* of the conveying nozzle 611 while the nozzle shutter 612 is closed. Therefore, a function to prevent the nozzle shutter 612 from coming off can be realized. Furthermore, the front end 612*g* of the first inner rib 612*b*, which is the end of the first inner rib 612*b* in the circumferential direction, butts against the nozzle opening rim 611*s* that is a rim of the nozzle opening 610 in the lateral direction. Therefore, a function to prevent rotation of the nozzle shutter 612 can be realized. The function to prevent the rotation of the nozzle shutter 612 can be available in the same manner even when the toner container 32 is attached to the toner replenishing device 60.

Moreover, as described above, the inner diameters of the second inner rib 612*c* and the third inner rib 612*d* are slightly smaller than the outer diameter of the conveying nozzle 611. For example, when the outer diameter φ of the conveying nozzle 611 is 15 mm, it is preferable to set the inner diameters φ of the second inner rib 612*c* and the third inner rib 612*d* to about 14.8 mm to 14.9 mm. In this way, the second inner rib 612*c* and the third inner rib 612*d* in the form of cylinders with the inner diameters slightly smaller than the outer diameter of the conveying nozzle 611 are formed on the inner surface of the nozzle shutter 612. Therefore, it is possible to fill the gap between the inner surface of the nozzle shutter 612 and the outer surface of the conveying nozzle 611. Consequently, it becomes possible to realize the toner sealing function without a seal, so that the seal, such as sponge or rubber, is not needed. Because a seal separated from the nozzle shutter 612 is not needed, it is possible to prevent toner leakage at lower costs.

Figure 65A:
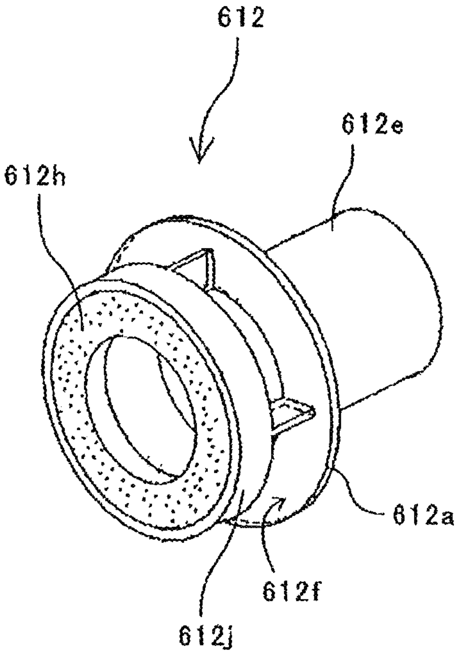
FIG. 65A is an explanatory perspective view of the nozzle shutter provided with a cylindrical seal.
Figure 65B:
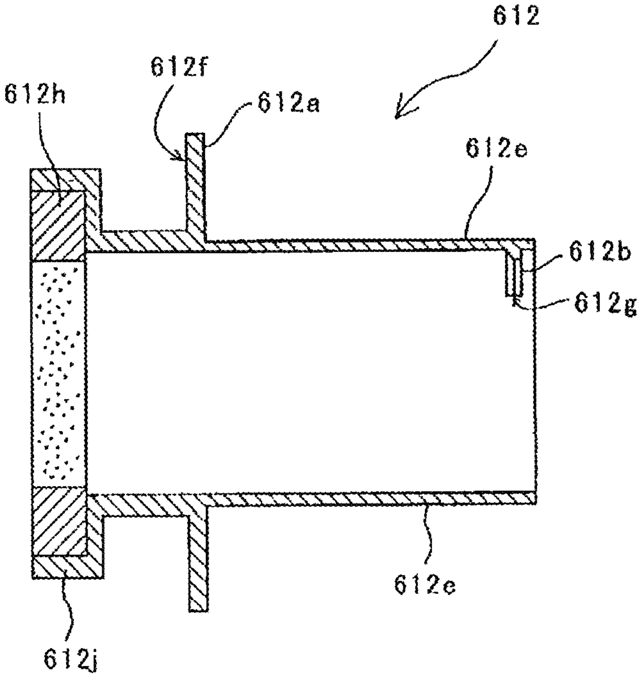
FIG. 65B is an explanatory cross-sectional view of the nozzle shutter provided with the cylindrical seal.

As a configuration for preventing toner leakage, it may be possible to provide an annular seal instead of the second inner rib 612*c* and the third inner rib 612*d*. However, because the gap between the inner surface of the nozzle shutter 612 and the outer surface of the conveying nozzle 611 is extremely small, the annular seal is not insertable. Therefore, if the annular seal is arranged, an annular nozzle shutter seal 612*h* needs to be arranged in the manner illustrated in FIGS. 65A and 65B. In this case, the outer diameter of a nozzle shutter seal receiver 612*j* is made smaller than the diameter of the nozzle shutter spring 613 so that the nozzle shutter spring 613 can butt against the nozzle shutter spring receiving surface 612*f*.

To mount the nozzle shutter 612 on the conveying nozzle 611, the nozzle shutter 612 is temporarily deformed. Therefore, the nozzle shutter 612 needs to be elastically deformable to a certain extent. This is because, if a hard and elastically less deformable material is used, the nozzle shutter 612 may be broken without being elastically deformed when it is mounted. The nozzle shutter 612 is made of a material with appropriate elasticity. For example, when the outer shape of the conveying nozzle 611 is a cylinder, the nozzle shutter 612 is formed in the cylindrical shape with the inner diameter slightly greater than the outer diameter of the conveying nozzle 611. Furthermore, the first inner rib 612*b* as a protrusion protruding inward is formed on the inner portion of the nozzle shutter 612. The first inner rib 612*b* is arranged so as to face the nozzle opening 610 of the conveying nozzle 611, so that it is possible to realize the function to prevent the nozzle shutter 612 from coming off and rotating. A portion of the conveying nozzle 611 to be engaged with the protrusion of the nozzle shutter 612 is not limited to the nozzle opening 610. As long as the protrusion can function to prevent coming off and rotation, any portion of the conveying nozzle 611 may be used.

According to experiments performed by the inventors of the present disclosure, it is preferable to select a resin material with a tensile elastic modulus of 500 MPa to 2000 MPa as the material of the nozzle shutter 612. When the nozzle shutter 612 is mounted on the conveying nozzle 611, the three ribs (612*b* to 612*d*) formed on the inner surface of the nozzle shutter 612 act as resistance while the conveying nozzle 611 is inserted into the nozzle shutter 612. The resistance increases when the first inner rib 612*b* enters the nozzle opening 610 over the front end 611*a* of the nozzle.

At this time, if the nozzle shutter 612 is made of a material with certain elasticity, the nozzle shutter 612 is deformed and can be mounted easily. Furthermore, a sliding load caused by tightening the second inner rib 612*c* and the third inner rib 612*d* by the conveying nozzle 611 is not increased, which is an advantage.

Incidentally, if the nozzle shutter 612 is extremely deformable, the function to prevent coming off and rotation of the first inner rib 612*b* is reduced.

As a material with certain elasticity applicable to the nozzle shutter 612, when polyethylene or polypropylene was selected, the above-described advantage was obtained stably. Furthermore, it is preferable to set the thickness of the nozzle shutter tube 612*e* of the nozzle shutter 612 to 0.3 mm to 0.5 mm.

If the nozzle shutter 612 has the material property and the shape as described above, it is possible to reduce costs of a shutter structure that opens and closes the nozzle opening 610. In relation to the toner container 32 in the state of being stored, a cap 370 common to the first to the fourth embodiments will be explained below.

Figure 32:
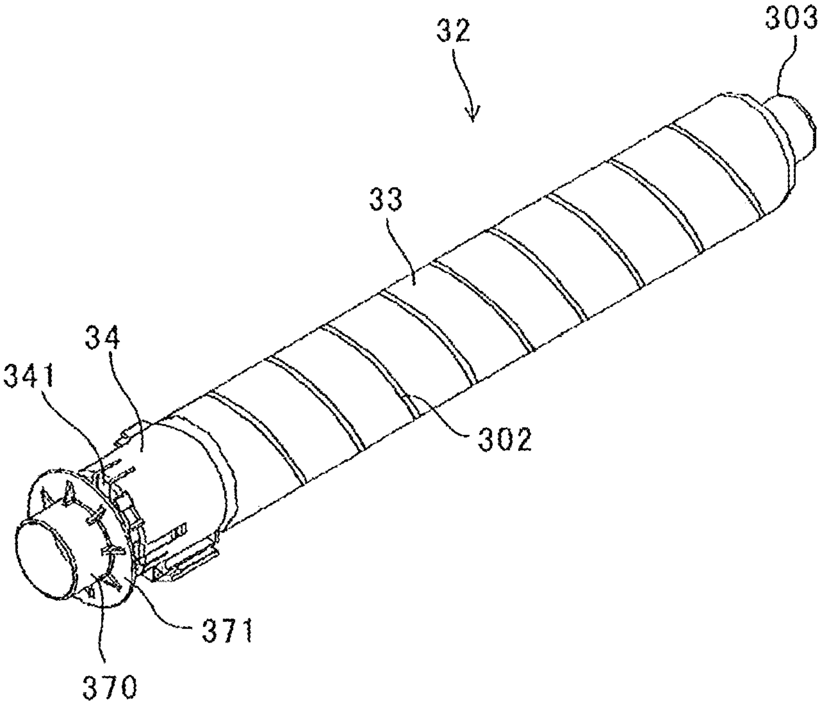
FIG. 32 is an explanatory perspective view of the toner container in the state of being stored.
Figure 33:
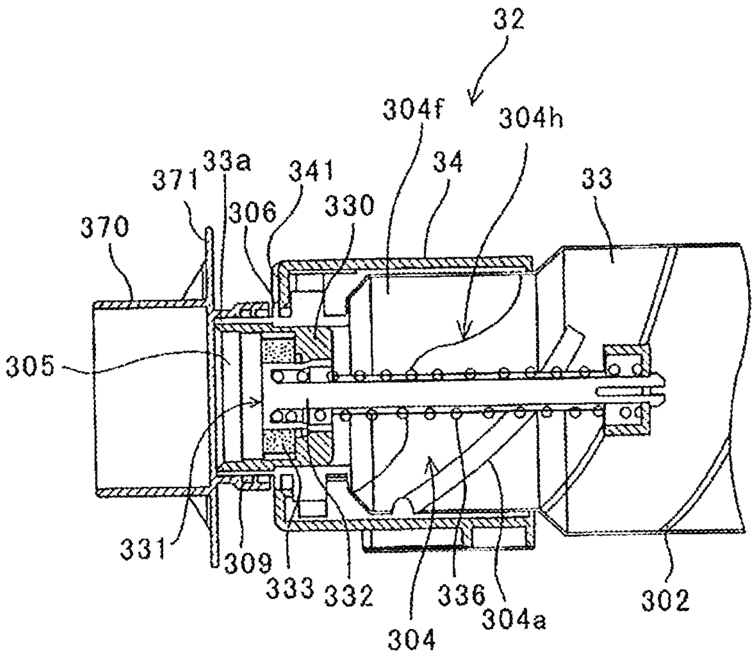
FIG. 33 is an explanatory cross-sectional view of the vicinity of a front end of the toner container to which a cap is attached.

FIG. 32 is an explanatory perspective view of the toner container 32 in the state of being stored, and the cap 370 is attached to the toner container 32. The cap 370 is serving as a seal member that seals the opening of the front end opening 305 of the toner container 32 illustrated FIG. 6. FIG. 33 is an explanatory cross-sectional view of the vicinity of the front end of the toner container 32 to which the cap 370 is attached.

The toner container 32 illustrated in FIG. 32 includes an embodiment as described below. Specifically, the toner container 32 is a powder container, which contains toner as a powder developer. The cap 370 serving as a seal member that seals the receiving opening 331 serving as a developer discharge opening is attachable to the cylindrical container opening 33*a* of the toner container 32. As described above, the cylindrical container opening 33*a* is a part of the container body 33. As illustrated in FIG. 1, FIG. 6, and FIG. 7 for example, in the container body 33, the cylindrical container opening 33*a* is formed so as to penetrate through the container front end cover 34 that is needed to set the toner container 32 to the toner replenishing device 60. Therefore, it is possible to expose the cylindrical container opening 33*a* of the container body 33 from the container front end cover 34. Because the cylindrical container opening 33*a* being a part of the container body 33 containing toner can be sealed directly by the cap 370, the sealing effect can be improved and toner leakage can be prevented more reliably.

In the toner container 32 common to the first to the twentieth embodiments, a cap flange 371 is provided on the cap 370. When the cap 370 is attached to the toner container 32, the cap flange 371 hides the ID tag 700 arranged on the container front end cover 34 as illustrated in FIG. 32. Therefore, it is possible to prevent the ID tag 700 from being contacted or subjected to impact from the outside when the toner container 32 is stored, enabling to protect the ID tag 700.

Furthermore, in the toner container 32 according to the first to the fourth embodiments, the outer diameter of the cap flange 371 of the cap 370 is made greater than the diameters of the container front end cover 34 and the container body 33. Therefore, it is possible to prevent the toner container 32 from being broken when it is dropped, enabling to protect the toner container 32.

Moreover, the cylindrical container opening 33*a* being a part of the container body 33 is directly sealed by the cap 370. Therefore, the sealing effect can be improved compared with the configuration that the container opening 33*a* is sealed via a member (for example, the container front end cover 34) separated from the container body 33. For the cylindrical container opening 33*a* is directly sealed, it is possible to tightly seal the container body 33. For the container body 33 can be sealed tightly, it is possible to prevent air or moisture from entering the container body 33. Consequently, it becomes possible to reduce packaging materials for packaging the toner container 32.

When the toner container 32 is used (when it is attached to the toner replenishing device 60), the cap 370 is detached. As a method for attaching the cap 370 to the toner container 32, any method, such as a screwing method or an engaging method, may be used as long as the cap 370 can be fixed. In this case, a fixing portion of the toner container 32, such as a male screw for the screwing method or an engaged portion in the engaging method, is formed on the outer surface of the cylindrical container opening 33*a* exposed from the container front end cover 34. In the toner container 32 according to the embodiments, as illustrated in FIG. 33, a male screw 309 for screwing the cap is arranged on the outer surface of the cylindrical container opening 33*a* and the screwing method is employed as the method for fixing the seal member.

The configuration for sealing the opening formed by the cylindrical container opening 33*a* is not limited to the configuration in which the cap 370 is fixed by the screwing method. It may be possible to seal the opening by press fitting a film member on the front end of the cylindrical container opening 33*a*.

Fifth Embodiment

A fifth embodiment will be explained below, in which the cap 370 provided with an absorbent (an adsorption material).

The toner container 32 that uses an absorbent, such as a desiccant, when the toner container is stored will be explained below. The absorbent functions to adsorb not only moisture but also various substances (gas or the like). Therefore, the absorbent includes a desiccant. Examples of the absorbent include silica gel, aluminum oxide, and zeolite. However, any substance having adsorption capability may be used.

When the container body 33 is completely sealed by the cap 370, entry of air or moisture can be prevented. Therefore, the absorbent becomes not needed, and the packaging materials also become not needed. In this method, it is possible to reduce the packaging materials, such as a bag, a cushioning material, or an individual box, for packaging the toner container 32 and to reduce the size of a package. As a result, it is possible to reduce materials to be used, enabling to reduce an environmental load.

However, the inventors of the present disclosure confirmed that the toner being powder had generated gas by itself and a cohesion as a small clot of toner had been generated although toner cohesion or solidification had not occur. Such a cohesion may become a cause of a dot, such as a white dot or a dot of arbitrary color, resulting in an abnormal image. Therefore, the cohesion needs to be prevented. If toner that does not generate gas by itself is used, it is possible to omit the absorbent for the sealing as illustrated in FIG. 33. However, because the toner container 32 contains the toner that generates gas by itself, it is preferable to provide an absorbent that adsorbs the gas.

Figure 34:
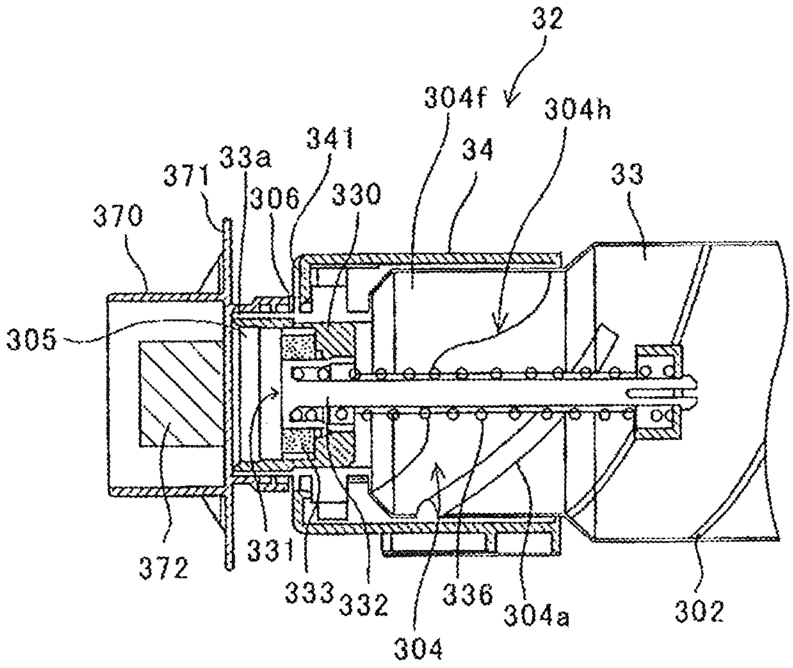
FIG. 34 is an explanatory cross-sectional view of a first example of the toner container when the cap is provided with an adsorption material.

FIG. 34 is an explanatory cross-sectional view of a first example of the toner container 32 when the cap 370 is provided with an absorbent 372. The toner container 32 illustrated in FIG. 34 includes an embodiment as described below. Specifically, the toner container 32 illustrated in FIG. 34 is configured such that the absorbent 372 is provided on the cap 370 in the toner container 32 illustrated in FIG. 33. In the toner container 32 illustrated in FIG. 34, the absorbent 372 can be detached together with the cap 370 when the cap 370 is detached to use the toner container. Therefore, the operability can be improved.

However, in the configuration illustrated in FIG. 34, the absorbent 372 is exposed to external air around the toner container 32. Therefore, a packaging material is needed.

Sixth Embodiment

A second example of the cap 370 provided with the absorbent will be explained below as a sixth embodiment.

Figure 35:
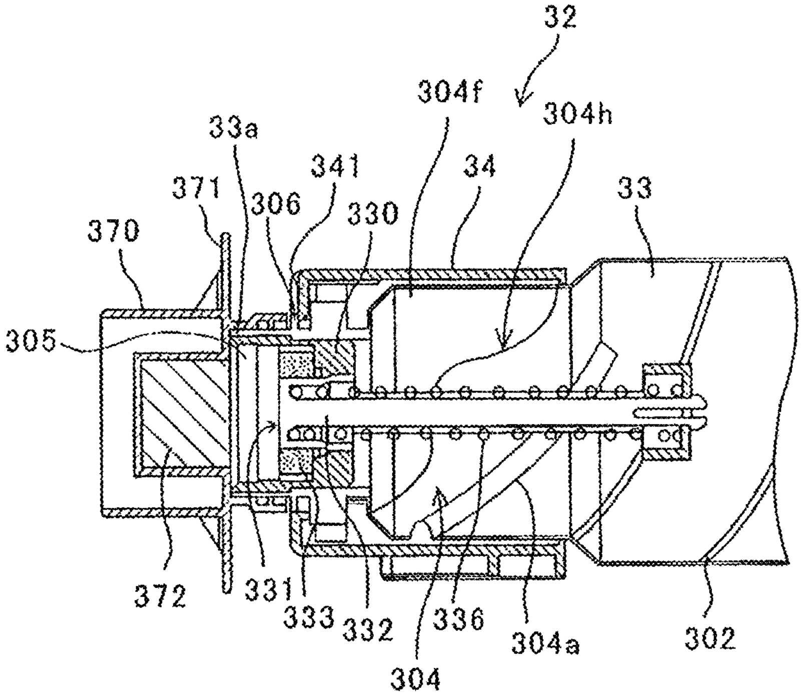
FIG. 35 is an explanatory cross-sectional view of a second example of the toner container when the cap is provided with the adsorption material.

FIG. 35 is an explanatory cross-sectional view of the second example of the toner container 32 when the cap 370 is provided with the absorbent 372. The toner container 32 illustrated in FIG. 35 includes an embodiment as described below. Specifically, the toner container 32 illustrated in FIG. 35 contains toner as a powder developer inside thereof. The toner container 32 is a powder container in which the cap 370, as a seal member for sealing the receiving opening 331 as a developer discharge opening, can be attached to the cylindrical container opening 33*a* forming the front end opening in order to seal the inside of the container body 33. In the toner container 32 illustrated in FIG. 35, the absorbent 372 is provided inside the cap 370 that tightly seals the front end opening.

In the toner container 32 illustrated in FIG. 35, the absorbent 372 is provided on the cap 370. Therefore, similarly to the toner container 32 illustrated in FIG. 34, it is possible to detach the absorbent 372 together with the cap 370 when the cap 370 is detached to use the toner container, so that the operability can be improved.

Furthermore, because a space for containing toner (the internal space of the container body 33) is tightly sealed by the cap 370, it is possible to prevent air or moisture from entering the space where toner is stored. Moreover, because the absorbent 372 is provided inside the tightly-sealed space, it is possible to adsorb gas generated by the toner by itself. Therefore, the adsorption performance can be improved compared with the toner container 32 illustrated in FIG. 34. Furthermore, because the space for containing toner (the internal space of the container body 33) is tightly sealed and the absorbent 372 is provided inside the tightly-sealed space, both of the toner and the absorbent 372 are not influenced by external air around the toner container 32. Therefore, a packaging material is not needed.

Seventh Embodiment

A third example of the cap 370 provided with an absorbent will be explained below as a seventh embodiment.

Figure 36:
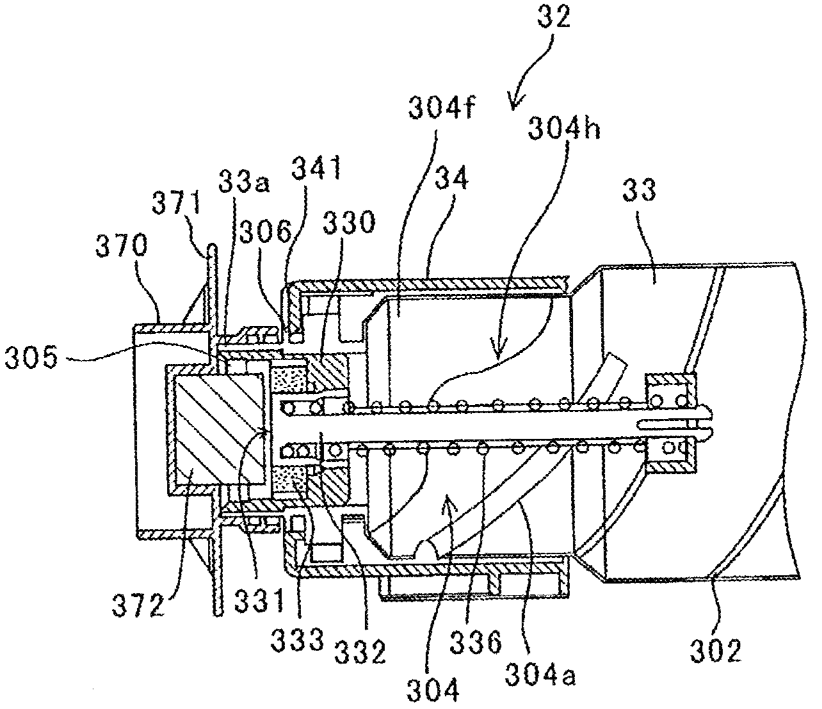
FIG. 36 is an explanatory cross-sectional view of a third example of the toner container when the cap is provided with the adsorption material.

FIG. 36 is an explanatory cross-sectional view of the third example of the toner container 32 when the cap 370 is provided with the absorbent 372. The toner container 32 illustrated in FIG. 36 includes an embodiment as described below. Specifically, the toner container 32 illustrated in FIG. 36 contains toner as a powder developer inside thereof. The toner container 32 is a powder container in which the cap 370, as a seal member for sealing the receiving opening 331 as a developer discharge opening, can be attached to the cylindrical container opening 33*a* forming the front end opening in order to seal the inside of the container body 33. In the toner container 32 illustrated in FIG. 36, the absorbent 372 is provided inside the cap 370 that tightly seals the front end opening. Furthermore, the toner container 32 illustrated in FIG. 36 is arranged so that at least a part of the absorbent 372 is housed in a recess (the front end opening 305) on the front end of the toner container 32. The recess on the front end of the toner container 32 is a cylindrical space formed between the front side end of the front end opening 305 and the front side end of the container seal 333.

In the toner container 32 illustrated in FIG. 36, the absorbent 372 is provided on the cap 370. Therefore, similarly to the toner container 32 illustrated in FIG. 34 and FIG. 35, it is possible to detach the absorbent 372 together with the cap 370 when the cap 370 is detached to use the toner container, so that the operability can be improved.

Furthermore, similarly to the toner container 32 illustrated in FIG. 35, because the space for containing toner (the internal space of the container body 33) is completely sealed by the cap 370, it is possible to prevent air or moisture from entering the space containing toner. Furthermore, because the absorbent 372 is provided inside the tightly-sealed space, it is possible to adsorb gas generated by the toner itself. Therefore, the adsorption performance can be improved compared with the toner container 32 illustrated in FIG. 34. Moreover, because the space for containing toner (the internal space of the container body 33) is tightly sealed and the absorbent 372 is provided in the tightly-sealed space, both of the toner and the absorbent 372 are not influenced by external air around the toner container 32. Therefore, a packaging material is not needed.

The toner container 32 illustrated in FIG. 36 is arranged such that at least a part of the absorbent 372 is housed in the recess on the front end of the toner container 32. Therefore, in addition to the same advantageous effects as the toner container 32 illustrated in FIG. 35, it is possible to reduce the length of the cap 370 in the rotation axis direction. As a result, it is possible to reduce the size of the toner container 32 in the state of being stored.

In the configuration in which the toner container 32 is sealed by the cap 370, it may be possible to improve the sealing performance between the cylindrical container opening 33*a* of the toner container 32 and the cap 370 by using a packing material or the like.

In the configuration in which the absorbent 372 is provided on the cap 370, the absorbent 372 may be integrated with the cap 370 (fixed to the cap 370) or may be separated from the cap 370 (not fixed to the cap 370). However, when the absorbent 372 is fixed and integrated with the cap 370, because it becomes possible to detach the absorbent 372 together with the cap 370, it is possible to prevent the absorbent 372 from remaining non-detached by error and improve the operability.

A problem with a conventional toner container that cannot directly seal the space for containing toner (the container body) by a seal member will be explained below.

In recent years, toner used in image forming apparatuses has more-improved low-temperature fixability and a smaller diameter, so that the heat resistance performance tends to become lower. Therefore, for example, if the toner is subjected to a high-temperature environment during transport, the toner is cohered, and in the worst case, solidified. Consequently, the toner cannot be supplied from the toner container to an image forming apparatus. It is known that the toner cohesion and solidification are much more likely to occur at higher humidity if the temperature environment is the same. A distribution route of a toner container to a user varies and it is impossible to manage the environment of all the routes. For example, when transport by land, by plane, and by sea are available, it is difficult to manage the temperature and humidity in all the routes.

As a measure to cope with the above situation, it may be possible to use a container that can control a transport environment. However, it is almost impossible to introduce the container in all the transport routes, and there is a problem with an increase in costs. With regard to the above matters, because the toner container 32 according to the embodiment can directly seal the cap 370 by the cylindrical container opening 33*a* being a part of the container body 33 containing toner, the sealing effect can be improved and toner leakage can be prevented more reliably. Furthermore, because the sealing effect is improved, the toner container 32 is less likely to be influenced by an external environment when the toner container 32 is stored.

Moreover, because attachment of the toner container 32 to the toner replenishing device 60 becomes possible by detaching the cap 370 from the toner container 32, it is possible to provide a powder container with good usability.

Furthermore, because the cap 370 has a shape that can protect the ID tag 700 and the toner container 32, it is possible to reduce cushioning materials or individual boxes for packaging the toner container 32 and reduce the size of a package. Therefore, it is possible to reduce materials to be used and an environmental load.

Eighth Embodiment

As an eighth embodiment, a first example of the toner container 32 that includes the cap 370 provided with a toner leakage preventer will be explained below.

After the toner container 32 being the powder container is distributed to a user, the toner container 32 is usually handled by the user. Therefore, the toner container 32 may be roughly handled because it is impossible to specifically regulate the way to handle the toner container. Therefore, an adequate measure against oscillation or falling is needed in order to prevent toner leakage even when the toner container 32 is roughly handled.

Regarding the toner leakage, leakage from the receiving opening 331 needs to be prevented. To prevent the leakage, it is necessary to prevent toner leakage that may occur when a gap is generated between the container seal 333 forming the receiving opening 331 and the container shutter 332 that closes the receiving opening 331.

Figure 37:
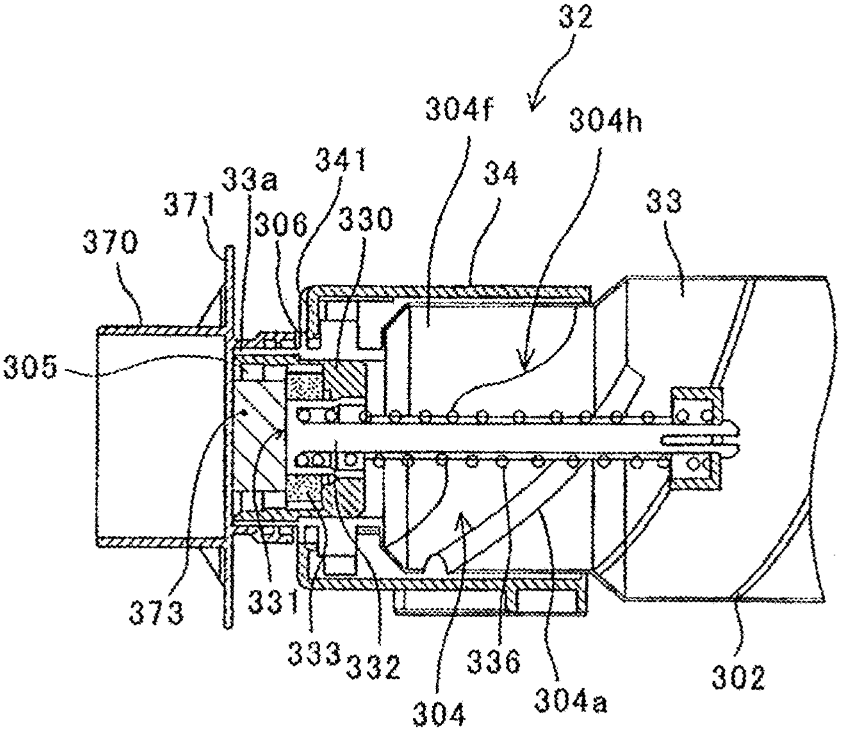
FIG. 37 is an explanatory cross-sectional view of a first example of the toner container when the cap is provided with a toner leakage preventer.

FIG. 37 is an explanatory cross-sectional view of the first example of the toner container 32 when the cap is provided with a toner leakage preventer, according to the eighth embodiment. The toner container 32 illustrated in FIG. 37 includes an embodiment as described below. Specifically, the toner container 32 illustrated in FIG. 37 is a powder container, which includes the container body 33, the container seal 333, the container shutter 332, and the cap 370, and in which a cylindrical member 373 is attached to the cap 370. The container body 33 is a powder storage that contains therein toner as powder. The container seal 333 forms the receiving opening 331 serving as the nozzle receiving opening arranged on the opening on the front end of the container body 33. The container shutter 332 is an open/close member for the receiving opening 331. The cap 370 is a seal member for the front end opening, i.e., a powder discharge side, of the container body 33. The cylindrical member 373 is the toner leakage preventer.

In the toner container 32 illustrated in FIG. 37, the cylindrical member 373 is made of a material different from the material of the cap 370, and the cylindrical member 373 is fixed to the cap 370 by an adhesive agent or the like. Furthermore, as illustrated in FIG. 37, when the cap 370 is attached, a surface of the cylindrical member 373 on an opposite side of the side fixed to the cap 370 (the right side in FIG. 37) is in contact with the container front end surface of the container shutter 332. The cylindrical member 373 has a circular shape with a diameter greater than the diameter of the container shutter 332 and smaller than the annular outer circumference of the container seal 333.

With this configuration, when the cap 370 is attached to the toner container 32, the surface of the cylindrical member 373 comes in contact with the container front side end surfaces of the container shutter 332 and the container seal 333 simultaneously. At this time, the surface of the cylindrical member 373 comes in contact so as to bridge a boundary between the container shutter 332 and the container seal 333. Therefore, it becomes possible to directly seal the receiving opening 331 and prevent toner leakage even when a gap is generated between the container seal 333 and the container shutter 332 due to impact caused by oscillation or falling. In this way, the toner container 32 illustrated in FIG. 37 can prevent toner leakage and become effective against oscillation or falling. Therefore, even when the toner container 32 is roughly handled during transport or the like, it is possible to prevent toner leakage.

Furthermore, as described above, in the toner container 32 illustrated in FIG. 37, the cylindrical member 373 is made of a material different from the material of the cap 370. Therefore, it is possible to form the cap 370 with a less expensive material, such as polystyrene resin, and form the cylindrical member 373 with a material having high flexibility, such as rubber or sponge. If the cylindrical member 373 is made with a material having high flexibility, when the cylindrical member 373 comes in contact with the end surfaces on the front end of the container shutter 332 and the container seal 333, the sealing performance with respect to the contacted members can be improved. Therefore, the cylindrical member 373 can become more effective to prevent toner leakage due to impact caused by oscillation or falling.

Furthermore, by forming the cap 370 with a less expensive material, such as polystyrene resin, different from the material of the cylindrical member 373, it becomes possible to reduce costs while maintaining the toner leakage preventing function of the cylindrical member 373.

Ninth Embodiment

A second example of the toner container 32 that includes the cap 370 provided with the toner leakage preventer will be explained below as a ninth embodiment.

Figure 38:
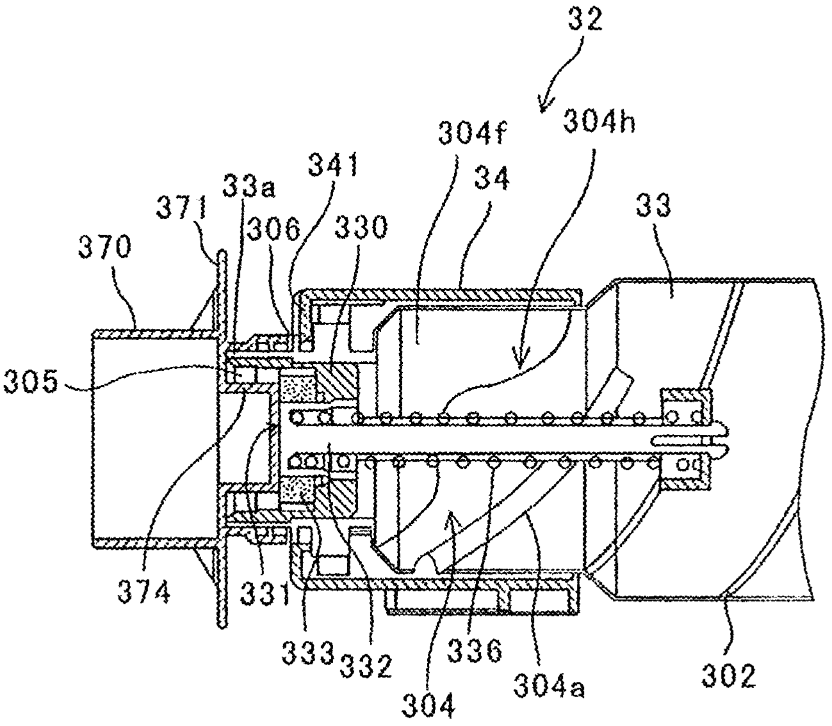
FIG. 38 is an explanatory cross-sectional view of a second example of the toner container when the cap is provided with the toner leakage preventer.

FIG. 38 is an explanatory cross-sectional view of the second example of the toner container 32 when the cap is provided with the toner leakage preventer. The toner container 32 illustrated in FIG. 38 includes an embodiment as described below. Specifically, the toner container 32 illustrated in FIG. 38 is a powder container, which includes the container body 33, the container seal 333, the container shutter 332, and the cap 370, and in which a cylindrical portion 374 is integrated with the cap 370. The cylindrical portion 374 is the toner leakage preventer.

In the toner container 32 illustrated in FIG. 38, when the cap 370 is attached, the cylindrical portion 374 comes in contact with the container shutter 332. At this time, a surface of the cylindrical portion 374 protruding from the cap 370 in the rotation axis direction (the right side in FIG. 38) is in contact with the container front end surface of the container shutter 332 (the left side in FIG. 38). The surface of the cylindrical portion 374 has a circular shape with a diameter greater than the container shutter 332 and smaller than the annular outer circumference of the container seal 333.

With this configuration, when the cap 370 is attached to the toner container 32, the surface of the cylindrical portion 374 comes in contact with the container front side end surfaces of the container shutter 332 and the container seal 333 simultaneously. At this time, the surface of the cylindrical portion 374 comes in contact so as to bridge a boundary between the container shutter 332 and the container seal 333. Therefore, it becomes possible to directly seal the receiving opening 331 and prevent toner leakage even when a gap is generated between the container seal 333 and the container shutter 332 due to impact caused by oscillation or falling. In this way, the toner container 32 illustrated in FIG. 38 can prevent toner leakage and become effective against oscillation or falling. Therefore, even when the toner container 32 is roughly handled during transport or the like, it is possible to prevent toner leakage. Furthermore, because the cylindrical portion 374 can be integrated as a part of the cap 370 (integrally molded), it is possible to reduce costs.

Tenth Embodiment

A third example of the toner container 32 that includes the cap 370 provided with the toner leakage preventer will be explained below as a tenth embodiment.

Figure 39:
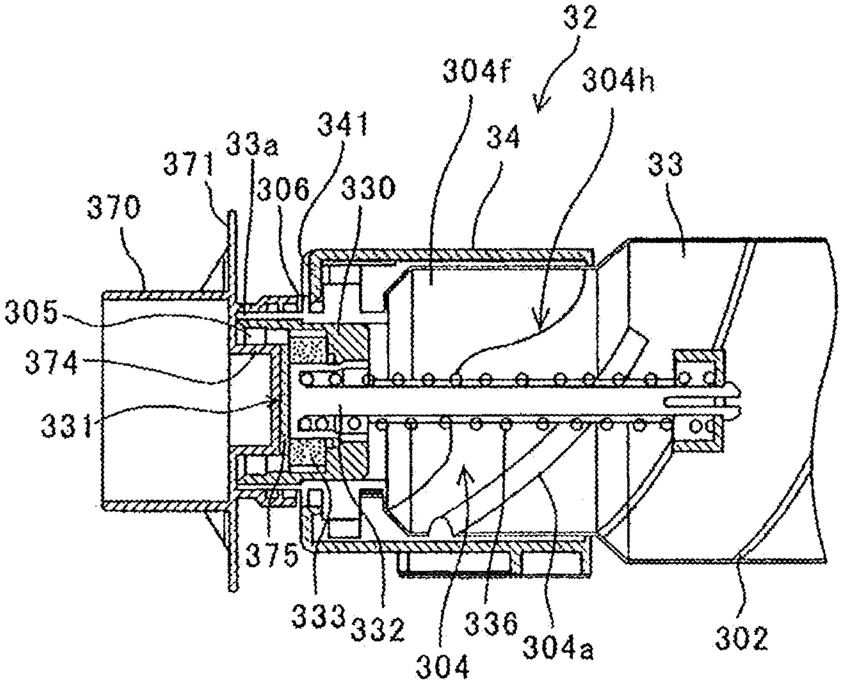
FIG. 39 is an explanatory cross-sectional view of a third example of the toner container when the cap is provided with the toner leakage preventer.

FIG. 39 is an explanatory cross-sectional view of the third example of the toner container 32 when the cap is provided with the toner leakage preventer. The toner container 32 illustrated in FIG. 39 includes an embodiment as described below. Specifically, the toner container 32 illustrated in FIG. 39 is a powder container, which includes the container body 33, the container seal 333, the container shutter 332, and the cap 370, and in which the cylindrical portion 374 is integrated with the cap 370. Furthermore, in the powder container, a front end elastic member 375 is formed on the end surface of the cylindrical portion 374 in contact with the receiving opening 331. The front end elastic member 375 is made of a material with high flexibility, such as rubber or sponge.

In the toner container 32 illustrated in FIG. 39, when the cap 370 is attached, the front end elastic member 375 on the cylindrical portion 374 comes in contact with the container front end surface of the container shutter 332 (the left side in FIG. 39). The cylindrical portion 374 is integrated as a part of the cap 370 and the front end elastic member 375 is provided on a surface of the cylindrical portion 374 protruding from the cap 370 in the rotation axis direction (the right side in FIG. 39). The front end elastic member 375 has a circular shape with a diameter greater than the container shutter 332 and smaller than the annular outer circumference of the container seal 333.

With this configuration, when the cap 370 is attached to the toner container 32, the circular surface of the front end elastic member 375 comes in contact with the container front end surfaces of the container shutter 332 and the container seal 333 simultaneously. At this time, the circular surface of the front end elastic member 375 comes in contact so as to bridge a boundary between the container shutter 332 and the container seal 333. Therefore, it becomes possible to directly seal the receiving opening 331 and prevent toner leakage even when a gap is generated between the container seal 333 and the container shutter 332 due to impact caused by oscillation or falling. In this way, the toner container 32 illustrated in FIG. 39 can prevent toner leakage and becomes effective against oscillation or falling. Therefore, even when the toner container 32 is roughly handled during transport or the like, it is possible to prevent occurrence of toner leakage. In particular, in the configuration illustrated in FIG. 39, the front end elastic member 375 is provided on the cylindrical portion 374 of the cap 370. Therefore, when the front end elastic member 375 comes in contact with the container shutter 332 and the container seal 333, it is possible to improve the sealing performance with respect to these parts, compared with the toner container 32 illustrated in FIG. 38. Therefore, it is possible to further enhance the advantageous effect to prevent toner leakage due to impact caused by oscillation or falling.

Eleventh Embodiment

A fourth example of the toner container 32 that includes the cap 370 provided with the toner leakage preventer will be explained below as an eleventh embodiment.

Figure 40:
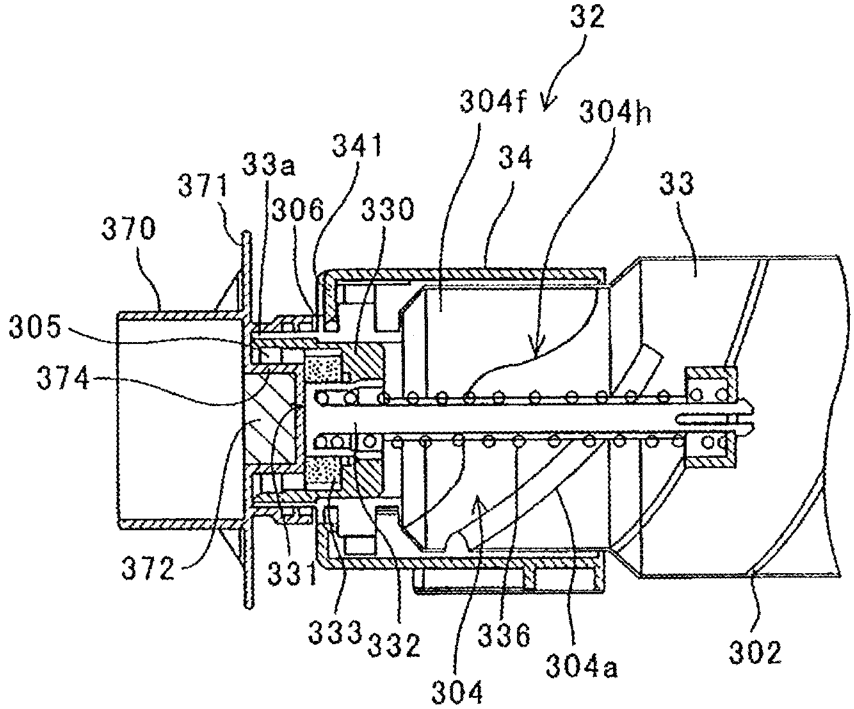
FIG. 40 is an explanatory cross-sectional view of a fourth example of the toner container when the cap is provided with the toner leakage preventer.

FIG. 40 is an explanatory cross-sectional view of the fourth embodiment of the toner container 32 when the cap is provided with the toner leakage preventer. The toner container 32 illustrated in FIG. 40 includes an embodiment as described below. Specifically, the toner container 32 illustrated in FIG. 40 is a powder container, which includes the container body 33, the container seal 333, the container shutter 332, and the cap 370, and in which the cylindrical portion 374 is provided on the cap 370. Furthermore, the absorbent 372 is arranged inside the cylindrical portion 374 so as to be open to the outside, that is, so as to be exposed to external air.

The toner container 32 illustrated in FIG. 40 is configured by adding the absorbent 372 to the toner container 32 illustrated in FIG. 38. Therefore, similarly to the toner container 32 illustrated in FIG. 38, the advantageous effect against to oscillation or falling can be obtained. Consequently, even when the toner container 32 is roughly handled during transport or the like, it is possible to prevent toner leakage. Furthermore, because the cylindrical portion 374 can be integrated as a part of the cap 370 (integrally molded), it is possible to reduce costs.

Moreover, because the toner container 32 illustrated in FIG. 40 is provided with the absorbent 372, it is possible to prevent air or moisture from entering the toner container 32. Furthermore, because the absorbent 372 is provided in the cylindrical portion 374 formed on the cap 370, it is possible to detach the absorbent 372 together with the cap 370 when the cap 370 is detached to use the toner container. Therefore, the operability can be improved.

However, in the configuration illustrated in FIG. 40, the absorbent 372 is exposed to external air around the toner container 32. Because the absorbent 372 is provided in order to adsorb moisture around the toner container 32, it is necessary to use a packaging material, such as a storage back.

In a normal situation, providing the cap 370 is sufficient. However, if the cap 370 does not have the sealing capability (if it is used to reduce impact or the like), providing the cylindrical portion 374 and the adsorption material 372 as illustrated in FIG. 40 is effective.

Twelfth Embodiment

A fifth example of the toner container 32 that includes the cap 370 provided with the toner leakage preventer will be explained below as a twelfth embodiment.

Figure 41:
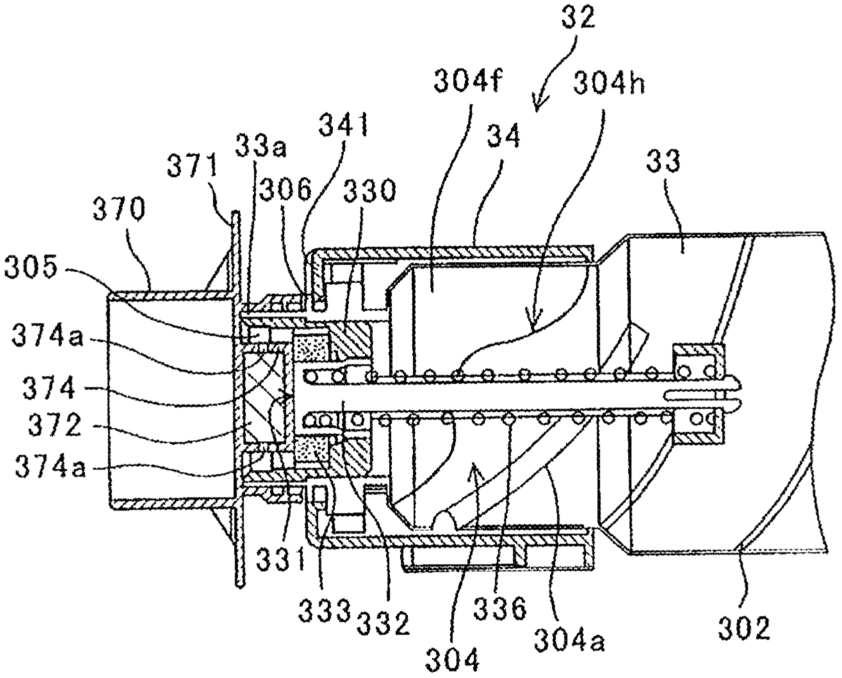
FIG. 41 is an explanatory cross-sectional view of a fifth example of the toner container when the cap is provided with the toner leakage preventer.

FIG. 41 is an explanatory cross-sectional view of the fifth example of the toner container 32 when the cap is provided with the toner leakage preventer. The toner container 32 illustrated in FIG. 41 includes an embodiment as described below. Specifically, the toner container 32 illustrated in FIG. 41 is a powder container, which includes the container body 33, the container seal 333, the container shutter 332, and the cap 370, and in which the cylindrical portion 374 is provided on the cap 370. The cap 370 can be attached to the cylindrical container opening 33*a* forming the front end opening so as to seal the inside of the container body 33. Moreover, the absorbent 372 is arranged inside the cylindrical portion 374 so as to adsorb adsorption object in the space sealed by the cap 370.

Furthermore, in the toner container 32 illustrated in FIG. 41, because the absorbent 372 adsorbs gas or the like generated by the toner itself, an adsorbing hole 374*a* as an opening is arranged on the side of the cylindrical portion 374. Accordingly, the space sealed by the cap 370 and the space where the adsorbing hole 374*a* is arranged can communicate with each other.

The toner container 32 illustrated in FIG. 41 is configured by closing the container front end surface of the cylindrical portion 374 of the toner container 32 illustrated in FIG. 38 and providing the absorbent 372 on the end surface. Therefore, similarly to the toner container 32 illustrated in FIG. 38, the advantageous effect against oscillation or falling can be obtained. Consequently, even when the toner container 32 is roughly handed during transport or the like, it is possible to prevent toner leakage.

Furthermore, because the toner container 32 illustrated in FIG. 41 includes the absorbent 372, it is possible to prevent air or moisture from entering the toner container 32. Moreover, because the absorbent 372 is arranged in the cylindrical portion 374 formed on the cap 370, it is possible to detach the absorbent 372 together with the cap 370 when the cap 370 is detached to use the toner container. Therefore, the operability can be improved.

In the toner container 32 illustrated in FIG. 41, because the space for containing toner (the internal space of the container body 33) is completely sealed by the cap 370, it is possible to prevent air or moisture from entering the space containing toner. Furthermore, because the space sealed by the cap 370 and the space where the adsorbing hole 374*a* is arranged communicate with each other, it is possible to adsorb gas generated by the toner itself. Therefore, it is possible to improve the adsorption performance compared with the configuration illustrated in FIG. 40. Moreover, because the space for containing toner (the internal space of the container body 33) is sealed and the absorbent 372 is arranged in the sealed space, both of the toner and the absorbent 372 are not influenced by external air around the toner container 32. Therefore, a packaging material is not needed.

In the toner container 32 illustrated in FIG. 40 and FIG. 41, it is explained that the absorbent 372 is provided on the cylindrical portion 374 that is integrated with the cap 370. However, as the toner leakage preventer where the absorbent 372 is provided, as illustrated in FIG. 37, the cylindrical member 373 separated from the cap 370 may be used.

In the toner container 32 illustrated in FIG. 37 to FIG. 41, a screwing method is employed as the method for fixing the cap 370 serving as the seal member. However, as the method for attaching the cap 370 to the toner container 32, any method, such as a screwing method or an engaging method, may be used as long as the attachment can be ensured, similarly to the configuration explained above with reference to FIG. 33.

In the toner container 32 illustrated in FIG. 37 to FIG. 41 (the eighth to the twelfth embodiments), the cylindrical member 373, the cylindrical portion 374, or the front end elastic member 375 presses the container shutter 332 and the container seal 333. Therefore, the toner container 32 becomes effective against impact caused by oscillation or falling. Consequently, even when the toner container 32 is roughly handled during transport or the like, it is possible to prevent toner leakage.

Furthermore, because the cylindrical member 373, the cylindrical portion 374, or the front end elastic member 375 presses the container shutter 332 and the container seal 333, even when the toner container 32 oscillates or falls, movement of the container shutter 332 can be regulated. Moreover, because a compression-contact with the container seal 333 is maintained, a gap is not generated. Therefore, toner leakage can hardly occur.

The toner container 32 illustrated in FIG. 36 to FIG. 41 (the seventh to the twelfth embodiments) relates to an embodiment for using a space between the end of the cylindrical container opening 33*a* and the receiving opening 331. This space is originally provided to realize an embodiment for housing the nozzle shutter 612 and the nozzle shutter spring 613 in a closely-contacted state when the toner container is attached to the toner replenishing device 60, for preventing toner scattering, and for reducing the size. Therefore, the exquisite feature of the embodiment described in connection with FIG. 36 to FIG. 41 is to use the same space in the engaged state between the toner container 32 and the cap 370 when the toner container 32 alone is stored.

Thirteenth Embodiment

Explanation will be given of screwing of the nozzle receiver 330 with respect to the container body 33.

The toner container 32 of the first to the twelfth embodiments explained above with reference to FIG. 11 etc. is configured such that toner is filled in the container body 33 via the opening of the cylindrical container opening 33*a*, and thereafter, the nozzle receiver 330 is press fitted to the cylindrical container opening 33*a* of the container body 33.

Therefore, if the nozzle receiver 330 is detached from the container body 33 by releasing the press fitting and the container body 33 is refilled with toner, all the members can be reused. Furthermore, by detaching the nozzle receiver 330 from the container body 33, it is possible to easily disassemble and sort out parts, which enables material recycling.

A configuration example for fixing the nozzle receiver 330 to the container body 33 by screwing will be explained below.

Figure 42:
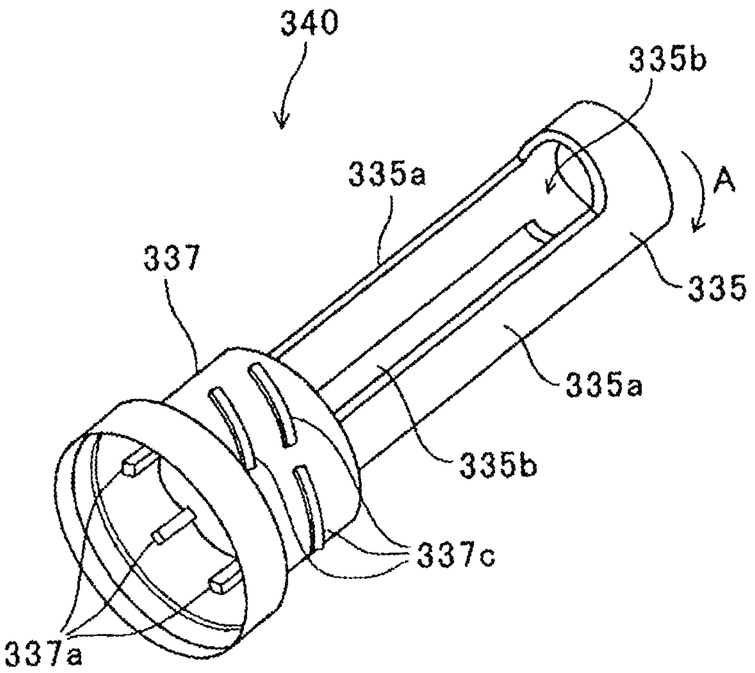
FIG. 42 is an explanatory perspective view of a container shutter supporter used in the nozzle receiver that is fixed to the container body by screwing.

FIG. 42 is an explanatory perspective view of the container shutter supporter 340 used in the nozzle receiver 330 fixed to the container body 33 by screwing. In the container shutter supporter 340 illustrated in FIG. 42, male screws 337*c* are formed on the outer surface of the nozzle receiver fixing portion 337. A male screw groove for screwing the male screws 337*c* is formed on the inner surface of the cylindrical container opening 33*a* of the container body 33 of the toner container 32 using the container shutter supporter 340 illustrated in FIG. 42.

In the nozzle receiver 330 using the container shutter supporter 340 illustrated in FIG. 42, screwing to the container body 33 is performed while the container seal 333 and the container shutter 332 are held by the container shutter supporter 340. The toner container 32 including the container shutter supporter 340 illustrated in FIG. 42 has the same configuration as the toner container 32 explained above with reference to FIG. 11 etc., except that the nozzle receiver 330 is fixed to the container body 33 by screwing.

In the toner container 32 explained above with reference to FIG. 11 etc., the opening of the cylindrical container opening 33*a* for filling toner is closed by the press-fitted nozzle receiver 330. Therefore, in some cases, it is difficult to detach the nozzle receiver 330 from the container body 33 after use and recycling may become difficult. The recycling here includes refilling, in which the toner container 32 is refilled with toner so as to be re-used, and material recycling, in which the toner container 32 is disassembled and materials are sorted out.

To cope with the above matter, in the toner container 32 using the container shutter supporter 340 illustrated in FIG. 42, the nozzle receiver 330 is rotated in the arrow A direction in FIG. 42 while the toner container 32 is being fixed. Alternatively, the toner container 32 is rotated in the direction opposite the arrow A direction in FIG. 42 while the nozzle receiver 330 is fixed. Due to the rotation, the screwing between the nozzle receiver 330 and the container body 33 is released and the nozzle receiver 330 can easily be detached from the container body 33 after use. Therefore, the nozzle receiver 330 that is closing the opening of the cylindrical container opening 33*a* being a toner filling opening can easily be detached from the container body. Therefore, with the toner container 32 using the container shutter supporter 340 illustrated in FIG. 42, it is possible to easily perform refilling such that the toner container 32 is refilled with toner so as to be reused after use.

Furthermore, the nozzle receiver 330 includes the container shutter supporter 340, the container shutter 332, the container seal 333, the container shutter spring 336, and the like. The container shutter supporter 340 and the container shutter 332 are made of resin material, such as ABS, PS, or POM. Moreover, the container seal 333 is made of sponge or the like, and the container shutter spring 336 is made of SW-C (hard steel wire), SWP-A (piano wire), SUS304 (stainless wire for spring), or the like. In this way, the nozzle receiver 330 is formed of different materials. Therefore, because the nozzle receiver 330 can easily be detached from the container body 33 made of PET (polyethylene terephthalate) or the like, it is possible to easily perform the material recycling, in which the toner container 32 is disassembled and materials are sorted out.

Furthermore, the present embodiment includes an implementation as described below. Specifically, in the toner container 32 according to the embodiment, as illustrated in FIG. 6 for example, the spiral rib 302 is wound such that, on the right side of the container body 33 viewed from the container front end, the spiral rib 302 is inclined so that the upper end is located on the container front end relative to the lower end. Therefore, by rotating the container body 33 such that the right side of the container body 33 viewed from the container front end moves from top to bottom (rotates in the arrow A direction in FIG. 6), toner in the container body 33 can be conveyed to the container front end.

The nozzle receiver 330 rotates in the A direction in FIG. 6 together with the container body 33. However, because the container seal 333 slides against the conveying nozzle 611, a frictional force generated between the container seal 333 and the conveying nozzle 611 is acting in a direction of stopping the rotation. A case will be explained below that the winding direction of the male screws 337*c* differs from the direction illustrated in FIG. 42. In this case, the winding direction of the male screws 337*c* becomes the same as the direction of the spiral rib 302. That is, the male screws 337*c* on the right side of the nozzle receiver fixing portion 337 are inclined such that the upper end is on this side relative to the lower end viewed from the container front end (a right-hand screw direction). In this way, if the winding direction of the male screws 337*c* differs from the direction illustrated in FIG. 42, the rotation direction of the container body 33 (arrow A direction in FIG. 6) corresponds to the direction of releasing the screwing from the container body.

By contrast, in the toner container 32 using the container shutter supporter 340 illustrated in FIG. 42, the winding direction of the male screws 337*c* is opposite to the winding direction of the spiral rib 302. Specifically, in the toner container 32 according to the embodiment, as illustrated in FIG. 42, the male screws 337*c* are formed such that the nozzle receiver 330 becomes a left-hand screw. Therefore, it is possible to prevent a situation where the rotation of the container body 33 in the arrow A direction acts to release the screwing between the container body 33 and the nozzle receiver 330.

Embodiments about a positional relationship between the scooping wall surface 304*f* and the shutter rear end supporting portion 335 in the container body 33 will be explained below.

First, a problem is explained below. When the container body 33 is adequately filled with toner just after the toner container 32 is attached to the toner replenishing device 60 for example, toner is continuously supplied to the nozzle opening 610 of the conveying nozzle 611 as if the toner overflows. Therefore, by rotating the shutter side supporting portions 335*a* so as to cross an area above the nozzle opening 610 to alleviate the overflow of the toner and by controlling the amount of rotation of the conveying screw 614 through intermittent operation, it is possible to replenish the developing device 50 with a desired amount of toner.

Incidentally, if the amount of toner in the container body 33 is reduced due to use over time, the rate of the amount of toner slipped from a gap between the end of the scooping portion 304 in the rotation center side and the conveying nozzle 611 to the amount of toner that flows from the scooping portion 304 to the nozzle opening 610 increases. Therefore, the amount of toner replenished to the developing device 50 is reduced. If the amount of toner replenished to the developing device 50 is reduced, the toner density of the developer G in the developing device 50 becomes unstable. Finally, the image forming apparatus may alert the toner end and it becomes necessary to replace the toner container 32 although a large amount of toner still remains in the toner container. In this state, the toner remaining amount in the toner container 32 at the time of replacement becomes large, which is a problem.

Figure 43:
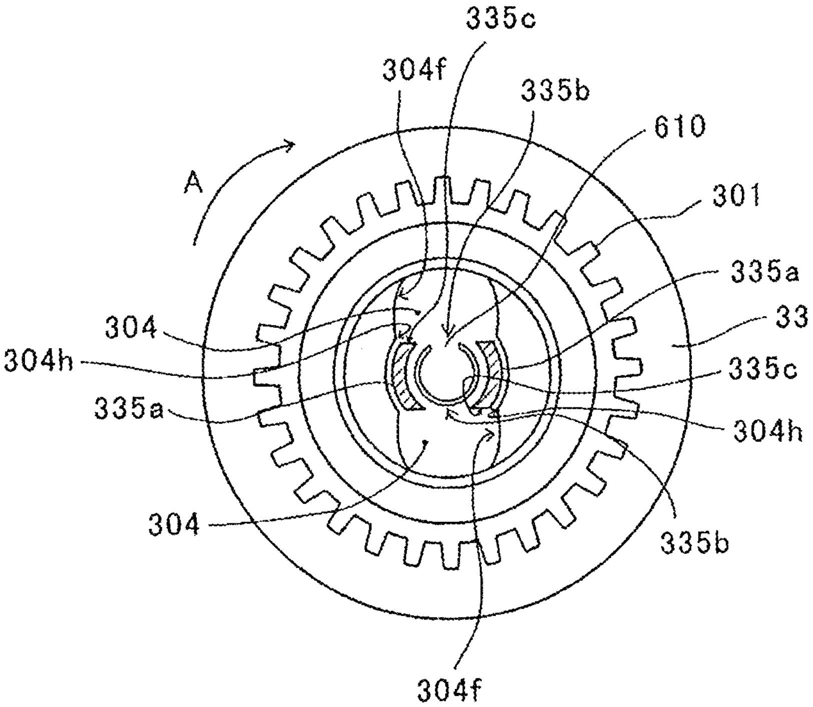
FIG. 43 is an explanatory diagram illustrating a front view of the container body in the rotation axis direction.

FIG. 43 is an explanatory front view of the container body 33 fixed with the nozzle receiver 330, taken in a direction perpendicular to the rotation axis when the position in the rotation axis direction is located at the position of the scooping portion 304.

The present embodiment includes an implementation as described below. Specifically, as illustrated in FIG. 43, in the toner container 32, the outer surfaces of the shutter side supporting portions 335*a* face the inner wall surface of the container body 33 on the upstream side of the scooping portion 304 in the rotation direction A of the container body 33*a* when the nozzle receiver 330 is fixed to the container body 33. More specifically, the outer surface of the shutter side supporting portion 335*a* faces the upstream side of the container inner wall surface that is divided by the convex 304*h*, which is a ridge of a rising portion rising inward in the container body 33, into the upstream and downstream sides. With this setting, the scooping wall surface 304*f*, which is an inner wall surface on the downstream side in the rotation direction A between the inner wall surfaces divided by the convex 304*h* of the container body 33, can be located above the space 335*b* between the side supporting portions along with rotation of the container body 33. The nozzle opening 610 is always open with face up. Therefore, when the scooping portion 304 is located in the upper side along with rotation of the toner container 32, toner scooped up by the scooping portion 304 can pass through the space 335*b* between the side supporting portions and be supplied to the nozzle opening 610.

Furthermore, as illustrated in FIG. 43, a downstream facet 335*c*, which is a facet of the shutter side supporting portion 335*a* on the downstream side in the rotation direction, is arranged near the convex 304*h* that protrudes toward the rotation center of the container body 33. Therefore, toner that has flown along the scooping wall surface 304*f* drops on the downstream facet 335*c* and bounces, and therefore is supplied to the nozzle opening 610. In other words, the downstream facet 335*c* has a bridging function to pass toner received from the scooping wall surface 304*f* to the nozzle opening 610.

Figure 44:
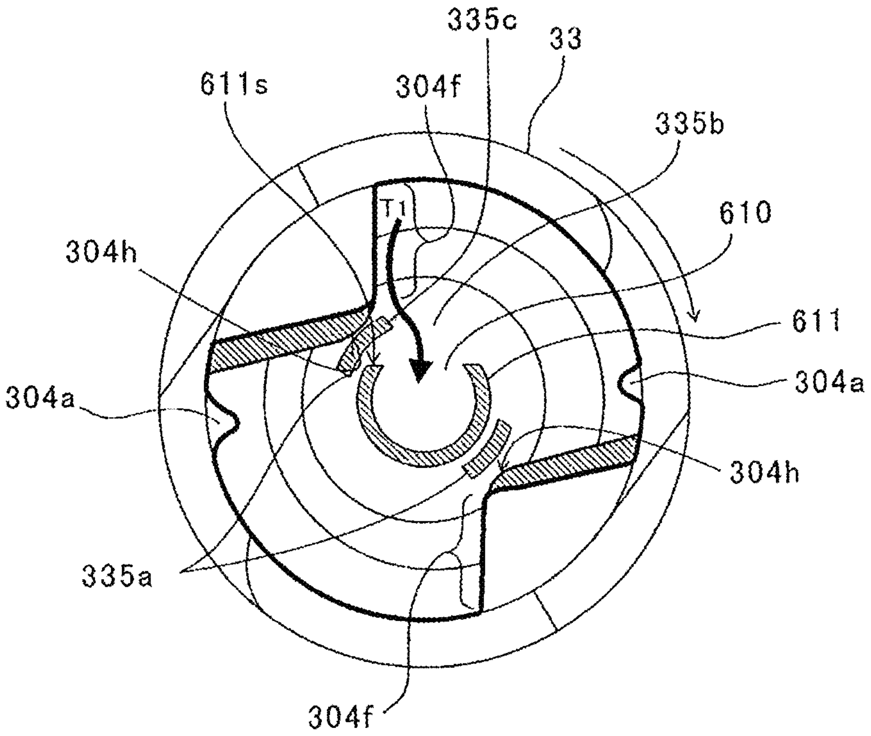
FIG. 44 is a cross-sectional view taken along E-E in FIG. 9 for explaining a configuration in which shutter side supporting portions have a bridging function.
Figure 45A:
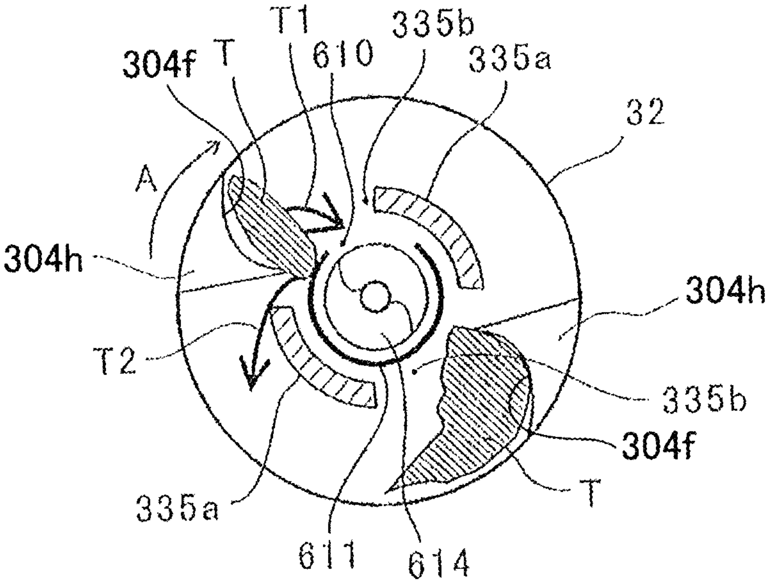
FIG. 45A is a schematic cross-sectional view taken along E-E in FIG. 9 for explaining a configuration in which the bridging function is not provided.
Figure 45B:
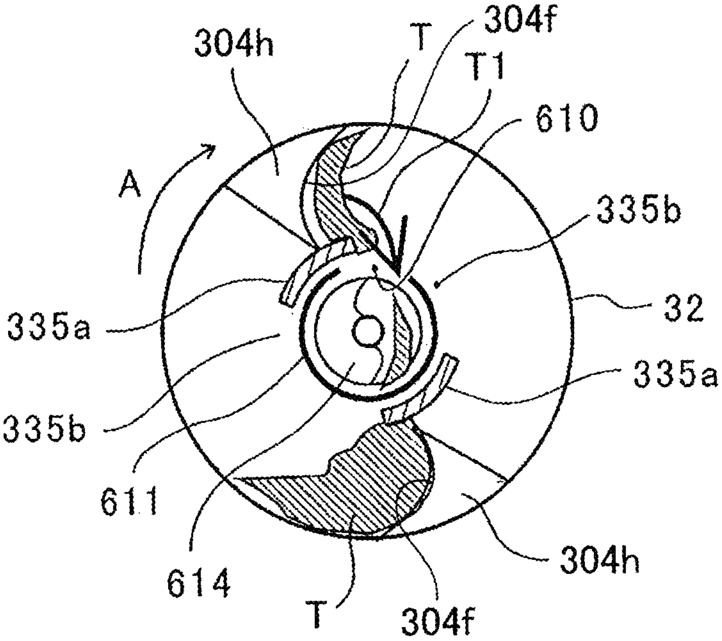
FIG. 45B is a schematic cross-sectional view taken along E-E in FIG. 9 for explaining a configuration in which shutter side supporting portions 335*a* have the bridging function.

The bridging function of the shutter side supporting portions 335*a* common to the first to the twentieth embodiments will be explained below. FIG. 9 is a cross-sectional view illustrating a relationship between the scooping portion 304 and the receiving opening 331 of the toner container 32 common to the first to the twentieth embodiments. FIG. 44 is an explanatory cross-sectional view of the container body 33 taken along E-E in FIG. 9, in particular, taken at the end surface of a shaft bearing of the conveying screw 614 on the front end of the conveying nozzle 611 in FIG. 9. FIGS. 45A and 45B are functional schematic cross-sectional views taken along E-E. Specifically. FIG. 45A is a functional schematic diagram of a comparative example for explaining a configuration in which the shutter side supporting portions 335*a* do not function as a bridge. FIG. 45*b* is a functional schematic diagram of the configuration illustrated in FIG. 44, in which the shutter side supporting portions 335*a* function as a bridge.

First, a problem is explained below. As described in Patent Document 6, when the amount of toner conveyed in the conveying nozzle is controllable, and if adequate toner is present near the opening of the conveying nozzle, it is possible to stably convey the toner. However, if the amount of toner in the toner container is reduced, in some cases, the amount of toner conveyed may be reduced and the toner cannot be conveyed stably. This is because, while it is possible to move the toner to the vicinity of the opening by the spiral rib arranged inside the toner container, the toner slips off before it reaches the opening arranged on the conveying nozzle, so that the amount of toner that enters the conveying nozzle is reduced. If the amount of toner conveyed is reduced and the toner cannot be conveyed stably, the toner density of the developer in the developing device becomes unstable. Therefore, as well as explained above with reference to FIG. 43, it becomes necessary to replace the toner container. In this state, a large amount of toner remains in the container body, so that the toner remaining amount in the toner container at the time of replacement becomes large.

In FIG. 9, the conveying nozzle (conveying tube) 611 is inserted in the nozzle receiver (nozzle insertion member) 330 in the container body 33. The nozzle opening (powder receiving opening) 610 of the conveying nozzle 611 inserted in the nozzle receiver 330 is open so that toner can be conveyed to the toner replenishing device.

A part of the scooping portion 304 overlaps the nozzle opening 610 in the longitudinal direction of the toner container 32, and some other part of the scooping portion 304 is the inner wall surface of the container body 33 on the container rear end side relative to the nozzle opening 610. Specifically, the scooping portion 304 is formed of the convex 304*h*, which corresponds to a ridge of a rising portion that is the inner wall of the container body 33 rising toward the inside of the container body 33, and the scooping wall surface 304*f*, which is a wall surface on the downstream side in the rotation direction of the container between the inner wall surfaces divided by the ridge (see FIG. 44).

As illustrated in FIG. 44, the ridge of the convex 304*h* has a moderate mountain shape influenced by the blow molding applied to form the container body 33. In FIG. 9 etc., the convex 304*h* is illustrated by a curve for convenience in order to distinguish it from the scooping wall surface 304*f*. The scooping portion 304 is a region indicated by a grid in FIG. 9 and is formed of a pair of slopes that connect the convex 304*h* and the inner cylindrical surface of the container body 33 in a point symmetric manner with respect to the rotation axis of the container body 33. At the E-E-cross-section, the wall surface located upstream in the rotation direction of the container between the inner wall surfaces divided by the ridge extends in approximately the same direction as the cut direction of the E-E-cross-section. Therefore, the wall surface looks thick in FIG. 44, which is illustrated with a pair of shaded areas on the cylindrical shape of the container body 33. The convex 304*h* is provided in the same portion that looks thick.

In FIG. 44, the conveying nozzle 611 in the tube shape has the nozzle opening 610 that opens the upper part of the conveying nozzle. The shutter side supporting portions 335*a*, as a pair, fixed to the container body 33 are provided between the conveying nozzle 611 and the convex 304*h*. The shutter side supporting portions 335*a* rotate together with the scooping wall surface 304*f* along with rotation of the container body 33. At the E-E-cross-section (at the end surface of the shaft bearing of the conveying screw 614 on the front end of the conveying nozzle 611), the convex 304*h* and the shutter side supporting portions 335*a* face each other. In this state, the scooping wall surface 304*f*, the downstream facets 335*c* of the shutter side supporting portions 335*a*, and the rim 611 is of the nozzle opening 610 on the upstream side in the rotation direction are arranged in this order viewed from the downstream side in the rotation direction of the container.

Similarly to the scooping function explained above with reference to FIG. 43, even in the scooping portion 304 formed of the scooping wall surface 304*f* of the container body 33 in FIG. 44, the outer surfaces of the shutter side supporting portions 335*a* and the downstream facets 335*c* function as a toner bridging that passes toner from the scooping portion 304 to the nozzle opening 610 when the toner moves in the arrow T1 direction toward the nozzle opening 610 that is the opening of the conveying nozzle 611 being the conveying tube.

As illustrated in FIG. 44, the inner diameters of the shutter side supporting portions 335*a* are greater than the outer diameter of the conveying nozzle 611. Therefore, it is possible to prevent the conveying nozzle 611 that has passed through a region in contact with the container seal 333 from coming into contact with the inner surfaces of the shutter side supporting portions 335*a*. As a result, a load is less likely to be applied when the conveying nozzle 611 is inserted into the container body. Because the container seal 333 with the inner diameter smaller than the outer diameter of the conveying nozzle 611 is formed on the nozzle receiver 330, it is possible to prevent toner in the container body 33 from being leaked to the outside of the container body 33 along the outer surface of the conveying nozzle 611. Therefore, it is possible to prevent toner from flowing out to areas other than the toner conveying passage connecting the container body 33 and the developing device 50 via the conveying nozzle 611.

The bridging function will be explained in detail below with reference to the schematic diagrams in FIGS. 45A and 45B.

FIG. 45A illustrates a flow of toner inside the container body 33 when the shutter side supporting portions 335*a* are arranged so as not to provide the bridging function. Toner scooped up by the scooping portion 304 along the circumferential direction of the container body due to the rotation of the container body 33 in the arrow A direction in FIG. 45A flows in the direction toward the nozzle opening 610 by gravity (an arrow T1 in FIG. 45A). However, some of the toner flows out from the gap between the conveying nozzle 611 and the convex 304*h* (a convex protruding toward the rotation center from the scooping wall surface 304*f*) (an arrow T2 in FIG. 45A).

Specifically, FIG. 45A illustrates a state at the moment when the scooping wall surface 304*f* is not fully brought upward and the convex 304*h* is located near the position at 9 o'clock on the clock face. At this moment, the rim 611*s* on the upstream side, the convex 304*h* of the scooping wall surface 304*f*, and the downstream facets of the shutter side supporting portions 335*a* are arranged in this order when viewed from the downstream side in the rotation direction of the container body 33. In this state, the facets of the shutter side supporting portions 335*a* in the middle are always delayed relative to the convex 304*h* of the scooping wall surface 304*f* that attempts to pass toner, so that the toner bridging function is not obtained. Therefore, the replenishing speed may become unstable or the amount of toner remaining in the container body 33 at the time of replacement of the toner container 32 may be increased, which is a defect.

FIG. 45B illustrates a flow of toner inside the container body 33 including the shutter side supporting portions 335*a* that function as the bridge.

The same configuration as illustrated in FIG. 45A applies in that toner scooped up by the scooping portion 304 along the circumferential direction of the container body due to the rotation of the container body 33 in the arrow A direction in FIG. 45A flows toward the nozzle opening 610 by gravity (the arrow T1 in FIG. 45A). However, in the configuration illustrated in FIG. 45B, because the shutter side supporting portions 335*a* are arranged so as to fill the gap between the conveying nozzle 611 and the convex 304*h* (a convex protruding toward the rotation center from the scooping wall surface 304). To realize this configuration, the downstream facets 335*c* of the shutter side supporting portions 335*a* and the convex 304*h* of the scooping portion 304 are arranged in this order when viewed from the downstream side in the rotation direction of the container body 33.

With this arrangement, it is possible to prevent the toner flow indicated by the arrow T2 in FIG. 45A and allow the scooped-up toner to enter the nozzle opening 610 efficiently. Therefore, it is possible to stabilize the replenishing speed even when the amount of toner in the container body 33 is reduced, and to reduce the amount of toner remaining in the container body 33 at the time of replacement of the toner container 32. Furthermore, because the amount of toner remaining in the container body 33 at the time of replacement can be reduced, a running cost can be reduced to improve the economic efficiency and the amount of residual toner to be disposed can be reduced to reduce the influence on the environment.

To fill the gap between the conveying nozzle 611 and the convex 304*h* as described above, it is desirable that the shutter side supporting portions 335*a* and the convex 304*h* are attached to each other. However, as long as it is possible to prevent a toner flow indicated by T2, a slight gap (about 0.3 mm to 1 mm) may be acceptable between the shutter side supporting portions 335*a* and the convex 304*h* as illustrated at the convex 304*h* on the lower part in FIG. 45B. This is because the slight gap can be clogged with toner through the operation performed with a large amount of toner at the start of replenishment and the toner can function as a seal. Furthermore, because the convex 304*h* is formed by blow molding in which dimensional accuracy is lower than the injection molding, it is difficult to completely attach the shutter side supporting portions 335*a* and the convex 304*h*. In view of the productivity, it is preferable to form the structure with a slight gap.

Figure 46:
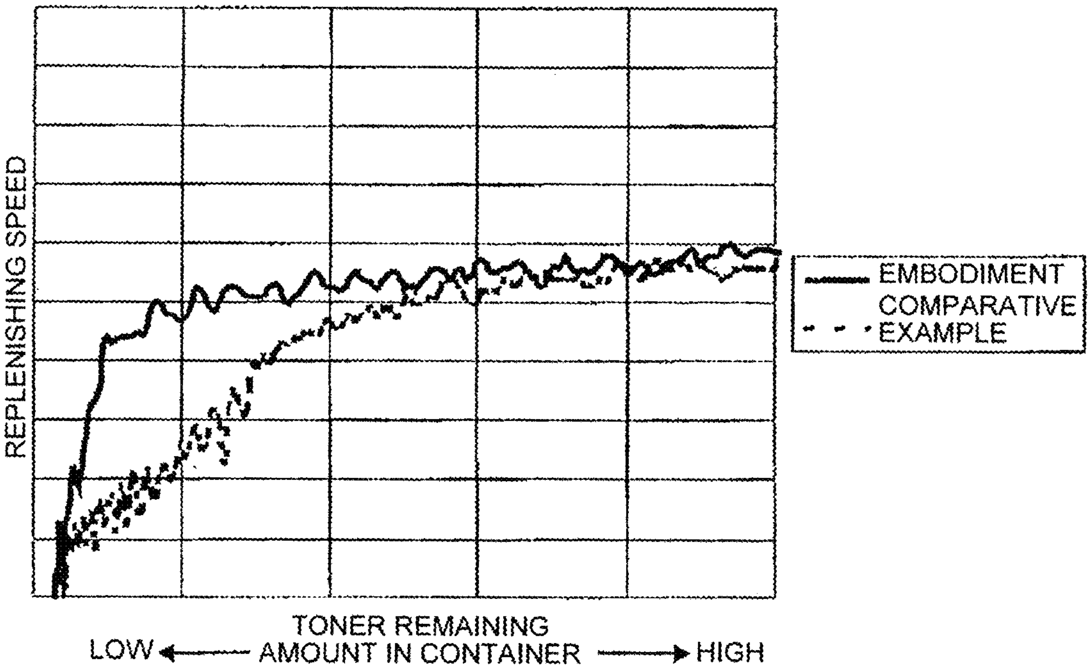
FIG. 46 is a graph showing a relationship between a toner remaining amount in the container and a replenishing speed according to the embodiment and a comparative example.

FIG. 46 is a graph showing a relationship between a toner remaining amount in the container and a replenishing speed (toner supply amount per unit time) according to the embodiment (the configuration illustrated in FIGS. 44 and 45B) and the comparative example (the configuration illustrated in FIG. 45A).

It can be found from FIG. 46 that the replenishing speed is stable even when the toner remaining amount in the container decreases in the embodiment, but the replenishing speed decreases when the toner remaining amount in the container decreases in the comparative example. In the comparative example in which a bridging member is not provided, toner passes through (slips away) the gap between the end of the scooping wall surface 304*f* on the rotation center side being a part of the container body 33 and the conveying nozzle 611. Therefore, the adequate amount of toner can hardly be conveyed to the nozzle opening 610 when the amount of remaining toner decreases, so that the supply amount to the nozzle opening 610 cannot be maintained and the replenishing speed decreases.

The toner container 32 in the examples illustrated in FIG. 9, FIG. 43, FIG. 44, and FIG. 45B includes an embodiment as described below. Specifically, the scooping wall surfaces 304*f* are provided at two positions in the container body, and the bridging members (the shutter side supporting portions 335*a*) are provided at two positions corresponding to the scooping wall surfaces 304*f*. It is effective to provide the same number of the scooping wall surfaces 304*f* as the bridging members such that if the scooping wall surfaces 304*f* of the container body 33 are provided at three positions, the bridging members are also provided at three positions. Similarly, if the scooping wall surfaces of the container body 33 are provided at four positions or more, it is effective to provide the same number of the bridging members as the scooping wall surfaces 304*f*.

It is of course possible that only limited ones of a plurality of the shutter side supporting portions 335*a* are configured as the bridging member corresponding to the scooping wall surfaces 304*f*. For example, only one of the two shutter side supporting portions 335*a* is configured as the bridging member and only one scooping wall surface 304*f* is formed in the container body 33 in accordance with the bridging member.

A case will be described below that the container body 33 is formed as a cylindrical member made of resin (in the following, described as a container body 1033 to distinguish it from the container body of the other embodiments) and a scooping portion is provided on a part of the conveyor inside the container body.

Figure 47A:
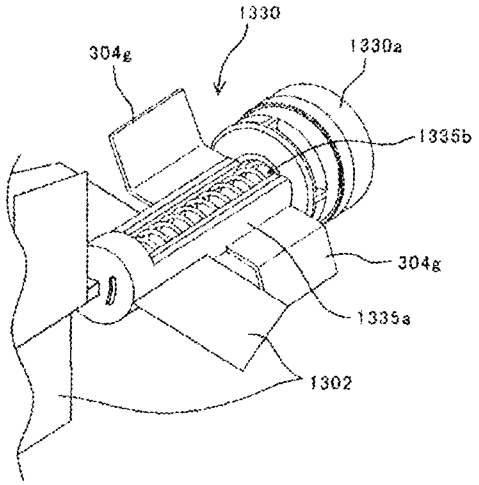
FIG. 47A is an explanatory diagram of a configuration in which scooping ribs are provided as the scooping portion, in particular, an explanatory perspective view of a nozzle receiver.
Figure 47B:
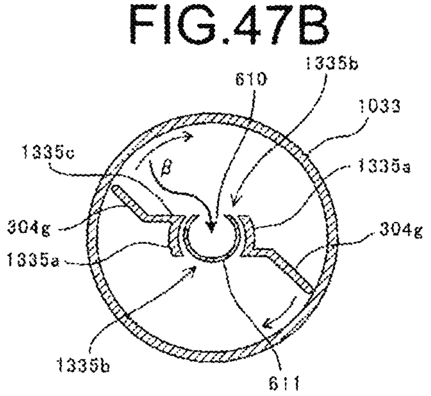
FIG. 47B is an explanatory cross-sectional view illustrating a state where the nozzle receiver illustrated in FIG. 47A is mounted on the container body.
Figure 47C:
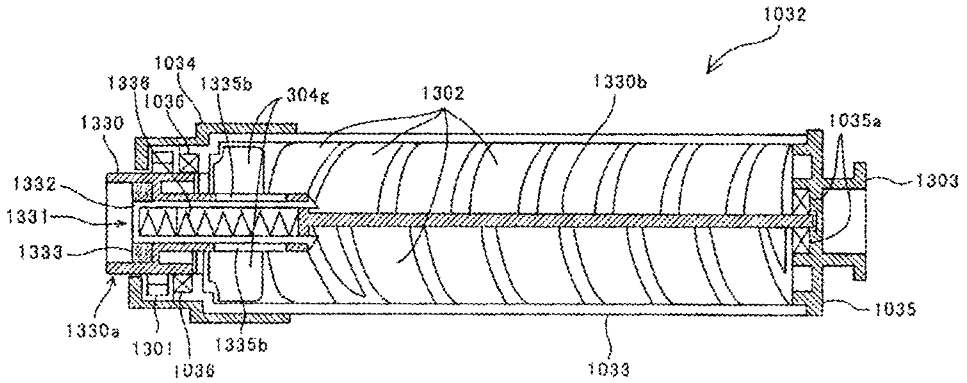
FIG. 47C is a lateral cross-sectional view of the entire toner container on which the nozzle receiver illustrated in FIG. 47A is mounted.
Figure 47D:
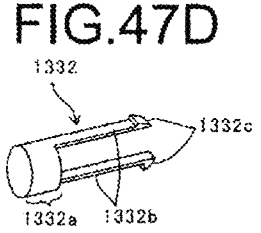
FIG. 47D is a perspective view of a container shutter included in the toner container illustrated in FIG. 47C.

FIG. 47A is a perspective view illustrating a configuration in which scooping ribs 304*g* corresponding to the scooping wall surfaces 304*f* are integrated with the nozzle receiver 330 (hereinafter, described as a nozzle receiver 1330). FIG. 47B is a cross-sectional view illustrating how the nozzle receiver 1330 illustrated in FIG. 47A is arranged in the container body 1033 in relation to the conveying nozzle 611. FIG. 47C is an explanatory lateral cross-sectional view of an entire toner container 1032 on which the nozzle receiver 1330 illustrated in FIG. 47A is mounted. FIG. 47D is a perspective view of a container shutter 1332 as a part of the toner container 1032.

The nozzle receiver 1330 illustrated in FIGS. 47A to 47D include the scooping ribs 304*g* as descried above, which is integrated with a conveying blade holder 1330*b* to which conveying blades 1302 made of a flexible material, such as a resin film, are fixed.

The nozzle receiver 1330 illustrated in FIGS. 47A to 47D includes a container seal 1333, a receiving opening 1331, the container shutter 1332, and a container shutter spring 1336. The container seal 1333 is a seal having a contact surface that faces and comes in contact with the nozzle shutter flange 612*a* of the nozzle shutter 612 held by the conveying nozzle 611 when the toner container 1032 is attached to the main body of the copier 500. The receiving opening 1331 is an opening in which the conveying nozzle 611 is inserted. The container shutter 1332 is a shutter that opens and closes the receiving opening 1331. The container shutter spring 1336 is a biasing member that biases the container shutter 1332 to a position at which the container shutter 1332 closes the receiving opening 1331.

In the configuration illustrated in FIGS. 47A to 47D, the nozzle receiver 1330 includes an outer surface 1330*a* of the nozzle receiver that is rotatably fitted to the inner surface 615*a* of the container setting section of the main body of the copier 500. As illustrated in FIG. 47D, the container shutter 1332 includes a contact section 1332*a* to be in contact with the conveying nozzle 611 and includes shutter supporting portions 1332*b*. The shutter supporting portions 1332*b* extend from the contact section 1332*a* in the longitudinal direction of the container body 1033, and include hooked portions 1332*c* that prevent the container shutter 1332 from coming out of the nozzle receiver 1330 due to the biasing force applied by the container shutter spring 1336. The toner container 1032 is provided with a container gear 1301 that is separately structured from the container body 1033 and that is fixed to the nozzle receiver 1330 so as to transmit a driving force.

In this way, a flow structure including the scooping inner wall surfaces, the bridges, and a space 1335*b* between the side supporting portions for flowing toner to the nozzle opening 610 can be integrated.

The toner container 1032 including the scooping ribs 304*g* will be described in detail below.

As illustrated in FIG. 47C, the toner container 1032 includes a container front end cover 1034, the container body 1033, a bottom cap 1035, and the nozzle receiver 1330. The container front end cover 1034 is provided on the front end of the toner container 1032 in an attachment direction with respect to the main body of the copier 500. The container body 1033 has an approximately cylindrical shape. The bottom cap 1035 is provided on the rear end of the toner container 1032 in the attachment direction. The nozzle receiver 1330 is rotatably held by the approximately cylindrical container body 1033.

A gear exposing hole, which is an opening similar to the gear exposing hole 34*a*, is arranged on the container front end cover 1034 so that the container gear 1301 fixed to the nozzle receiver 1330 can be exposed. The cylindrical container body 1033 holds the nozzle receiver 1330 so that the nozzle receiver 1330 can rotate. The container front end cover 1034 and the bottom cap 1035 are fixed to the container body 1033 (by a well-known method, such as thermal welding or adhesive agent). The bottom cap 1035 includes a rear end shaft bearing 1035*a*, which supports one end of the conveying blade holder 1330*b*, and includes a gripper 1303, which a user can grip when the user attaches/detaches the toner container 1032 to/from the main body of the copier 500.

A method for assembling the container front end cover 1034, the bottom cap 1035, and the nozzle receiver 1330 on the container body 1033 will be explained below.

The nozzle receiver 1330 is inserted from the rear end of the container body 1033 and is positioned so as to be rotatably supported by a front end shaft bearing 1036 arranged on the front end of the container body 1033. Subsequently, positioning is performed such that one end of the conveying blade holder 1330*b* of the nozzle receiver 1330 is rotatably supported by the rear end shaft bearing 1035*a*, and the rear end shaft bearing 1035*a* is fixed to the container body 1033. Thereafter, the container gear 1301 is fixed to the nozzle receiver 1330 from the container front end side. After the container gear 1301 is fixed, the container front end cover 1034 is fixed to the container body 1033 so as to cover the container gear 1301 from the container front end side.

The fixation between the container body 1033 and the container front end cover 1034, the fixation between the container body 1033 and the bottom cap 1035, and the fixation between the nozzle receiver 1330 and the container gear 1301 can be performed appropriately by using a well-known method, such as thermal welding or adhesive agent.

A configuration for conveying toner from the toner container 1032 to the nozzle opening 610 will be explained below.

The scooping ribs 304*g* protrude so as to come closer to the inner surface of the container body 1033 such that the rib surfaces are continued from downstream facets 1335*c*, which are on the downstream side in the rotation direction, of shutter side supporting portions 1335*a*. The rib surfaces are bent once in the middle so as to resemble curved surfaces. However, the configuration is not limited to this example depending on the compatibility with toner. For example, simple planar ribs without bend may be used. Furthermore, because the scooping ribs 304*g* stand integrally with the space 1335*b* between the side supporting portions, it is possible to obtain the same bridging function and effect as those obtained by tightly attaching the shutter side supporting portions 335*a* and the convex 304*h* to each other. Namely, the conveying blades rotate along with rotation of the nozzle receiver 1330 when the toner container 1032 is attached to the main body of the image forming apparatus, so that toner contained in the toner container 1032 is conveyed from the rear end to the front end where the nozzle receiver 1330 is arranged. Subsequently, the scooping ribs 304*g* receive the toner conveyed by the conveying blades 1302, scoop up the toner from bottom to top along with the rotation, and flow the toner to the nozzle opening 610 by using the rib surfaces as slides.

A configuration for fixing the nozzle receiver 330 to the container body 33 in the toner container 32 will be explained below as fourteenth to nineteenth embodiments. In FIGS. 48A, 49, 51B, and 52B, the container gear 301 are illustrated in a roller shape by omitting gear teeth.

Fourteenth Embodiment

Figure 48A:
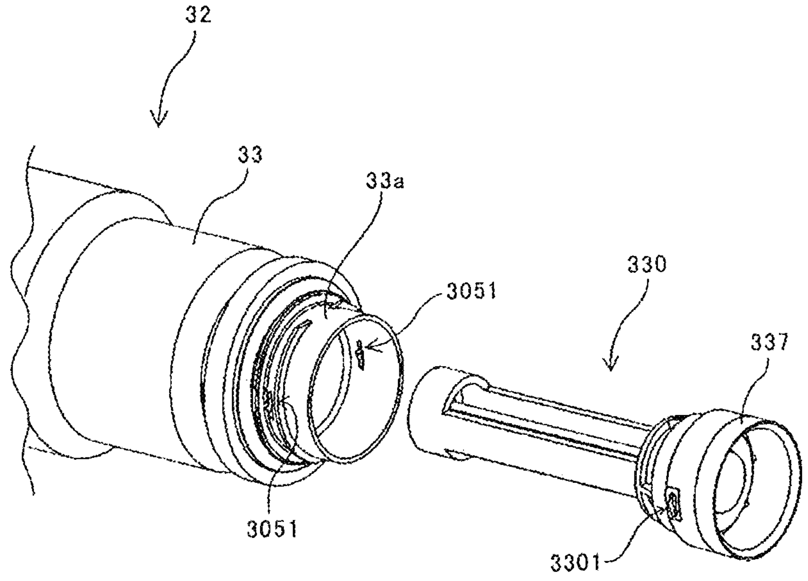
FIG. 48A is an explanatory perspective view illustrating a state where a nozzle receiver is dismounted from the container body of the toner container according to a fourteenth embodiment.
Figure 48B:
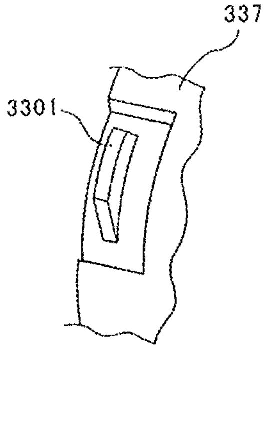
FIG. 48B is an enlarged view of a nozzle receiver engaging protrusion.
Figure 49:
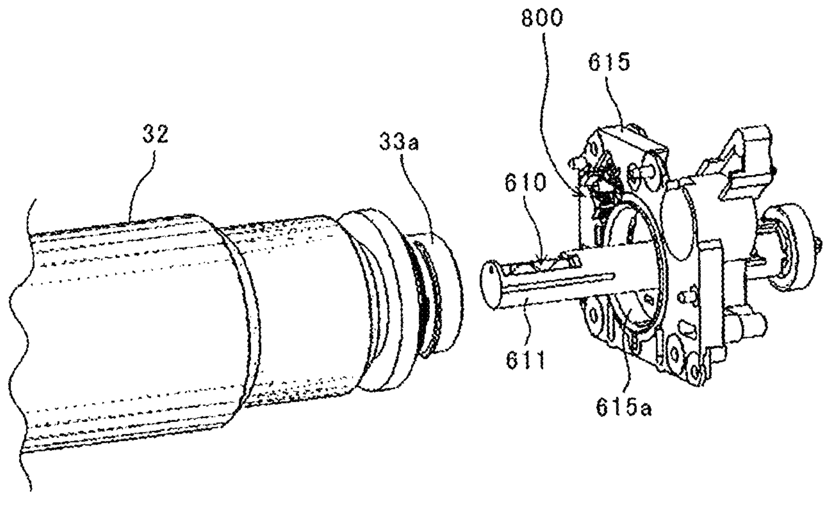
FIG. 49 is an explanatory perspective view of the front end of the toner container and the container setting section according to the fourteenth embodiment.
Figure 50A:
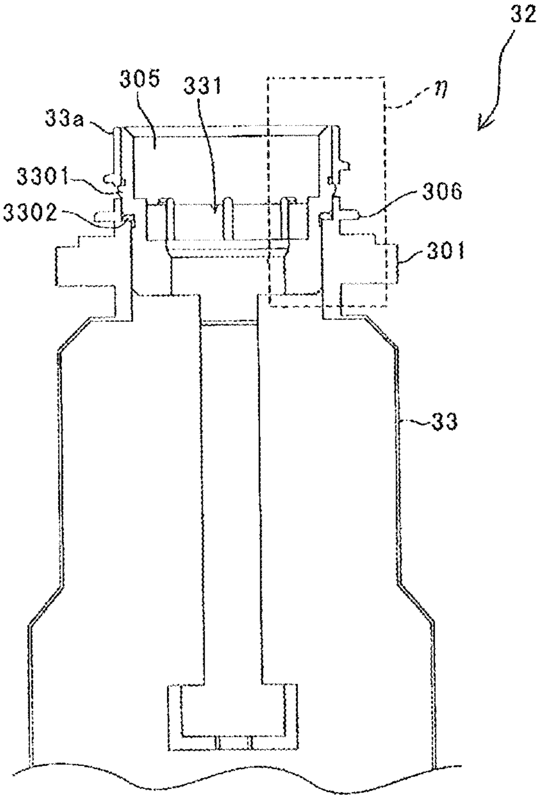
FIG. 50A is a cross-sectional view of the vicinity of the front end of the toner container according to the fourteenth embodiment.
Figure 50B:
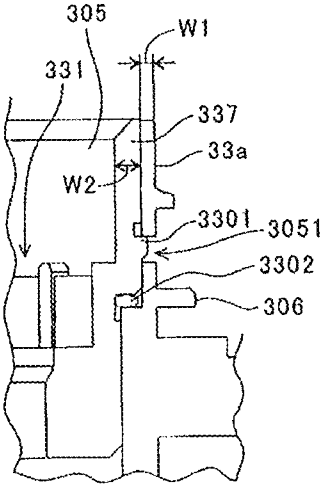
FIG. 50B is an explanatory enlarged view of a region η illustrated in FIG. 50A.

FIGS. 48A to 50B are explanatory diagrams of the toner container 32 according to the fourteenth embodiment. FIGS. 48A and 48B are explanatory perspective views illustrating a state where the nozzle receiver 330 is detached from the container body 33 of the toner container 32. FIG. 49 is an explanatory perspective view of a front end of the toner container 32 and the container setting section 615 according to the fourteenth embodiment. FIG. 50A is a cross-sectional view of the vicinity of the front end of the toner container 32. FIG. 50B is an explanatory enlarged view of a region η illustrated in FIG. 50A. In FIGS. 48A to 50B, the container front end cover 34 is omitted. In FIGS. 48A to 49, the container shutter 332 is omitted. In FIG. 50, the nozzle shutter 612 is omitted.

The container body 33 of the toner container 32 according to the fourteenth embodiment is molded by a blow molding method as explained above in the other embodiments. However, the accuracy in the blow molding tends to be lower than that of injection molding used in general resin molding. Therefore, in some cases, the circularity of the cylindrical cross-section of the cylindrical container opening 33*a* being a part of the container body 33 formed by blow molding may be low.

As described above, the cylindrical container opening 33*a* (the outer surface of the container in the radial direction of the front end opening 305) is slidably fitted to the inner surface 615*a* of the container setting section 615. Therefore, the position of the toner container 32 relative to the toner replenishing device 60 in the planar direction perpendicular to the rotation axis is determined. At this time, if the circularity of the outer surface of the cylindrical container opening 33*a* that contributes to the positioning is low, the position of the toner container 32 relative to the toner replenishing device 60 may be deviated when the toner container rotates.

Meanwhile, the nozzle receiver 330 is a general resin-molded product formed by injection molding. Therefore, the nozzle receiver 330 can be molded with higher accuracy than the container body 33, and the nozzle receiver fixing portion 337 being a part of the nozzle receiver 330 can be molded in a cylindrical shape with good circularity.

In the fourteenth embodiment, the outer diameter of the nozzle receiver fixing portion 337 of the nozzle receiver 330 is greater than the inner diameter of the cylindrical container opening 33*a*. With this configuration, the outer surface of the cylindrical container opening 33*a* is adjusted so as to follow the nozzle receiver fixing portion 337 when the nozzle receiver 330 is attached to the container body 33, so that the circularity can be improved.

With the improvement of the circularity of the outer surface of the cylindrical container opening 33*a*, the positioning accuracy of the toner container 32 relative to the toner replenishing device 60 can be improved.

If the circularity of the outer surface of the cylindrical container opening 33*a* is low, it is necessary to set the inner surface 615*a* of the container setting section 615 to a greater size by taking a variation in the shape into account. However, if the inner surface 615*a* is set to a grater size, the freedom of displacement of the outer surface of the cylindrical container opening 33*a* relative to the inner surface 615*a* of the container setting section 615 in the planar direction perpendicular to the rotation axis increases, resulting in large backlash. By contrast, in the fourteenth embodiment, the circularity of the outer surface of the cylindrical container opening 33*a* can be improved and the inner surface 615*a* of the container setting section 615 need not be set to a greater size, so that backlash can be reduced. With a reduction of the backlash, the positioning accuracy of the toner container 32 relative to the toner replenishing device 60 can be improved.

As illustrated in FIGS. 48A, 50A, and 50B, nozzle receiver engaging protrusions 3301 are provided at two positions on the outer surface of the nozzle receiver fixing portion 337 of the nozzle receiver 330. The two nozzle receiver engaging protrusions 3301 are arranged at positions separated by 180° from each other in the circumferential direction of the outer surface, that is, at positions opposite to each other on the surface of the nozzle receiver fixing portion 337. The nozzle receiver engaging protrusions 3301 have rectangular shapes extending in the circumferential direction when viewed from the radial direction of the nozzle receiver fixing portion 337 that has a cylindrical shape. As illustrated in FIG. 48B, the nozzle receiver engaging protrusions 3301 have trapezoidal shapes when viewed from the axial direction of the nozzle receiver fixing portion 337. The amount of protrusion (height) is about 0.5 mm from the surface of the nozzle receiver fixing portion 337. The slopes of the trapezoids are located on the downstream side in the rotation direction of the container body 33. The surfaces opposite the slopes stand in the radial direction on the upstream side in the rotation direction of the container body 33.

Meanwhile, two engaged holes 3051 of the front end opening are provided on the cylindrical container opening 33*a*. The engaged holes 3051 of the front end opening are arranged at positions separated by 180° from each other in the circumferential direction of the inner surface of the cylindrical container opening 33*a*, that is, at positions opposite to each other on the inner surface of the cylindrical container opening 33*a*, such that the inner surface and the outer surface can communicate with each other. The engaged holes 3051 of the front end opening are elliptical holes extending in the circumferential direction when viewed from the radial direction of the nozzle receiver fixing portion 337.

With this configuration, the two nozzle receiver engaging protrusions 3301 are engaged with the two engaged holes 3051 of the front end opening, respectively, when the nozzle receiver 330 is attached to the container body 33. Due to the engagement, it is possible to prevent the nozzle receiver 330 from coming out of the container body 33 and from rotating relative to the container body 33.

Such a rotation preventer as described above is effective to maintain the relative positional relationship of the scooping wall surfaces 304*f*, the convex 304*h*, and the shutter side supporting portions 335*a* being the bridging members, in order to enable the toner bridging function. The reasons why the nozzle receiver engaging protrusions 3301 are formed in the trapezoidal shapes in the axial direction will be described below.

The details will be explained below with reference to FIG. 48B. The nozzle receiver 330 can easily be detached from the container body 33 by rotating the nozzle receiver fixing portion 337 toward the slopes. This makes it possible to easily discharge or replenish toner from or to the container body 33. Incidentally, when the container body 33 is attached to the toner replenishing device for operation, because the radially-standing surfaces opposite the slopes are located upstream in the rotation direction of the container body 33, the standing surfaces receive a rotational force transmitted by the container gear 301 via contact sections of the engaged holes 3051 of the front end opening. Specifically, the standing surfaces opposite the slopes of the nozzle receiver engaging protrusions 3301 rotate so as to be continuously engaged with the engaged holes 3051 of the front end opening. Therefore, the nozzle receiver 330 does not rotate relative to the container body 33 during replenishment, so that positional deviation can hardly occur. If the slopes of the trapezoids are located downstream in the rotation direction, the slopes receive the rotational force, which may result in positional deviation.

An annular receiver outer seal 3302 is provided at a step where the outer diameter of the nozzle receiver fixing portion 337 of the nozzle receiver 330 is reduced. The step is located opposite a step where the inner circumference of the cylindrical container opening 33*a* is reduced, so that the receiver outer seal 3302 is sandwiched between the two steps when the nozzle receiver 330 is attached to the container body 33. Therefore, it is possible to prevent toner contained in the container body 33 from being leaked via a gap between the outer surface of the nozzle receiver fixing portion 337 and the inner surface of the cylindrical container opening 33*a*.

Furthermore, the receiver outer seal 3302 is compressed by the two steps. Therefore, when the nozzle receiver 330 is attached to the container body 33, a restoring force of the compressed receiver outer seal 3302 is applied so that the nozzle receiver 330 pushes against the container body 33. The restoring force is received by the contact (engagement) between the standing surfaces of the nozzle receiver engaging protrusions 3301 and the inner surfaces of the engaged holes 3051 of the front end opening.

As described above, in the fourteenth embodiment, the cylindrical container opening 33*a* is adjusted so as to follow the nozzle receiver fixing portion 337 resulting in the improved circularity.

The container body 33 including the cylindrical container opening 33*a* is made of PET (polyethylene terephthalate) and a thickness W1 of the cylindrical container opening 33*a* is set to 1.1 mm. The nozzle receiver 330 including the nozzle receiver fixing portion 337 is made of PS (polystyrene) and a thickness W2 of the nozzle receiver fixing portion 337 is set to 2 mm. In this case, when a fit tolerance (a difference between the outer diameter of the nozzle receiver fixing portion 337 and the inner diameter of the cylindrical container opening 33*a*) was set to 0.01 mm to 0.1 mm, preferable results were obtained in terms of the positioning accuracy of the toner container 32 relative to the toner replenishing device 60 and in terms of toner leakage preventing performance.

In general, components are fixed by press fitting. By contrast, in the structure according to the fourteenth embodiment, a tolerance between components can be increased. Therefore, the productivity can be ensured. Furthermore, a restoring force of the receiver outer seal 3302 is received by the engagement of the nozzle receiver engaging protrusions 3301 so that the fit tolerance of an extremely small value including the smallest value of 0.01 mm can be allowed. Moreover, the nozzle receiver engaging protrusions 3301 function as rotation preventers. Furthermore, at the fitted portion, the shape of the cylindrical container opening 33*a* is adjusted. Thus, the function to fix the positions of the components in the axial direction and the function to adjust the shape of the cylindrical container opening 33*a* are separated. In the fourteenth embodiment, the nozzle receiver 330 is fixed to the container body 33 by using the nozzle receiver engaging protrusions 3301. If the container body 33 and the nozzle receiver 330 are fixed by only the engagement of the nozzle receiver engaging protrusions 3301, the position of the nozzle receiver 330 relative to the container body 33 may be deviated in the planar direction perpendicular to the rotation axis of the toner container 32. By contrast, in the fourteenth embodiment, because the cylindrical container opening 33*a* is press fitted by being adjusted in shape, it is possible to prevent positional deviation of the nozzle receiver 330 relative to the container body 33 in the planar direction perpendicular to the rotation axis of the toner container 32.

In this way, in the fourteenth embodiment, both of the engagement of the nozzle receiver engaging protrusions 3301 and press fitting are used to fix the container body 33 and the nozzle receiver 330. By the engagement of the nozzle receiver engaging protrusions 3301, the compressed amount of the receiver outer seal 3302 formed of a rubber packing or the like is determined. This contributes to the positioning of the toner container 32 in the rotation axis direction. Incidentally, if the shape of the cylindrical container opening 33*a* is more adjusted by press fitting so as to follow the shape of the nozzle receiver fixing portion 337, the outer surface of the nozzle receiver fixing portion 337 and the inner surface of the cylindrical container opening 33*a* are more tightly attached. This press fitting contributes to the positioning of the toner container 32 in the planar direction perpendicular to the rotation axis.

Fifteenth Embodiment

A fifteenth embodiment is the same as the fourteenth embodiment in that the configuration illustrated in FIGS. 48A to 50B is basically applicable, but is different from the fourteenth embodiment in that the outer diameter of the nozzle receiver fixing portion 337 of the nozzle receiver 330 is smaller than the inner diameter of the cylindrical container opening 33*a*.

The cylindrical container opening 33*a* and the nozzle receiver fixing portion 337 are made of hard material because their dimensional accuracy needs to be ensured for engagement with the toner replenishing device 60. Examples of the material for the nozzle receiver 330 having the nozzle receiver fixing portion 337 include PS (polystyrene).

Examples of the material for the container body 33 having the cylindrical container opening 33*a* include PET (polyethylene terephthalate). When the cylindrical container opening 33*a* and the nozzle receiver fixing portion 337 are fixed to each other by press fitting, the outer surface of the nozzle receiver fixing portion 337 is tightly sealed by the inner surface of the cylindrical container opening 33*a*. To improve the sealing performance between the inner surface of the cylindrical container opening 33*a* and the outer surface of the nozzle receiver fixing portion 337, it may be possible to increase the outer diameter of the nozzle receiver fixing portion 337 relative to the inner diameter of the cylindrical container opening 33*a*. However, if the outer diameter of the nozzle receiver fixing portion 337 is increased, although it is possible to adjust the shape of the cylindrical container opening 33*a* as in the toner container 32 of the fourteenth embodiment, a greater fitting force is needed at the time of attachment. If the fitting force increases, the cylindrical container opening 33*a* and the nozzle receiver fixing portion 337 may be deformed or broken. Therefore, it becomes necessary to reduce the dimensional tolerance at the fitted portion between the cylindrical container opening 33*a* and the nozzle receiver fixing portion 337 and to strictly manage the process.

On the other hand, if the outer diameter of the nozzle receiver fixing portion 337 is reduced relative to the inner diameter of the cylindrical container opening 33*a*, a defect as described below may occur. Specifically, even when the engaged portion is set as a detachment preventer and the position in the rotation axis direction is determined, the nozzle receiver fixing portion 337 of the nozzle receiver 330 moves up and down in the cylindrical container opening 33*a* within the tolerance between components. Therefore, it becomes difficult to seal the gap between the cylindrical container opening 33*a* and the nozzle receiver fixing portion 337.

Therefore, in the fifteenth embodiment, the annular receiver outer seal 3302 as a sealing member made of elastic material is used to seal the gap between the inner surface of the cylindrical container opening 33*a* and the outer surface of the nozzle receiver fixing portion 337. Specifically, the receiver outer seal 3302 is sandwiched between the cylindrical container opening 33*a* and the nozzle receiver fixing portion 337 such that the receiver outer seal 3302 is compressed and elastically deformed to seal the gap. Because the receiver outer seal 3302 is elastically deformed, a restoring force acts in a direction in which the nozzle receiver fixing portion 337 comes out of the cylindrical container opening 33*a*. However, in the fifteenth embodiment, the engaged portions between the nozzle receiver engaging protrusions 3301 and the engaged holes 3051 of the front end opening prevent the nozzle receiver fixing portion 337 from moving in the direction of coming out of the cylindrical container opening 33*a*. Therefore, the position of the nozzle receiver 330 relative to the container body 33 in the rotation axis direction can be determined.

Furthermore, because the elastically-deformed receiver outer seal 3302 seals the gap between the inner surface of the cylindrical container opening 33*a* and the outer surface of the nozzle receiver fixing portion 337, a restoring force due to the deformation acts on the whole areas of the inner surface and the outer surface in the circumferential direction. Due to the action of the restoring force, the position of the nozzle receiver fixing portion 337 in the planar direction perpendicular to the rotation axis inside the cylindrical container opening 33*a* is determined. Therefore, the position of the nozzle receiver 330 relative to the container body 33 in the planar direction perpendicular to the rotation axis can be determined. The positioning is effective to maintain the relative positional relationship of the scooping wall surfaces 304*f*, the convex 304*h*, and the shutter side supporting portions 335*a* being the bridging members in order to enable the toner bridging function.

In the fifteenth embodiment, the sealed state is obtained not directly by the inner surface of the cylindrical container opening 33*a* and the outer surface of the nozzle receiver fixing portion 337. Therefore, a dimensional tolerance between components can be increased. By increasing the dimensional tolerance, the productivity can be improved. Furthermore, even when the nozzle receiver fixing portion 337 of the nozzle receiver 330 moves up and down inside the cylindrical container opening 33*a*, because the sealed state is ensured by the elastically-deformed receiver outer seal 3302, it is possible to prevent toner leakage.

In the fifteenth embodiment, the receiver outer seal 3302 being the sealing member is compressed by the inner surface being the seal receiving surface of the cylindrical container opening 33*a* and the outer surface being the seal receiving surface of the nozzle receiver fixing portion 337, so that the sealed state is obtained. Furthermore, the nozzle receiver engaging protrusions 3301 being the engaging portions on the outer surface of the nozzle receiver fixing portion 337 are engaged with the engaged holes 3051 of the front end opening being the engaged portions of the cylindrical container opening 33*a*, so that the engaged state is obtained. A repulsive force (restoring force) applied by the compressed receiver outer seal 3302 is received by the engagement to prevent the nozzle receiver from coming out of the container body. Due to the repulsive force from the receiver outer seal 3302 and the detachment preventer realized by the engagement, the position of the toner container 32 in the axial direction can be determined. Therefore, it is possible to prevent the nozzle receiver 330 from coming out of the container body 33 due to the impact of an external force.

Furthermore, because the restoring force of the receiver outer seal 3302 acts on the engaged holes 3051 of the front end opening of the cylindrical container opening 33*a* due to the engagement with the nozzle receiver engaging protrusions 3301, the engaged holes 3051 of the front end opening need to have certain strength. Therefore, it is desirable to use the strength of a thick portion of the cylindrical container opening 33*a* for the engaged holes 3051 of the front end opening. In the fifteenth embodiment, as illustrated in FIGS. 50A and 50B, the male screw 309 for screwing the cap is provided on the container front end (in the upper part in FIGS. 50A and 50B) relative to the engaged holes 3051 of the front end opening, and the male screw 309 for screwing the cap is thicker than other portions. By using the strength of such a thick portion, it becomes possible to prevent the cylindrical container opening 33*a* from being broken due to the restoring force of the receiver outer seal 3302.

In the fifteenth embodiment, a configuration is explained in which the receiver outer seal 3302 being the sealing member is provided on the outer surface of the nozzle receiver fixing portion 337 of the nozzle receiver 330. However, the sealing member may be provided on the inner surface of the cylindrical container opening 33*a* of the container body 33.

Sixteenth Embodiment

A first modification of the configuration, in which the position of the nozzle receiver 330 relative to the container body 33 is determined by using the elastic deformation of the sealing member that seals the gap between the container body 33 and the nozzle receiver 330 in the same manner as the fifteenth embodiment, will be explained below as a sixteenth embodiment.

Figure 51A:
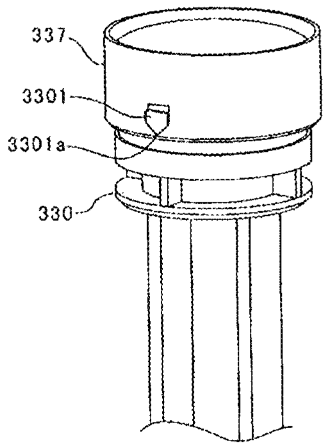
FIG. 51A is an explanatory perspective view of a nozzle receiver of the toner container according to a sixteenth embodiment.
Figure 51B:
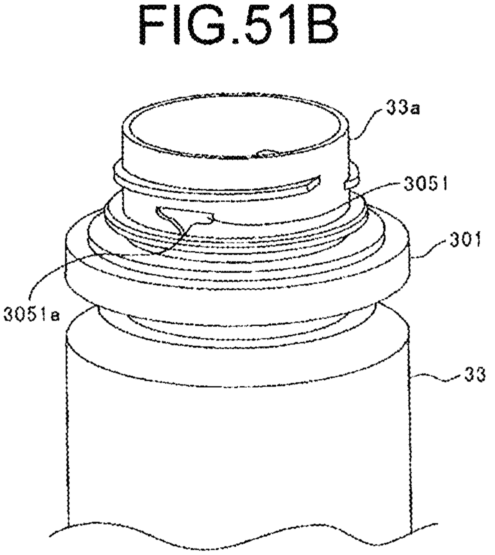
FIG. 51B is an explanatory perspective view of the container body of the toner container according to the sixteenth embodiment.

FIGS. 51A and 51B are explanatory diagrams of the toner container 32 according to the sixteenth embodiment. Specifically, FIG. 51A is an explanatory perspective view of the nozzle receiver 330 and FIG. 51B is an explanatory perspective view of the container body 33.

The toner container 32 according to the sixteenth embodiment illustrated in FIGS. 51A and 51B include an implementation as described below. Specifically, an insertion position regulator that regulates an insertion position in the rotation direction when the nozzle receiver 330 is inserted in the container body 33 is provided on the container rear end of each of the nozzle receiver engaging protrusions 3301 as the engaging portions and the engaged holes 3051 of the front end opening as the engaged portions.

The shapes applied in the sixteenth embodiment illustrated in FIGS. 51A and 51B will be explained below. The nozzle receiver engaging protrusion 3301 has a pentagonal shape when viewed in the radial direction of the nozzle receiver 330. The amount of protrusion (height) is about 0.5 mm from the surface of the nozzle receiver fixing portion 337. A crowing part 3301*a* of the engaging protrusion is formed on the container rear end as the insertion position regulator of the nozzle receiver engaging protrusions 3301. The engaged hole 3051 of the front end opening is a through hole in which an elliptical hole extending in the circumferential direction of the cylindrical container opening 33*a* and the pentagonal hole described above overlap each other. As an insertion position preventer of the engaged holes 3051 of the front end opening, a crowing part 3051*a* of the engaged hole (crowing part of the pentagonal hole) is formed on the container rear end.

The engaged hole 3051 of the front end opening, which is the engaged portion, is located inside (the side where toner is stored) relative to the front end of the tubular front end opening 305 (the end of the opening). Therefore, when the nozzle receiver fixing portion 337 is inserted in the cylindrical container opening 33*a* along with attachment of the nozzle receiver 330 to the container body 33, the nozzle receiver engaging protrusion 3301 is hidden by the cylindrical container opening 33*a* and comes out of sight. Therefore, attachment is difficult at a predetermined position where the nozzle receiver engaging protrusion 3301 is engaged with the engaged hole 3051 of the front end opening.

To cope with this, if a front end shape as an insertion position regulator is provided as in the sixteenth embodiment, it becomes possible to guide the nozzle receiver engaging protrusions 3301 to a predetermined insertion position even when the insertion position in the rotation direction varies in a small range. With the elliptical hole extending in the circumferential direction, it is possible to easily see the nozzle receiver engaging protrusion 3301 at a deviated position.

Furthermore, the advantageous effect as described below may be obtained by providing the insertion position regulator. Specifically, when the rotation drive is input and the container body 33 rotates, one of the insertion position regulators of the engaging portion and the engaged portion is engaged with the other one, so that the nozzle receiver 330 and the container body 33 can be rotated integrally. Therefore, it is possible to prevent the nozzle receiver 330 from rotating and being deviated relative to the container body 33 along with rotation of the toner container 32.

Seventeenth Embodiment

A second modification of the configuration, in which the position of the nozzle receiver 330 relative to the container body 33 is determined by using the elastic deformation of the sealing member that seals the gap between the container body 33 and the nozzle receiver 330 in the same manner as the fifteenth embodiment, will be explained below as a seventeenth embodiment.

Figure 52A:
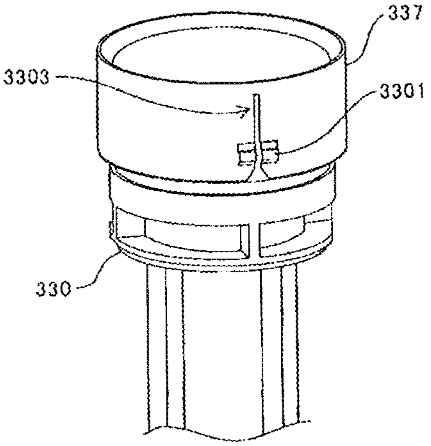
FIG. 52A is an explanatory perspective view of a nozzle receiver of the toner container according to a seventeenth embodiment.
Figure 52B:
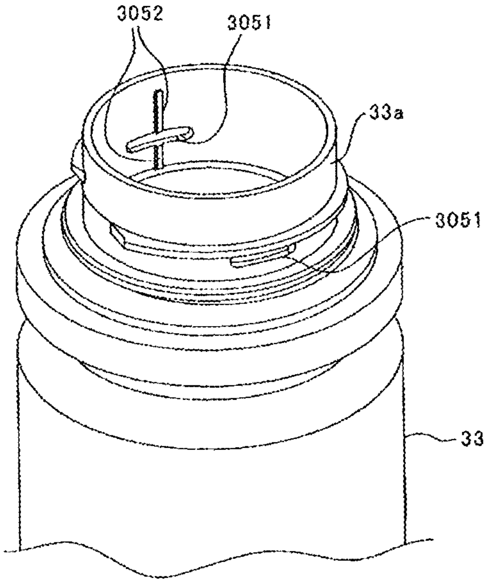
FIG. 52B is an explanatory perspective view of the container body of the toner container according to the seventeenth embodiment.

FIGS. 52A and 52B are explanatory diagrams of the toner container 32 according to the seventeenth embodiment. Specifically, FIG. 52A is an explanatory perspective view of the nozzle receiver 330 and FIG. 52B is an explanatory perspective view of the container body 33.

The toner container 32 according to the seventeenth embodiment illustrated in FIGS. 52A and 52B include an implementation as described below. Specifically, a pair of positioning sections for determining the insertion position in the rotation direction when the nozzle receiver 330 is inserted in the container body 33 and that overlaps at least one of the engaging portion and the engaged portion.

In the seventeenth embodiment illustrated in FIGS. 52A and 52B, the nozzle receiver engaging protrusion 3301, which is a protrusion extending in the circumferential direction, is provided as an engaging portion of the nozzle receiver fixing portion 337. A receiver positioning concave 3303, which overlaps the nozzle receiver engaging protrusion 3301 at the center in the circumferential direction and which extends in the rotation axis direction of the container body 33, is provided as one of the pair of the positioning sections for regulating the insertion position of the engaging portion to the engaged portion. The engaged hole 3051 of the front end opening, which is an elliptical hole extending in the circumferential direction of the front end opening 305, is provided as the engaged portion of the cylindrical container opening 33*a*. A positioning rib 3052 of the front end opening, which overlaps the engaged hole 3051 of the front end opening at the center in the circumferential direction and which extends in the rotation axis direction of the container body 33, is provided as the other one of the pair of positioning sections for regulating the insertion position of the engaging portion to the engaged portion.

When the nozzle receiver fixing portion 337 is inserted in the cylindrical container opening 33*a* along with attachment of the nozzle receiver 330 of the container body 33, the cylindrical container opening 33*a* expands in the vicinity of the nozzle receiver engaging protrusions 3301 protruding from the outer surface of the nozzle receiver fixing portion 337. Therefore, if the positioning sections, such as a rib and a concave, are provided at a position near the engaging portion or the engaged portion so as not to overlap the engaging portion or the engaged portion, the cylindrical container opening 33*a* needs to be expanded at both of the engaging portions and the positioning sections, resulting in increased fitting load.

By contrast, according to the seventeenth embodiment, the positioning ribs 3303 and 3052 formed of a rib and a concave as a pair are provided at the positions overlapping both of the engaging protrusion 3301 and the engaged hole 3051 in the rotation axis direction. By forming the positioning sections as described above, the positioning rib 3052 of the front end opening and the receiver positioning concave 3303 are engaged with each other on the engaging portion (the nozzle receiver engaging protrusion 3301) that tightly adheres to the inner surface of the cylindrical container opening 33*a* at the time of attachment. Therefore, the portion that expands in the cylindrical container opening 33*a* can be minimized to the engaging portion, the engaged position in the rotation direction can be determined, and the nozzle receiver 330 can be prevented from rotating relative to the container body 33 with rotation of the toner container 32.

Eighteenth Embodiment

A third modification of the configuration, in which the position of the nozzle receiver 330 relative to the container body 33 is determined by using the elastic deformation of the sealing member that seals the gap between the container body 33 and the nozzle receiver 330 in the same manner as the fifteenth embodiment, will be explained below as an eighteenth embodiment.

Figure 53A:
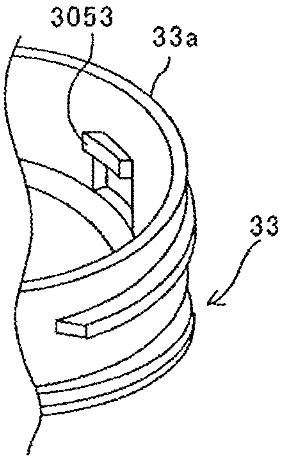
FIG. 53A is an explanatory enlarged perspective view of a front end opening of the toner container according to an eighteenth embodiment.
Figure 53B:
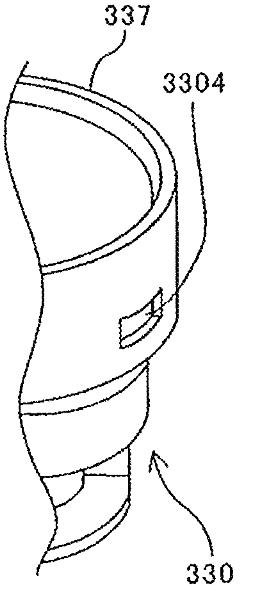
FIG. 53B is an explanatory enlarged cross-sectional view of a nozzle receiver fixing portion of the toner container according to the eighteenth embodiment.
Figure 53C:
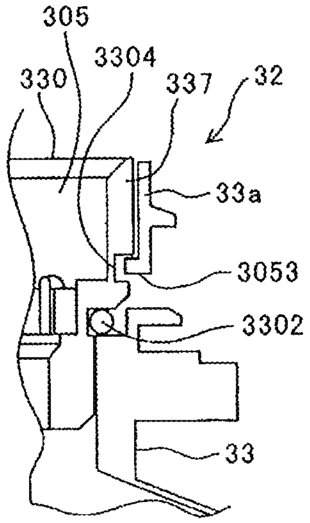
FIG. 53C is an explanatory enlarged perspective view of the vicinity of a front end of the toner container according to the eighteenth embodiment.

FIGS. 53A to 53C are explanatory diagram of the toner container 32 according to the eighteenth embodiment. Specifically, FIG. 53A is an enlarged perspective view of the nozzle receiver fixing portion 337, FIG. 53B is an enlarged perspective view of the nozzle receiver fixing portion 337, and FIG. 53C is an enlarged cross-sectional view of the vicinity of the front end of the toner container 32.

In the eighteenth embodiment, the receiver outer seal 3302 as a sealing member is provided on the outer surface of the nozzle receiver fixing portion 337. However, the sealing member may be provided on the inner surface of the cylindrical container opening 33*a* of the container body 33.

Similarly to the fifteenth embodiment, the toner container 32 according to the eighteenth embodiment is configured such that an engaging portion is provided on the nozzle receiver 330 and an engaged portion to be engaged with the engaging portion is provided on the cylindrical container opening 33*a*. To more reliably prevent the nozzle receiver 330 from coming out of the toner container, it may be possible to increase the size of the engaging portion so that the engaged area with respect to the engaged hole can be increased. However, if the engaging portion provided on the nozzle receiver 330 is increased in size, insertion load becomes too large and the cylindrical container opening 33*a* may be deformed or broken. By contrast, according to the eighteenth embodiment, an engaging protrusion 3053 of the front end opening is provided on the container body 33 in addition to the nozzle receiver engaging protrusion 3301 of the nozzle receiver 330 and a receiver engaged hole 3304 is provided on the nozzle receiver 330 in addition to the engaged hole 3051 of the front end opening of the cylindrical container opening 33*a*. Therefore, even when the amount of engagement at each portion is small, the overall amount of engagement can be increased.

Nineteenth Embodiment

A fourth modification of the configuration, in which the position of the nozzle receiver 330 relative to the container body 33 is determined by using the elastic deformation of the sealing member that seals the gap between the container body 33 and the nozzle receiver 330 in the same manner as the fifteenth embodiment, will be explained below as a nineteenth embodiment.

Figure 54A:
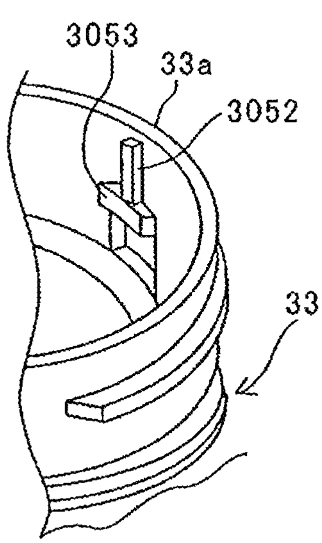
FIG. 54A is an explanatory enlarged perspective view of a front end opening of the toner container according to a nineteenth embodiment.
Figure 54B:
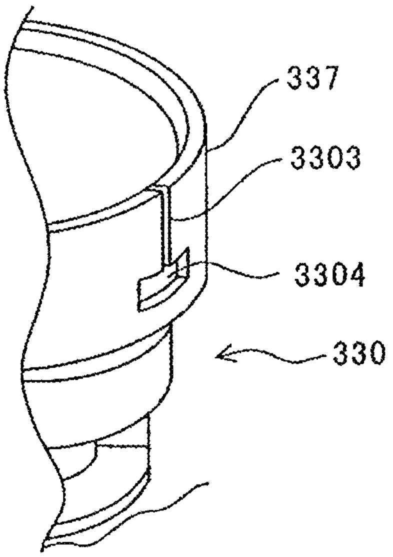
FIG. 54B is an explanatory enlarged perspective view of a nozzle receiver fixing portion of the toner container according to the nineteenth embodiment

FIGS. 54A and 54B are explanatory diagrams of the toner container 32 according to the nineteenth embodiment. Specifically, FIG. 54A is an enlarged perspective view of the cylindrical container opening 33*a* and FIG. 54B is an enlarged perspective view of the nozzle receiver fixing portion 337.

The toner container 32 according to the nineteenth embodiment illustrated in FIG. 54 includes an implementation as described below. Specifically, the positioning section for determining the insertion position in the rotation direction when the nozzle receiver 330 is inserted in the container body 33 is provided so as to overlap at least one of the engaging portion and the engaged portion in the toner container 32 according to the eighteenth embodiment.

When the nozzle receiver fixing portion 337 is inserted in the cylindrical container opening 33*a* along with attachment of the nozzle receiver 330 to the container body 33, the cylindrical container opening 33*a* expands in the vicinity of the nozzle receiver engaging protrusions 3301 protruding on the outer surface of the nozzle receiver fixing portion 337. Therefore, if the positioning sections, such as a rib and a concave, are provided at the position near the engaging portion or the engaged portion so as not to overlap the engaging portion or the engaged portion, the cylindrical container opening 33*a* needs to be expanded at both of the engaging portion and the positioning section, resulting in increased fitting load.

By contrast, according to the nineteenth embodiment, the positioning ribs 3303 and 3052 formed of a rib and a concave as a pair are provided at the positions overlapping the engaging protrusion 3053 and the receiver engaged hole 3304 in the rotation axis direction. By forming the positioning sections as described above, the positioning rib 3052 of the front end opening and the receiver positioning concave 3303 are engaged with each other on the engaging portion (the nozzle receiver engaging protrusion 3301) that tightly adheres to the inner surface of the cylindrical container opening 33*a* at the time of attachment. Therefore, the portion that expands in the cylindrical container opening 33*a* can be minimized to the engaging portion, the engaged position in the rotation direction can be determined, and the nozzle receiver 330 can be prevented from rotating relative to the container body 33 with rotation of the toner container 32.

The toner container 32 according to the fourteenth to the nineteenth embodiments all includes an invention as described below. Specifically, the toner container 32 includes the container body 33 as a powder storage that contains therein toner as powder to be supplied to the toner replenishing device 60 as a powder conveying device. The container body 33 conveys toner contained therein from the container rear end to the container front end where the opening is formed, in the rotation direction by being rotated. The toner container 32 also includes the nozzle receiver 330 serving as a nozzle insertion member that has the receiving opening 331 serving as a nozzle receiving member in which the conveying nozzle 611 as a conveying tube fixed to the toner replenishing device 60 is inserted and that is attached in the opening of the container body 33. In the toner container 32 configured as above, the nozzle receiver 330 includes the nozzle receiver engaging protrusion 3301 that is an engaging portion to be engaged with the engaged hole 3051 of the front end opening that is an engaged portion provided in the cylindrical container opening 33*a* having the opening. Furthermore, the toner container 32 includes the receiver outer seal 3302 serving as a sealing member that is disposed between the nozzle receiver 330 and the container body 33 when the nozzle receiver engaging protrusion 3301 is engaged with the engaged hole 3051 of the front end opening and that seals the gap between the nozzle receiver 330 and the container body 33.

Twentieth Embodiment

A toner container 32 according to a twentieth embodiment will be explained below. A feature of the toner container 32 according to the twentieth embodiment lies in a portion where the nozzle receiver 330 is press-fitted to the container body 33.

FIG. 13 has been referred to in the embodiments explained above, but it can also be referred to for explaining the press-fitted portion of the receiving opening 331 to the container body 33; therefore, it is referred to in explanation below. One of a region γ1 and a region γ2 in FIG. 13 becomes the press-fitted portion. The region γ1 is the inner surface of the container body 33 where the container gear 301 is provided. The region γ2 is the inner surface of the container body 33 where the cover hooked portion 306 is provided.

The toner container 32 illustrated in FIG. 13 includes an embodiment as described below. Specifically, the toner container 32 is a powder container, which contains toner as a powder developer and which includes the container shutter 332 and the nozzle receiver 330. The container shutter 332 serves as a receiving opening open/close member that opens and closes the receiving opening 331 serving as a powder discharge opening through which the toner discharged from the container body 33 passes. The nozzle receiver 330 serves as an open/close member holder for holding the container shutter 332. The cylindrical container opening 33*a* is formed on the front end of the toner container 32, and the outer surface of the cylindrical container opening 33*a* is slidably fitted to the cylindrical inner surface 615*a* (shaft bearing) of the container setting section 615. The nozzle receiver 330 is fixed to the inner surface of the container body 33 by press fitting, and the position of the press-fixed portion in the rotation axis direction is located on the container rear end relative to the position at which the outer surface of the cylindrical container opening 33*a* and the cylindrical inner surface of the container setting section 615 slide against each other.

As illustrated in FIG. 13 for example, the position of the front end of the nozzle receiver 330 and the position of the front end of the cylindrical container opening 33*a* in the rotation axis direction are the same. Therefore, the nozzle receiver 330 may be press-fitted to the inner surface of the vicinity of the front end of the cylindrical container opening 33*a*. However, the vicinity of the front end of the cylindrical container opening 33*a* is fitted to the cylindrical inner surface 615*a* of the container setting section 615. Therefore, if the press-fitted portion of the cylindrical container opening 33*a* expands and the outer diameter of the cylindrical container opening 33*a* increases due to the press-fitting of the nozzle receiver 330, the cylindrical container opening 33*a* cannot be press-fitted to the container setting section 615, resulting in a failure in the attachment between the toner container 32 and the toner replenishing device 60. Even if the toner container can be attached, the rotational torque of the toner container 32 may increase.

To prevent the above situation, it may be possible to estimate the amount of expansion of the cylindrical container opening 33*a* due to the press-fitting and set the outer diameter of the cylindrical container opening 33*a* at the time of formation of the toner container 32 based on the estimation. However, if the outer diameter of the cylindrical container opening 33*a* is set by taking the amount of expansion due to the press-fitting into account, the following defect may occur. Specifically, it becomes necessary to set a large tolerance. If the amount of expansion is small within a tolerance range, a difference between the outer diameter of the cylindrical container opening 33*a* and the inner diameter of the cylindrical inner surface 615*a* of the container setting section 615 increases resulting in inadequate positioning.

As a configuration for preventing the above situation, in the toner container 32 according to the twentieth embodiment, the outer diameter of the vicinity of the front end of the nozzle receiver fixing portion 337 of the nozzle receiver 330 is set to a slightly smaller size so that the nozzle receiver fixing portion 337 can be loose-fitted, rather than press-fitted, to the inner surface of the front end opening 305. Furthermore, as the press-fitted portion, the outer diameter of the nozzle receiver fixing portion 337 at a position irrelevant of attachment of the container setting section 615 and the container body 33 (a position where the attachment is not influenced) on the container rear end rather than the container front end is set to a size enough to enable adequate press fitting with respect to the inner diameter of the container. The irrelevant position may be a position corresponding to a thick portion of the container gear 301 (the region 11 in FIG. 13) or may be a position at which the inner diameter of the cylindrical container opening 33*a* is reduced so as to form a step and the thickness of the cylindrical container opening 33*a* is increased (the region γ2 in FIG. 13). At the position where the inner diameter is reduced so as to form a step (the region γ2 in FIG. 13), the cover hooked portion 306 formed of an annular rib is also provided on the outer surface.

By forming a portion that has a large outer diameter and that serves as a press-fitted portion on the container rear end relative to the front end of the nozzle receiver fixing portion 337 of the nozzle receiver 330, it becomes possible to prevent an increase in the outer diameter of the cylindrical container opening 33*a* in the press-fitted portion of the container setting section 615. Therefore, it is possible to prevent a failure in the attachment between the toner container 32 and the toner replenishing device 60 or prevent an increase in the rotational torque of the toner container 32 due to an increase in the outer diameter of the cylindrical container opening 33*a*.

Furthermore, because the cylindrical container opening 33*a* remains in the same form as in the preform generated by injection molding, the cylindrical container opening 33*a* can be molded with high accuracy. The portion at this position does not expand due to the press-fitting of the nozzle receiver 330 and can be used as the positioning section and the sliding section. Therefore, it is possible to maintain the good accuracy of injection molding, enabling to realize positioning with higher accuracy and sliding with good performance.

The toner container 32 formed by press fitting in the region γ1 includes an implementation as described below. Specifically, the press-fitted portion of the nozzle receiver fixing portion 337 of the nozzle receiver 330 made of resin is located so as to correspond to the position of the inner surface of the container body 33 where the container gear 301 is provided. The strength of the portion where the container gear 301 is provided is greater than the other portions of the container body 33 because a gear structure is formed to make one round around the outer circumference in the direction perpendicular to the rotation axis. Therefore, the portion is less likely to be deformed due to the press-fitting. Furthermore, because the nozzle receiver fixing portion 337 can be firmly tightened, the nozzle receiver 330 is less likely to come off even over time. Therefore, the portion is preferable as the press-fitted portion.

Furthermore, the toner container 32 formed by press fitting in the region γ2 includes an implementation as described below. Specifically, the press-fitted portion of the nozzle receiver fixing portion 337 of the nozzle receiver 330 is located so as to correspond to the position of the inner surface of the container body 33 where the cover hooked portion 306 is provided. The strength of the portion where the cover hooked portion 306 is arranged is greater than the other portions of the container body 33 because a rib structure is formed on the entire circumference in the direction perpendicular to the rotation axis. Therefore, the portion is less likely to be deformed due to the press-fitting. Furthermore, because the nozzle receiver fixing portion 337 can be firmly tightened, the nozzle receiver 330 is less likely to come off even over time. Therefore, the portion is preferable as the press-fitted portion.

A holding structure for the ID tag 700 included in the toner container 32 common to the first to the twentieth embodiments will be explained below.

Figure 55:
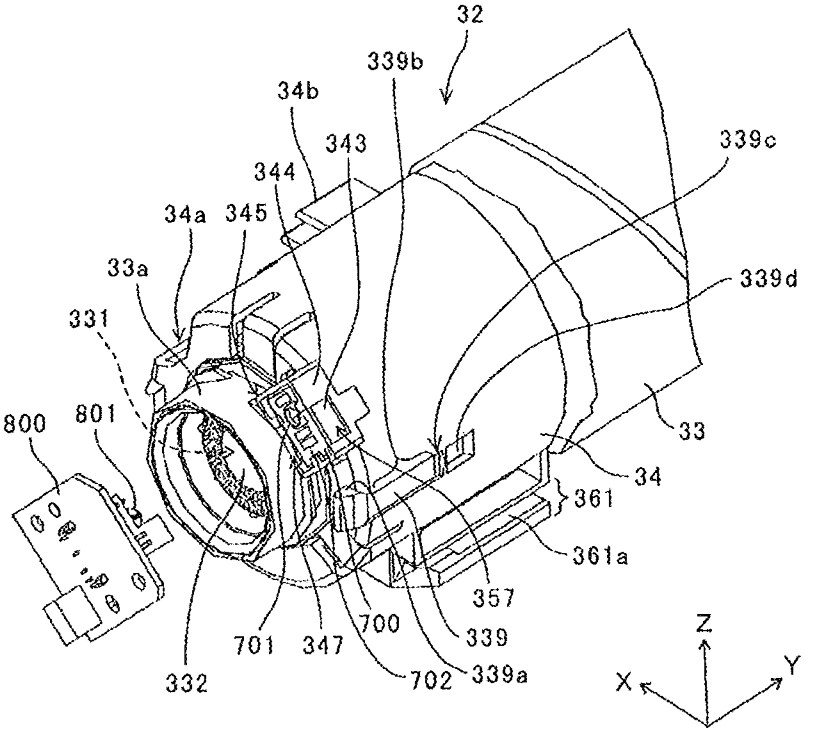
FIG. 55 is an explanatory perspective view of a connector fixed to the toner replenishing device and the front end of the toner container.

FIG. 55 is an explanatory perspective view of the connector 800 fixed to the toner replenishing device 60 and the front end of the toner container 32. As illustrated in FIG. 55, the toner container 32 includes the container body 33 and the container front end cover 34 that is attached to the container body 33 so as to expose the cylindrical container opening 33*a* provided with the receiving opening 331 serving as a toner discharge opening formed on the container body 33. The toner container 32 also includes the ID tag 700 serving as an information storage device attached to the front end of the container front end cover 34 and a holding structure 345 for holding the ID tag 700.

The ID tag 700 according to the embodiments is based on a contact communication system. Therefore, the connector 800 is arranged on the main body of the toner replenishing device 60 so as to face the front end surface of the container front end cover 34.

Figure 56:
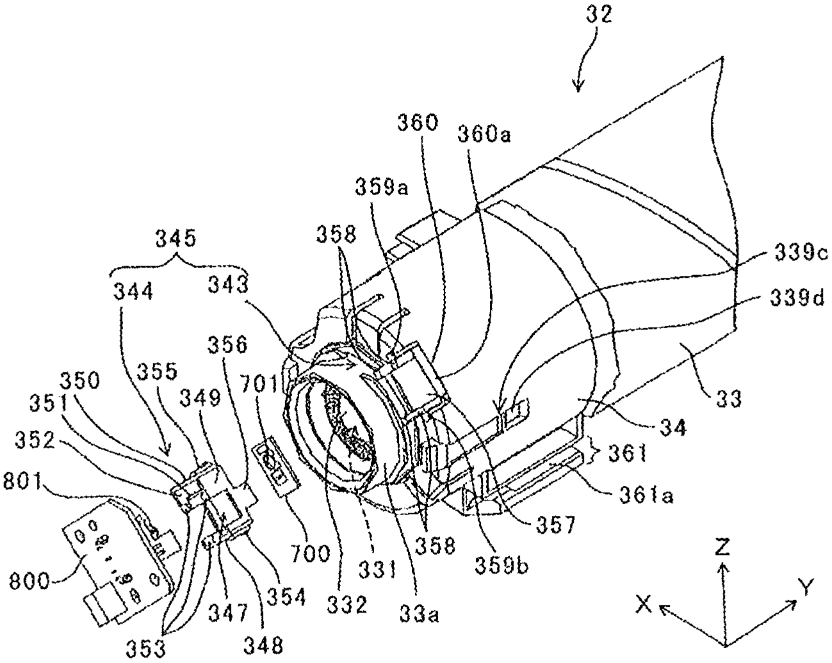
FIG. 56 is an explanatory perspective view of the front end of the toner container and the connector, when an ID tag (ID chip) holding structure is disassembled.

FIG. 56 is an explanatory perspective view of the front end of the toner container 32 and the connector 800, when the holding structure 345 is disassembled. As illustrated in FIG. 56, an ID tag hole 701 for positioning is formed on the ID tag 700. When the toner container 32 is attached to the toner replenishing device 60, a positioning pin 801 of the connector 800 is inserted into the ID tag hole 701.

The holding structure 345 includes a holding portion 343 provided with holding bases 358 for holding the ID tag 700, and includes an ID tag holder 344 that serves as a holder for holding the ID tag 700 such that the ID tag 700 can move in the X-Z direction in FIG. 56 and that serves as a cover member detachably attached to the holding portion 343. The ID tag 700 and the holding structure 345 are arranged in the obliquely upper right space of the container front end cover 34 when the toner container 32 is viewed from the container front end along the rotation axis. The holding structure 345 is arranged on the container front end cover by utilizing the obliquely upper right space that becomes a dead space when the toner container 32 is arranged in tandem with the toner containers 32 of the other colors. This makes it possible to provide a compact-size toner replenishing device that allows the cylindrical toner containers 32 to be arranged adjacent to one another. In the obliquely upper left space of the container front end cover 34, the container gear 301 and the container driving gear 601 of the main body are arranged. To prevent interference between adjacent toner replenishing systems, the toner containers are arranged so as to prevent interference among the ID tag 700, the holding structure 345, terminals 804 of the main body, and the container driving gear 601 of the main body of the toner replenishing device 60.

Figure 57:
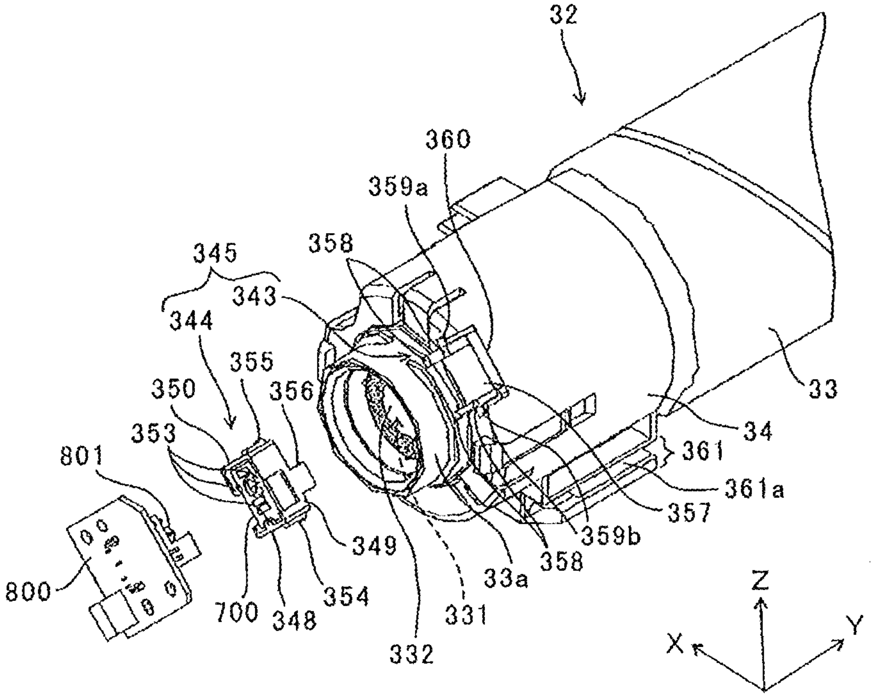
FIG. 57 is an explanatory perspective view of the front end of the toner container and the connector, when an ID tag (ID chip) is temporarily attached to an ID tag holder.

FIG. 57 is an explanatory perspective view of the front end of the toner container 32 and the connector 800, in which the ID tag 700 is temporarily attached to the ID tag holder 344. As illustrated in FIG. 57, the holding portion 343 includes the holding bases 358 including four rectangular pillars. The holding bases 358 are formed on an ID tag attaching surface 357 on the front end of the container front end cover 34, and hold the back board surface of the ID tag 700 where wiring is not arranged. The ID tag holder 344 includes a frame 352 and holder protrusions 353. The frame 352 is formed so as to surround the outer sides of the holding bases 358 to prevent the ID tag 700 from coming off when the frame is engaged with the holding portion 343. The holder protrusions 353 protrude from the inner wall surface of the frame 352 so as to cover a region where no terminal is arranged on the surface of the ID tag 700. The frame 352 of the ID tag holder 344 has the outer shape large enough to house a rectangular ID tag 700, and holds the ID tag 700 so that the ID tag 700 can move to a certain extent in the X-Z direction when the ID tag 700 is in the frame 352.

The holding structure 345 will be explained in detail below.

The frame 352 of the ID tag holder 344 is formed so as to be longer than the lengths of the holding bases 358 in the Y-axis direction in FIG. 57 (the height from the ID tag attaching surface 357). Therefore, when the ID tag 700 is attached to the holding bases 358, the ID tag 700 is not fixed to the container front end cover 34. Furthermore, the ID tag 700 is attached so as to maintain a clearance with respect to the frame 352 that surrounds the outer side of the ID tag 700 in the X-Z direction. Moreover, the ID tag 700 is attached so as to maintain a small clearance with respect to the holder protrusions 353 of the ID tag holder 344. Therefore, the ID tag 700 is not detached from the container front end cover 34 although the ID tag 700 is not fixed to the container front end cover 34. The ID tag 700 is held such that the ID tag 700 moves and rattles in the ID tag holder 344 when the toner container 32 is lightly shaken.

When the ID tag 700 is attached, as illustrated in FIG. 57, the ID tag 700 is engaged with an inner wall protrusion 351 of the ID tag holder 344 (see FIG. 56) and thereafter attached to the holding bases 358 of the holding portion 343 in the temporary-attached state. At this time, the outer portions of the holding bases 358 function as a guide for the ID tag holder 344. After the ID tag 700 is mounted on the holding bases 358, the attached ID tag 700 is separated from the inner wall protrusion 351 and placed on the front end surfaces of the holding bases 358.

Mounting of the ID tag holder 344 will be explained in detail below.

In the toner container 32 according to the embodiments, the ID tag holder 344 is fixed to the container front end cover 34 not by processing, such as thermal caulking, or fastening using a fastener but by engaging using hooks.

As illustrated in FIG. 56, the ID tag holder 344 includes a holder upper hook 355, a holder lower hook 354, and a holder right side hook 356 on a holder upper part 350, a holder lower part 348, and a holder right side part 349, respectively.

Around the ID tag attaching surface 357 on the container front end cover 34, three attached parts are formed at positions opposite the three hooks, i.e., the holder upper hook 355, the holder lower hook 354, and the holder right side hook 356. Specifically, an upper attached part 359*a* is formed at the position opposite the holder upper hook 355 around the ID tag attaching surface 357. A lower attached part 359*b* is formed at the position opposite the holder lower hook 354 around the ID tag attaching surface 357. A side attached part 360 is formed at the position opposite the holder right side hook 356.

When the ID tag holder 344 is set on the container front end cover 34, the three hooks (355, 354, 356) on the ID tag holder 344 are engaged with and fixed to the three attached parts (359*a*, 359*b*, 360) on the container front end cover 34. Two of the three attached parts, in particular, the upper attached part 359*a* and the lower attached part 359*b*, are in the form of holes, and the remaining one, in particular, the side attached part 360, is in the form of a hook.

The upper attached part 359*a* and the lower attached part 359*b* in the form of holes are set by using slopes on the front ends of the two hooks (the holder upper hook 355 and the holder lower hook 354) and by using the elasticity of the two hooks. The side attached part 360 in the form of a hook is set by using a slope on the front end of the holder right side hook 356 and by using an inclined surface 360*a* of the side attached part 360.

With this configuration, as illustrated in FIG. 57, the ID tag 700 is temporarily set inside the frame 352 of the ID tag holder 344 and the ID tag holder 344 is moved along the holding bases 358 on the container front end cover 34. Accordingly, the hooks (355, 354, 356) formed on the ID tag holder 344 can be engaged with the attached parts (359*a*, 359*b*, 360) formed on the container front end cover 34, so that the ID tag holder 344 can be fixed to the container front end cover 34 by the engagement between the hooks and the attachment parts.

In the example described above with reference to FIG. 55 to FIG. 57, the engaged portions between the hooks (355, 354, 356) and the attached parts (359*a*, 359*b*, 360) are provided on an upper side, a lower side, and a right side of the ID tag holder 344. However, the positions of the engaged portions on the ID tag holder 344 are not limited to a combination of the upper side, the lower side, and the right side. The engaged portions may be provided on only the upper side and the lower side, on only the left side and the right side, or on all of the upper side, the lower side, the left side, and the right side of the ID tag holder 344. The positions and the number of the engaged portions are not limited by the embodiments.

As described above, in the embodiments, an engaging method using hooks is explained. However, in some cases, it may be possible to fix the ID tag holder 344 to the container front end cover 34 by processing, such as thermal caulking, or fastening using a fastener. For other examples, the ID tag holder 344 may need to be mounted more firmly or a tool for rewriting (rewrite) the ID tag without detaching it from the container front end cover 34 may be available.

With reference to FIG. 58A to FIG. 63, the ID tag 700 serving as an information storage device included in the toner container 32 according to the embodiments will be explained.

In the explanation below, "an approximately rectangular metal plate" includes both a rectangular plate and an approximately rectangular plate. Therefore, "the approximately rectangular metal plate" includes plates obtained by chamfering all or some of the corners of a rectangular metal plate, plates formed in an R shape, and the like.

Figure 58A:
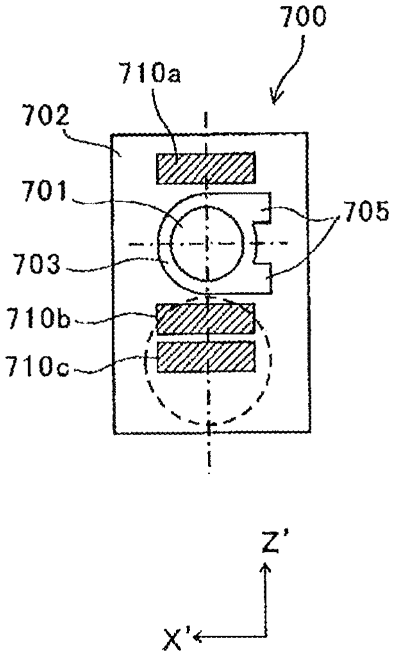
FIG. 58A is a front view of the ID tag as one of three-view drawings.
Figure 58B:
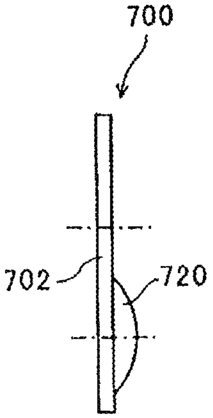
FIG. 58B is a side view of the ID tag as one of the three-view drawings.
Figure 58C:
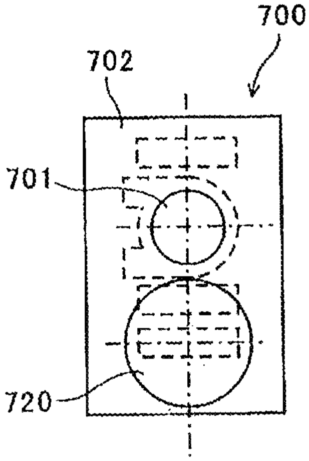
FIG. 58C is a back view of the ID tag as one of the three-view drawings.

FIGS. 58A to 58C are three-view drawings of the ID tag 700. FIG. 58A is a front view of the ID tag 700 viewed from the connector 800 side. FIG. 58B is a side view of the ID tag 700 viewed in a direction perpendicular to the attaching direction (in the obliquely upper right direction in FIG. 55). FIG. 58C is a back view of the ID tag 700 viewed from the container front end cover 34 side.

Figure 59:
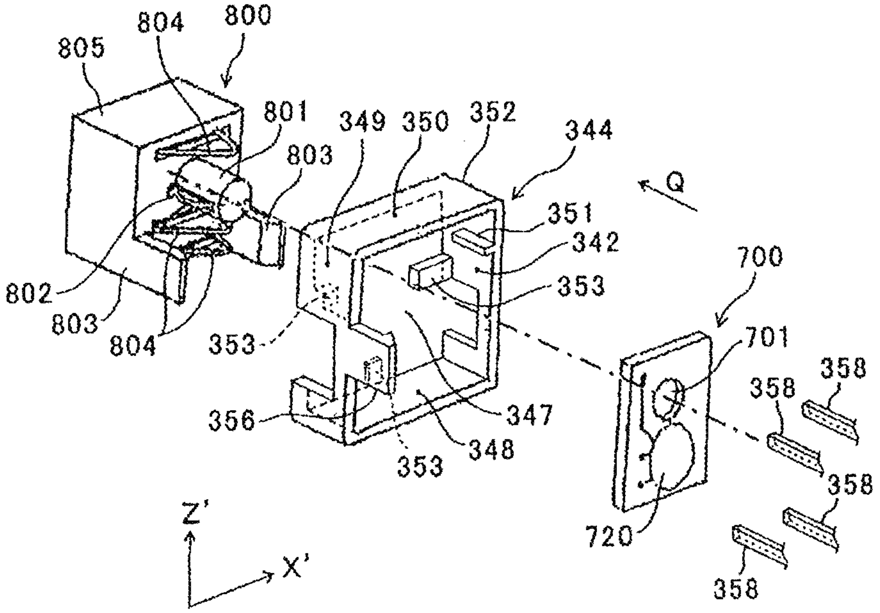
FIG. 59 is a perspective view illustrating a relative positional relationship of the ID tag, the ID tag holder, and the connector.

FIG. 59 is a perspective view of the ID tag 700, the ID tag holder 344, and the connector 800, in particular, illustrates a relative positional relationship of the three members (700, 344, 800). In FIG. 59, the holder upper hook 355 and the holder lower hook 354 illustrated in FIG. 56 and FIG. 57 are omitted.

Figure 60:
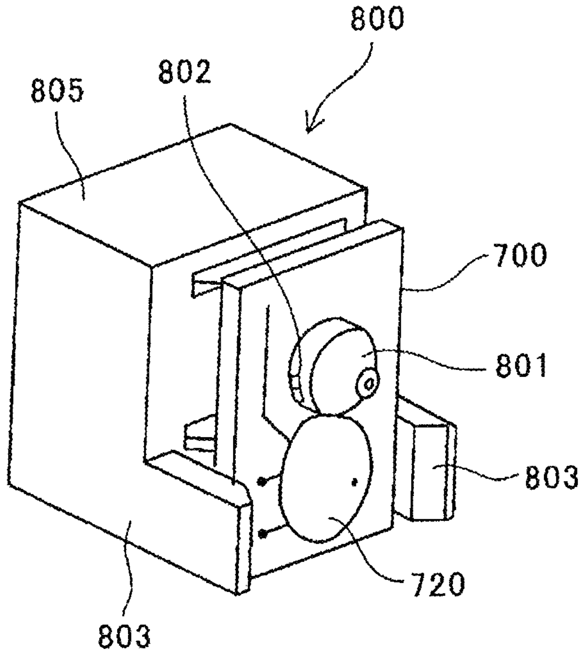
FIG. 60 is a perspective view illustrating a state where the ID tag is engaged with the connector.
Figure 61A:
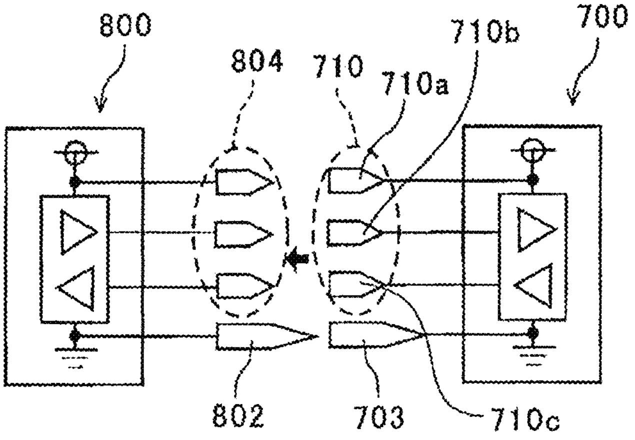
FIGS. 61A and 61B are circuit diagrams of an electrical circuit of the ID tag and an electrical circuit of the connector.
Figure 61B:
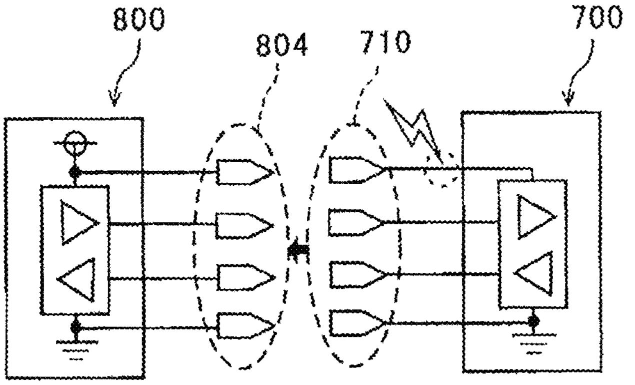

FIG. 60 is a perspective view illustrating a state where the ID tag 700 is engaged with the connector 800. FIGS. 61A and 61B are circuit diagrams of an electrical circuit of the ID tag 700 and an electrical circuit of the connector 800.

Figure 62A:
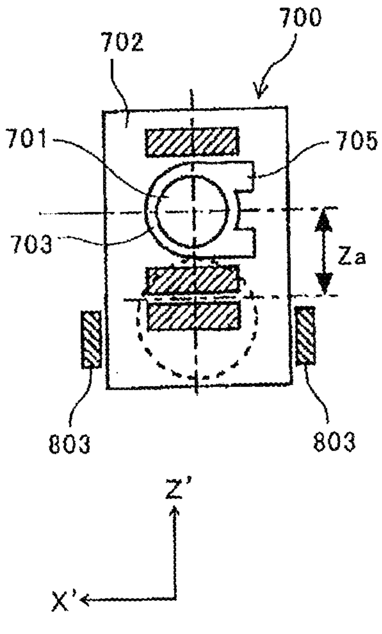
FIG. 62A is a front view of the ID tag held by the connector.
Figure 62B:
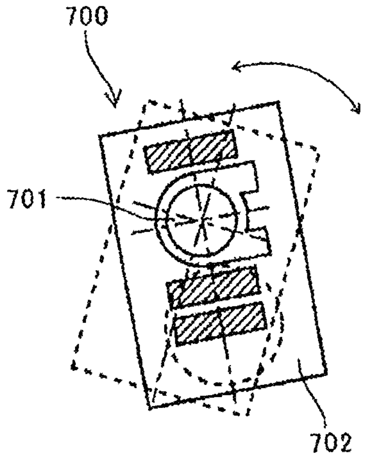
FIG. 62B is a front view of the ID tag rotated about a positioning ID tag hole.
Figure 63:
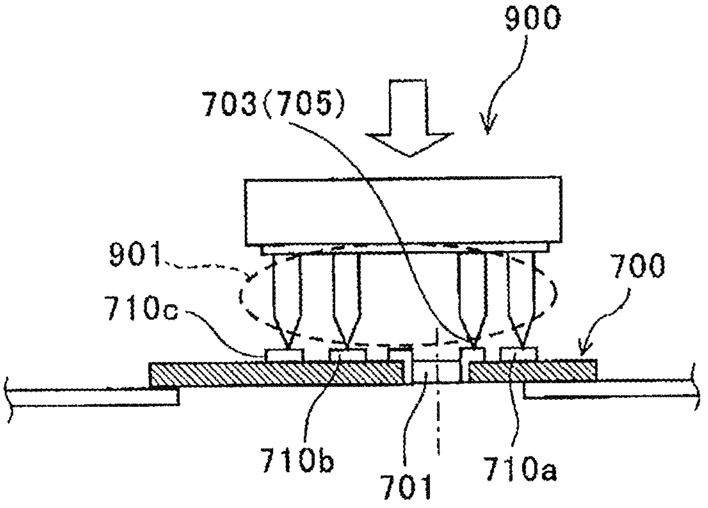
FIG. 63 is a diagram illustrating the ID tag in contact with probes of a conduction inspection device.

FIG. 62A is a front view of the ID tag 700 held by the connector 800. FIG. 62B is a front view of the ID tag 700 rotated about the ID tag hole 701 that is used for positioning. FIG. 63 is a diagram illustrating the ID tag 700 in contact with probes 901 of a conduction inspection device 900 in a test process during manufacturing in a factory.

In the ID tag 700 according to the embodiments, only one ID tag hole 701 is formed on a substrate 702, and the ID tag hole 701 is arranged between two of a plurality of metallic pads 710 (710*a*. 710*b*, 710*c*) formed of rectangular metal plates.

As illustrated in FIG. 55, in the toner container 32 according to the embodiments, the rectangular ID tag 700 is arranged such that the long side is inclined rather than being parallel to the vertical direction. Therefore, the vertical direction of the ID tag 700 being arranged on the toner container 32 does not match the longitudinal direction of the ID tag 700. However, in the following, for convenience of explanation, the direction parallel to the long side of the ID tag 700 (the Z'-axis direction in FIG. 58A) is referred to as a tag vertical direction and the direction parallel to the short side of the ID tag 700 (the X'-axis direction in FIG. 58A) is described as a tag horizontal direction. The same applies to the connector 800 that is inclined with respect to the toner replenishing device 60.

As illustrated in FIGS. 58A to 58C, in the ID tag 700 serving as an information storage device according to the embodiments, the ID tag hole 701 is formed at a position vertically above the gravity center of the substrate 702 in the tag vertical direction. An earth terminal 703 for grounding (earth), which is formed of a metal terminal, is installed on the inner surface of the ID tag hole 701 and around the ID tag hole 701. As illustrated in FIGS. 58A to 58C, the earth terminal 703 on the front surface of the substrate 702 of the embodiments is formed so that two earth terminal projections 705 extend in the tag horizontal direction relative to the circular-ring portion.

One rectangular metallic pad 710 (the first metallic pad 710*a*) is arranged above the ID tag hole 701 in the tag vertical direction. Furthermore, two metallic pads 710 (the second metallic pad 710*b* and the third metallic pad 710*c*) are arranged below the ID tag hole 701 in the tag vertical direction.

Moreover, as illustrated in FIG. 58C, a protector 720 that is made of a resin material, such as a hemispherical epoxy, and that covers and protects an information storage section is formed on the back surface of the substrate 702. In the ID tag 700, the ID tag hole 701 is arranged above the protector 720, which is the largest and heaviest component provided on the back surface because it houses an information storage section, such as an IC (integrated circuit), in the tag vertical direction. Therefore, as described above, it is possible to realize the positional relationship, in which the ID tag hole 701 is located vertically above the gravity center of the ID tag 700 in the tag vertical direction. The arrangement of the ID tag hole 701 depends on the shape of the substrate 702 or on the configuration or arrangement of the back surface, such as the protector 720.

Specifically, as illustrated in FIG. 62A, the ID tag 700 according to the embodiments is formed such that the center position of the ID tag hole 701 is located at a distance Za above the gravity center of the ID tag 700 in the tag vertical direction.

As illustrated in FIG. 59, the connector 800 includes a connector body 805 that is a hollow box made of resin, and the positioning pin 801 (positioning protrusion) that is a hollow cylinder with a tapered tip that is arranged on the connector body 805 so as to stand in the horizontal direction. An earth terminal 802 of the main body is arranged on the positioning pin 801. The earth terminal 802 of the main body is a plate-shape (or linear-shape) metallic member, a part of which is housed in the hollow section of the positioning pin 801 integrated with the connector body 805. A curved part of the earth terminal 802 is exposed from a slit-shaped opening formed on a part of the periphery of the hollow cylinder so as to protrude from the cylindrical outer surface of the positioning pin 801. One of the terminals 804 of the main body is installed vertically above the positioning pin 801 (the earth terminal 802 of the main body) in the tag vertical direction, and two of the terminals 804 of the main body are installed vertically below the positioning pin 801 in the tag vertical direction. The terminals 804 of the main body are plate-shape (or linear-shape) metallic members.

A pair of ribs are provided on the right and left sides of the positioning pin 801 in the tag horizontal direction in the lower part of the connector body 805 such that inner tapered surfaces of the ribs face each other. Furthermore, swing preventers 803 serving as a pair of regulators are provided so as to face the lower both sides of the ID tag 700 below the center of the ID tag hole 701 in the tag vertical direction.

When the ID tag holder 344 is fixed to the container front end cover 34 of the toner container 32 and the toner container 32 is attached to the toner replenishing device 60, the ID tag holder 344 is located between the connector 800 and the ID tag 700. In this state, the ID tag holder 344 holds the ID tag 700 so that the ID tag 700 can move (so that certain backlash can be allowed).

As illustrated in FIG. 59, in the ID tag holder 344, the holder protrusions 353 are provided on the holder lower part 348, a holder left side part 342, and the holder right side part 349, respectively. The three holder protrusions 353 provided on the holder lower part 348, the holder left side part 342, and the holder right side part 349 can prevent the ID tag 700 from coming out of the ID tag holder 344 toward the connector 800.

A holder hole 347 is formed on the end of the ID tag holder 344 on the connector 800 side (a wall surface including the holder protrusions 353). The holder hole 347 is shaped such that a large part of the end of the ID tag holder 344 on the connector 800 side including areas facing the four terminals of the connector 800 (the three terminals 804 of the main body and one earth terminal 802 of the main body) is opened. Furthermore, the holder hole 347 of the ID tag holder 344 is shaped such that even an area corresponding to the swing preventers 803 arranged on the connector 800 is opened. When the toner container 32 is attached, the positioning pin 801 passes through the opening position of the holder hole 347 and the swing preventers 803 subsequently pass through the opening position of the holder hole 347 and enter the inside of the ID tag holder 344.

The holding bases 358 facing the back surface of the ID tag 700 (on the protector 720 side) are one part of the container front end cover 34. The four pillars of the holding bases 358 extend from the holding portion 343 to the connector 800 side. The holding bases 358 press the vicinity of the four corners of the rectangular substrate 702 so as to prevent interference with the protector 720 fixed to the ID tag 700, and to prevent interference with the swing preventers 803 which are inserted when the connector 800 is connected.

Meanwhile, when the positioning pin 801 is inserted in the ID tag hole 701 of the ID tag 700, the ID tag 700 is pressed to the container rear end by the earth terminal 802 or the terminals 804 of the positioning pin 801. At this time, the four holding bases 358 support the back surface of the substrate 702, so that the contact state between the terminals can be maintained.

FIG. 60 is a schematic perspective view illustrating a state in which positioning of the connector 800 of the toner replenishing device 60 and the ID tag 700 is completed when the toner container 32 is attached to the toner replenishing device 60 (the main body of the copier 500). Specifically, FIG. 60 illustrates a state in which the terminals on the main body side (the terminals 804 of the main body and the earth terminal 802 of the main body) and the terminals on the ID tag 700 side (the metallic pad 710 and the earth terminal 703) are connected to one another. In FIG. 60, for simplicity of understanding, the ID tag holder 344 and the three metallic pads 710 between the connector 800 and the ID tag 700 are omitted.

In the toner container 32 according to the embodiment, the cylindrical container opening 33*a* protrudes relative to the container front end cover 34. When the non-attached toner container 32 is moved in the arrow Q direction in FIG. 60 so as to be attached to the toner replenishing device 60, the outer surfaces of the cylindrical container opening 33*a* and the container setting section 615 are engaged with each other. Consequently, the position of the toner container 32 relative to the toner replenishing device 60 in the rotation axis direction is determined. Thereafter, when the toner container 32 is further moved in the arrow Q direction in FIG. 60, a connection between the ID tag 700 and the connector 800 is started.

After the position of the toner container 32 in the direction perpendicular to the rotation axis direction is determined and the position of the container front end cover 34 in the direction perpendicular to the rotation axis direction is determined, the position of the ID tag 700 in the direction perpendicular to the rotation axis direction is determined. Specifically, after the position of the cylindrical container opening 33*a* in the direction perpendicular to the rotation axis direction is determined, the ID tag hole 701 of the ID tag 700 is engaged with the positioning pin 801 so as to be picked up by a tapered tip of the positioning pin 801 of the connector 800. With this engagement, the positions of the ID tag 700 in the tag vertical direction and the tag horizontal direction are determined simultaneously. Specifically, the position of the ID tag 700 in the direction perpendicular to the rotation axis direction is determined.

Furthermore, as illustrated in FIG. 62A, the swing preventers 803 of the connector 800 enter the lower edge portions that are horizontal both sides of the substrate 702 in the tag horizontal direction and that are located below the center of the ID tag hole 701 in the tag vertical direction. At this time, even when the posture of the ID tag 700 is misaligned as illustrated in FIG. 62B, when one of the tapered surfaces at the ends of the rib-shaped swing preventers 803 comes in contact with one of the edges, a portion below the ID tag hole 701 rotates in a direction opposite the contacted tapered surface. Then, the rotation stops at a position at which the ID tag 700 comes in contact with the two tapered surfaces equally, and the postural misalignment in the rotation direction (rotation in the double-head arrow in FIG. 62B) can be corrected (corrected to the state illustrated in FIG. 62A). As a result, the positioning of the ID tag 700 is completed.

At this time, a part of the earth terminal 703 of the ID tag 700 (a section corresponding to the inner surface of the ID tag hole 701) comes in contact with the earth terminal 802 of the positioning pin 801 illustrated in FIG. 60, so that the ID tag 700 is earthed (conduction). After the earth is connected, as illustrated in FIG. 61A, the three metallic pads 710 (710*a*, 710*b*, 710*c*) of the ID tag 700 are connected to the three terminals 804 of the connector 800, respectively. Consequently, information can be transmitted between the ID tag 700 and the controller on the toner replenishing device 60 including the connector 800 (the controller 90 of the copier 500).

In this way, according to the embodiment, a positioning structure can be realized with higher accuracy and at lower costs based on various ideas as described below (1) to (5).

(1) Only one ID tag hole 701 is provided. Therefore, costs for processing the substrate 702 can be reduced.

(2) The earth terminal 802 of the main body is integrally installed on the side circumferential surface of the positioning pin 801. Therefore, a distance between the positioning pin 801 and the earth terminal 802 of the main body can become substantially zero, and the positioning accuracy of the earth terminal 703 with respect to the earth terminal 802 of the main body can be improved.

(3) In the completely attached state as illustrated in FIG. 60, the positional relationship between the ID tag hole 701 and the curved sections of the terminals 804 of the main body is adjusted so that the center of the ID tag hole 701 coincides with a line connecting vertexes of the curved sections (contact sections) of the three terminals 804 on the connector 800. Therefore, it is possible to reduce a distance from the ID tag hole 701 serving as a positioning section to the contact sections of the terminals (the terminals 804 of the main body and the metallic pads 710) in the tag horizontal direction to nearly 0 mm. As a result, the positional accuracy can be improved when the three metallic pads 710 (710*a*, 710*b*, 710*c*) come into contact with the three terminals 804 of the main body.

(4) A plurality of the metallic pads 710 (710*a*, 710*b*, 710*c*) are arranged in a line, and the ID tag hole 701 is arranged at either of two spaces formed between two of the three pads. Therefore, it is possible to reduce a distance from the center of the ID tag hole 701 to the farthest metallic pad 710*c* (corresponding to the arm length of a pendulum) compared with an arrangement in which a positioning hole (or a notch) is arranged on the upper side or the lower side outside a row of the metallic pads 710 (710*a*, 710*b*, 710*c*) in the tag vertical direction. Specifically, when the positioning hole (or a notch) is arranged outside the row of the three metallic pads 710 (710*a*, 710*b*, 710*c*), the longest arm length becomes the distance corresponding to the three metallic pads 710 from the center (or the center of the notch). However, in the ID tag 700 according to the embodiment, the longest arm length can be reduced to a distance corresponding to the two metallic pads 710. By reducing the arm length of the pendulum, even when the parallelism of the farthest metallic pad 710*c* with respect to the terminals 804 of the main body is deviated due to, for example, mass production, it is possible to minimize the deviation.

(5) When the toner container 32 is stored alone in some space, a foreign substance may enter the ID tag holder 344 and be stuck between the ID tag 700 and the holder protrusions 353 or the holding bases 358, so that a positional deviation may be left. To cope with this problem, according to the embodiment, the positional relationship is effectively determined such that the ID tag hole 701 of the ID tag 700 is located above the gravity center in the tag vertical direction. Therefore, when the swing preventers 803 formed of a pair of ribs are inserted below the ID tag hole 701 that is the rotation center in the tag vertical direction, the ID tag 700 can be rotated. Specifically, the ID tag 700 comes in contact with the tapered surfaces of the swing preventers 803 (ribs) and is rotated so as to come in contact with the two tapered surfaces equally. Therefore, it is possible to regulate the positional deviation and correct the posture. As a result, even when only one ID tag hole 701 is provided, the positional accuracy of a plurality of the metallic pads 710 (710*a*, 710*b*, 710*c*) relative to a plurality of the terminals 804 of the main body can be improved simultaneously.

As described above (1) to (5), each of the five ideas can provide each functions and advantageous effects. Even if an inexpensive configuration in which the area size of the metallic pad 710 becomes minimal is applied, it is possible to extremely improve the positional accuracy of a plurality of the terminals (703, 710) on the ID tag 700 including the earth terminal 703 and a plurality of the terminals (802, 804) of the main body.

Other ideas and advantageous effects according to the embodiment will be explained below.

Each of the three metallic pads 710 (710*a*, 710*b*. 710*c*) will be described in detail below. The metallic pad 710*a*, which is at the highest level, receives a clock signal for controlling communication. The first metallic pad 710*a* employs a serial communication method that is low-speed but low-cost because of sequential data transfer and employs an I2C (Inter-Integrated Circuit) as a serial bus. The first metallic pad 710*a* forms a signal line to which a serial clock (SCL) is input when the serial line is connected to the connector 800 of the toner replenishing device 60. The first metallic pad 710*a* corresponds to a terminal to which a clock signal is input. However, because the clock signal flows in one-way, the first metallic pad 710*a* is highly likely to cause breakdown of the ID tag 700 if a short circuit occurs between itself and Vcc (a power supply, the third metallic pad 710) to be descried later, compared with the other terminals. Therefore, to prevent breakdown of the ID tag 700, the first metallic pad 710*a* is located more distant from the Vcc. This is because the possibility of breakdown is lowered even if a short circuit occurs between the first metallic pad 710*a* and GND (the earth terminal 703).

The second metallic pad 710*b* also employs a serial communication method, employing an I2C as a serial bus, and forms a signal line to which serial data (SDA) is input/output when the signal line is connected to the connector 800 of the toner replenishing device 60. The second metallic pad 710*b* has bidirectional input/output mechanism, and therefore, the possibility that the ID tag 700 breaks down due to a short circuit is lower than the first metallic pad 710*a* that employs a one-way input mechanism.

The third metallic pad 710*c* is a power input portion (Vcc) to which a voltage of 5V or 3.3V is input when it is connected to the connector 800 of the toner replenishing device 60. To reduce a risk of breakdown of the entire device due to a short circuit between the power supply and the GND, the serial data input terminal (the second metallic pad 710*b*) is arranged between the GND (the earth terminal 703) and the serial clock input terminal (the first metallic pad 710*a*). As illustrated in FIGS. 58A to 58C, the third metallic pad 710*c* serving as the Vcc overlaps the protector 720 on the back side of the ID chip via the substrate 702, and is located close to an IC driving circuit in the protector 720. Therefore, a short and thick line can be obtained as a power-supply line, which enables stable power-supply operations (i.e., reduction of malfunction due to noise).

Ideas regarding earth will be described below. In the attachment operation of the toner container 32, the earth terminal 703 of the ID tag 700 comes in contact with the earth terminal 802 of the positioning pin 801 (the connector 800). Thereafter, the three metallic pads 710 (710*a*. 710*b*, 710*c*) of the ID tag 700 start coming into contact with the three terminals 804 of the connector 800. In other words, in the detachment operation of the toner container 32, the contact between the three metallic pads 710 (710*a*, 710*b*, 710*c*) of the ID tag 700 and the three terminals 804 of the connector 800 is released. Thereafter, the contact between the earth terminal 703 of the ID tag 700 and the earth terminal 802 of the positioning pin 801 (the connector 800) is released (separated).

Specifically, as illustrated in FIG. 61A, in the connector 800, the contact start position of the earth terminal 802 of the main body is located closer to the ID tag 700 compared with the three terminals 804 of the terminal.

With this configuration, in the attachment operation of the toner container 32, the ID tag 700 is always earthed when the connection between the metallic pads 710 and the terminals 804 of the main body is started. In the detachment operation of the toner container 32, the ID tag 700 is always earthed when the release of the connection between the metallic pads 710 and the terminals 804 of the main body is started (contact is released). Therefore, it is possible to prevent the electrical circuit on the ID tag 700 from electrically floating because of being not earthed. As a result, the ID tag 700 is less likely to be electrically damaged.

Specifically, when the electrical circuit on the ID tag 700 is not earthed and becomes an electrically floating condition, the electrical circuit comes in the state of being earthed with extremely large impedance. Therefore, even if only slight static electricity generated by a contact or separation between the three metallic pads 710 and the three terminals 804 of the main body flows into the electrical circuit, a high voltage equal to multiplication of the electric current and the impedance is generated. The high voltage causes insulation breakdown inside the IC of the ID tag 700, so that the IC is broken.

Such a defect easily occurs when, as illustrated in FIG. 61B, the contact start positions of the three terminals 804 and the earth terminal 802 in the connector 800 are formed at the same positions with respect to the ID tag 700.

By contrast, according to the embodiment, the curved section of the earth terminal 802 of the main body exposed from the slit-shaped opening of the positioning pin 801 is arranged so as to be closer to the ID tag 700 relative to the curved sections being the most protruding portions of the terminals 804 of the main body protruding toward the ID tag 700. Therefore, the earth is firstly connected at the time of contact and the earth is lastly disconnected at the time of separation, so that the impedance becomes always zero in theory. As a result, even if static electricity flows in the electrical circuit, it is possible to prevent occurrence of insulation breakdown inside the IC.

Furthermore, the ID tag 700 according to the embodiment includes the two earth terminal projections 705 arranged on a part of the outer circumference of the earth terminal 703 as explained above with reference to FIGS. 58A to 58C.

By arranging the earth terminal projections 705 on the front surface of the substrate 702 of the ID tag 700 as described above, it is possible to easily perform the operation of contacting a conduction inspection probe in the conduction inspection process (a process of inspecting whether or not the ID tag 700 is defective) at the time of manufacturing in a factory. Specifically, as illustrated in FIG. 63, leading ends of a plurality of the probes 901 of the conduction inspection device 900 is pressed downward against the metallic pads 710 or the earth terminal 703 of the ID tag 700 on an inspection table. At this time, because the earth terminal projections 705 of the earth terminal 703 has an area that can sufficiently come in contact with the leading ends of the probes 901, it is possible to prevent a conduction inspection failure caused by a contact failure of the probes 901. Furthermore, the conduction inspection is performed by pressing the leading ends of the probes 901 downward against the earth terminal 703 (the earth terminal projections 705). Therefore, it is possible to improve the durability of the probes 901 that are repetitively used for inspection compared with a case that the probes 901 are inserted into the ID tag hole 701 in the conduction inspection. Furthermore, it is possible to prevent abrasion of the ID tag hole 701 of the ID tag 700 due to the conduction inspection.

In a surplus space broadening in a wedge form between the annular earth terminal 703 and the rectangular metallic pads 710, the components are arranged as follows. Specifically, the earth terminal projections 705 have the boundary (the boundary line) in the tag horizontal direction. The boundary comes in contact with the annular outer circumference of the annular earth terminal 703, the earth terminal projections 705 are arranged so as to be parallel to the longitudinal direction of the metallic pads 710 (710*a*, 710*b*, 710*c*). Therefore, the earth terminal projections 705 do not protrude in the tag vertical direction and can be prevented from protruding to the right and left sliding areas of the substrate 702 that slides against the holder protrusions 353 (protrusion in the tag horizontal direction). As a result, it is possible not to increase the size of the substrate 702 and it is possible to obtain as many substrates 702 having the standard size as possible from a standard material having a rated size at the time of manufacturing. Therefore, it is possible to reduce an increase in the initial cost of the ID tag 700.

Furthermore, the three terminals 804 of the connector 800 are plate-shape (or linear-shape) metallic members. The three terminals 804 are fixedly supported by the connector body 805 such that one end of each of the terminals serves as a fixed end and the other end (the front end) of each of the terminals serves as a free end. A curved section that curves toward the ID tag 700 (the toner container 32) is formed on the front end of each of the three terminals 804. Specifically, the terminals 804 are bent like a knee (or a boomerang) toward the ID tag 700. The curved sections of the terminals 804 serve as contact sections with the metallic pads 710.

Along with the attachment operation of the toner container 32 to the toner supply device 60, the curved sections of the terminals 804 come into contact with approximate centers of the metallic pads 710 in the longitudinal direction (the tag horizontal direction). When the attachment operation of the toner container 32 is further continued, the ID tag 700 comes closer to the connector 800, and the terminals 804 are displaced while being pressed and elastically deformed by the metallic pads 710 (such that a bent knee is straightened) such that the curved sections of the terminals 804 come closer to the free end side. Specifically, along with the attachment operation of the toner container 32, the curved sections of the terminals 804 slide from the center to the free end side in the longitudinal direction (the tag horizontal direction) while gradually increasing the contact pressure applied to the metallic pads 710.

With this configuration, it is possible to more reliably prevent a contact failure between the terminals 804 of the main body and the metallic pads 710. Specifically, in some cases, the position of the container front end cover 34 (the metallic pads 710) relative to the connector 800 (the terminals 804 of the main body) in the longitudinal direction (the tag horizontal direction) may be deviated because of a variation in the dimensional accuracy of related components or a variation in the assembly accuracy (dimensional variation). However, because of the above configuration, even when the longitudinal position of the container front end cover 34 relative to the connector 800 is deviated, it is possible to more reliably prevent a contact failure between the terminals 804 of the main body and the metallic pads 710.

As described above, in the toner container 32 according to the embodiments, the contact-type ID tag 700 (the information storage device) is held by the holding structure 345 of the ID tag holder 344. Specifically, the ID tag 700 is held by the holding structure 345 of the ID tag holder 344 so that the ID tag 700 can move on a virtual plane approximately perpendicular to the moving direction (the arrow Q direction) along which the metallic pads 710 (terminals of the container) come closer (or come in contact with) the terminals 804 of the main body. Therefore, even in the situations described below, a contact failure caused by a positioning failure between the metallic pads 710 of the ID tag 700 and the terminals 804 of the connector 800 of the toner replenishing device 60 can hardly occur. Specifically, even when the contact-type ID tag 700 is mounted on the toner container 32 detachably attached to the toner replenishing device 60 (the main body of the copier 500), the contact failure can hardly occur.

Furthermore, according to the embodiments, even when the contact-type ID tag 700 is mounted on the toner container 32 detachably attached to the toner replenishing device 60, the ID tag 700 can hardly be damaged electrically. This is because the earth terminal 703 to be engaged with the earth terminal 802 on the positioning pin 801 of the connector 800 is formed on the ID tag hole 701 on the substrate 702 of the ID tag 700.

If toner fluidity is high, toner scattering due to attachment/detachment of the toner replenishing container easily occurs. This problem is dealt with in the embodiments.

As indicators indicating the toner fluidity, accelerated cohesion (%) and aerated bulk density ($g/cm^3$) are known. Toner to be contained in the toner container 32 according to the embodiment may be as follows; toner with a volume-average particle diameter of about 5.5 μm, the accelerated cohesion of about 13%, and the aerated bulk density of 0.36 $g/cm^3$ added with silica of 3.3 (part by weight) and titanium of 0.6 (part by weight). Such toner can be fixed by heat at 120° C. and has excellent low-temperature fixability.

Alternatively, it is possible to use toner with a volume-average particle diameter of about 4.5 μm, the accelerated cohesion of about 18%, and the aerated bulk density of 0.38 $g/cm^3$ added with silica of 2.3 (part by weight) and titanium of 0.7 (part by weight). It is of course possible to use other toner instead of those illustrated above by example.

Toner can be manufactured by using a known polymerization method or grinding method.

As a method for measuring a particle diameter distribution of a toner particle, a Coulter Counter method may be applied. As a measuring device based on this method, a Coulter Counter TA-II or a Coulter Multisizer II (each manufactured by Beckman Coulter, Inc.) may be applied.

The accelerated cohesion of toner was measured by Powder Tester (manufactured by Hosokawa Micron Corporation) in the test environment with temperature of 24° C. and humidity of 72%. Other conditions are listed in Table 1.

TABLE 1

| item | unit | value under standard condition | value under condition of the embodiment |
|---|---|---|---|
| upper screen | μm | 75 | 75 |
| middle screen | μm | 45 | 45 |
| lower screen | μm | 20 | 20 |
| vibration width | mm | 1 | 1.5 |
| amount of sample powder | g | 2.00 ± 0.01 | 2.00 ± 0.01 |
| vibration duration | sec | 10 | 30 |

After the measurement, the toner cohesion is obtained according to Equation below.

$$\text{Weight \% of powder remaining in upper screen} \times 1 \quad (a)$$

$$\text{Weight \% of powder remaining in middle screen} \times 0.6 \quad (b)$$

$$\text{Weight \% of powder remaining in lower screen} \times 0.2 \quad (c)$$

$$\text{Cohesion (\%)} = (a)+(b)+(c)$$

The measurement results are shown in Table 2 (unit: %)

TABLE 2

| type of toner | measurement value under standard condition | first measurement value under condition of embodiment | second measurement value under condition of embodiment |
|---|---|---|---|
| A | 11.4 | 11.2 | 11.6 |
| B | 12.9 | 12.6 | 13.2 |
| C | 18.4 | 17.2 | 19.6 |
| D | 56 | 54.2 | 57.8 |
| E | 64.9 | 63.8 | 66 |

According to the results shown in Table 2, the fluidities of toner D and E were determined as low.

The aerated bulk density is a value calculated by loosely filling a container with toner, leveling the toner, and dividing the inner weight by the volume of the container.

If the toner fluidity is high, toner scattering is likely to occur. However, in the toner container and the toner replenishing device according to the present disclosure, toner is replenished to the toner replenishing device inside the toner container. Therefore, while this configuration is of course useful for toner with relatively low fluidity, the configuration is more useful for toner with higher fluidity because it can prevent toner scattering.

The above embodiments are explained by way of example only. The present disclosure can achieve various effects specific to each embodiment as described below.

Embodiment A

A powder container, such as the toner container 32, removably attachable to an image forming apparatus, such as the copier 500, the powder container includes a container body, such as the container body 33, including a container opening, such as the container opening 33*a*, in a first end and containing image forming powder, such as toner, a conveyor, such as the spiral rib 302, arranged inside the container body, to convey the powder from a second end of the container body to the first end along a longitudinal direction of the container body; a nozzle receiver, such as the nozzle receiver 330, arranged in the container opening and including a nozzle receiving opening, such as the receiving opening 331, to receive a powder conveying nozzle, such as the conveying nozzle 611, of the image forming apparatus, the nozzle receiver to guide the powder conveying nozzle to the inside of the container body; and a scooping portion, such as the scooping portion 304, scooping up the powder received from the conveyor with the rotation of the scooping portion, to move the powder to a powder receiving opening, such as the nozzle opening 610, of the powder conveying nozzle. The nozzle receiving opening is arranged on the inner bottom of the container opening, such as the front end opening 305.

Therefore, as described in the above embodiments, because the nozzle receiving opening is arranged on the cylindrical inner bottom of the container opening, a part of the edge of the container opening on the container front end side protrudes relative to the edge of the nozzle insertion member where the nozzle receiving opening is formed. The protrusion prevents scattering of toner leaked from the nozzle receiving opening when the conveying nozzle is removed from the powder container. Furthermore, the contact member and the biasing member are housed in the inner space of the cylindrical container opening when the powder container is attached to the powder conveying device. Therefore, it is possible to prevent increase in the longitudinal size of the powder conveying device when the powder container is attached.

Embodiment B

In the powder container according to the embodiment A, an outer surface of the container opening of the container body is a positioning section with respect to the image forming apparatus.

Therefore, as explained in the above embodiments, it is possible to prevent powder, such as toner, to arrive at the outer surface of the container opening, enabling to improve the positioning accuracy of the powder container relative to the powder conveying device.

Embodiment C

In the powder container according to the embodiment A, a rotation axis of the container body is corresponding to the longitudinal direction, and a cylindrical outer surface of the container opening of the container body includes a rotary shaft section to be inserted in a rotary shaft receiving section of the image forming apparatus.

Therefore, as explained in the above embodiments, when the powder is entered into a gap between the rotary shaft receiving section and the rotary shaft section forming a sliding section, a sliding load at the time of rotation may increase and rotational torque of the container body may increase. However, the present embodiment enables to prevent the powder from arriving at the outer surface of the container opening. Therefore, it is possible to prevent the powder from being entered into the sliding section and prevent an increase in the sliding load. As a result, it is possible to stabilize the sliding performance and prevent an increase in the rotational torque of the container body.

Embodiment D

In the powder container according to the embodiment C, the outer surface of the container opening of the container body are a positioning section with respect to the image forming apparatus.

Therefore, as explained in the above embodiments, it is possible to stabilize the positioning accuracy of the powder container relative to the powder conveying device.

Embodiment E

In the powder container according to the embodiment C or D, the nozzle receiver includes a fixing portion, which has a screw, such as the male screws 337*c*, on the outer circumference thereof, to fix the nozzle receiver to the container opening, wherein a screwing direction of the screw is the same as a rotation direction of the powder container.

Therefore, as explained in the above thirteenth embodiment, it is possible to prevent a situation in which the rotation of the container body causes to release the screwing of the nozzle insertion member from the container body.

Embodiment F

In the powder container according to the embodiment C or D, the nozzle receiver includes a fixing portion, such as the nozzle receiver fixing portion 337, to fix the nozzle receiver to the container opening, an outer diameter of the fixing portion is greater than an inner diameter of the container opening, a protrusion, such as the nozzle receiver engaging protrusions 3301, is formed on one of an outer surface of the fixing portion and an inner surface of the container opening while an engaged hole, such as the engaged holes 3051 of the front end opening, to be engaged with the protrusion is formed on the other one of the outer surface of the fixing portion and the inner surface of the container opening, and the fixing portion is press fitted to the container opening at a position at which the protrusion and the engaged hole are engaged.

Therefore, as explained in the fourteenth embodiment, the engagement between the protrusion and the engaged hole can prevent the nozzle insertion member from coming out of the container body and from rotating relative to the container body. Furthermore, because the outer diameter of the fixing portion is greater than the inner diameter of the container opening, the container opening can be adjusted so as to follow the fixing portion when the nozzle insertion member is attached to the container body, resulting in improved circularity of the container opening. With the improvement in the circularity of the container opening, it is possible to improve the positioning accuracy of the powder container, such as the toner container 32, relative to the powder conveying device, such as the toner replenishing device 60.

Embodiment G

In the powder container according to the embodiment C or D, the nozzle receiver includes a fixing portion, such as the nozzle receiver fixing portion 337, to fix the nozzle receiver to the container opening, an outer diameter of the fixing portion is smaller than an inner diameter of the container opening, a protrusion, such as the nozzle receiver engaging protrusions 3301, is formed on one of an outer surface of the fixing portion and an inner surface of the container opening while an engaged hole, such as the engaged holes 3051 of the front end opening, to be engaged with the protrusion is formed on the other one of the outer surface of the fixing portion and the inner surface of the container opening, a seal, such as the receiver outer seal 3302, is disposed in a gap between the fixing portion and the container body, and the nozzle receiver is fitted to the container opening so that the seal is sandwiched and compressed between the fixing portion and the container body at a position at which the protrusion and the engaged hole are engaged.

Therefore, as explained in the fifteenth embodiment, the engagement between the protrusion and the engaged hole can prevent the nozzle insertion member from coming out of the container body and from rotating relative to the container body. Furthermore, the repulsive force applied by the seal and the detachment preventer realized by the engagement make it possible to determine the position of the powder container, such as the toner container 32, in the rotation axis direction and prevent the nozzle insertion member from coming out of the container body due to the impact of an external force. Moreover, because the seal is compressed for sealing, it is possible to prevent leakage of powder, such as toner.

Embodiment H

In the powder container according to the embodiment C or D, the nozzle receiver includes a fixing portion, such as the nozzle receiver fixing portion 337, to fix the nozzle receiver to the container opening, the fixing portion includes a first portion and a second portion, a first outer diameter of the first portion is smaller than an inner diameter of the container opening, corresponding to the rotary shaft section, a second outer diameter of the second portion is greater than the inner diameter of the container opening, and the fixing portion is press fitted to the container opening.

Therefore, as explained in the twentieth embodiment, a section that serves as the rotary shaft section of the container opening does not expand due to the press-fitting of the fixing portion, so that the section can be used as the positioning section or the sliding section. As a result, it is possible to maintain the good accuracy in the molding of the container opening, enabling to realize positioning with higher accuracy and sliding with good performance.

Embodiment I

In the powder container according to the embodiment H, a press-fitted portion of the fixing portion is located so as to correspond to a position of a container gear transmitting a rotational force to the container body.

Therefore, as explained in the twentieth embodiment, the strength of the portion is greater than the other portions of the container body, so that the portion is less likely to be deformed due to the press-fitting. Furthermore, because the container body firmly tightens the fixing portion, the nozzle insertion member, such as the nozzle receiver 330, is less likely to come off even over time.

Embodiment J

In the powder container according to the embodiment H, a press-fitted portion of the fixing portion is located so as to correspond to a position at which the container opening is thicker than the rotary shaft section.

Therefore, as explained in the twentieth embodiment, the strength of the portion is greater than the other portions, so that the portion is less likely to be deformed due to the press-fitting. Furthermore, because the container body firmly tightens the fixing portion, the nozzle insertion member, such as the nozzle receiver 330, is less likely to come off even over time.

Embodiment K

In the powder container according to any one of the embodiments A to J, the nozzle receiving opening is a through hole of an annular seal, and an enclosed space is formed around the conveying nozzle and between the annular seal and the nozzle receiver.

Therefore, as explained in the above embodiments, it is possible to prevent the annular seal from being jammed between the nozzle insertion member and the open/close member, such as the container shutter 332. Consequently, it is possible to prevent a situation in which the nozzle receiving opening cannot be opened and closed because of the jammed annular seal.

Embodiment L

A powder container, such as the toner container 32, removably attachable to an image forming apparatus, such as the copier 500, the powder container includes a container body, such as the container body 33, including a container opening, such as the container opening 33*a*, in a first end, and containing image forming powder, such as toner; a conveyor, such as the spiral rib 302, arranged inside the container body, to convey the powder from a second end of the container body to the first end along a longitudinal direction of the container body; a nozzle receiver, such as the nozzle receiver 330, arranged in the container opening and including a nozzle receiving opening, such as the receiving opening 331, to receive a powder conveying nozzle, such as the conveying nozzle 611, of the image forming apparatus, the nozzle receiver to guide the powder conveying nozzle to the inside of the container body; and a scooping portion, such as the scooping portion 304, receiving the powder from the conveyor and rotating to scoop up the received powder from bottom to top in the container body so as to move the powder to a powder receiving opening, such as the nozzle opening 610, of the powder conveying nozzle. The nozzle receiver includes a shutter, such as the container shutter 332, to open and close the nozzle receiving opening; a supporting portion, such as the shutter side supporting portions 335*a*, to support the shutter so as to move; an opening, such as the space 335*b* between the side supporting portions, arranged adjacent to the supporting portion, to communicate with the powder receiving opening of the conveying nozzle inserted in the nozzle receiver. The supporting portion and the opening arranged adjacent to the supporting portion are configured to alternately cross the powder receiving opening.

Therefore, as explained in the above embodiments, even when the powder is instantaneously accumulated above the powder receiving port, because the supporting portion cross the accumulated powder and alleviate the accumulation, it is possible to prevent a situation in which the accumulated toner is cohered in the rest state and a toner conveying failure occurs when the device is resumed.

Embodiment M

In the powder container according to the embodiment L, one of an inner rim of the opening, such as the space 335*b* between the side supporting portions, arranged adjacent to the supporting portion, such as the shutter side supporting portions 335*a*, and a combination of the inner rim and an outer surface of the supporting portion serves as a powder bridging that allows the powder to move from the scooping portion to the powder receiving opening.

Therefore, as explained in the above embodiments, it is possible to prevent the powder from passing through a gap between the conveying nozzle, such as the conveying nozzle 611, and an inner wall, such as the convex 304*h*, of the container body, such as the container body 33, that forms the scooping portion. Therefore, the scooped-up powder can be entered into the powder receiving opening efficiently. Consequently, it is possible to stabilize the replenishing speed even when the amount of powder in the container body is reduced. It is also possible to reduce the amount of toner remaining in the container body at the time of replacement of the powder container, such as the toner container 32. Furthermore, because the amount of powder remaining in the container body at the time of replacement, a running cost can be reduced to improve the economic efficiency and the amount of residual toner to be disposed can be reduced to reduce the influence on the environment.

Embodiment N

In the powder container according to the embodiment M, the scooping portion and the powder bridging rotate in the same rotation direction and are arranged close to each other such that the inner rim of the opening arranged adjacent to the supporting portion and a convex, such as the convex 304*h*, that rises toward the inside of the container body in the scooping portion are located in this order from downstream to upstream in the rotation direction.

Therefore, as explained in the above embodiments, it is possible to prevent the powder from passing through a gap between the conveying nozzle, such as the conveying nozzle 611, and an inner wall, such as the convex 304*h*, of the container body, such as the container body 33, that forms the scooping portion.

Embodiment O

In the powder container according to the embodiment L, the container body is held by the powder conveying device so as to rotate relative to the powder conveying nozzle about a longitudinal direction of the container body as a rotation axis when the powder is conveyed, the nozzle receiver is fixed to the container body, and the scooping portion includes a convex, such as the convex 304*h*, that is an inner wall surface of the container body rising inward in the container body and includes an inner wall that rises from the convex to an inner wall surface of the container body.

Therefore, as explained in the above embodiments, it is possible to scoop up the powder by the rotation of the container body.

Embodiment P

In the powder container according to the embodiment L or M, wherein the container body is held by the powder conveying device so as to rotate relative to the powder conveying nozzle about a longitudinal direction of the container body as a rotation axis when the powder is conveyed, the nozzle receiver is fixed to the container body, the scooping portion includes a convex, such as the convex 304*h*, that is an inner wall surface of the container body rising inward in the container body and includes an inner wall that rises from the convex to an inner wall surface of the container body, and the convex and the powder bridging are arranged in a contacted state or with a small gap interposed therebetween.

Therefore, as explained in the above embodiments, it is possible to scoop up the powder by the rotation of the container body. Furthermore, it is possible to prevent the powder from passing through a gap between the conveying nozzle, such as the conveying nozzle 611, and an inner wall, such as the convex 304*h*, of the container body, such as the container body 33, that forms the scooping portion.

Embodiment Q

In the powder container according to the embodiment L, the container body is held by the powder conveying device so as to rotate relative to the conveying nozzle about a longitudinal direction of the container body as a rotation axis when the powder is conveyed, the nozzle receiver is fixed to the container body, and the scooping portion includes a rib, such as the scooping ribs 304*g*, protruding from the nozzle receiver to a vicinity of the inner wall of the container body.

Therefore, as explained in the modifications, it is possible to cause the rib to receive the powder conveyed by the conveyor, such as the spiral rib 302, scoop up the powder from bottom to top along with rotation, and cause the powder to slide on the rib surface and be entered into the powder receiving opening, such as the nozzle opening 610.

Embodiment R

A powder container, such as the toner container 32, removably attachable to an image forming apparatus, such as the copier 500, the powder container includes a container body, such as the container body 33, including a container opening, such as the container opening 33*a*, in a first end and containing image forming powder, such as toner, a conveyor, such as the spiral rib 302, arranged inside the container body, to convey the powder from a second end of the container body to the first end along a longitudinal direction of the container body; a nozzle receiver, such as the nozzle receiver 330, arranged in the container opening and including a nozzle receiving opening, such as the receiving opening 331, to receive a powder conveying nozzle, such as the conveying nozzle 611, of the image forming apparatus, the nozzle receiver to guide the powder conveying nozzle to the inside of the container body; and a scooping portion, such as the scooping portion 304, protruding to the inside of the container body and including a ridge, such as the convex 304*h*. The nozzle receiver includes a shutter, such as the container shutter 332, to open and close the nozzle receiving opening; a supporting portion, such as the shutter side supporting portions 335*a*, to support the shutter so as to move; an opening, such as the space 335*b* between the side supporting portions, arranged adjacent to the supporting portion, to communicate with the powder receiving opening of the conveying nozzle inserted in the nozzle receiver. The ridge of the scooping portion faces to the supporting portion of the nozzle receiver.

Therefore, as explained in the above embodiments, it is possible to scoop up the powder by the rotation of the container body. Furthermore, it is possible to prevent the powder from passing through a gap between the conveying nozzle, such as the conveying nozzle 611, and an inner wall, such as the convex 304*h*, of the container body, such as the container body 33, that forms the scooping portion.

Embodiment S

An image forming apparatus, such as the copier 500, includes an image forming unit, such as the printer 100, that forms an image on an image carrier, such as the photoreceptor 41, by using image forming powder, such as toner; a powder conveyor, such as the toner replenishing device 60, that conveys the powder to the image forming unit; and the powder container, such as the toner container 32, according to any one of embodiment A to R. The powder container is configured to be detachably attached to the image forming apparatus.

Embodiment A1

A powder container, removably attachable to an image forming apparatus, the powder container comprising:

a container body, including a container opening in a first end and containing image forming powder;

a conveyor, arranged inside the container body, to convey the powder from a second end of the container body to the first end along a longitudinal direction of the container body;

a nozzle receiver, arranged in the container opening and including a nozzle receiving opening to receive a powder conveying nozzle of the image forming apparatus, to guide the powder conveying nozzle to the inside of the container body, and a scooping portion, scooping up the powder received from the conveyor with the rotation of the scooping portion, to move the powder to a powder receiving opening of the powder conveying nozzle, wherein the nozzle receiving opening is arranged on the inner bottom of the container opening.

Embodiment A2

The powder container according to Embodiment A1, wherein an outer surface of the container opening of the container body is a positioning section with respect to the image forming apparatus.

Embodiment A3

The powder container according to Embodiment A1, wherein a rotation axis of the container body is corresponding to the longitudinal direction, and a cylindrical outer surface of the container opening of the container body includes a rotary shaft section to be inserted in a rotary shaft receiving section of the image forming apparatus.

Embodiment A4

The powder container according to Embodiment A3, wherein the outer surface of the container opening of the container body are a positioning section with respect to the image forming apparatus.

Embodiment A5

The powder container according to Embodiment A3, wherein the nozzle receiver includes a fixing portion, which has a screw on the outer circumference thereof, to fix the nozzle receiver to the container opening, wherein a screwing direction of the screw is the same as a rotation direction of the powder container.

Embodiment A6

The powder container according to Embodiment A3, wherein the nozzle receiver includes a fixing portion to fix the nozzle receiver to the container opening, and an outer diameter of the fixing portion is greater than an inner diameter of the container opening, a protrusion is formed on one of an outer surface of the fixing portion and an inner surface of the container opening while an engaged hole to be engaged with the protrusion is formed on the other one of the outer surface of the fixing portion and the inner surface of the container opening, and the fixing portion is press fitted to the container opening at a position at which the protrusion and the engaged hole are engaged.

Embodiment A7

The powder container according to Embodiment A3, wherein the nozzle receiver includes a fixing portion to fix the nozzle receiver to the container opening, an outer diameter of the fixing portion is smaller than an inner diameter of the container opening, a protrusion is formed on one of an outer surface of the fixing portion and an inner surface of the container opening while an engaged hole to be engaged with the protrusion is formed on the other one of the outer surface of the fixing portion and the inner surface of the container opening, a seal is disposed in a gap between the fixing portion and the container body, and the nozzle receiver is fitted to the container opening so that the seal is sandwiched and compressed between the fixing portion and the container body at a position at which the protrusion and the engaged hole are engaged.

Embodiment A8

The powder container according to Embodiment A3, wherein the nozzle receiver includes a fixing portion to fix the nozzle receiver to the container opening, the fixing portion includes a first portion and a second portion, a first outer diameter of the first portion is smaller than an inner diameter of the container opening, corresponding to the rotary shaft section, a second outer diameter of the second portion is greater than the inner diameter of the container opening, and the fixing portion is press fitted to the container opening.

Embodiment A9

The powder container according to Embodiment A8, wherein a press-fitted portion of the fixing portion is located so as to correspond to a position of a container gear transmitting a rotational force to the container body.

Embodiment A10

The powder container according to Embodiment A8, wherein a press-fitted portion of the fixing portion is located so as to correspond to a position at which the container opening is thicker than the rotary shaft section.

Embodiment A11

The powder container according to Embodiment A1, wherein the nozzle receiving opening is a through hole of an annular seal, and an enclosed space is formed around the conveying nozzle and between the annular seal and the nozzle receiver.

Embodiment A12

A powder container, removably attachable to an image forming apparatus, the powder container comprising:

a container body, including a container opening in a first end, and containing image forming powder;

a conveyor, arranged inside the container body, to convey the powder from a second end of the container body to the first end along a longitudinal direction of the container body;

a nozzle receiver, arranged in the container opening and including a nozzle receiving opening to receive a powder conveying nozzle of the image forming apparatus, to guide the powder conveying nozzle to the inside of the container body; and a scooping portion, receiving the powder from the conveyor and rotating to scoop up the received powder from bottom to top in the container body so as to move the powder to a powder receiving opening of the powder conveying nozzle, wherein the nozzle receiver includes a shutter to open and close the nozzle receiving opening;

a supporting portion to support the shutter so as to move;

an opening, arranged adjacent to the supporting portion, to communicate with the powder receiving opening of the conveying nozzle inserted in the nozzle receiver, wherein the supporting portion and the opening arranged adjacent to the supporting portion are configured to alternately cross the powder receiving opening.

Embodiment A13

The powder container according to Embodiment A12, wherein one of an inner rim of the opening arranged adjacent to the supporting portion and a combination of the inner rim and an outer surface of the supporting portion serves as a powder bridging that allows the powder to move from the scooping portion to the powder receiving opening.

Embodiment A14

The powder container according to Embodiment A13, wherein the scooping portion and the powder bridging rotate in the same rotation direction and are arranged close to each other such that the inner rim of the opening arranged adjacent to the supporting portion and a convex that rises toward the inside of the container body in the scooping portion are located in this order from downstream to upstream in the rotation direction.

Embodiment A15

The powder container according to Embodiment A12, wherein the container body is held by the powder conveying device so as to rotate relative to the powder conveying nozzle about a longitudinal direction of the container body as a rotation axis when the powder is conveyed, the nozzle receiver is fixed to the container body, and the scooping portion includes a convex that rises inside the container body so as to form a ridge and includes a slope that connects the convex and an inner cylindrical surface of the container body.

Embodiment A16

The powder container according to Embodiment A13, wherein the container body is held by the powder conveying device so as to rotate relative to the powder conveying nozzle about a longitudinal direction of the container body as a rotation axis when the powder is conveyed, the nozzle receiver is fixed to the container body, the scooping portion includes a convex that rises inside the container body so as to form a ridge and includes a slope that connects the convex and an inner cylindrical surface of the container body, and the convex and the powder bridging are arranged in a contacted state or with a small gap interposed therebetween.

Embodiment A17

The powder container according to Embodiment A12, wherein the container body is held by the powder conveying device, the nozzle receiver is held by the container body so as to rotate relative to the conveying nozzle about a longitudinal direction of the container body, and the scooping portion includes a rib protruding from the nozzle receiver to a vicinity of the inner wall of the container body.

Embodiment A18

A powder container, removably attachable to an image forming apparatus, the powder container comprising:

a container body, including a container opening in a first end and containing image forming powder;

a conveyor, arranged inside the container body, to convey the powder from a second end of the container body to the first end along a longitudinal direction of the container body;

a nozzle receiver, arranged in the container opening and including a nozzle receiving opening to receive a powder conveying nozzle of the image forming apparatus, to guide the powder conveying nozzle to the inside of the container body; and a scooping portion, protruding to the inside of the container body and including a ridge, wherein the nozzle receiver includes a shutter to open and close the nozzle receiving opening;

a supporting portion to support the shutter so as to move;

an opening, arranged adjacent to the supporting portion, to communicate with the powder receiving opening of the conveying nozzle inserted in the nozzle receiver, wherein the ridge of the scooping portion faces to the supporting portion of the nozzle receiver.

Embodiment A19

The powder container according to Embodiment A12, wherein an outer surface of the container opening is rotatably fitted to an inner surface of a container setting section of the image forming apparatus.

Embodiment A20

An image forming apparatus comprising:

an image forming unit that forms an image on an image carrier by using image-forming powder;

the powder container according to Embodiment A12 or A18;

a powder conveyor that conveys the powder to the image forming unit and includes a powder conveying nozzle that is inserted into the powder container;

a rotary shaft receiving section that holds the powder container; and a driving gear that gives the powder container a rotational force, wherein the powder container is configured to be detachably attached to the image forming apparatus so that an outer surface of the container opening is rotatably fitted to an inner surface of a container setting section of the image forming apparatus.

Embodiment A21

The powder container according to Embodiment A17, wherein a surface of the rib is bent.

Embodiment A22

The powder container according to Embodiment A12, wherein the container body is held by the powder conveying device, the nozzle receiver is held by the container body so as to rotate relative to the conveying nozzle about a longitudinal direction of the container body, and the scooping portion includes a pair of ribs whose surfaces are bent.

Embodiment A23

The powder container according to Embodiment A17 or A22, wherein the nozzle receiver is integrated with a conveying blade holder of the conveyor to which conveying blades are fixed.

Embodiment A24

The powder container according to Embodiment A17 or A22, wherein a container gear is fixed to the nozzle receiver.

Embodiment A25

The powder container according to Embodiment A17 or A22, wherein an outer surface of the nozzle receiver is rotatably fitted to an inner surface of a container setting section of the image forming apparatus.

Embodiment A26

An image forming apparatus comprising:

an image forming unit that forms an image on an image carrier by using image-forming powder;

the powder container according to Embodiment A17 or A22;

a powder conveyor that conveys the powder to the image forming unit and includes a powder conveying nozzle that is inserted into the powder container;

a container setting section that holds the powder container; and a driving gear that gives the powder container a rotational force, wherein the powder container is configured to be detachably attached to the image forming apparatus so that an outer surface of the nozzle receiver is rotatably fitted to an inner surface of the container setting section.

Embodiment A27

The powder container according to Embodiment A12, wherein the powder container contains therein toner.

Embodiment A28

The powder container according to Embodiment A18, wherein the powder container contains therein toner.

Therefore, as explained in the above embodiments, it is possible to prevent toner scattering, prevent a reduction in the positioning accuracy of the powder container due to the scattered toner, and prevent an increase in the rotational torque of the powder container. Consequently, it is possible to stably convey the powder to the conveying destination. The stable conveyance of the image forming powder can result in the stable amount of powder conveyed to the image forming unit. Therefore, the image density can be stabilized, resulting in good image formation.

EXPLANATIONS OF LETTERS OR NUMERALS

26 feed tray
27 feed roller
28 registration roller pair
29 discharge roller pair
30 stack section
32 toner container (powder container)
33 container body (powder storage)
33*a* container opening
34 container front end cover
34*a* gear exposing hole
41 photoreceptor
42*a* cleaning blade
42 photoreceptor cleaning device
44 charging roller
46Y image forming unit for yellow
46 image forming unit
47 exposing device
48 intermediate transfer belt
49 primary-transfer bias roller
50 developing device
51 developing roller
52 doctor blade
53 first developing particle accommodating portion
54 second developing particle accommodating portion
55 developer conveying screw
56 toner density sensor
60 toner replenishing device
64 toner dropping passage (powder conveying device)
70 container holding section
71 insert hole portion
72 container receiving section
73 container cover receiving section
82 secondary-transfer backup roller
85 intermediate transfer unit
86 fixing device
89 secondary transfer roller
90 controller
91 container driving section
100 printer
200 sheet feeder
301 container gear
302 spiral rib
303 gripper
304 scooping portion
304*a* scooping portion spiral rib
304*f* scooping wall surface
304*g* scooping rib
304*h* convex
305 front end opening (opening)
305*f* edge (brim)
306 cover hooked portion
309 male screw
330 nozzle receiver
330*f* edge
331 receiving opening (nozzle insertion member)
332 container shutter
332*a* first shutter hook
332*b* second shutter hook
332*c* front end cylindrical portion
332*d* sliding section
332*e* guiding rod
332*f* cantilever
333 container seal
335 shutter rear end supporting portion
335*a* shutter side supporting portion
335*b* space between the side supporting portions
336 container shutter spring
337 nozzle receiver
337*a* nozzle shutter positioning rib
337*b* seal jam preventing space
337*c* male screw

339 container engaged portion
339*a* guiding protrusion
339*b* guiding gutter
339*c* bump
339*d* engaged hole
340 container shutter supporter
341 cover hook
342 holder left side part
343 holding portion
344 ID tag holder
345 holding structure
347 holder hole
348 holder lower part
349 holder right side part
350 holder upper part
351 inner wall protrusion
352 frame
353 holder protrusion
354 holder lower hook
355 holder upper hook
356 holder right side hook
357 ID tag attaching surface
358 holding base
359*a* upper attached part
359*b* lower attached part
360 side attached part
360*a* inclined surface
361 sliding guide
361*a* sliding gutter
370 cap
371 cap flange
372 adsorption material
373 cylindrical member
374 cylindrical portion
374*a* adsorbing hole
375 front end elastic member
400 scanner
500 copier (image forming apparatus)
601 container driving gear
602 frame
603 driving motor
604 drive transmitting gear
605 conveying screw gear
607 nozzle holder
608 setting cover
609 replenishing device engaging member
610 nozzle opening
611 conveying nozzle
611*a* front end of the nozzle
611*s* nozzle opening rim
612 nozzle shutter
612*a* nozzle shutter flange
612*b* first inner rib
612*c* second inner rib
612*d* third inner rib
612*e* nozzle shutter tube
612*f* nozzle shutter spring receiving surface
612*g* front end of the first inner rib
613 nozzle shutter spring (biasing member)
614 conveying screw
615 container setting section
615*a* inner surface of the container setting section
615*b* end surface of the container setting section
640 oscillating spring
650 toner container driving shaft
651 delay generating spring
651*a* spring fixing pin
652 driving pin
653 idler gear
653*a* gear surface hole
655 spring guiding circular plate
700 ID tag (ID chip, information storage device)
701 ID tag hole (hole, notch)
702 substrate
703 earth terminal
705 earth terminal projection
710 metallic pad (terminal of the container)
710*a* first metallic pad
710*b* second metallic pad
710*c* third metallic pad
720 protector
800 connector
801 positioning pin (protrusion)
802 earth terminal of the main body
803 swing preventer
804 terminal of the main body
805 connector body
3051 engaged hole of the front end opening
3051*a* crowing part of the engaged hole
3052 positioning rib of the front end opening
3053 engaging protrusion
3301 nozzle receiver engaging protrusion
3301*a* crowing part of the engaging protrusion
3302 receiver outer seal
3303 receiver positioning concave
3304 receiver engaged hole
G developer
L laser light
P recording medium

What is claimed is:

1. A powder container to contain powder, comprising:

a nozzle receiving opening at one side of the powder container in a longitudinal direction of the powder container;

a scoop, at the one side, to scoop up the powder, when the scoop is rotated about a rotational axis; and a holder, at the one side, including an electrical terminal, the holder and the electrical terminal not intersecting the rotational axis, wherein the electrical terminal is oblique to the rotational axis relative to a vertical direction when the powder container is in a mounted orientation, and wherein the scoop is rotatable relative to the holder.

2. The powder container according to claim 1, wherein:

the electrical terminal is to contact a terminal of an image forming apparatus and communicate with an electrical circuit of the image forming apparatus.

3. The powder container according to claim 1, wherein:

the electrical terminal includes an earth terminal.

4. The powder container according to claim 1, wherein:

the electrical terminal receives a clock signal for controlling communication.

5. The powder container according to claim 1, wherein:

the electrical terminal includes a serial data input terminal.

6. The powder container according to claim 1, wherein:

the electrical terminal includes a power supply terminal.

7. The powder container according to claim 1, wherein:

the electrical terminal includes a plurality of terminals, the plurality of terminals includes at least three terminals including an earth terminal and, the earth terminal is between two other terminals of the plurality of terminals.

8. The powder container according to claim 7, wherein: the earth terminal includes a contact surface perpendicular to a contact surface of one of the other two terminals.

9. The powder container according to claim 8, wherein: the electrical terminal is to contact a terminal of an image forming apparatus and communicate with an electrical circuit of the image forming apparatus.

10. The powder container according to claim 8, wherein: the holder holds a substrate including the electrical terminal.

11. The powder container according to claim 10, wherein: the substrate includes a hole, a side of the hole includes the contact surface of the earth terminal.

12. The powder container according to claim 11, wherein: the electrical terminal is to contact a terminal of an image forming apparatus and communicate with an electrical circuit of the image forming apparatus, the longitudinal direction is parallel to an insertion direction of the powder container into the image forming apparatus, and the hole extends parallel to the insertion direction.

13. The powder container according to claim 8, wherein: the plurality of terminals are each metallic pads.

14. The powder container according to claim 7, wherein: the plurality of terminals is disposed in a row, and the row is oblique to the rotational axis relative to the vertical direction when the powder container is in the mounted orientation.

15. The powder container according to claim 14, wherein: the rotational axis passing through the nozzle receiving opening, the electrical terminal is oblique to the rotational axis relative to the vertical direction when the powder container is in the mounted orientation, a line connecting the electrical terminal and the nozzle receiving opening is oblique to the vertical direction when the powder container is in the mounted orientation, and the row is oblique to the line connecting the electrical terminal and the nozzle receiving opening.

16. The powder container according to claim 15, wherein: the plurality of terminals includes a rectangular metal pad terminal, and the rectangular metal pad terminal is oblique to the vertical direction when the powder container is in the mounted orientation.

17. The powder container according to claim 1, wherein: the rotational axis passes through the nozzle receiving opening, the electrical terminal is oblique to the rotational axis relative to the vertical direction when the powder container is in the mounted orientation, and a line connecting the electrical terminal and the nozzle receiving opening is oblique to the vertical direction when the powder container is in the mounted orientation.

18. The powder container according to claim 1, wherein: the electrical terminal is a metallic pad.

19. The powder container according to claim 1, wherein: the electrical terminal includes a plurality of terminals, the plurality of terminals includes at least four terminals, the plurality of terminals is disposed in a row, and the row is oblique to the rotational axis relative to the vertical direction when the powder container is in the mounted orientation.

20. The powder container according to claim 19, wherein: the plurality of terminals includes a rectangular metal pad terminal, and the rectangular metal pad terminal is oblique to the vertical direction when the powder container is in the mounted orientation.

* * * * *